United States Patent
Li et al.

(10) Patent No.: US 11,964,884 B2
(45) Date of Patent: Apr. 23, 2024

(54) SYSTEM AND METHOD FOR REMOVING NITRATE FROM WATER

(71) Applicant: Iowa State University Research Foundation, Inc., Ames, IA (US)

(72) Inventors: Wenzhen Li, Ames, IA (US); Hengzhou Liu, Ames, IA (US); Yifu Chen, Ames, IA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 418 days.

(21) Appl. No.: 17/195,321

(22) Filed: Mar. 8, 2021

(65) Prior Publication Data

US 2021/0276891 A1 Sep. 9, 2021

Related U.S. Application Data

(60) Provisional application No. 62/986,402, filed on Mar. 6, 2020.

(51) Int. Cl.
| | |
|---|---|
| C02F 1/467 | (2023.01) |
| B01D 53/18 | (2006.01) |
| C01B 21/50 | (2006.01) |
| C02F 1/42 | (2023.01) |
| C02F 1/461 | (2023.01) |
| C02F 1/70 | (2023.01) |
| C02F 101/16 | (2006.01) |
| C02F 103/00 | (2006.01) |
| G01N 30/86 | (2006.01) |

(52) U.S. Cl.
CPC ............ *C02F 1/4676* (2013.01); *B01D 53/18* (2013.01); *C02F 1/46109* (2013.01); *C02F 1/70* (2013.01); *G01N 30/8624* (2013.01); *C01B 21/50* (2013.01); *C02F 1/42* (2013.01); *C02F 2001/422* (2013.01); *C02F 2001/46133* (2013.01); *C02F 2101/163* (2013.01); *C02F 2103/007* (2013.01); *C02F 2201/46115* (2013.01)

(58) Field of Classification Search
CPC .......................... C02F 2101/163; C25B 1/00
See application file for complete search history.

(56) References Cited

U.S. PATENT DOCUMENTS

| | | | | |
|---|---|---|---|---|
| 5,021,132 A | * | 6/1991 | Bandlish | ................... C25B 3/29 562/60 |
| 5,098,532 A | * | 3/1992 | Thompson | ................ C25B 1/16 204/522 |
| 2008/0302736 A1 | | 12/2008 | Canos et al. | |

OTHER PUBLICATIONS

English translation of EP-0713928 (Year: 1996).*
English translation of DE-19815669 (Year: 2001).*

(Continued)

*Primary Examiner* — Salil Jain
(74) *Attorney, Agent, or Firm* — Troutman Pepper Hamilton Sanders LLP (Rochester)

(57) ABSTRACT

The present application relates to a system for removal of nitrate from water. The system includes a first reactor comprising a porous oxide-derived silver electrode (OD-Ag) for electrocatalytic reduction of nitrate ($NO_3^-$) to nitrite ($NO_2^-$) and a second reactor comprising a Pd-based catalyst for catalytic reduction of nitrite ($NO_2^-$). Also disclosed is a method of removing nitrate from water.

20 Claims, 84 Drawing Sheets

(56) References Cited

OTHER PUBLICATIONS

Hörold et al., "Development of Catalysis for a Selective Nitrate and Nitrite Removal from Drinking Water," Catal. Today 17(1-2):21-30 (1993).
Martinez et al., "State-of-the-art and Perspectives of the Catalytic and Electrocatalytic Reduction of Aqueous Nitrates," Appl. Catal. B. Environ. 207:42-59 (2017).
Pintar et al., "Catalytic Denitrification: Direct and Indirect Removal of Nitrates from Potable Water," Catal. Today 66 (2-4):503-510 (2001).
Barrabés et al., "Catalytic Nitrate Removal from Water, Past, Present and Future Perspectives," Appl. Catal. B. Environ. 104(1-2):1-5 (2011).
Chaplin et al., "Critical Review of Pd-Based Catalytic Treatment of Priority Contaminants in Water," Environ. Sci. Technol. 46(7):3655-3670 (2012).
De Vooys et al., "Electrocatalytic Reduction of NO3—on Palladium/Copper Electrodes," J. Mol. Catal. A Chem. 154 (1-2):203-215 (2000).

\* cited by examiner

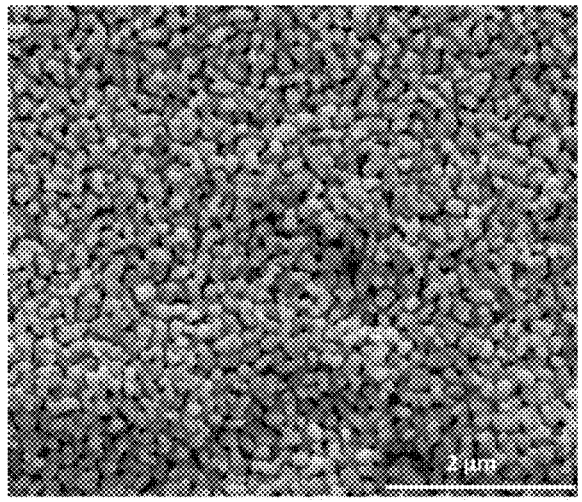
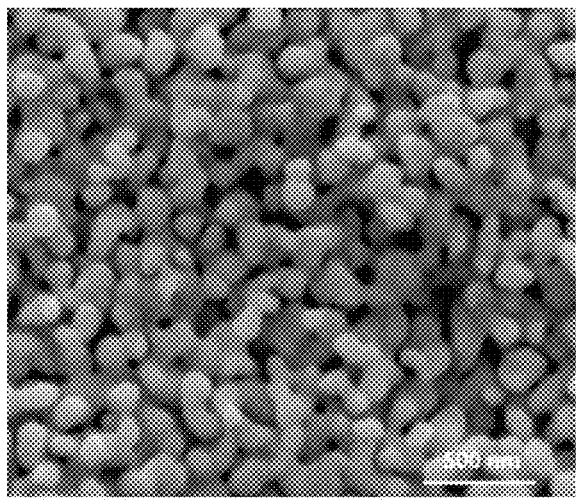
*FIG. 1A*  *FIG. 1B*
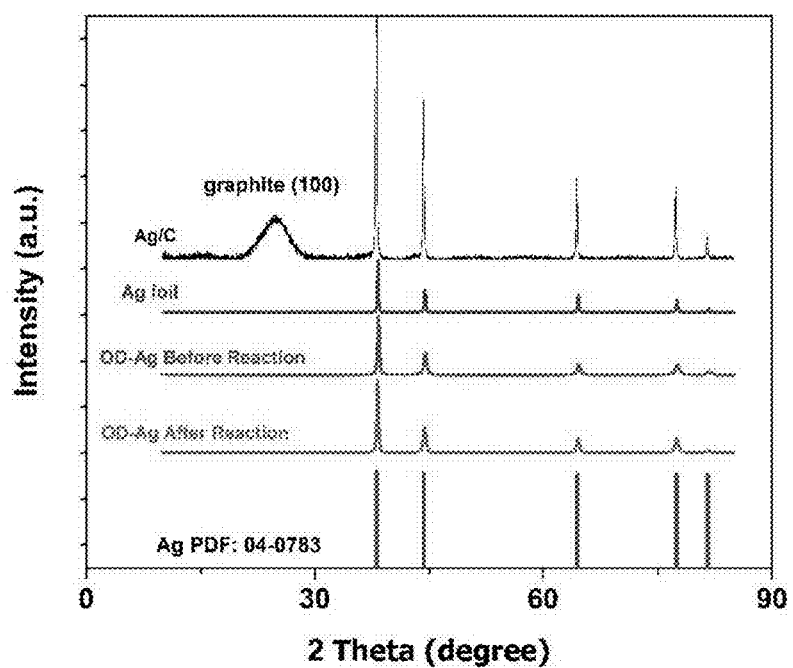
*FIG. 2*

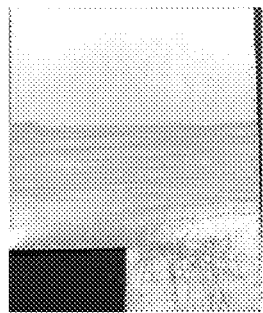 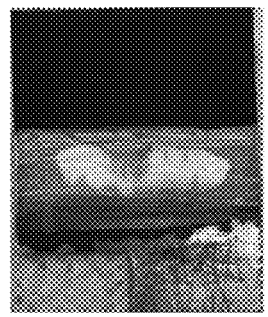 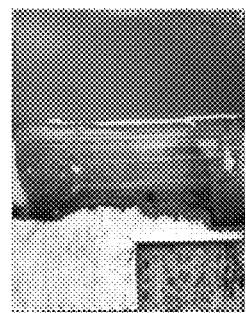
FIG. 19A  FIG. 19B  FIG. 19C
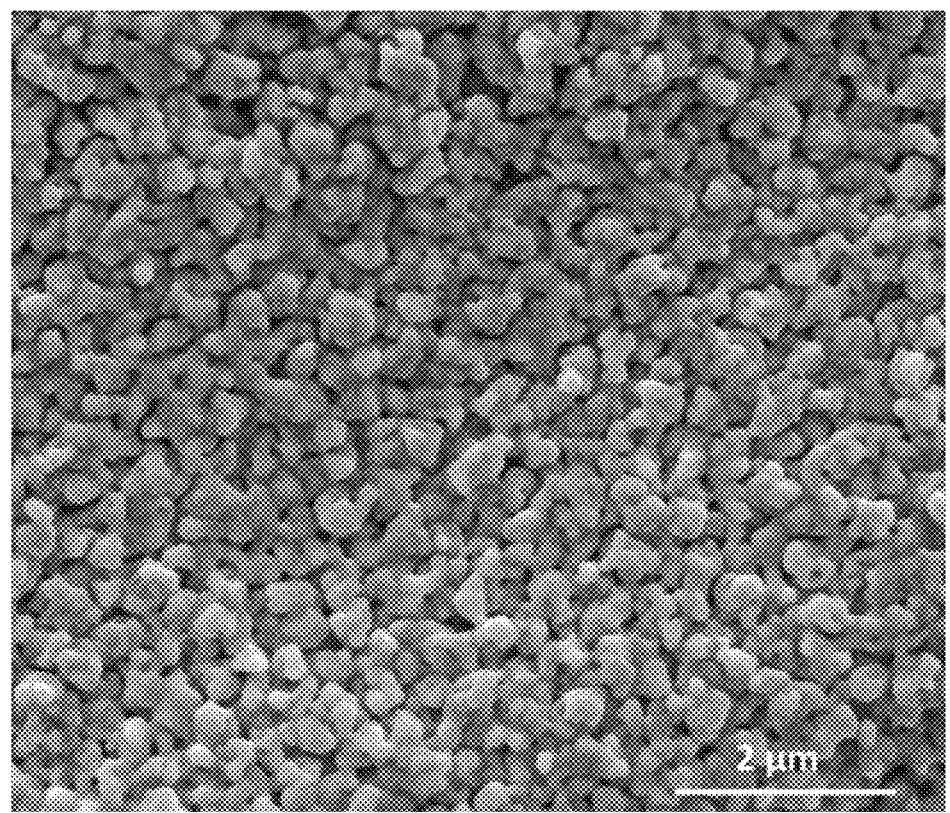
FIG. 20A

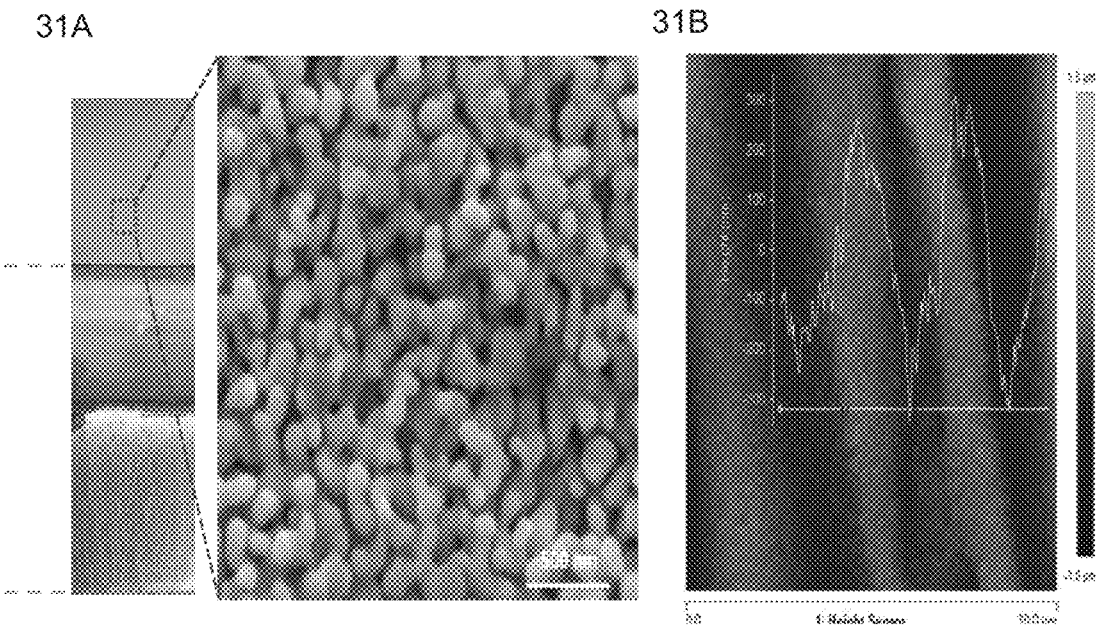
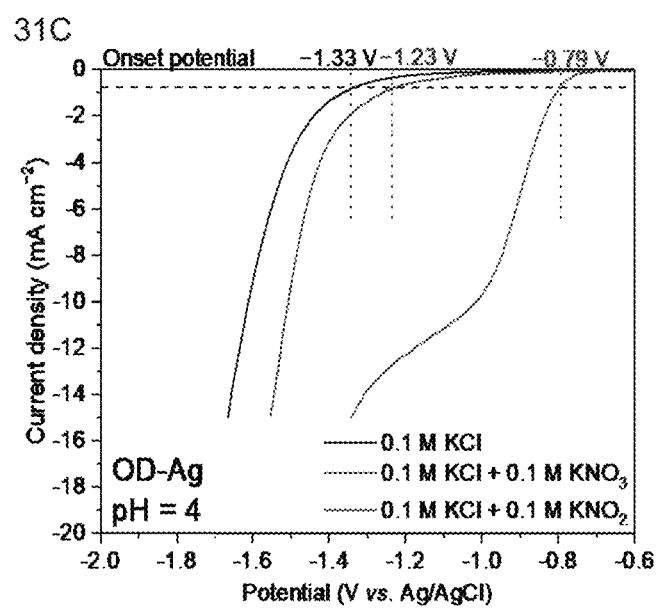
FIGs. 31A-31B
FIG. 31C

| Potential (V vs. Ag/AgCl) | $k_1$ (min$^{-1}$) | $k_2$ (min$^{-1}$) | $k_3$ (min$^{-1}$) | $R^2$ for $k_2$ | $R^2$ for $(k_1 + k_3)$ | $R^2$ for $k_1$ |
|---|---|---|---|---|---|---|
| −1.50 | 0.0316 | 0.0255 | 0.0056 | 0.97 | 0.97 | 0.96 |
| −1.30 | 0.0273 | 0.00643 | 0.0007 | 0.77 | 0.98 | 0.99 |

*FIG. 32G*

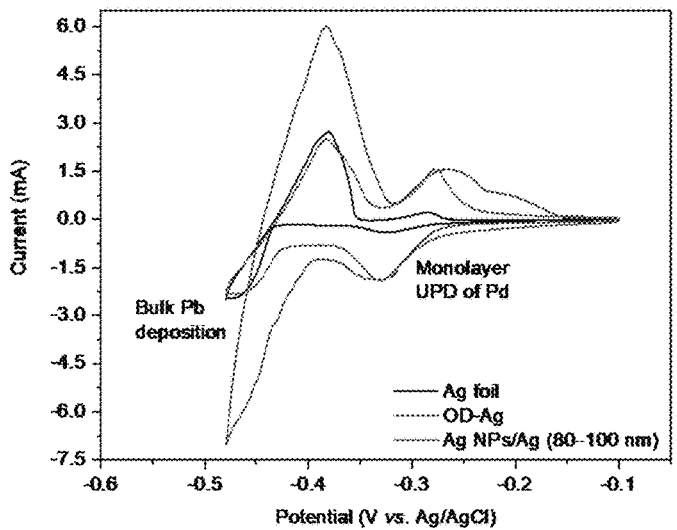
*FIG. 41A*
| Material | Preparation condition | Geometric area (cm²) | ECSA (cm²) |
|---|---|---|---|
| Ag foil | N/A | 2 | 2.1 |
| Ag NPs/Ag (80–100 nm) | Spray-coating | 2 | 25.9 |
| OD-Ag | SWV + CA | 2 | 27.1 |
*FIG. 41B*
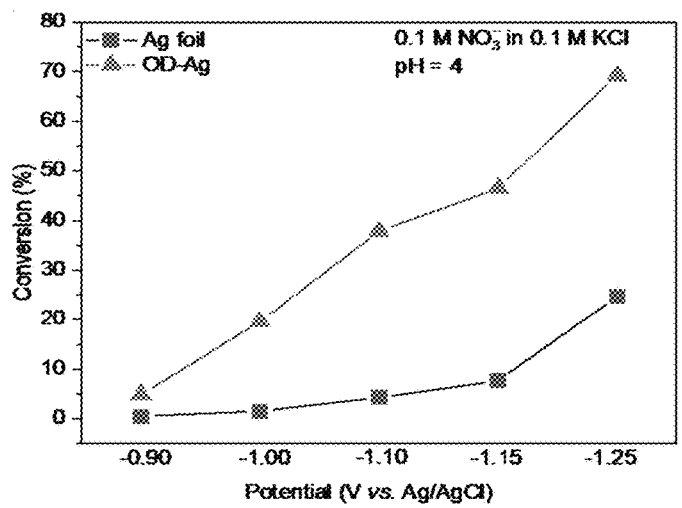
*FIG. 42A*

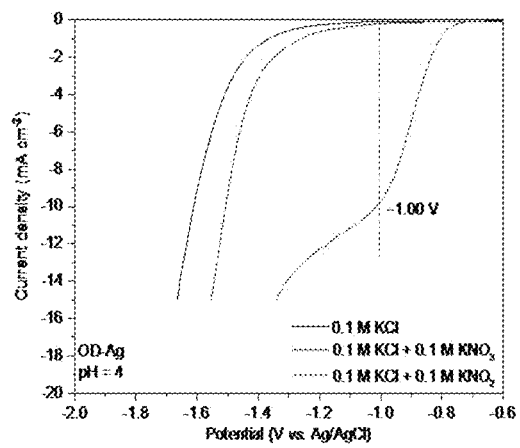
*FIG. 43C*
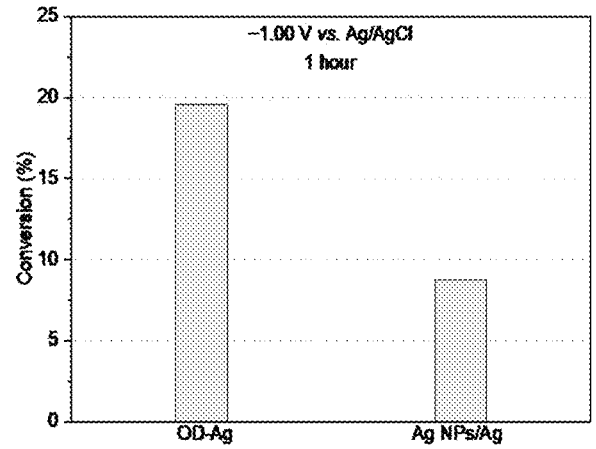
*FIG. 43D*
| Electrode | Geometric area (cm$^2$) | ECSA (cm$^2$) | Current @−1.00 V (mA) | ECSA-specific current density (mA cm$^{-2}$) |
|---|---|---|---|---|
| Ag NPs/Ag (80-100nm) | 4 | 51.80 | −13.44 | 0.26 |
| OD-Ag | 4 | 54.20 | −38.80 | 0.72 |
*FIG. 43E*
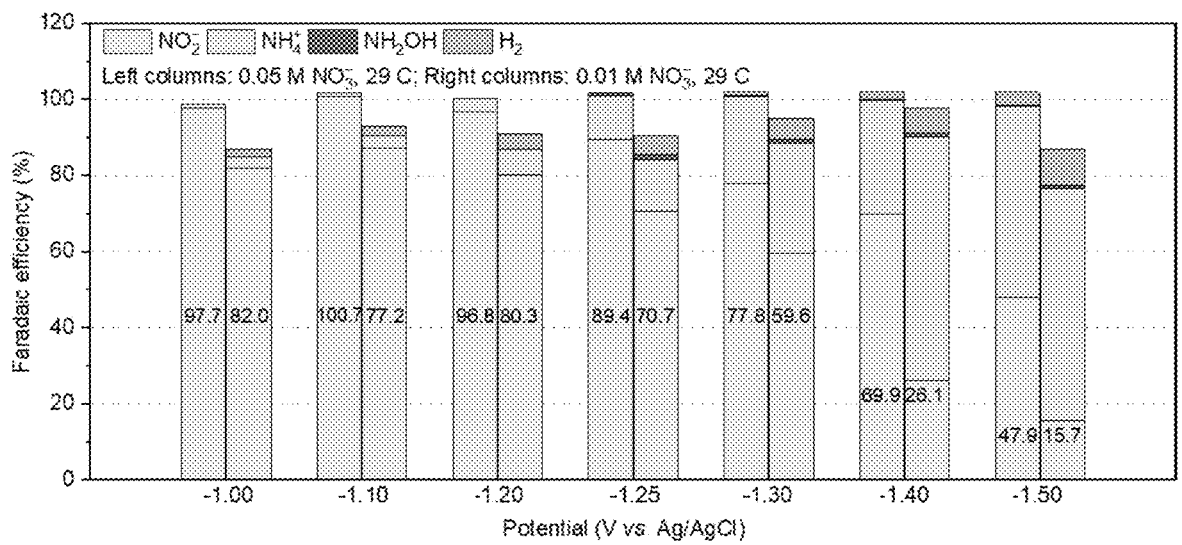
*FIG. 44*

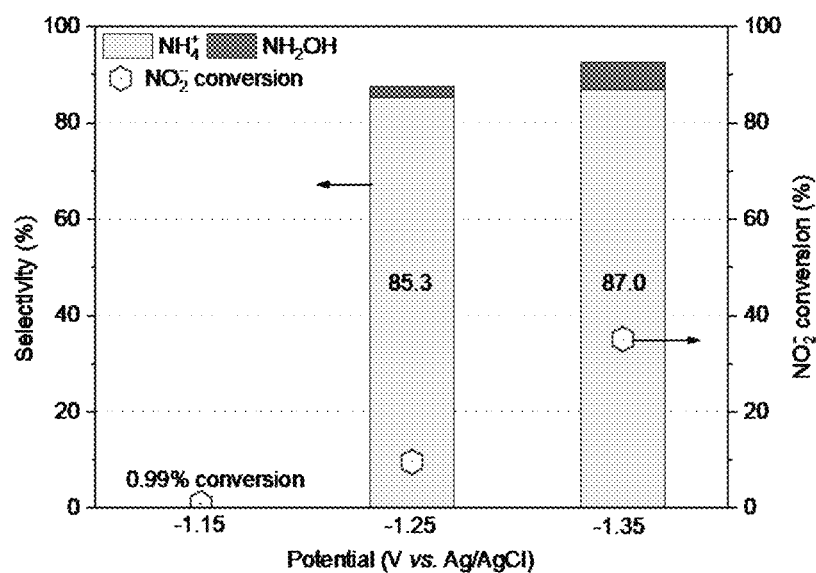
FIG. 46B
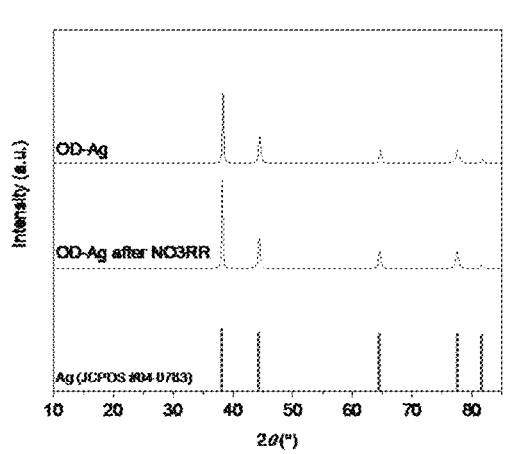
FIG. 47A
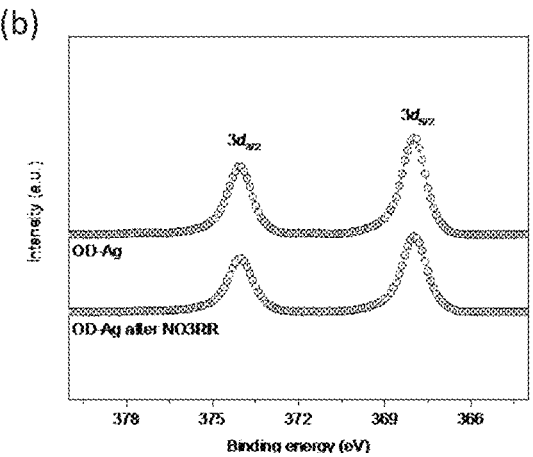
FIG. 47B
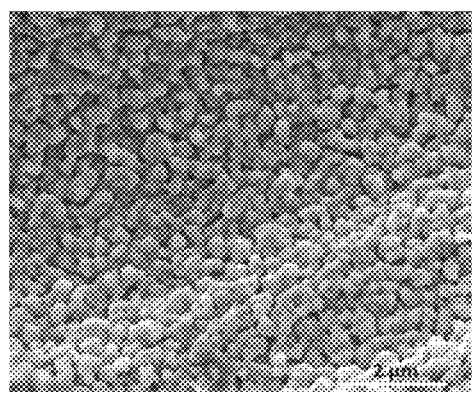
FIG. 47C
| Sample | Ag$^+$ concentration (ppb) |
|---|---|
| Ag foil | 4.90 |
| OD-Ag | 4.86 |
FIG. 47D

- $NO_3^-$ conversion: >95%    • $NO_2^-$ conversion: 100%

SYSTEM AND METHOD FOR REMOVING NITRATE FROM WATER

This application claims priority benefit of U.S. Provisional Patent Application Ser. No. 62/986,402, filed Mar. 6, 2020, which is hereby incorporated by reference in its entirety.

This invention was made with government support under grant number CHE 2036944 awarded by the National Science Foundation. The government has certain rights in the invention.

FIELD

The present application relates to a system and method for removing nitrate from water.

BACKGROUND

The nitrogen cycle plays a crucial role in biological, energy, and industrial processes (Rosca et al., "Nitrogen Cycle Electrocatalysis," *Chem. Rev.* 109:2209-2244 (2009); Duca & Koper, "Powering Denitrification: The Perspectives of Electrocatalytic Nitrate," *Energy Environ. Sci.* 5:9726-9742 (2012); Canfield et al., *Science* 330:192-196 (2010)). As a toxic chemical, nitrate ($NO_3^-$) has been increasingly found in agricultural runoff and industrial wastes, creating an imbalance in the global nitrogen cycle. The excessive $NO_3^-$ is directly responsible for the notorious eutrophication in natural waters as well as other environmental problems (N. R. Council, Clean Coastal Waters: Understanding and Reducing the Effects of Nutrient Pollution, The National Academies Press, Washington, D.C., (2000)). The intake of $NO_3^-$ has been linked to severe health issues such as methemoglobinemia (blue baby syndrome) (Ward et al., "Workgroup Report: Drinking-Water Nitrate and Health—Recent Findings and Research Needs," *Environ. Health Perspect.* 113:1607-1614 (2005)), specific cancers, and birth defects (Ward et al., "Drinking Water Nitrate and Human Health: An Updated Review," *Int. J. Environ. Res. Public Health* 15(7):1557 (2018)). Converting excess $NO_3^-$ from waste streams to harmless dinitrogen ($N_2$) has therefore increasingly become an important research topic. In the process of the $NO_3^-$-to-$N_2$ reaction, nitrite ($NO_2^-$) has been recognized as an essential intermediate product that holds the key to understanding and controlling the product selectivity and reaction activity (De Vooys et al., "Electrocatalytic Reduction of $NO_3^-$ on Palladium/Copper Electrodes," *J. Mol. Catal. A Chem.* 154:203-215 (2000); Hörold et al., "Development of Catalysts for a Selective Nitrate and Nitrite Removal from Drinking Water," *Catal. Today* 17:21-30 (1993)).

It is essential to strictly control the concentrations of nitrate and nitrite in drinking water below their maximum allowed contaminant levels of 10 ppm N (10 mg N per L) for nitrate, 1 ppm N for nitrite, and 0.66 ppm N for ammonia (EU, Council Directive 98/83/EC, Official Journal of the European Communities, Brussel, 1998; U.S. EPA, National Primary Drinking Water Regulations and Contaminant Candidate List, ed. U.S. EPA, 2008). Currently, the widely used technologies to remove nitrate or nitrite in drinking water include biological denitrification (Park & Yoo, "Biological Nitrate Removal in Industrial Wastewater Treatment: Which Electron Donor We Can Choose," *Appl. Microbiol. Biotechnol.* 82:415-429 (2009); Ghafari et al., "Bio-electrochemical Removal of Nitrate from Water and Wastewater—A Review," *Bioresour. Technol.* 99:3965-3974 (2008)), reverse osmosis (Viraraghavan, "Nitrate Removal from Drinking Water," *J. Environ. Eng.* 123(4):371-380 (1997)), ion exchange (Samatya et al., "Removal of Nitrate from Aqueous Solution by Nitrate Selective Ion Exchange Resins," *Reactive and Functional Polymers* 66:1206-1214 (2006)), and catalytic/electrocatalytic denitrification (Hamid et al., "Highly Reactive and Selective Sn—Pd Bimetallic Catalyst Supported by Nanocrystalline ZSM-5 for Aqueous Nitrate Reduction," *Applied Catalysis* B: Environmental 187:37-46 (2016); Reyter et al., "Study of the Electroreduction of Nitrate on Copper in Alkaline Solution," *Electrochimica Acta* 53:5977-5984 (2008); Siriwatcharapiboon et al., "Promotion Effects of Sn on the Electrocatalytic Reduction of Nitrate at Rh Nanoparticles," *ChemElectroChem* 1:172-179 (2014)). The main drawback of biological denitrification is that the growth of bacteria in water can cause severe issues without appropriate purification. The reverse osmosis and ion exchange processes can generate secondary nitrate/nitrite containing waste that in turn must be further treated before disposal.

Realizing highly-selective nitrate reduction towards $NO_2^-$ has, however, proven challenging, largely because the reactivity is significantly higher for $NO_2^-$ than $NO_3^-$, leading to the deep reduction to ammonia/ammonium $NH_3/NH_4^+$ with the lowest valence (Laue et al., *Ullmann's Encyclopedia of Industrial Chemistry* (2000); Matson et al., "Facile Nitrite Reduction in a Non-heme Iron System: Formation of an Iron(III)-Oxo," *J. Am. Chem. Soc.* 136:17398-17401 (2014)). Compared with $NO_2^-$, $NO_3^-$ possesses a trigonal planar structure with a stable symmetrical ($D_{3h}$) resonance that gives rise to lower binding affinity to metals and weakens the adsorption necessary for catalytic reactions (Ford et al., "A Bioinspired Iron Catalyst for Nitrate and Perchlorate Reduction," *Science* 354:741-743 (2016); Suslick & Watson, "Photochemical Reduction of Nitrate and Nitrite by Manganese and Iron Porphyrins," *Inorg. Chem.* 30:912-919 (1991)). Meanwhile, the complex reduction networks involving several nitrogen-containing chemicals provides further challenges toward controlling reduction processes (Rosca et al., "Nitrogen Cycle Electrocatalysis," *Chem. Rev.* 109:2209-2244 (2009)). Therefore, specific catalytic systems are usually required to conduct selective $NO_3^-$ reduction reactions ($NO_3$RR) (Ford et al., "A Bioinspired Iron Catalyst for Nitrate and Perchlorate Reduction," *Science* 354:741-743 (2016); Yoshioka et al., "Electrocatalytic Reduction of Nitrate to Nitrous Oxide by a Copper-Modified Covalent Triazine Framework," *J. Phys. Chem.* 120:5729-15734 (2016)).

In addition to being the intermediate product towards harmless $N_2$, $NO_2^-$ is also a versatile chemical widely involved in chemical, pharmaceutical (e.g., dyes, caffeine, and pytamine) (Laue et al., *Ullmann's Encyclopedia of Industrial Chemistry* (2000); Bauer et al., "Recent Progress in Alkali Nitrate/Nitrite Developments for Solar Thermal Power Applications," *Molten Salts Chemistry and Technology, Norway,* 5-9 Jun. 2011), and food industries (as preservative and flavor agent) (Carocho et al., "Natural Food Additives: Quo Vadis?," *Trends Food Sci. Technol.* 45:284-295 (2015); Cammack et al., "Nitrite and Nitrosyl Compounds in Food Preservation," *Biochim. Biophys. Acta* 1411: 475-488 (1999)). Further, the use of $NO_2^-$ as a reactive platform has shown promising design flexibilities for the distributed production of nitrogen-based valuable chemicals such as $NH_4^+$ (Clark et al., "Mechanistic Insights into pH-Controlled Nitrite Reduction to Ammonia and Hydrazine over Rhodium," *ACS Catal.* 10:494-509 (2019); Li et al., "$Cu_xIr_{1-x}$ Nanoalloy Catalysts Achieve Near 100%

Selectivity for Aqueous Nitrite Reduction to $NH_3$," *ACS Catal.* 10:7915-7921 (2020); Li et al., "Molybdenum Sulfide: A Bioinspired Electrocatalyst for Dissimilatory Ammonia Synthesis with Geoelectrical Current," *J. Phys. Chem. C* 121:2154-2164 (2017)), NO (Park et al., "In Situ Electrochemical Generation of Nitric Oxide for Neuronal Modulation," *Nat. Nanotechnol.* 15:690-697 (2020)), and urea (Feng et al., "Te-Doped Pd Nanocrystal for Electrochemical Urea Production by Efficiently Coupling Carbon Dioxide Reduction with Nitrite Reduction," *Nano Lett.* 20:8282-8289 (2020)).

Early studies of selective reduction of $NO_3^-$ to $NO_2^-$ were mainly through biological catalysis with nitrate reductase during anaerobic respiration (Zheng et al., "Crystal Structure of a Nitrate/Nitrite Exchanger," *Nature* 497:647-651 (2013); Ghafari et al., "Bio-Electrochemical Removal of Nitrate from Water and Wastewater—A Review," *Bioresour. Technol.* 99:3965-3974 (2008)), and the catalytic activity is highly sensitive to the living and functioning environment (Magalon et al., "Molybdenum Cofactor Properties and [Fe—S] Cluster Coordination in *Escherichia coli* Nitrate Reductase A: Investigation by Site-Directed Mutagenesis of the Conserved His-50 Residue in the NarG Subunit," *Biochemistry* 37:7363-7370 (1998)). Alternatively, heterogeneous/electrochemical catalysis plays an important role in the nitrogen cycle chemistry (Rosca et al., "Nitrogen Cycle Electrocatalysis," *Chem. Rev.* 109:2209-2244 (2009)). Inspired by structures of nitrate reductase in the biological systems, some bio-mimicked catalysts based on deoxygenation-facilitating metal centers (e.g., Mo, Fe, and Co) were developed to catalyze $NO_3RR$ in ambient conditions (Ford et al., "A Bioinspired Iron Catalyst for Nitrate and Perchlorate Reduction," *Science* 354:741-743 (2016); Fourmond et al., "Reassessing the Strategies for Trapping Catalytic Intermediates During Nitrate Reductase Turnover," *J. Phys. Chem. B* 114:3341-3347 (2010)). However, the highly selective generation of intermediate $NO_2^-$ with an enhanced activity remained difficult to be realized. Thus, most previously reported $NO_3^-$-to-$NO_2^-$ selectivity was <50% in the electrolysis system (Fajardo et al., "Earth-Abundant Elements a Sustainable Solution for Electrocatalytic Reduction of Nitrate," *Appl. Catal. B* 281:119465 (2021)).

Recently, catalytic and electrocatalytic reduction of nitrate and nitrite to $N_2$ gas have received enormous research attention, owing to their unique advantages of low footprints (no residue left), and high activity and selectivity. The driving force for nitrate or nitrite reduction is heat or potentially renewable electricity (harvested from wind and solar).

Catalytic reduction of nitrate in a batch reactor was first reported by Hörold et al., "Catalytical Removal of Nitrate and Nitrite from Drinking Water: 1. Screening for Hydrogenation Catalysts and Influence of Reaction Conditions on Activity and Selectivity," *Environmental Technology* 14:931-939 (1993) and Horold et al., "Development of Catalysts for a Selective Nitrate and Nitrite Removal from Drinking Water," *Catalysis Today* 17:21-30 (1993). Pd was found to be the most efficient catalyst to reduce nitrite, while Pd—Cu was the best to promote nitrate reduction. The catalytic reduction processes generally include two steps. The first is nitrate reduction to nitrite on a metal promotor (e.g., Cu, Sn, In) (Prüsse et al.," "Improving the Catalytic Nitrate Reduction," *Catalysis Today* 55:79-90 (2000); Marchesini et al., "Nitrate Hydrogenation over Pt, In/$Al_2O_3$ and Pt, In/$SiO_2$. Effect of Aqueous Media and Catalyst Surface Properties Upon the Catalytic Activity," *Catalysis Communications* 9:1021-1026 (2008); Brian et al., "Effects of Natural Water Ions and Humic Acid on Catalytic Nitrate Reduction Kinetics Using an Alumina Supported Pd—Cu Catalyst," *Environ. Sci. Technol.* 40:3075-3081 (2006)), and the second step is reduction of nitrite and subsequent intermediates to $N_2$ over Pd based catalysts (Shuai et al., "Enhanced Activity and Selectivity of Carbon Nanofiber Supported Pd Catalysts for Nitrite Reduction," *Environ. Sci. Technol.* 46:2847-2855 (2012); Guo et al., "Insights into Nitrate Reduction over Indium-Decorated Palladium Nanoparticle Catalysts," *ACS Catalysis* 8:503-515 (2017); Seraj et al., "PdAu Alloy Nanoparticle Catalysts: Effective Candidates for Nitrite Reduction in Water," *ACS Catalysis* 7:3268-3276 (2017); Qian et al., "Supporting Palladium Metal on Gold Nanoparticles Improves its Catalysis for Nitrite Reduction," *Nanoscale* 6:358-364 (2014)). Many materials have been investigated as catalyst supports to promote nitrate and nitrite reduction, e.g., carbon (Yoshinaga et al., "Hydrogenation of Nitrate in Water to Nitrogen over Pd—Cu Supported on Active Carbon," *Journal of Catalysis* 207:37-45 (2002)), alumina (Costas et al., "The Remarkable Effect of Oxygen on the $N_2$ Selectivity of Water Catalytic Denitrification by Hydrogen," *Environ. Sci. Technol.* 41:950-956 (2007)), silica (Garron et al., "Effect of the Support on Tin Distribution in Pd—Sn/Al2O3 and Pd—Sn/SiO2 Catalysts for Application in Water Denitration," *Applied Catalysis* B: Environmental 59:57-69 (2005)), and iron oxide (Jung et al., "Development of Pd—Cu/hematite Catalyst for Selective Nitrate Reduction," *Environ. Sci. Technol.* 48:9651-9658 (2014)). Although nitrate and nitrite can be eliminated, the low nitrate removal rate and considerable amount of unwanted ammonia as by-product were the main drawback, even on the bimetallic system, e.g., Pd—Cu nanoparticles.

Electrocatalysis can provide an alternative way for nitrate reduction by using renewable electricity. From the thermodynamic point of view, $N_2$ is the most favorable nitrate product, as shown below (Rosca et al., "Nitrogen Cycle Electrocatalysis," *Chem. Rev.* 109:2209-2244 (2009)).

$$NO_3^- + 2H^+ + 2e^- = NO_2^- + H_2O \quad E^0=0.835 \text{ V vs NHE} \quad (1)$$

$$NO_3^- + 4H^+ + 3e^- = NO\ (g) + 2H_2O \quad E^0=0.958 \text{ V vs NHE} \quad (2)$$

$$2NO_3^- + 10H^+ + 8e^- = N_2O\ (g) + 5H_2O \quad E^0=1.116 \text{ V vs NHE} \quad (3)$$

$$NO_3^- + 10H^+ + 8e^- = NH_4^+ + 3H_2O \quad E^0=0.875 \text{ V vs NHE} \quad (4)$$

$$2NO_3^- + 12H^+ + 10e^- = N_2\ (g) + 6H_2O \quad E^0=1.246 \text{ V vs NHE} \quad (5)$$

(Reaction equations and thermodynamic potentials for nitrate reduction to different products: The reversible thermodynamic potentials under standard reactions (20° C., 1 atm) are shown as following (vs. normal hydrogen electrode, NHE) (Rosca et al., "Nitrogen Cycle Electrocatalysis," *Chemical Reviews* 109:2209-2244 (2009)).)

However, from the kinetics point of view, nitrate reduction to $N_2$ needs high overpotential and usually $NH_3$ is a preferable product. A general reaction pathway was proposed by de Vooys et al., "Electrocatalytic Reduction of $NO_3^-$ on Palladium/Copper Electrodes," *Journal of Molecular Catalysis A: Chemical* 154:203-215 (2000). The first step is adsorption of $NO_3^-$ on the electrode surface, which is a fast and reversible process; the second step is $NO_3^-$ reduction to $NO_2^-$ and it is known to be the rate-determining step (rds); the subsequent steps are selective $NO_2$ reduction to possible N-based products including NO, $N_2O$, $N_2$, $NH_2OH$, and $NH_3$. The selectivity heavily depends on the reaction conditions and metal catalysts properties. Many catalysts have been studied for $NO_3^-$ electrocatalytic reduction, such as Sn (Katsounaros et al., "Efficient Electrochemical Reduction of Nitrate to Nitrogen on Tin Cathode at Very High Cathodic Potentials," *Electrochimica Acta* 52:1329-1338 (2006)), Cu (Reyter et al., "Study of the Electroreduction of Nitrate on Copper in Alkaline Solution," *Electrochimica Acta* 53:5977-5984 (2008); Yoshioka et al., "Electrocatalytic Reduction of Nitrate to Nitrous Oxide by a Copper-Modified Covalent Triazine Framework," *J. Phys. Chem. C* 120: 15729-15734 (2016)), Pt (Duca et al., "Direct Reduction of Nitrite to $N_2$ on a Pt(100) Electrode in Alkaline Media," *J. Am. Chem. Soc.* 132:18042-18044 (2010)), and Pd—Cu (Ghodbane et al., "Electrochemical Reduction of Nitrate on Pyrolytic graphite supported Cu and PdCu Catalysts," *J. Elect. Soc.* 155:F117-F123 (2008)). In addition, Shen et al., "Electrocatalytic Nitrate Reduction by a Cobalt Protoporphyrin Immobilized on a Pyrolytic Graphite Electrode," *Langmuir* 31:8495-8501 (2015) reported high-value-added chemical $NH_2OH$ could be obtained on a cobalt protoporphyrin catalyst, and the selectivity highly depends on the pH. However, controlled high selectivity to nitrogen from direct electrocatalytic reduction of nitrate has not been achieved yet. Instead, significant amount of $NH_3$ production remain a practical challenge that is needed to be addressed.

The present application is directed to overcoming limitations in the art.

SUMMARY

One aspect of the present application relates to a system for removal of nitrate from water. The system includes a first reactor comprising a porous oxide-derived silver electrode (OD-Ag) for electrocatalytic reduction of nitrate ($NO_3^-$) to nitrite ($NO_2^-$) and a second reactor comprising a Pd-based catalyst for catalytic reduction of nitrite ($NO_2^-$).

Another aspect of the present application relates to a method of removing nitrate from water. This method involves providing a system comprising a first reactor comprising a porous oxide-derived silver electrode (OD-Ag) for electrocatalytic reduction of nitrate ($NO_3^-$) to nitrite ($NO_2^-$) and a second reactor comprising a Pd-based catalyst for catalytic reduction of nitrite ($NO_2^-$). The method further involves introducing water containing nitrate ($NO_3^-$) into the first reactor to cause catalytic reduction of the nitrate into nitrite ($NO_2^-$) by the porous oxide-derived silver electrode (OD-Ag) and introducing water from the first reactor is introduced into the second reactor to cause reduction of nitrite ($NO_2^-$) by the Pd-based catalyst, thereby removing nitrate from the drinking water.

The present application describes a process combining electrocatalysis and catalysis for efficient conversion of nitrite to $N_2$. In particular, electrocatalytic reduction of nitrate ($NO_3^-$) over an oxide-derived porous Ag (OD-Ag) to nitrite ($NO_2^-$) with high selectivity with negligible $NH_3$ as a side product is described. The $NO_2$ selectivity (≥95%) at nearly 100% nitrate conversion was higher than Ag foil and Ag/C nanoparticles. Catalytic reduction of nitrite over Pd-based catalysts (5% Pd/C, 5% $Pd/SiO_2$, and 5% $Pd/Al_2O_3$) is also disclosed, which achieved $N_2$ selectivity of >99% and $NH_3$ selectivity of <1% at 100% conversion of nitrite. It is demonstrated that combining electrocatalytic nitrate reduction and catalytic nitrite reduction in one system can be used to treat waste water containing 0.01 M nitrate (140 ppm-N). The concentration of nitrate, nitrite, and ammonium in the final solution was 4.7 ppm, 0 ppm, and 0.8 ppm, respectively, which is lower than any previously reported results.

The oxide-derived Ag (OD-Ag) electrocatalyst was discovered to have unique selectivity and superior activity for electrocatalytic $NO_3^-$-to-$NO_2$ reaction. Up to 98% selectivity and 95% faradaic efficiency were achieved and well-maintained in a wide potential window. The wave-like morphology exposing the increased abundance of under-coordinated Ag sites could facilitate enhancing its intrinsic activity. Further, electro-kinetics and DFT computations provided mechanistic insights into the underlying cause of the unique $NO_3^-$-to-$NO_2^-$ selectivity observed on OD-Ag. Based on the exceptionally high $NO_3^-$-to-$NO_2^-$ selectivity on OD-Ag, a combined electrocatalytic-catalytic process was demonstrated to treat real-world $NO_3^-$-containing wastewater to harmless $N_2$ without considerable $NH_4^+$. The directional conversion of $NO_3^-$ to $NO_2^-$ discovered opens new scenarios for N-cycle management and enables many energy-efficient and/or cost-effective distributed synthetic routes.

BRIEF DESCRIPTION OF THE DRAWINGS

FIGS. 1A-B are SEM images of OD-Ag at different magnifications.

FIG. 2 is a graph showing XRD patterns of polycrystalline Ag/C, Ag foil, and OD-Ag before and after electrocatalysis tests.

Conditions: 1 h duration, cathode electrolyte 0.1M KCl+ 0.1M $KNO_2$ (pH=4), anode electrolyte 0.1M KCl (pH=4), stir rate 350 rpm, geometric electrode area immersed in electrolyte were 4 cm$^2$.

Figure 8:
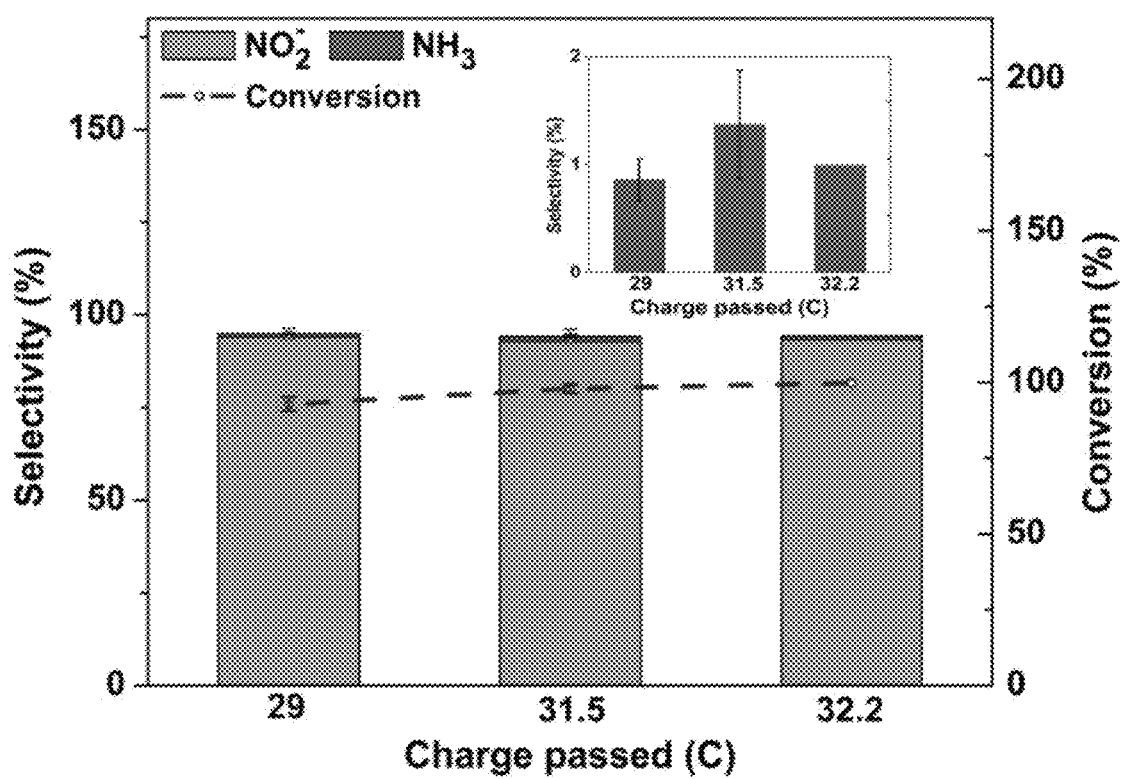

FIG. 8 is a graph showing $NO_3^-$ conversion and product selectivity on OD-Ag. Conditions: 0.1M KCl+0.01M $KNO_3$ (pH=4), −1.1V vs Ag/AgCl, different charge passed (29° C., 31.5° C., and 32.2° C.), respectively, stir rate 350 rpm, geometric electrode area immersed in electrolyte were 6 $cm^2$.

Figure 9A:
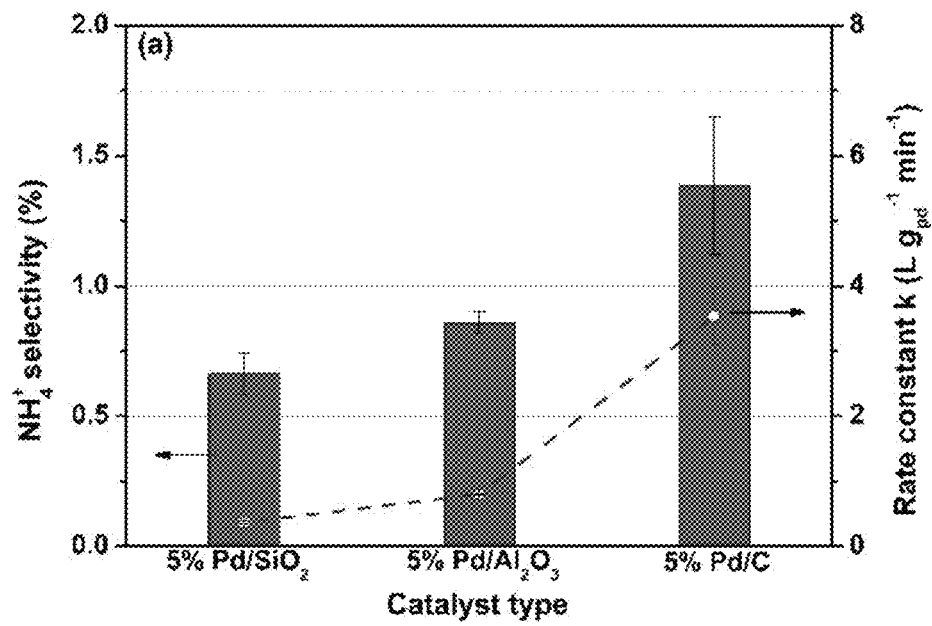
Figure 9B:
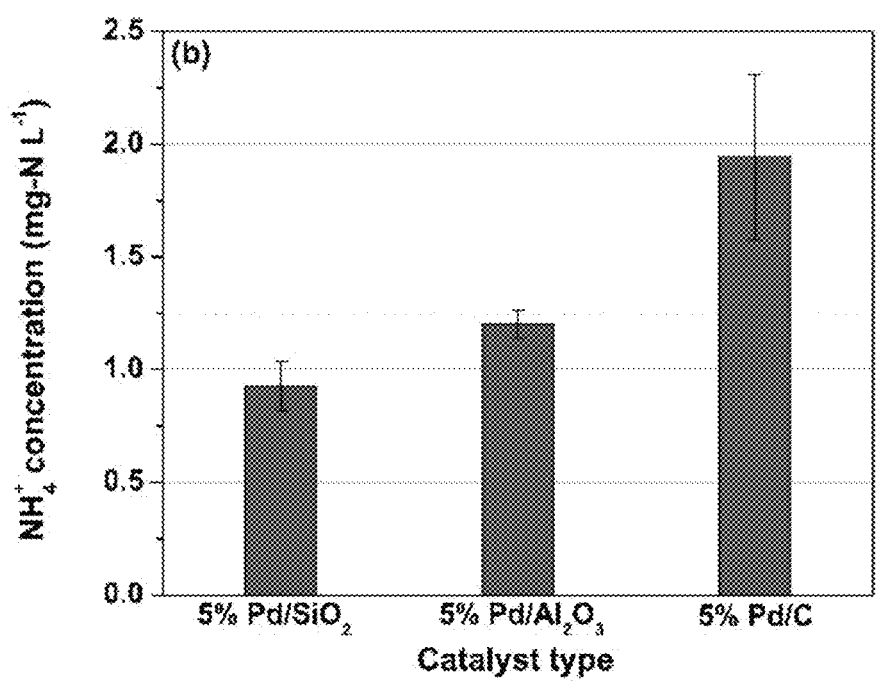

FIGS. 9A-B are graphs showing $NO_2^-$ catalytic reduction at Pd-based catalysts (5% $Pd/SiO_2$, 5% $Pd/Al_2O_3$, and 5% Pd/C). Their corresponding $NH_3$ selectivity and reaction rate constant (FIG. 9A) and final $NH_4^+$ concentration (FIG. 9B) as shown. Conditions: 0.1 M KOH+0.1 M KCl+0.01 M $KNO_2$ as feedstock, purge $CO_2$ for 15 mins before reduction, 50 mg Catalyst, 15 ml reaction solution in H-Cell, $H_2$ flow rate: 25 ml/min, $CO_2$ flow rate: 50 ml/min, room temperature and ambient pressure, 800 rpm stir rate.

Figure 10A:
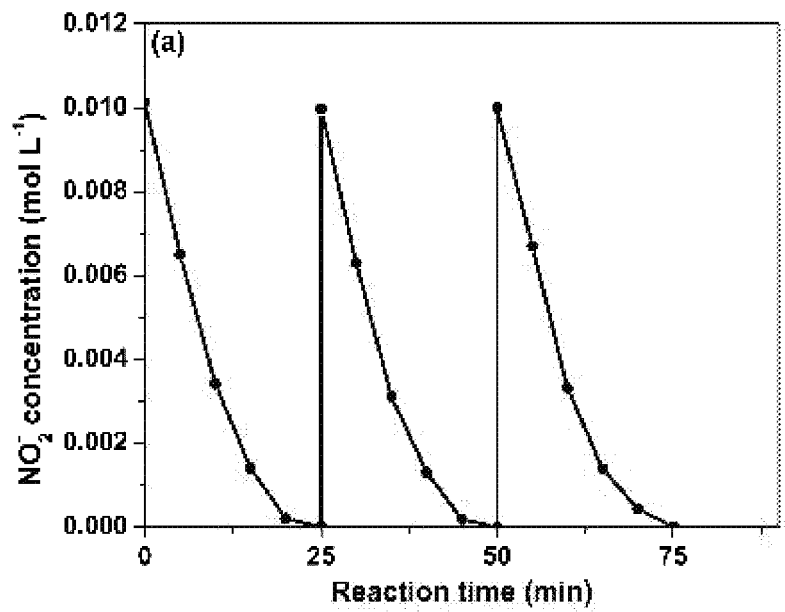
Figure 10B:
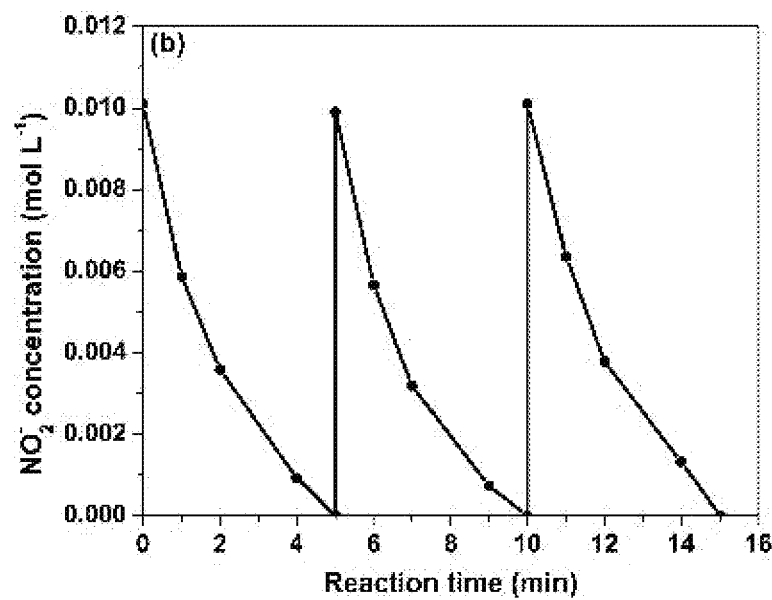
Figure 10C:
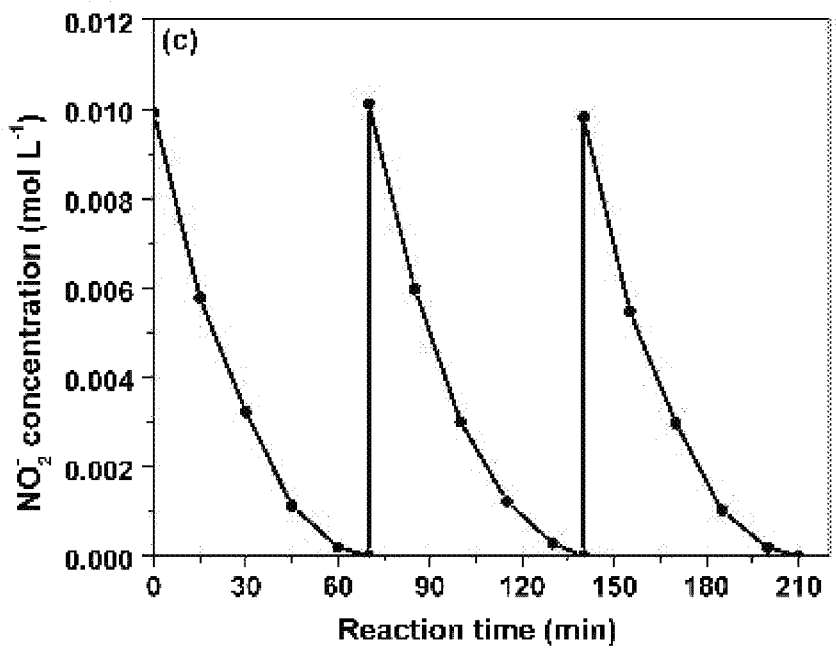

FIGS. 10A-C are graphs showing $NO_2^-$ reduction in three continuous stability tests on 5% $Pd/Al_2O_3$ (FIG. 10A), 5% Pd/C (FIG. 10B), and 5% $Pd/SiO_2$ (FIG. 10C), respectively.

Figure 11:
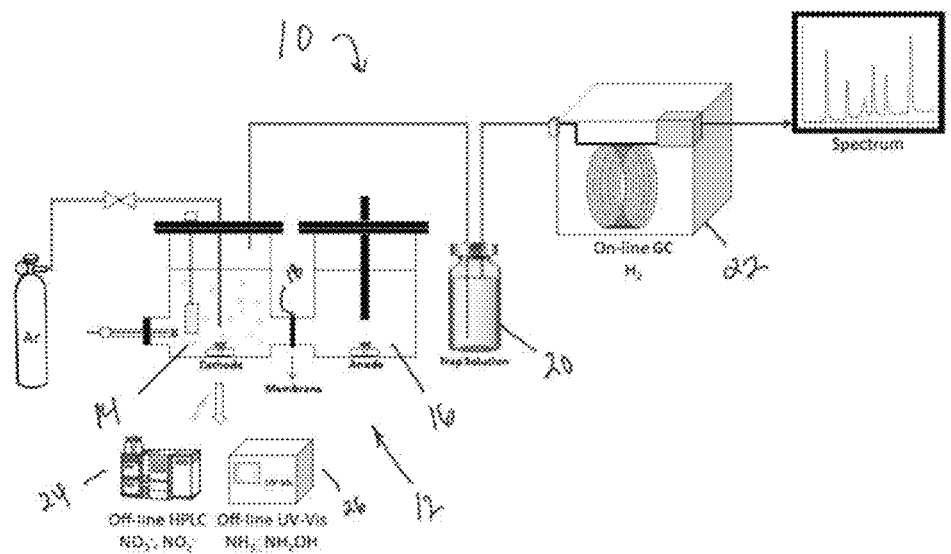

FIG. 11 is a schematic illustration showing one embodiment of an H-cell test configuration for $NO_3^-$ electroreduction connected with on-line GC and off-line HPLC and UV-Vis.

Figure 12A:
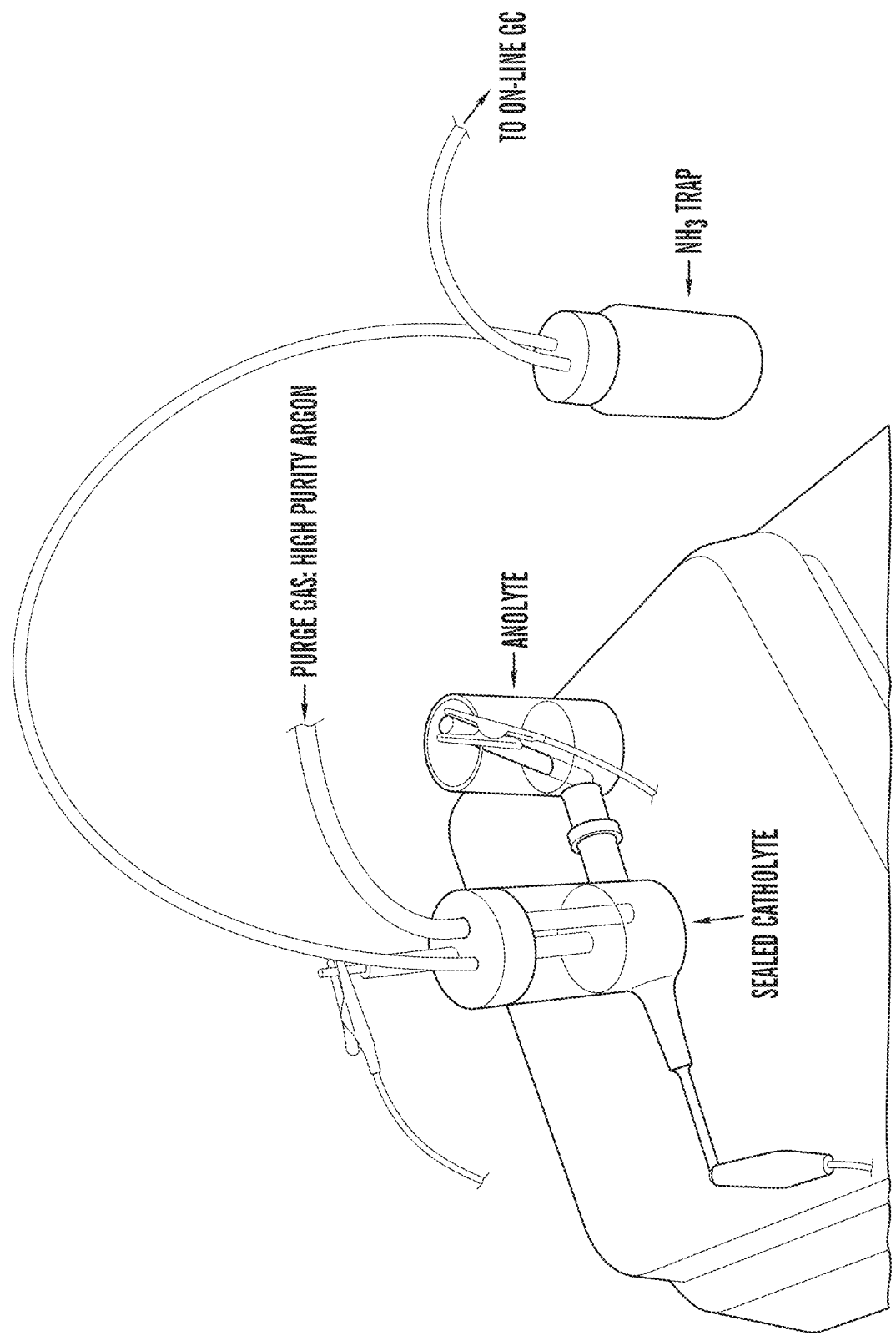
Figure 12B:
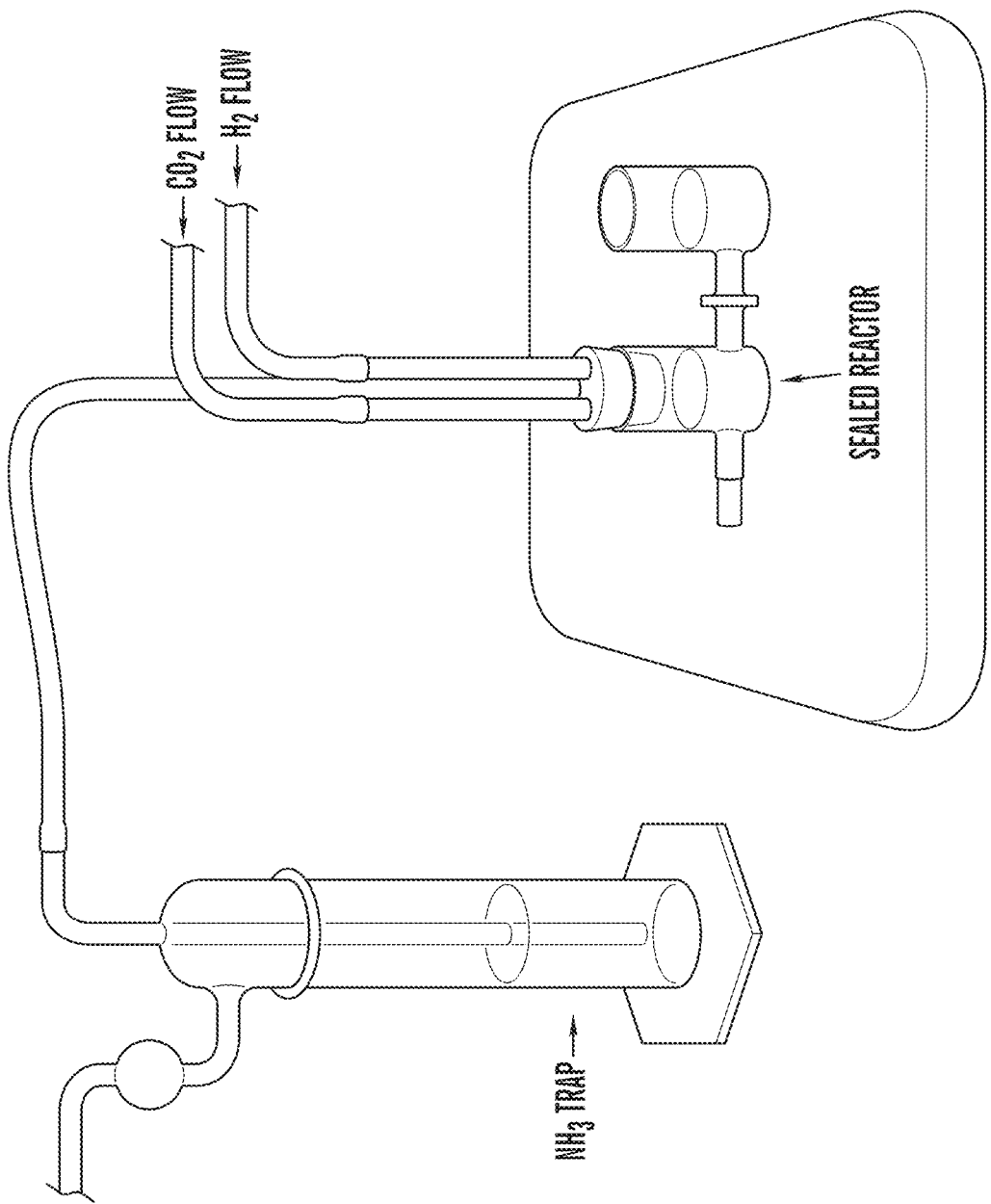

FIGS. 12A-B are photographs showing an H-cell image for $NO_3^-$ electrocatalytic reduction connected with on-line GC (FIG. 12A) and an H-cell image for $NO_2^-$ catalytic reduction (FIG. 12B).

Figure 13A:
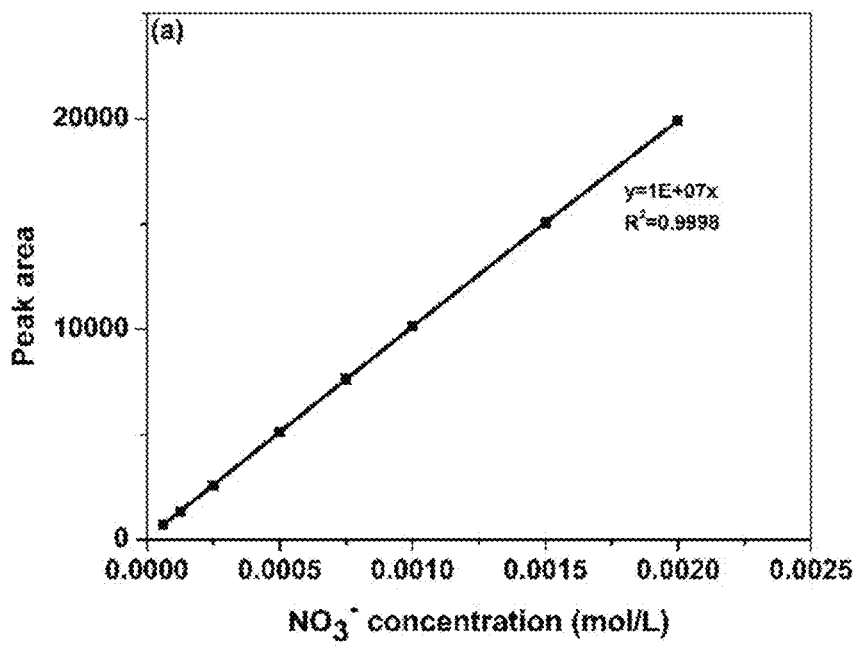
Figure 13B:
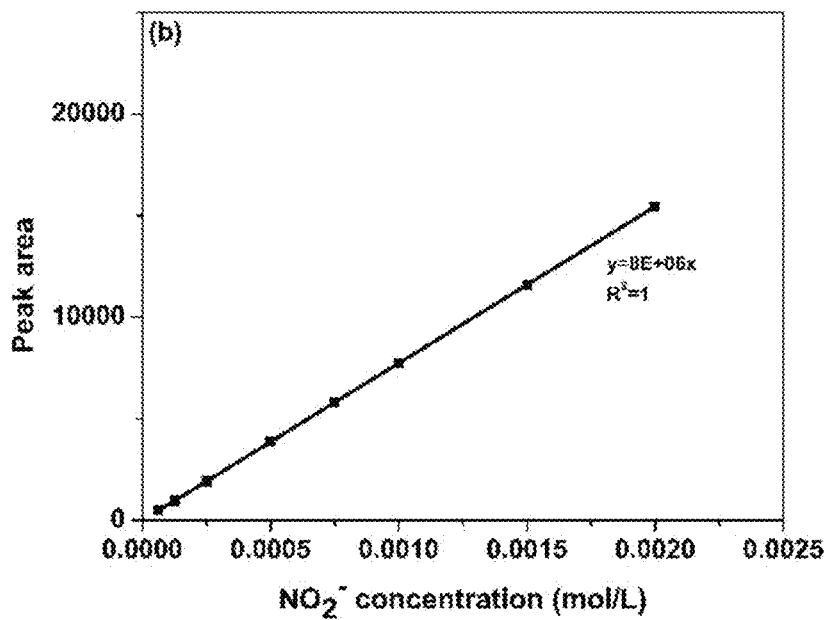

FIGS. 13A-B are graphs showing HPLC results for $NO_3^-$ calibration (FIG. 13A) and $NO_2^-$ calibration (FIG. 13B).

Figure 14:
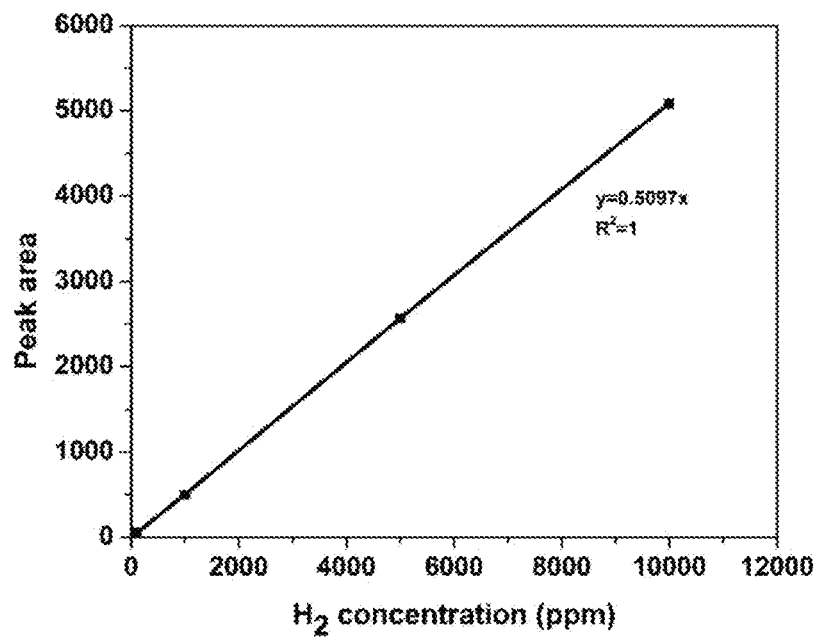

FIG. 14 is a graph showing a $H_2$ calibration curve by using different concentrations of $H_2$ calibration gases (10 ppm, 100 ppm, 1,000 ppm, 5,000 ppm, and 10,000 ppm).

Figure 15:
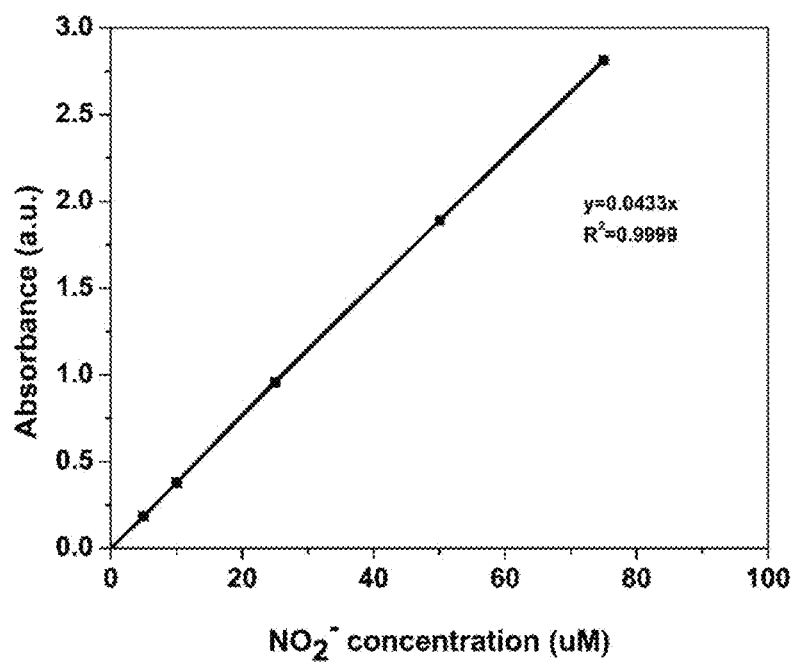

FIG. 15 is a graph showing a $NO_2^-$ calibration curve by UV-Vis.

Figure 16:
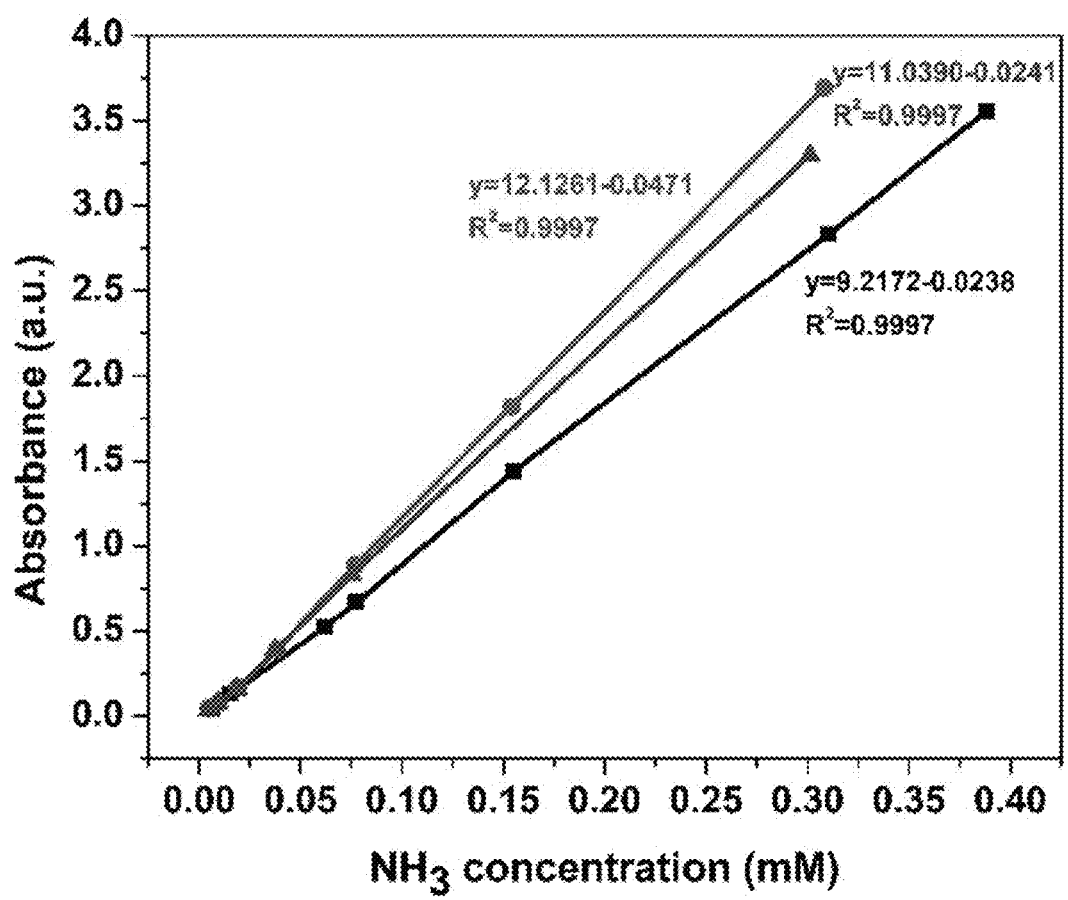

FIG. 16 is a graph showing different $NH_3$ calibration curves used in all processes. The line with squares represents different concentrations of $NH_3$ in pH=3, 0.1M KCl. The line with triangles represents different concentrations of $NH_3$ prepared and diluted by $CO_2$, saturated 0.1 M KOH, and 0.1 M KCl solution, then using 12 M KOH to adjust $NH_3$ standard solutions to pH=13. The line with circles represents different concentrations of $NH_3$ in 0.1 M KOH and adjusted pH to accurate 13 by pH meter.

Figure 17:
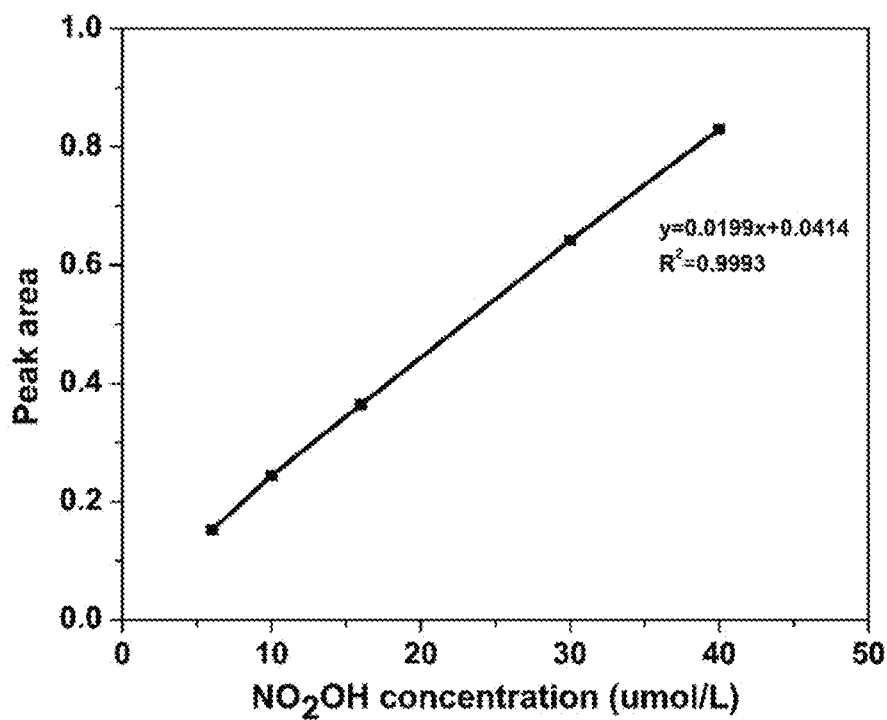

FIG. 17 is a graph showing an $NH_2OH$ calibration curve.

Figure 18:
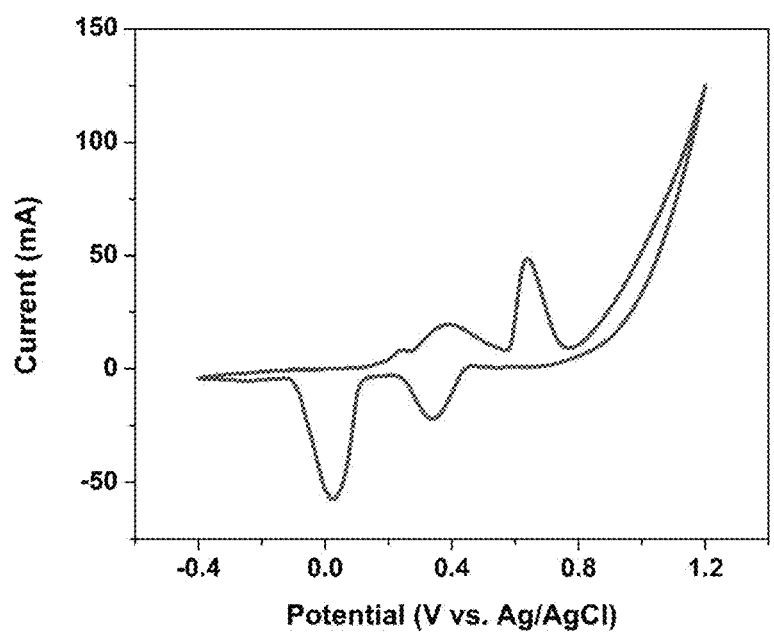

FIG. 18 is a graph showing cyclic voltammetry of Ag foil from −0.4V to 1.2V vs (Ag/AgCl) with a scan rate of 20 mV/s in a one-compartment cell.

FIGS. 19A-C are photographic images of Ag foil (FIG. 19A), Ag oxide (FIG. 19B), and OD-Ag (FIG. 19C). The total geometric area for square-wave pulse voltage treatment is 4 $cm^2$ in total (one side 2 $cm^2$).

Figure 20B:
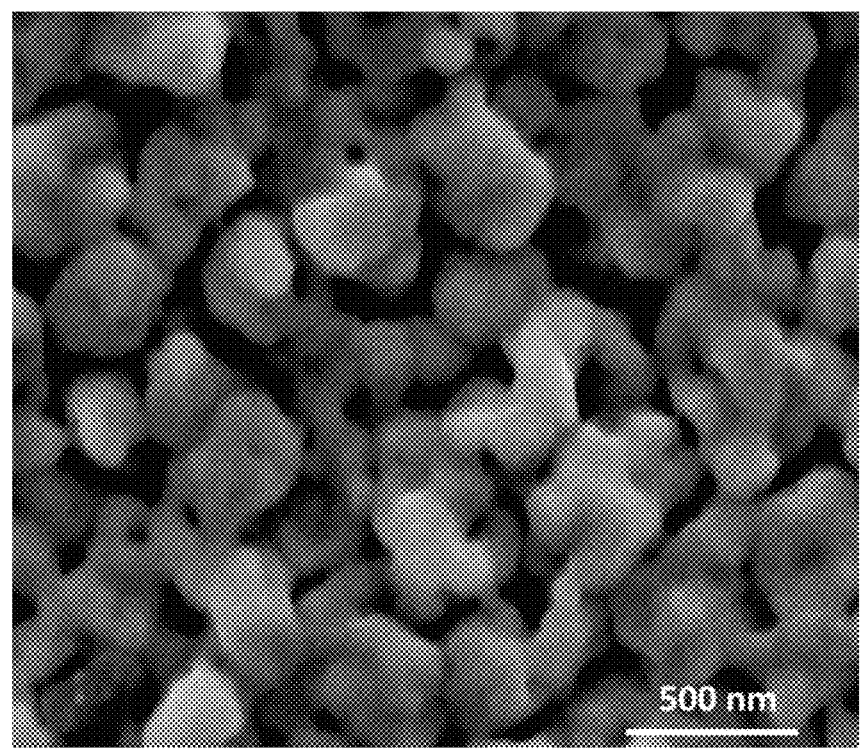

FIGS. 20A-B are SEM images at different magnifications of OD-Ag after nitrate electrocatalytic reduction.

Figure 21:
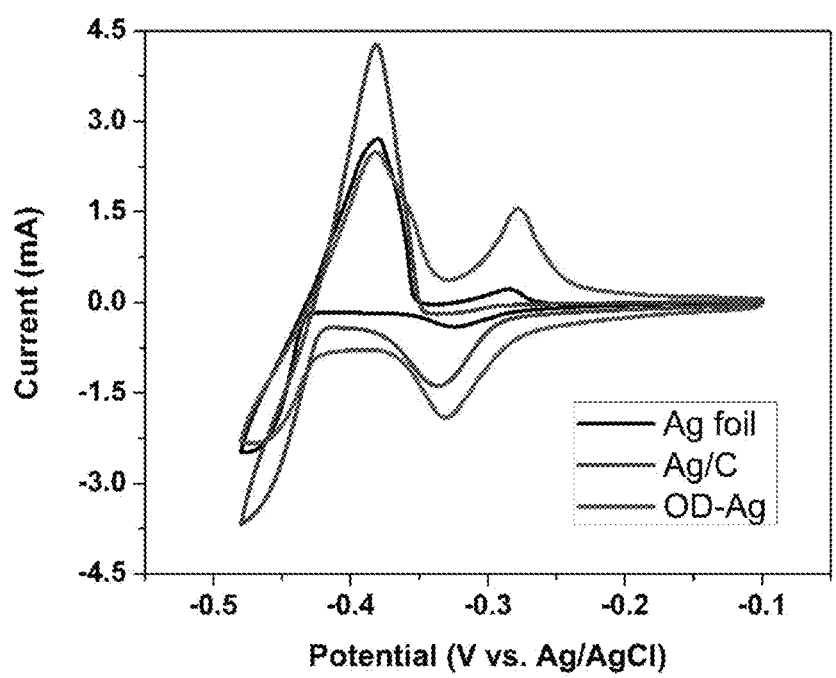

FIG. 21 is a graph showing that cyclic voltammetry was performed from −0.1 V to −0.48 V (vs. Ag/AgCl) with a scan rate of 10 mV/s.

Figure 22:
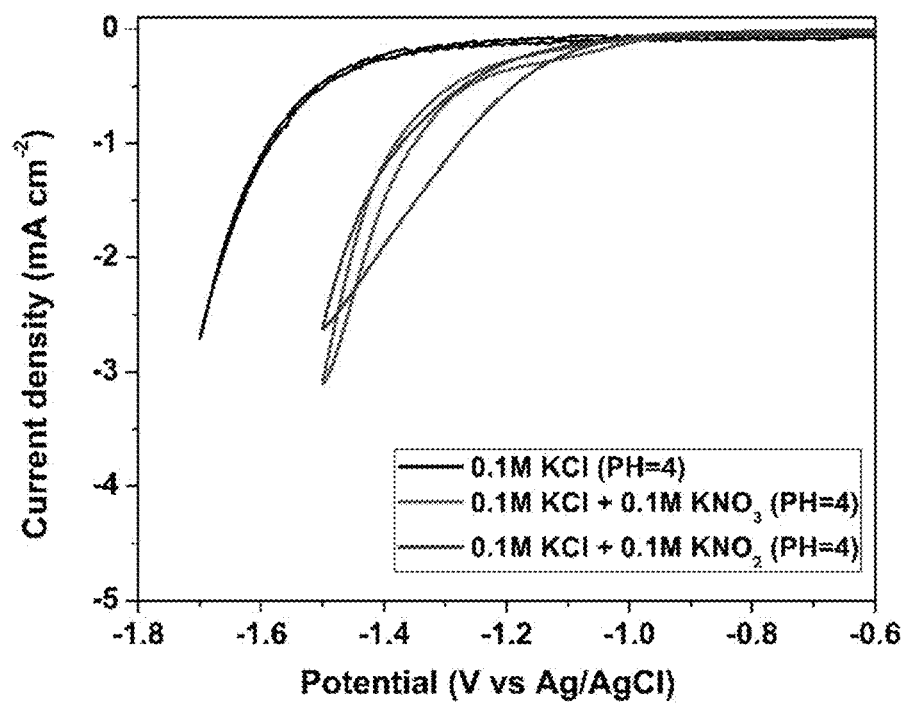

FIG. 22 is a graph showing cyclic voltammograms on carbon cloth in 0.1 M KCl (pH=4), 0.1 M KCl+0.1 M $KNO_3$ (pH=4), and 0.1 M KCl+0.1 M $KNO_2$ (pH=4), respectively. Conditions: Scan rate of 20 mV/s, geometric electrode area immersed in electrolyte were all 4 $cm^2$, without stirring.

Figure 23A:
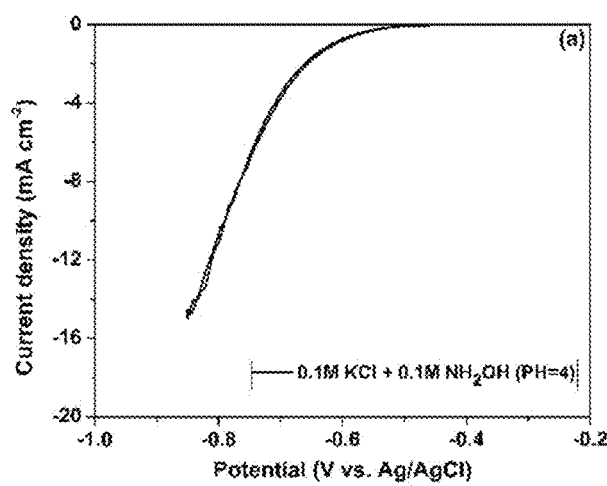
Figure 23B:
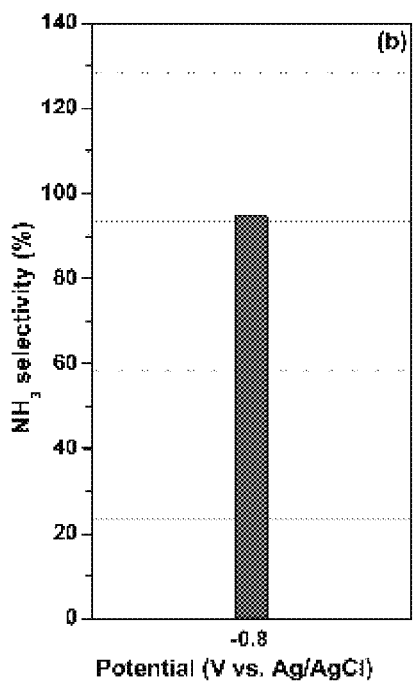
Figure 23C:
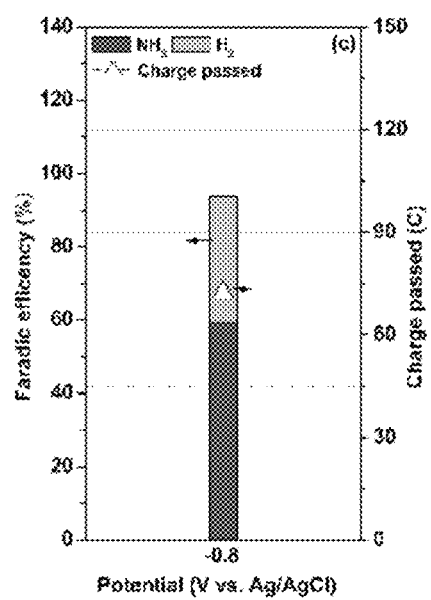
Figure 23D:
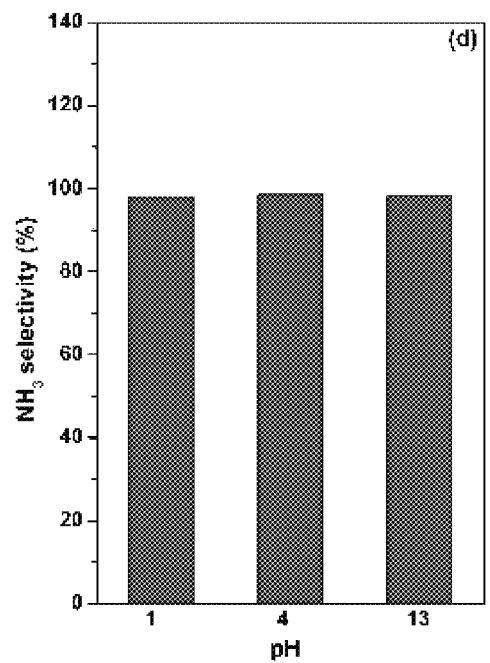
Figure 23E:
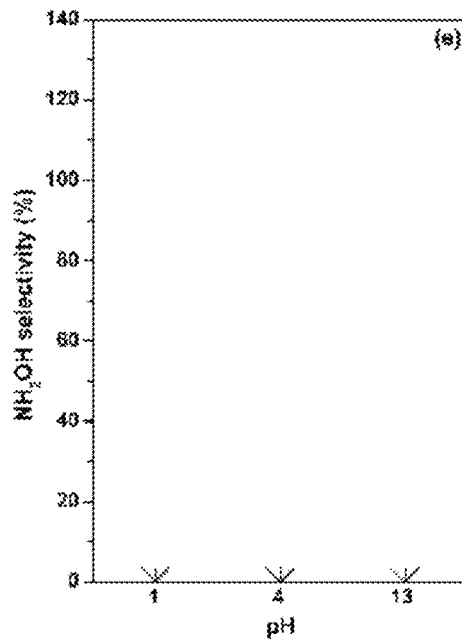

FIGS. 23A-E are graphs showing cyclic voltammograms of $NH_2OH$ electroreduction (FIG. 23A). Conditions: Scan rate of 20 my/s, OD-Ag electrode, 0.1 M KCl+0.1 M $NH_2OH$ (pH=4), geometric electrode area immersed in electrolyte was 4 $cm^2$, without stirring. $NH_3$ selectivity (FIG. 23B) and faradic efficiency for $NH_2OH$ electroreduction (FIG. 23C). Conditions: 1 h duration, cathode electrolyte 0.1 M KCl+0.1M $NH_2OH$ (pH=4), anode electrolyte 0.1 M KCl (pH=4), stir rate 350 rpm, geometric electrode area immersed in electrolyte were all 4 $cm^2$. Catalytic reduction of $NH_2OH$ in 0.1 M $NH_2OH$+0.1 M KCl at different pH (FIG. 23D) and catalytic reduction of $NO_3^-$ in 0.1 M $KNO_3$+0.1 M KCl at different pH (FIG. 23E). (*) in FIG. 23E means no activity. Condition: H-type cell, $H_2$ flow rate 100 ml/min, 1 h duration.

Figure 24:
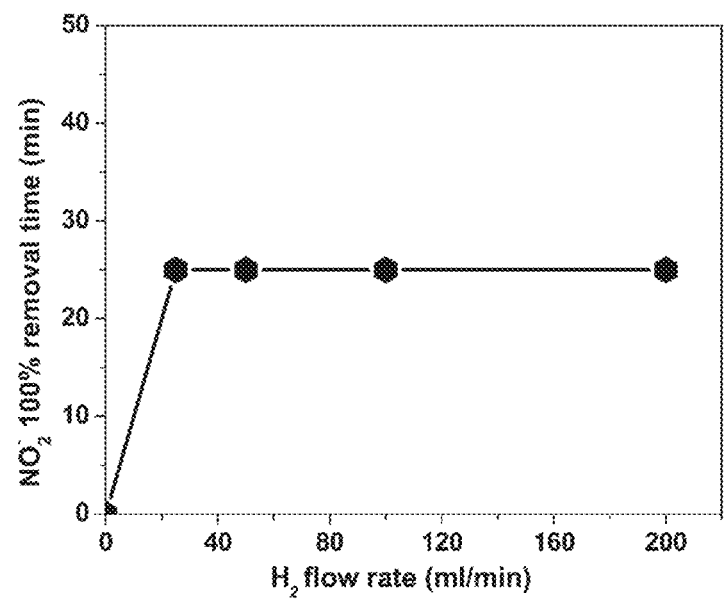

FIG. 24 is a graph showing $NO_2^-$ 100% removal time with respect to $H_2$ flow rate.

Figure 25:
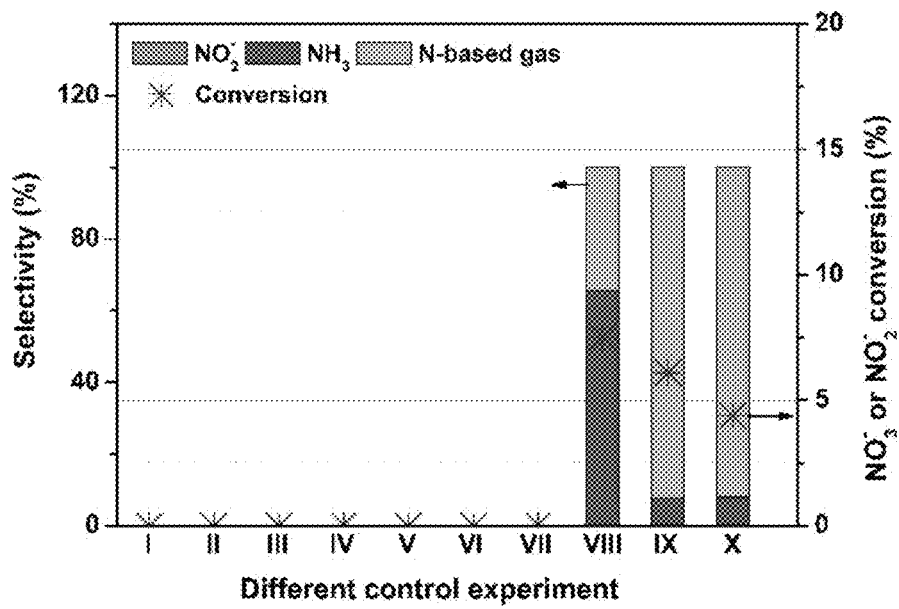

FIG. 25 is a graph showing that control experiments showed the products' selectivity and $NO_3^-$ or $NO_2^-$ conversion. ※ means no activity at this condition. Reaction conditions: 0.1 M KOH+0.1 M KCl+0.01 M $KNO_2$ or 0.01 M $KNO_3$ as feedstock, purge $CO_2$ 15 mins before reduction, 50 mg catalyst, 15 ml reaction solution in H-Cell, 25 ml/min $H_2$ flow rate, 50 ml/min $CO_2$ flow rate, room temperature and ambient pressure, 800 rpm stir rate. I: 5% $Pd/Al_2O_3$ 50 mg $NO_3^-$ reduction without Hz; II: 5% $Pd/Al_2O_3$ 50 mg $NO_2^-$ reduction without Hz; III: OD-Ag $NO_3^-$ reduction with $H_2+CO_2$, 1 h; IV: OD-Ag $NO_2^-$ reduction with $H_2+CO_2$, 1 h; V: 5% $Pd/Al_2O_3$ 50 mg $NO_3^-$ reduction with $H_2+CO_2$, 2 h; VI: 5% Pd/C 50 mg $NO_3^-$ reduction with $H_2+CO_2$, 2 h; VII: 5% $Pd/SiO_2$ 50 mg $NO_3^-$ reduction with $H_2+CO_2$, 2 h; VIII: 5% $Pd/Al_2O_3$ 100 mg $NO_2^-$ reduction with $H_2$, without $CO_2$, 0.5 h; IX: 20% Ag/C 50 mg $NO_2^-$ reduction with $H_2+CO_2$, 0.5 h; X: Ag nanopowder 50 mg $NO_2^-$ reduction with $H_2+CO_2$, 0.5 h.

Figure 26:
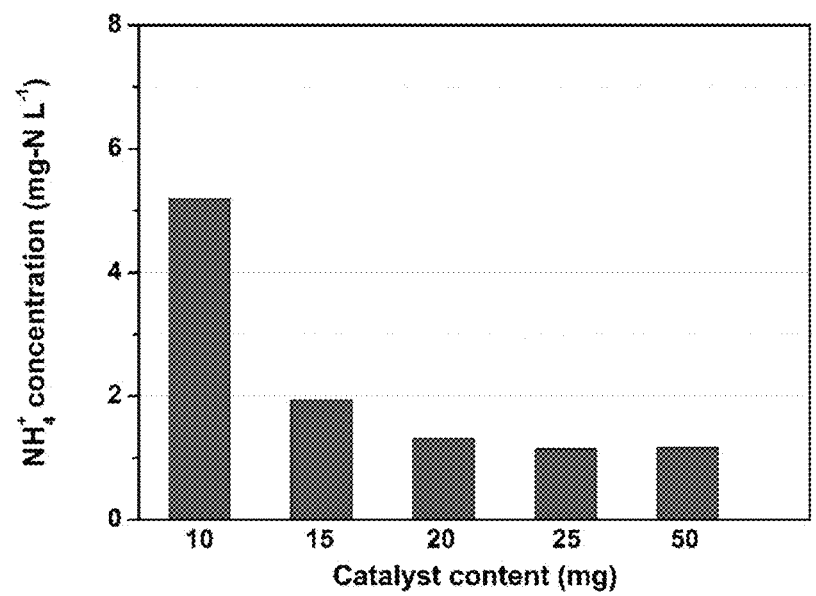

FIG. 26 is a graph showing $NO_2^-$ catalytic reduction on 5% Pd/C catalyst with different catalyst content. Their corresponding final $NH_4^+$ concentration is shown. Conditions: 0.1 M KOH+0.1 M KCl+0.01 M $KNO_2$ as feedstock, purge $CO_2$ 15 mins before reduction, 50 mg catalyst, 15 ml reaction solution in H-Cell, $H_2$ flow rate: 25 ml/min, $CO_2$ flow rate: 50 ml/min, room temperature and ambient pressure, 800 rpm stir rate.

Figure 27A:
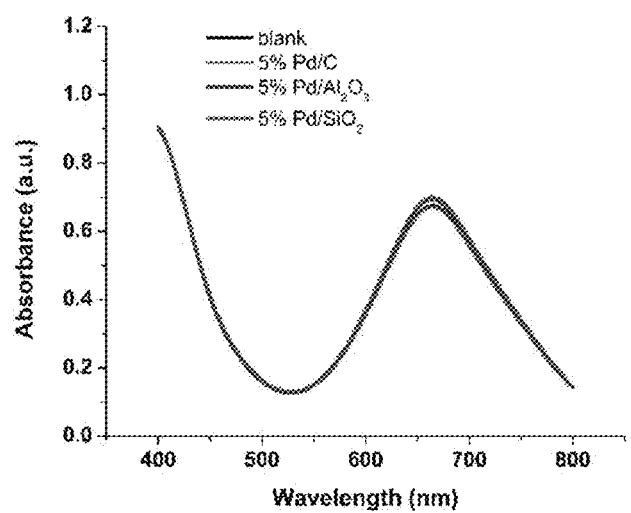
Figure 27B:
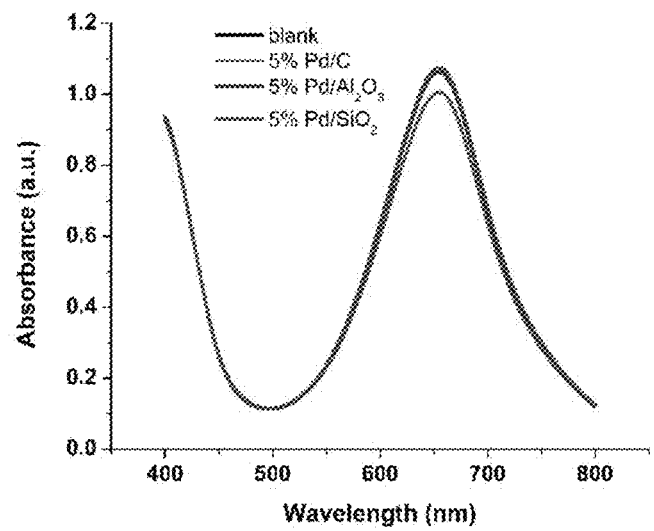
Figure 27C:
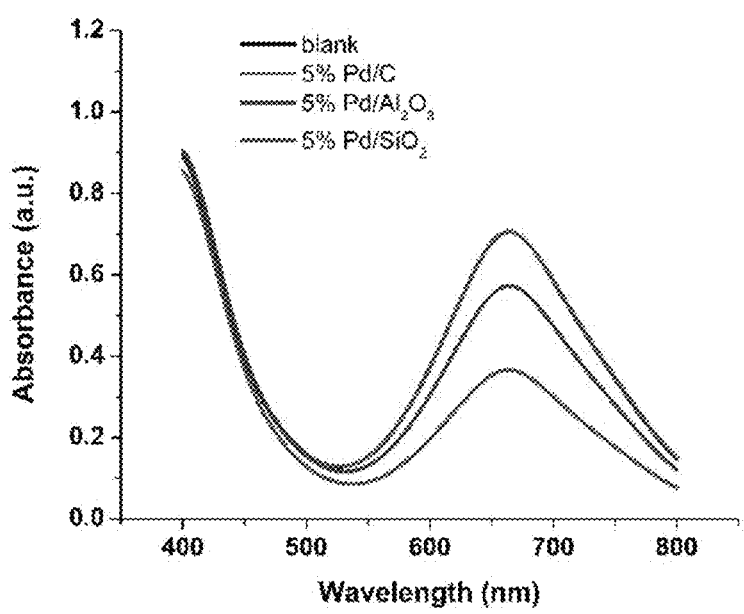
Figure 27D:
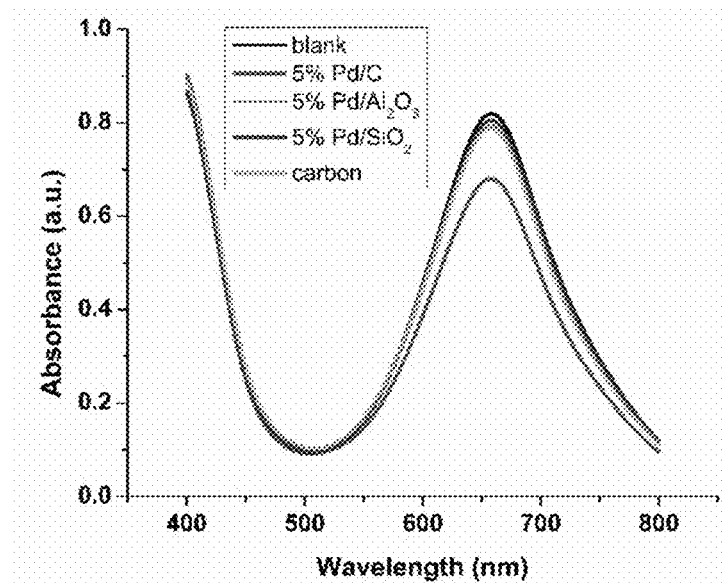

FIGS. 27A-D are graphs showing $NH_3$ adsorption control experiments at 0 h tests 2 ml 100 mg/L $NH_3$—N standard solution diluted to 150 ml by 0.0005 M $H_2SO_4$, 15 ml $NH_3$ standard solution with or without 50 mg catalyst (FIG. 27A). 2 ml 100 mg/L $NH_3$—N standard solution diluted to 150 ml by $CO_2$ buffer solution (0.1 M KOH+0.1M KCl and saturate $CO_2$), 15 ml $NH_3$ standard solution with or without 50 mg catalyst (FIG. 27B). 2 ml 100 mg/L $NH_3$—N standard solution diluted to 150 ml by DI-water, 15 ml $NH_3$ standard solution with or without 50 mg catalyst (FIG. 27C). 2 ml 100 mg/L $NH_3$—N standard solution diluted to 150 ml by 0.1 M KOH, 15 ml $NH_3$ standard solution with or without 50 mg catalyst (FIG. 27D).

Figure 28A:
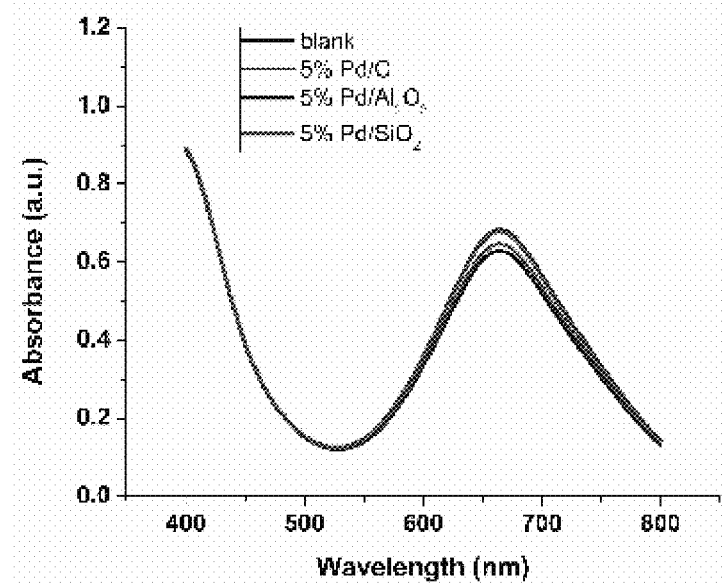
Figure 28B:
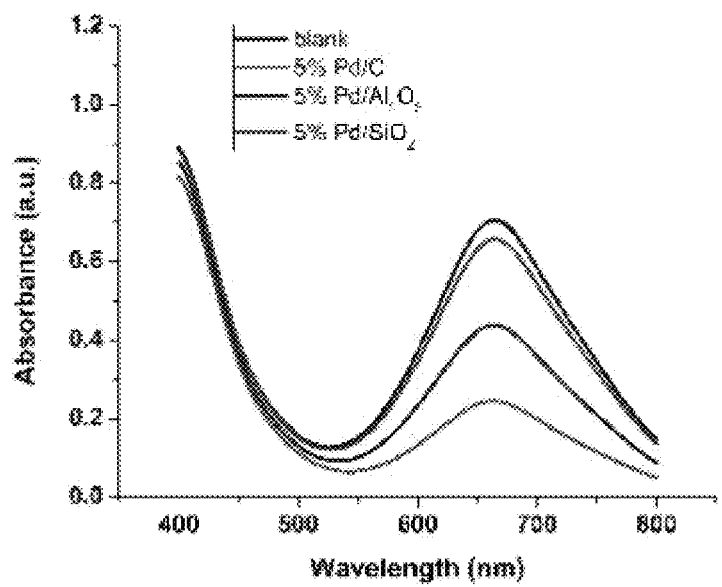
Figure 28C:
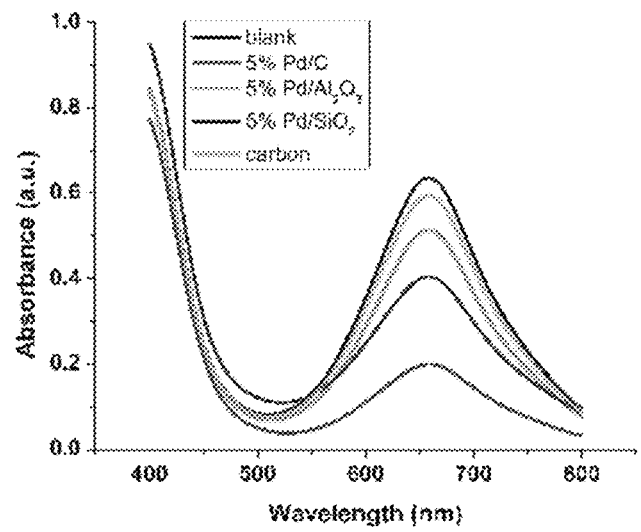

FIGS. 28A-C are graphs showing $NH_3$ adsorption control experiments at 20 h tests. In FIG. 28A, 2 ml 100 mg/L $NH_3$—N standard solution diluted to 150 ml by 0.0005 M $H_2SO_4$, 15 ml $NH_3$ standard solution with or without 50 mg catalyst and wait 20 h in air. In FIG. 28B, 2 ml 100 mg/L $NH_3$—N standard solution diluted to 150 ml by DI-water, 15 ml $NH_3$ standard solution with or without 50 mg catalyst and wait 20 h in air. In FIG. 28C, 2 ml 100 mg/L $NH_3$—N standard solution diluted to 150 ml by 0.1 M KOH, 15 ml $NH_3$ standard solution with or without 50 mg catalyst and wait 20 h in air.

Figure 29:
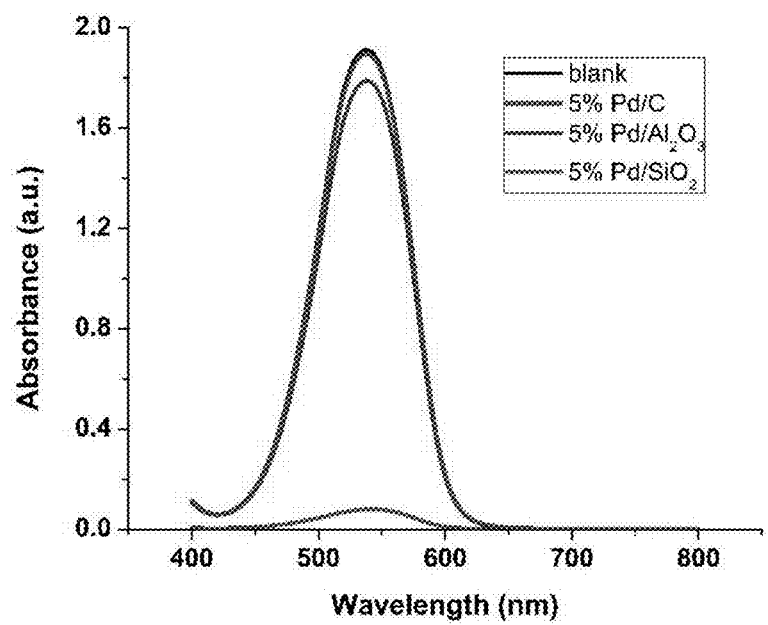

FIG. 29 is a graph showing $NO_2$-adsorption control test results. 15 ml blank (standard $NO_2$ solution)+50 mg Pd/C, 50 mg $Pd/Al_2O_3$, 50 mg $Pd/SiO_2$, respectively. Stir 15 mins for UV-Vis test to get $NO_2$ concentration at 540 nm wavelength.

Figure 30:
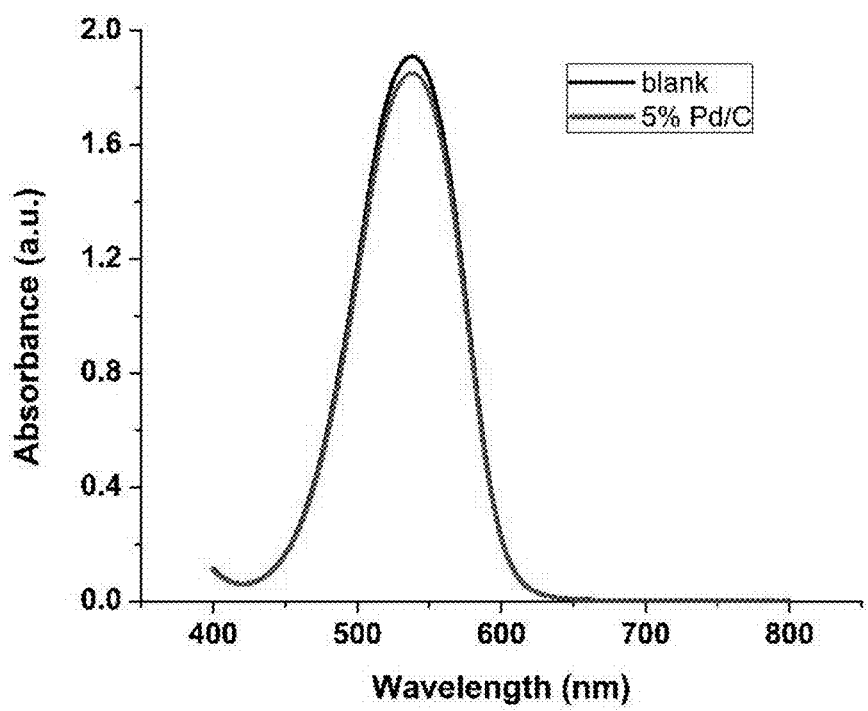

FIG. 30 is a graph showing $NO_2$ adsorption control test results. Blank: 0.01 M $NO_2^-$ standard solution and dilute 200× for UV-Vis test 5% Pd/C: 0.01 M $NO_2^-$-standard solution 15 ml+50 mg 5% Pd/C and stir 5 mins, then filtered and diluted 200× for UV-Vis test.

Figure 31D:
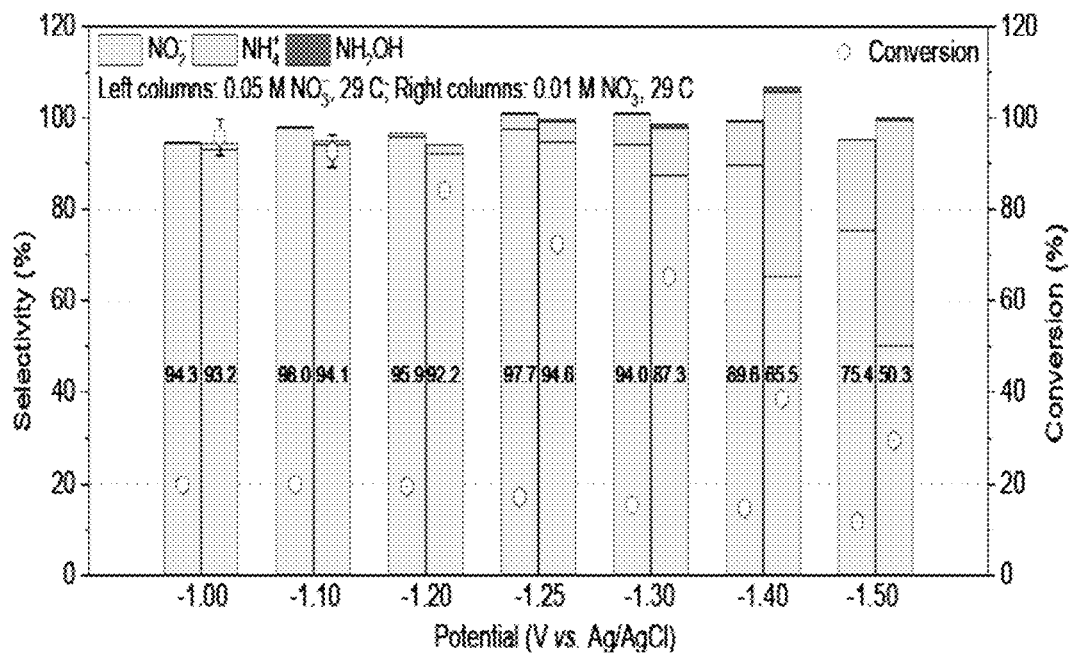

FIGS. 31A-D display the $NO_3^-$ reduction reactions performance on OD-Ag at pH 4. FIG. 31A is a photograph and SEM image of OD-Ag. FIG. 31B is an AFM image of OD-Ag. The inset graph is the height profile of a 7-μm section (the white line).

FIG. 31C is a plot of the linear sweep voltammetry of OD-Ag in three different solutions: 0.1 M KCl (leftmost curve), 0.1 M KCl with 0.1 M $NO_3^-$ (rightmost curve), and 0.1 M KCl with 0.1 M $NO_2^-$ (center curve). The onset potentials for $NO_3RR$, NO2RR, and HER are marked, leading to the "$E_{onset}(NO_3RR)-E_{onset}(NO2RR)$"=440 mV, and "$E_{onset}(NO_3RR)-E_{onset}(HER)$"=540 mV. The geometric area for OD-Ag was 4 $cm^2$.

Figure 31E:
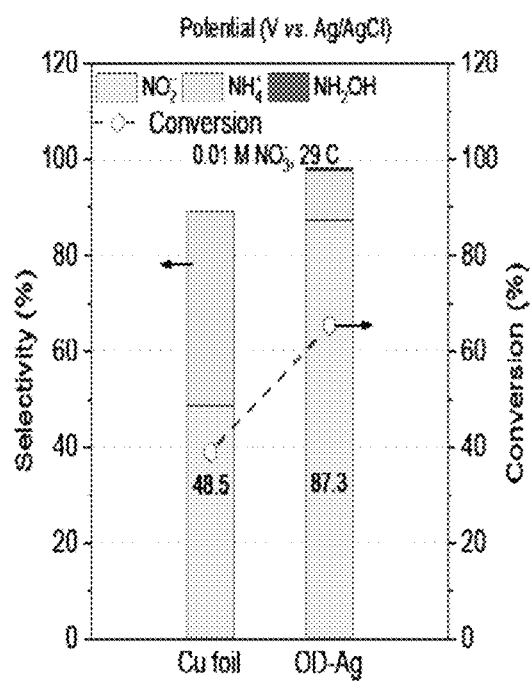

FIG. 31D is a graph of product selectivity and conversion of $NO_3^-$ in 0.1 M KCl with 0.05 M $NO_3^-$ (left columns) and 0.01 M $NO_3^-$ (right columns) at different applied potentials on OD-Ag with 29 C applied charge. The error bars represent the standard deviation for at least three independent measurements. FIG. 31E is graph of 0.01 M $NO_3^-$ at −1.30 $V_{Ag/AgCl}$ on different electrodes. The geometric area of the electrode was 6 $cm^2$ for −1.00 and −1.10 $V_{Ag/AgCl}$ with 0.01 M $NO_3^-$, and 2 $cm^2$ for all other conditions. The methods of product detection are detailed in Example 3 (infra), and their calibrations are shown in FIG. 34 and FIG. 35.

Figure 32A:
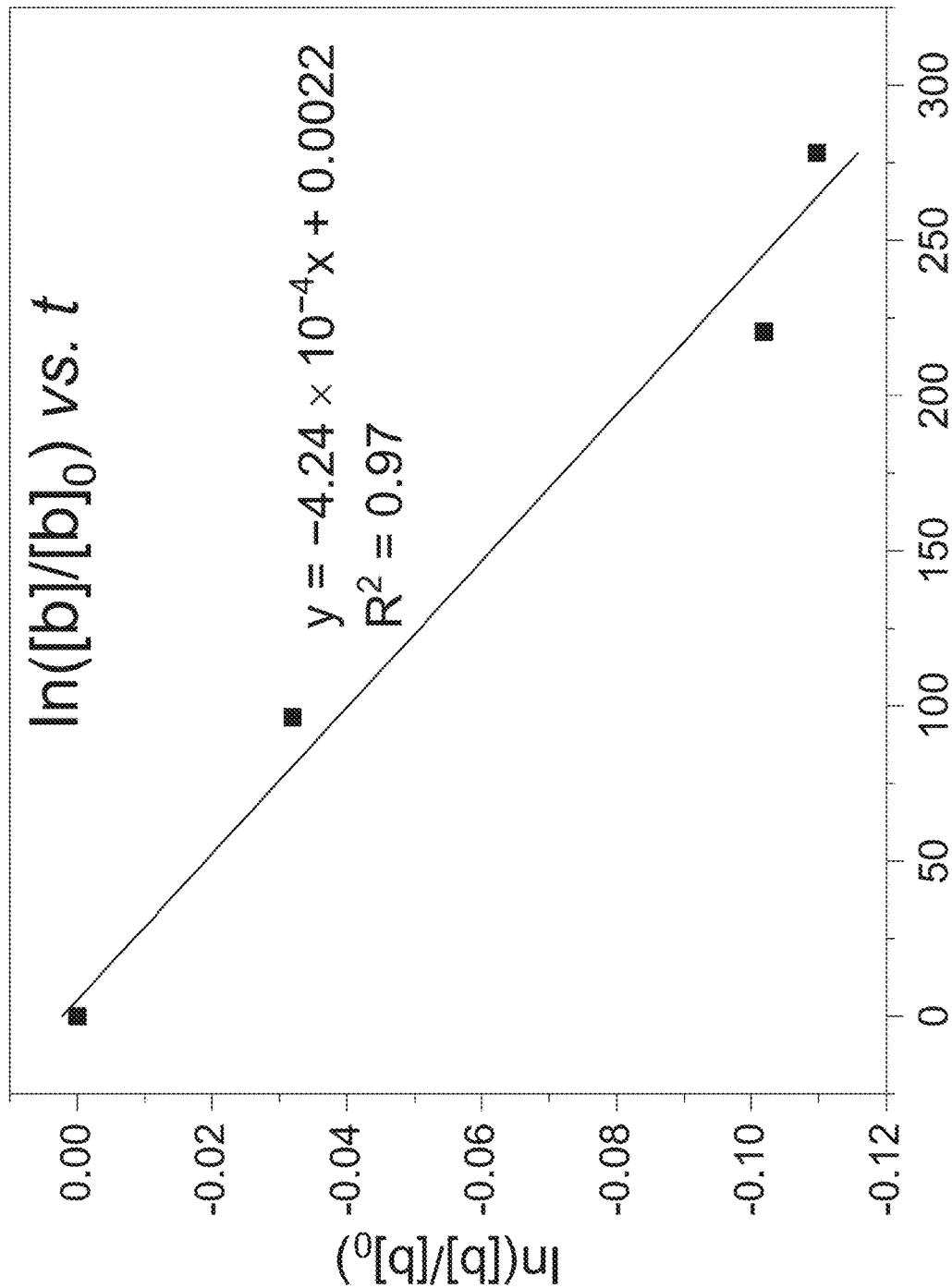
Figure 32B:
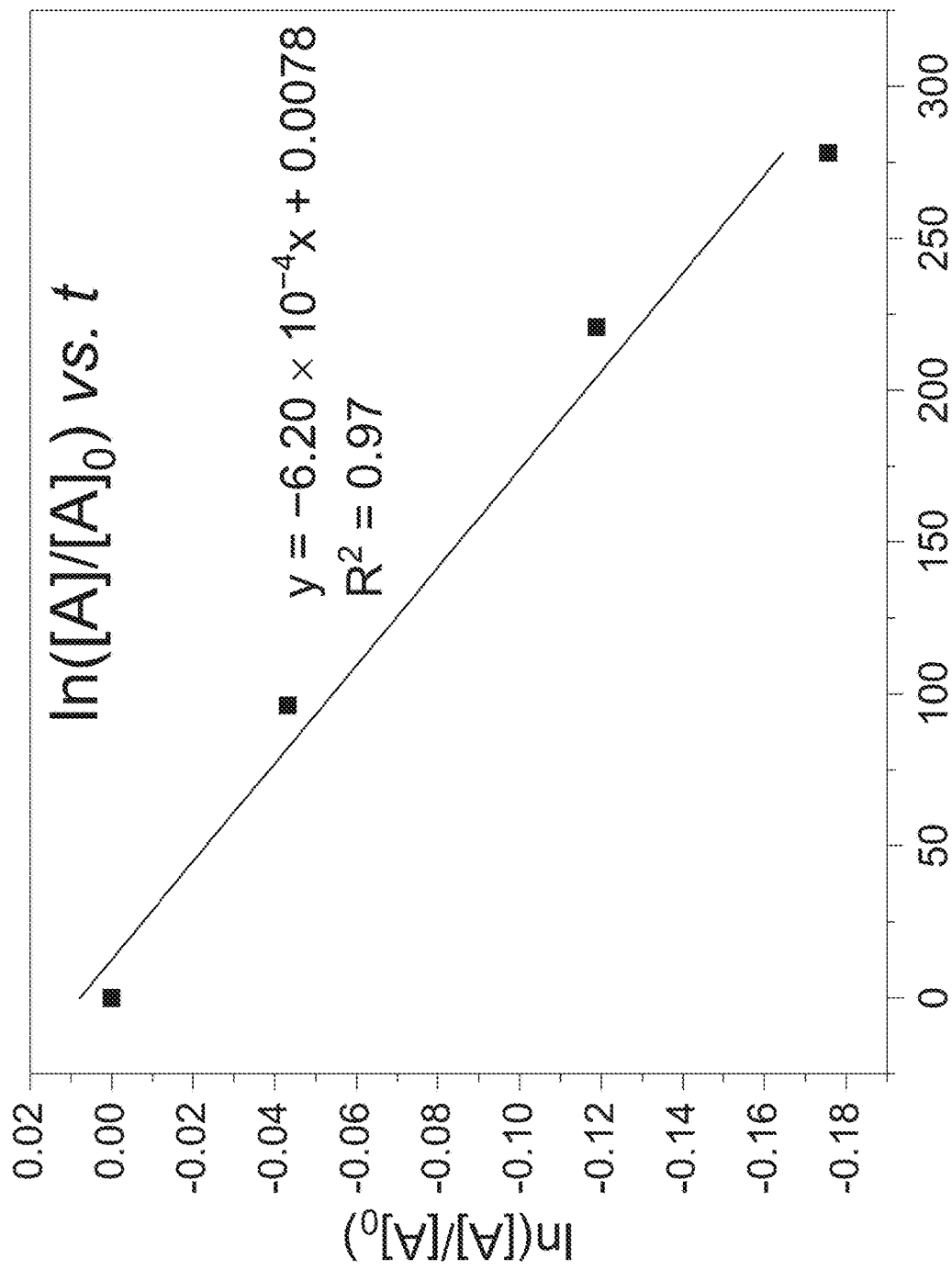
Figure 32C:
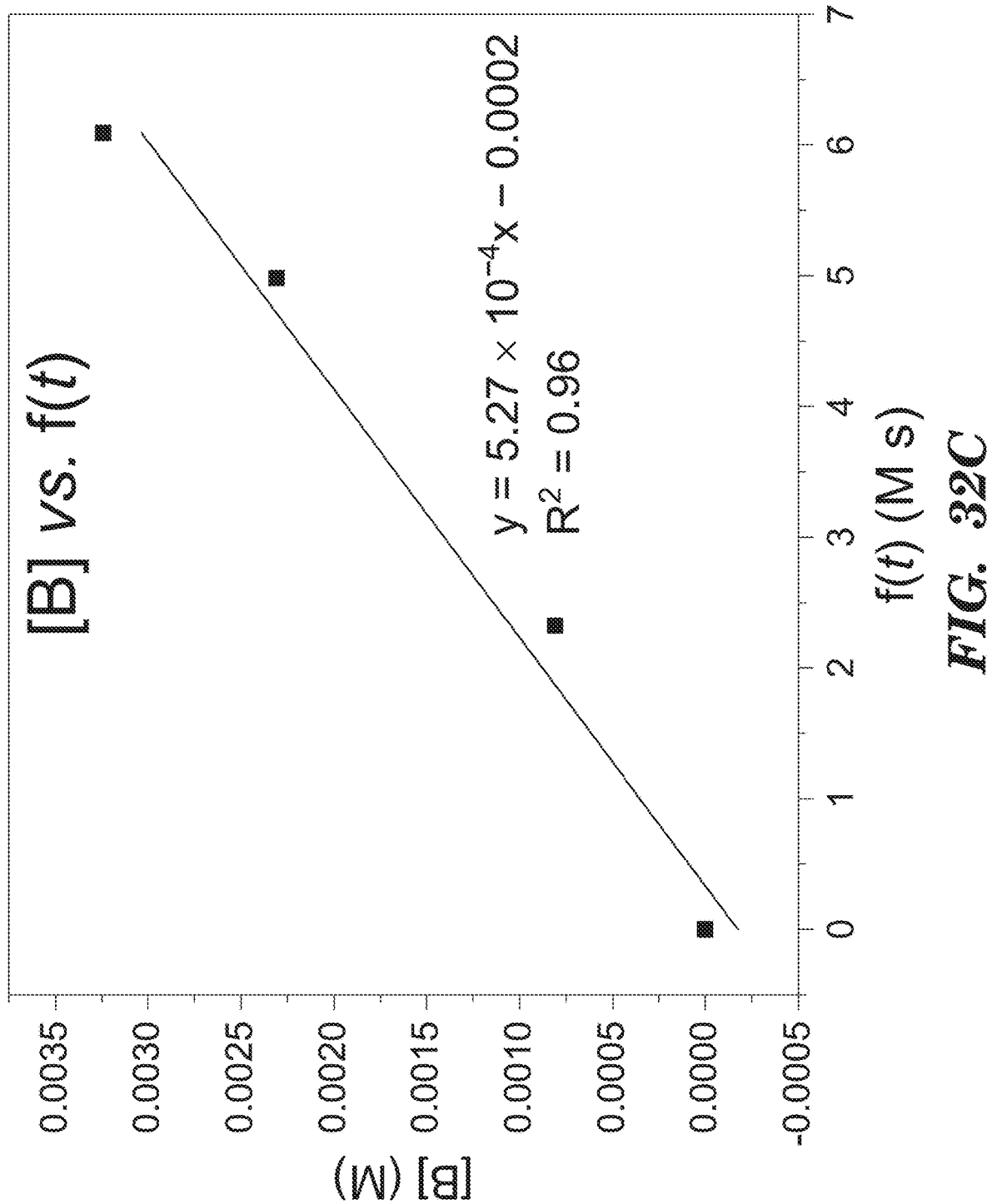
Figure 32D:
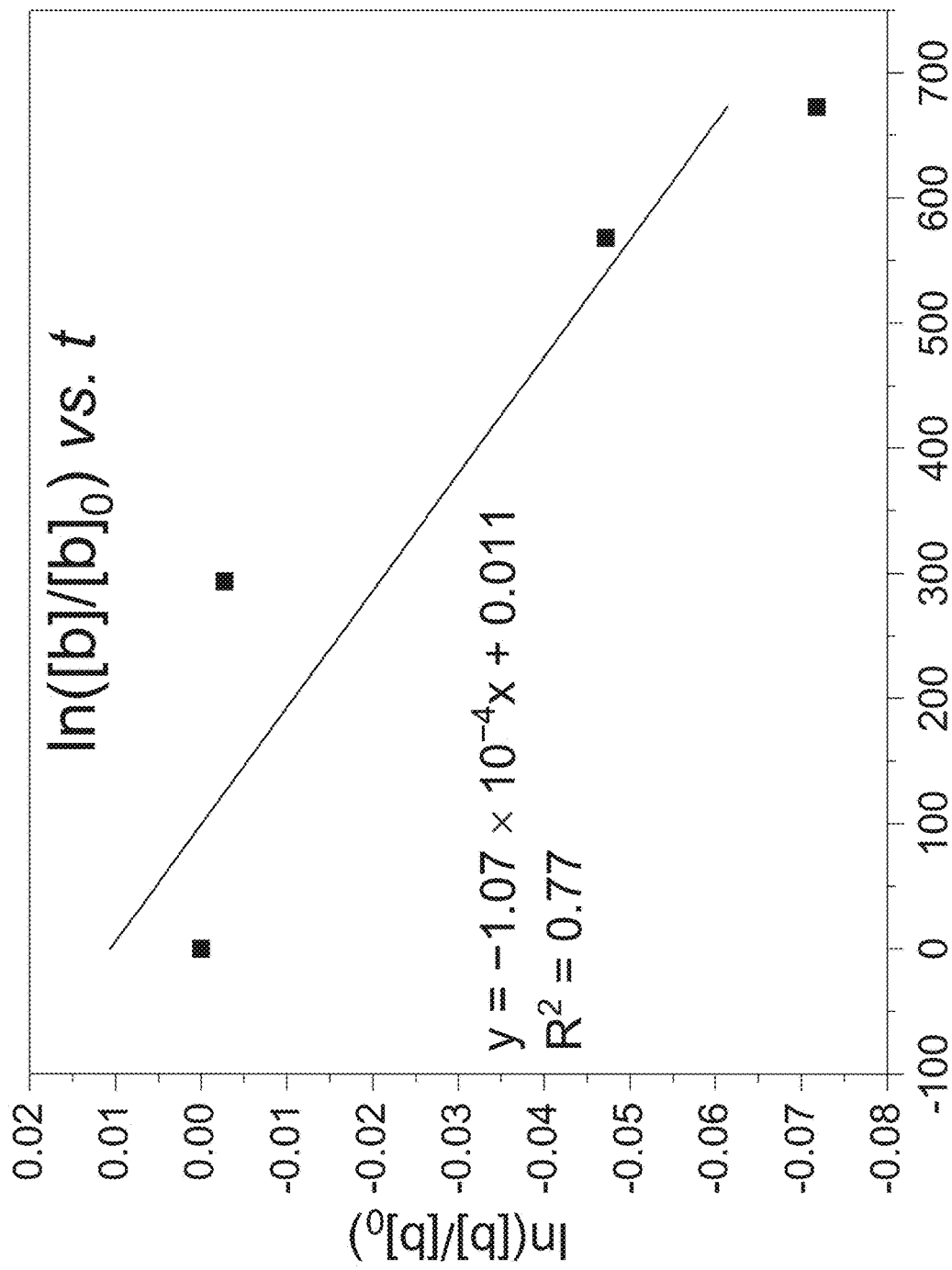
Figure 32E:
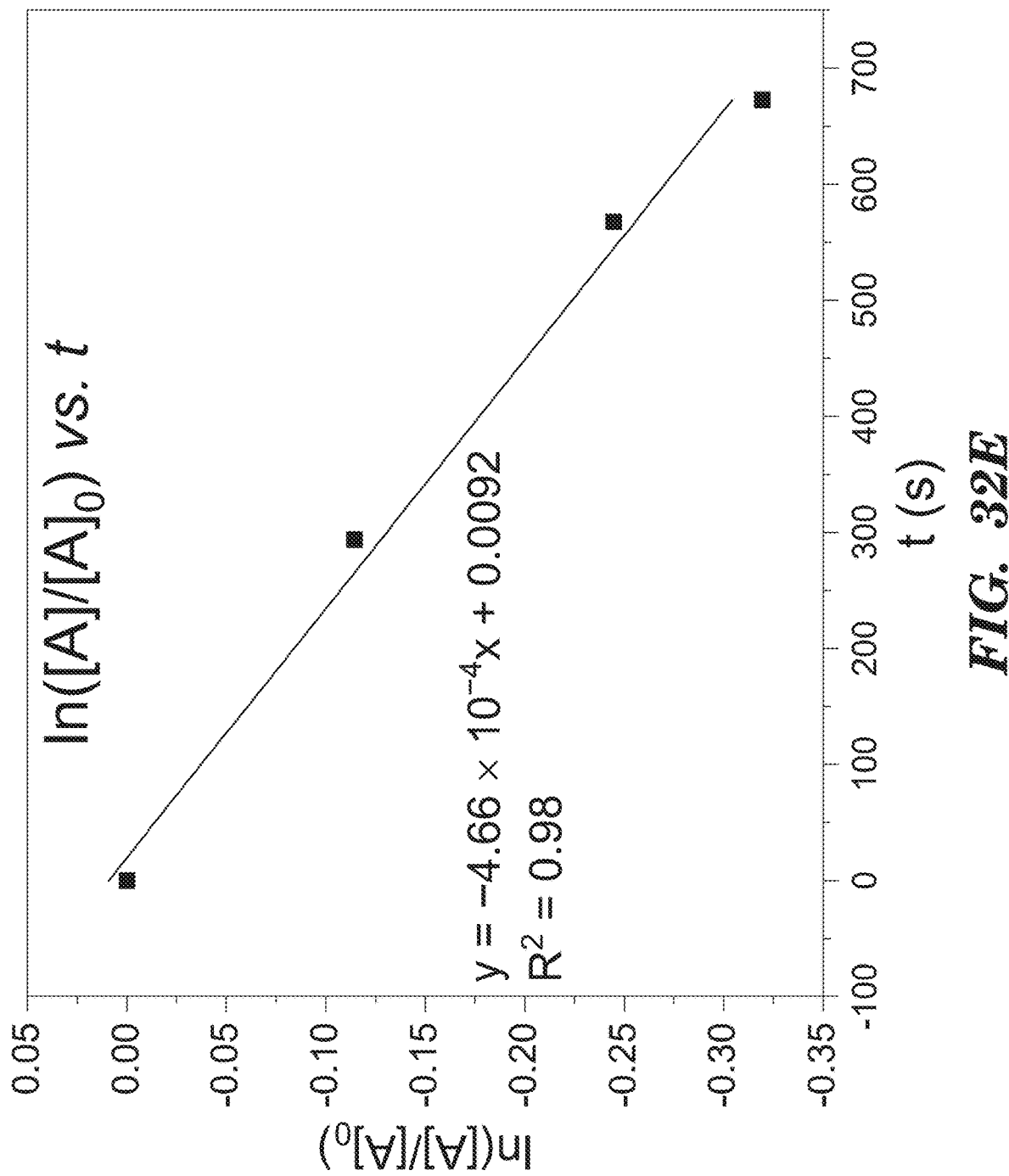
Figure 32F:
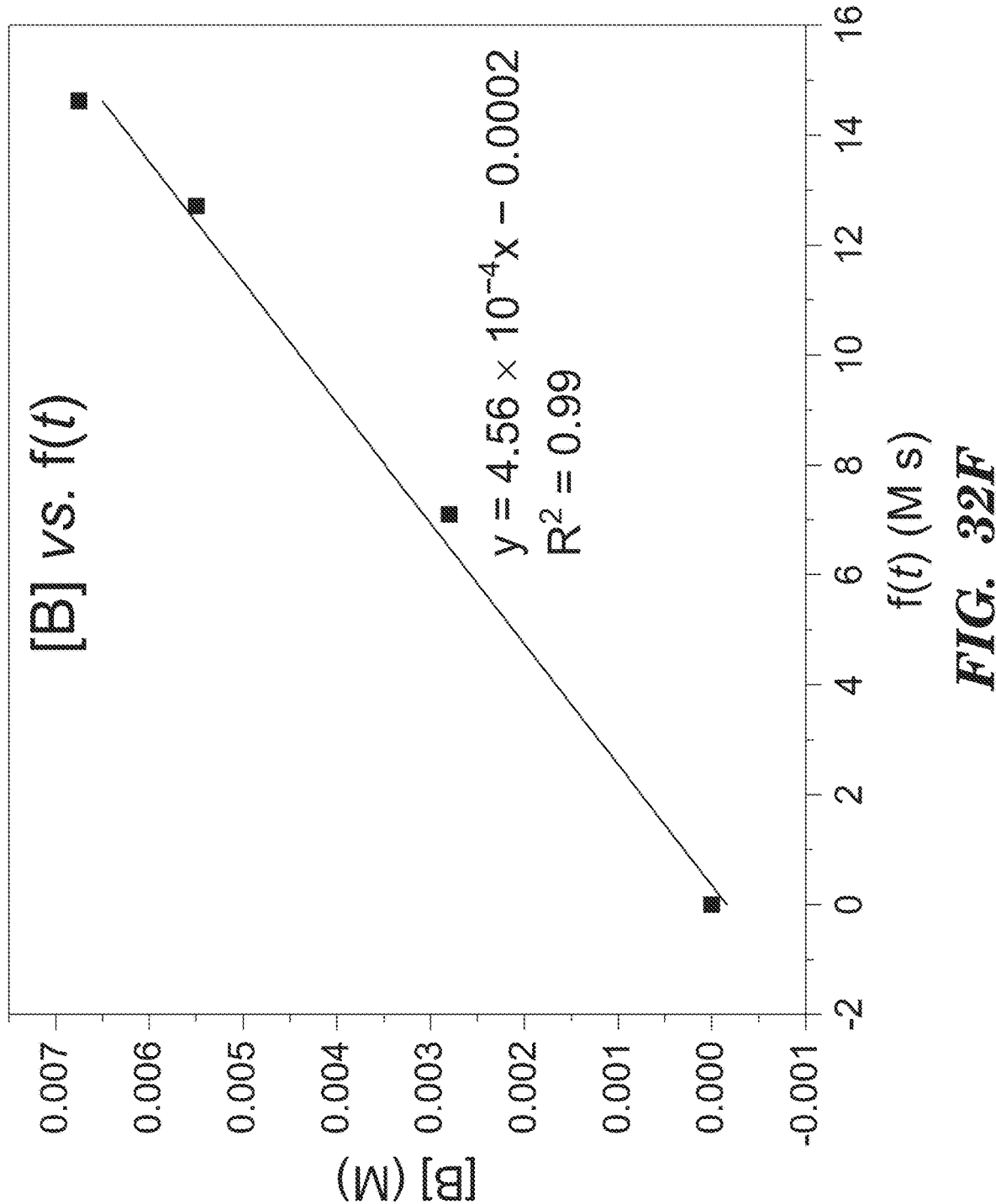

FIGS. 32A-G show the analysis of the electrolysis with 0.025 M $^{15}NO_3^-$ and 0.025 M $^{14}NO_2^-$ from Example 3 (infra). The electrolyte was 0.1 M KCl (pH=4) and the geometric area of OD-Ag was 2 $cm^2$. FIGS. 32A-C are plots of electrolysis at −1.50 $V_{Ag/AgCl}$. FIGS. 32D-F are plots of Electrolysis at −1.30 $V_{Ag/AgCl}$. FIG. 32G is a table summarizing the linear regression results. The detailed kinetic modeling and equations derivation were shown in Example 3 (infra).

Figure 33A:
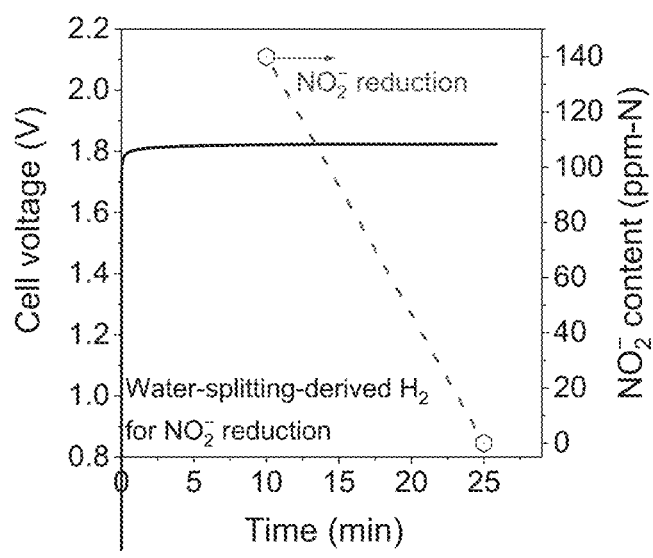
Figure 33B:
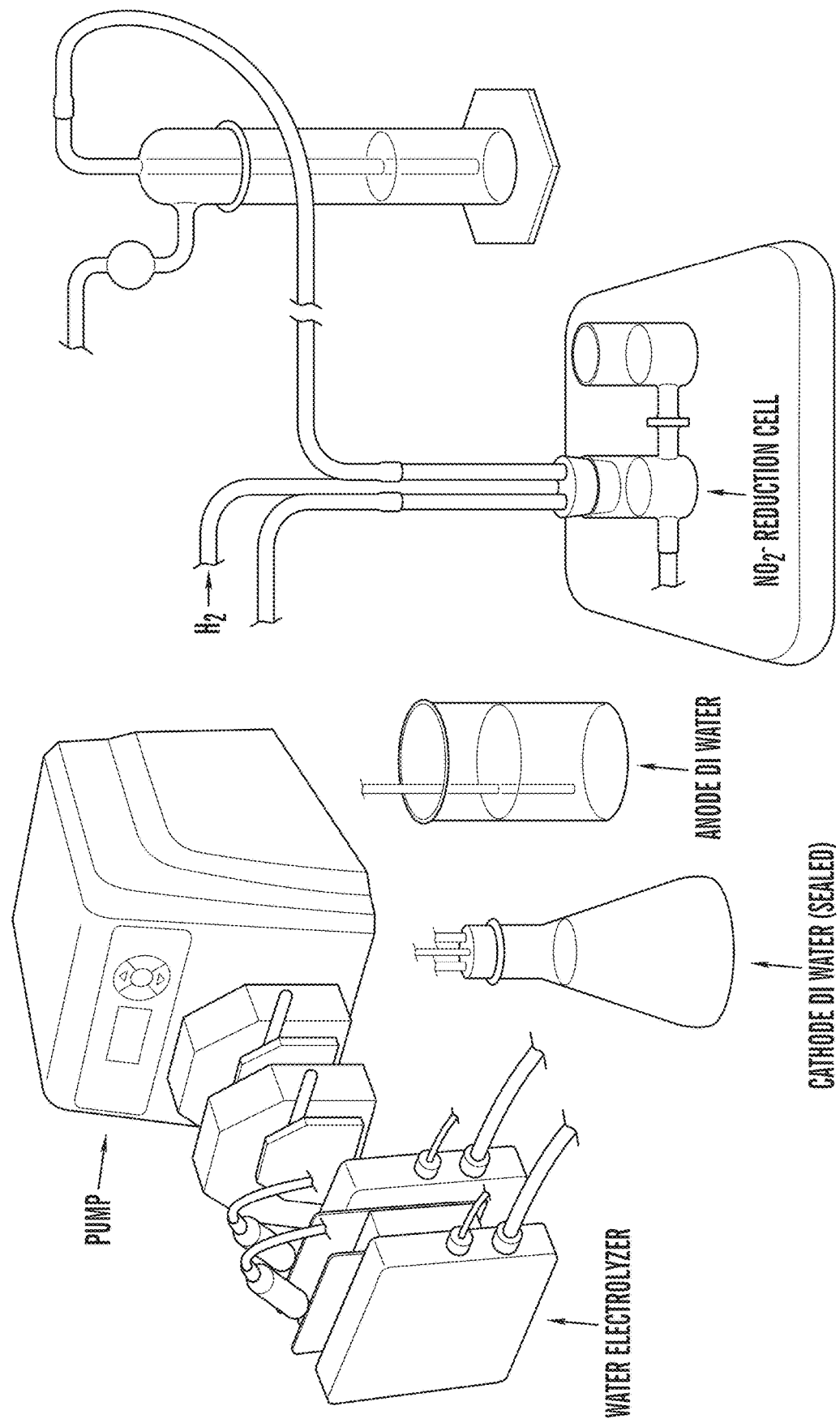

FIGS. 33A-B show the catalytic reduction of $NO_2$ by water-splitting-derived $H_2$. FIG. 33A is plot of the voltage profile of the PEM electrolyzer at 1.4 A, and the $NO_2^-$ concentration before and after the reaction. At t=10-25 min, the gas outlet of the sealed cathode water tank was connected to the cell for $NO_2^-$ reduction. FIG. 33B is a photograph of the experimental setup. The detailed PEM water electrolyzer set-up and catalytic reduction conditions are described Example 3 (infra). The $H_2$ feed was generated from a PEM water electrolyzer. $NO_2^-$ was completely removed within 15 min with 0.9% selectivity to $NH_4^+$, showing no significant difference with the performance with UHP $H_2$ feed (FIGS. 60A-C).

Figure 34A:
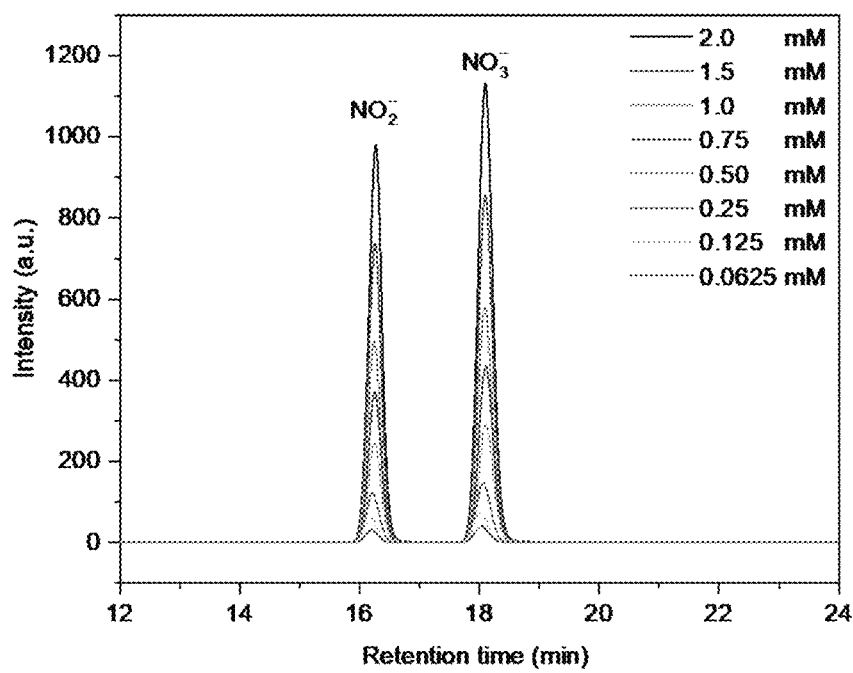
Figure 34B:
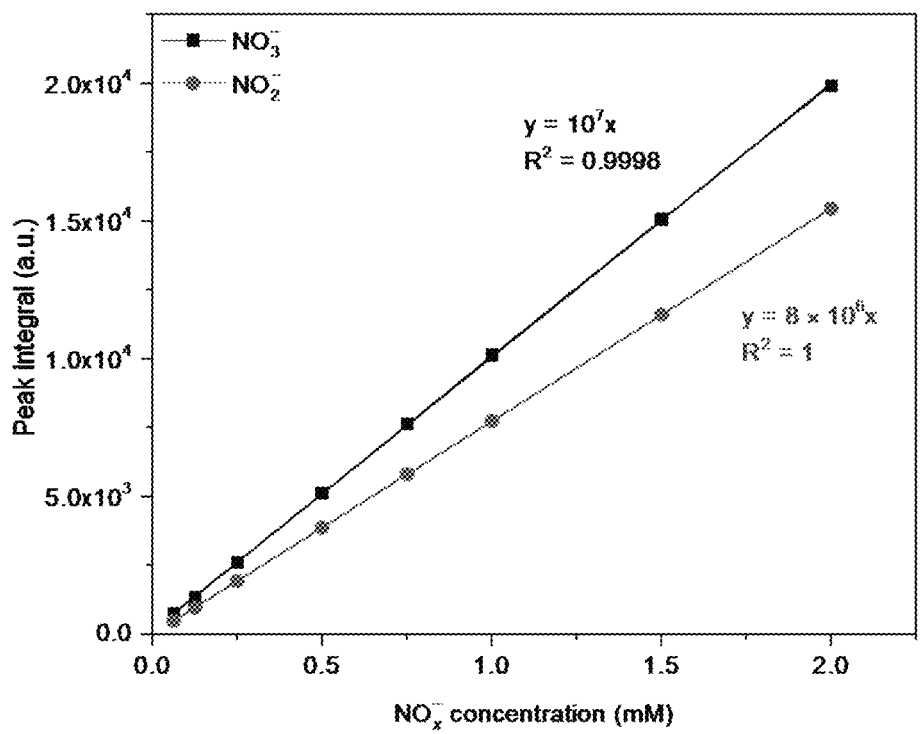

FIGS. 34A-B show the HPLC calibration with standard $NO_3^-$ and $NO_2^-$ solutions. FIG. 34A shows the HPLC chromatograms. The retention time was around 16 or 18 min for $NO_2^-$ or $NO_3^-$, respectively. FIG. 34B is a plot of the calibration curves.

Figure 35A:
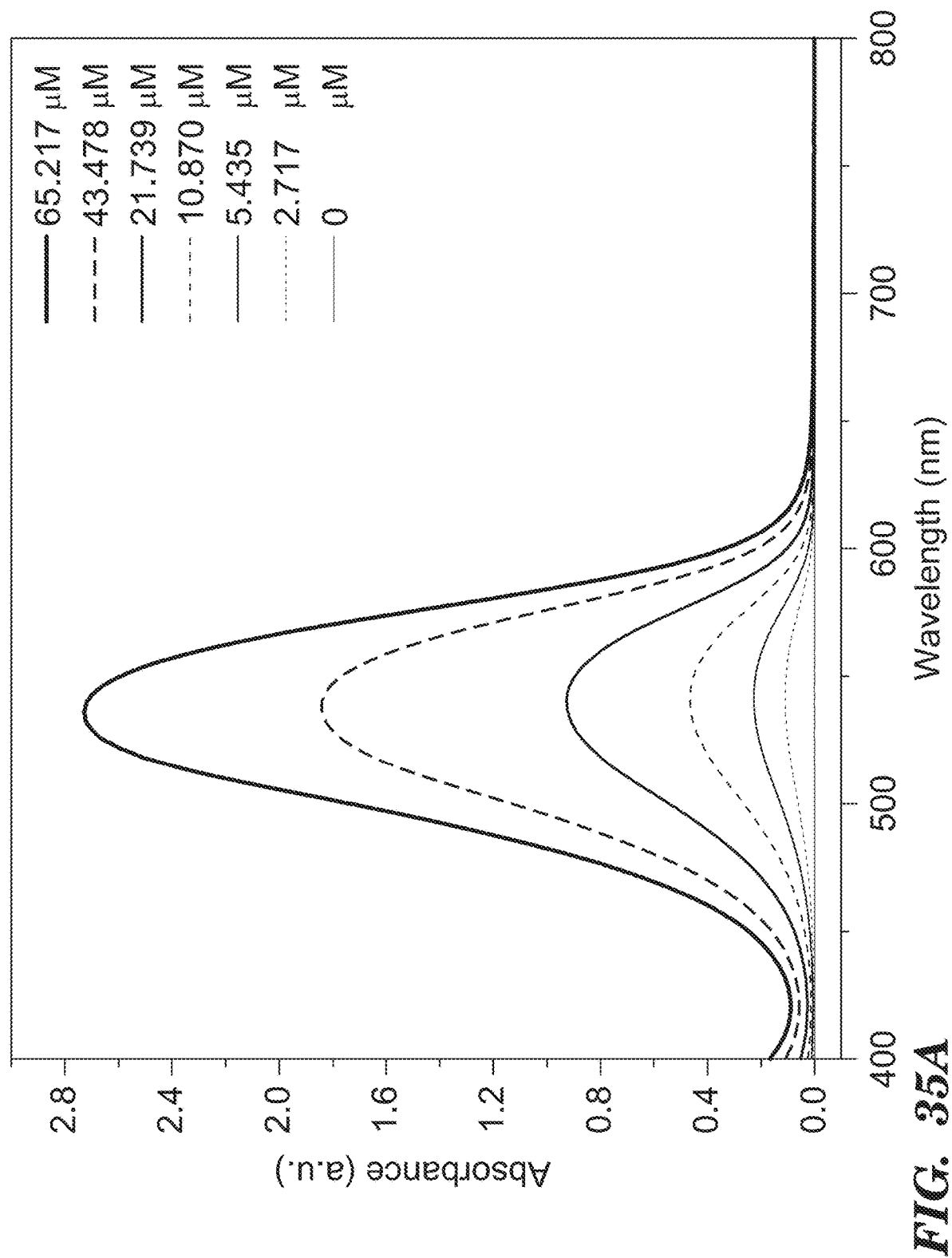
Figure 35B:
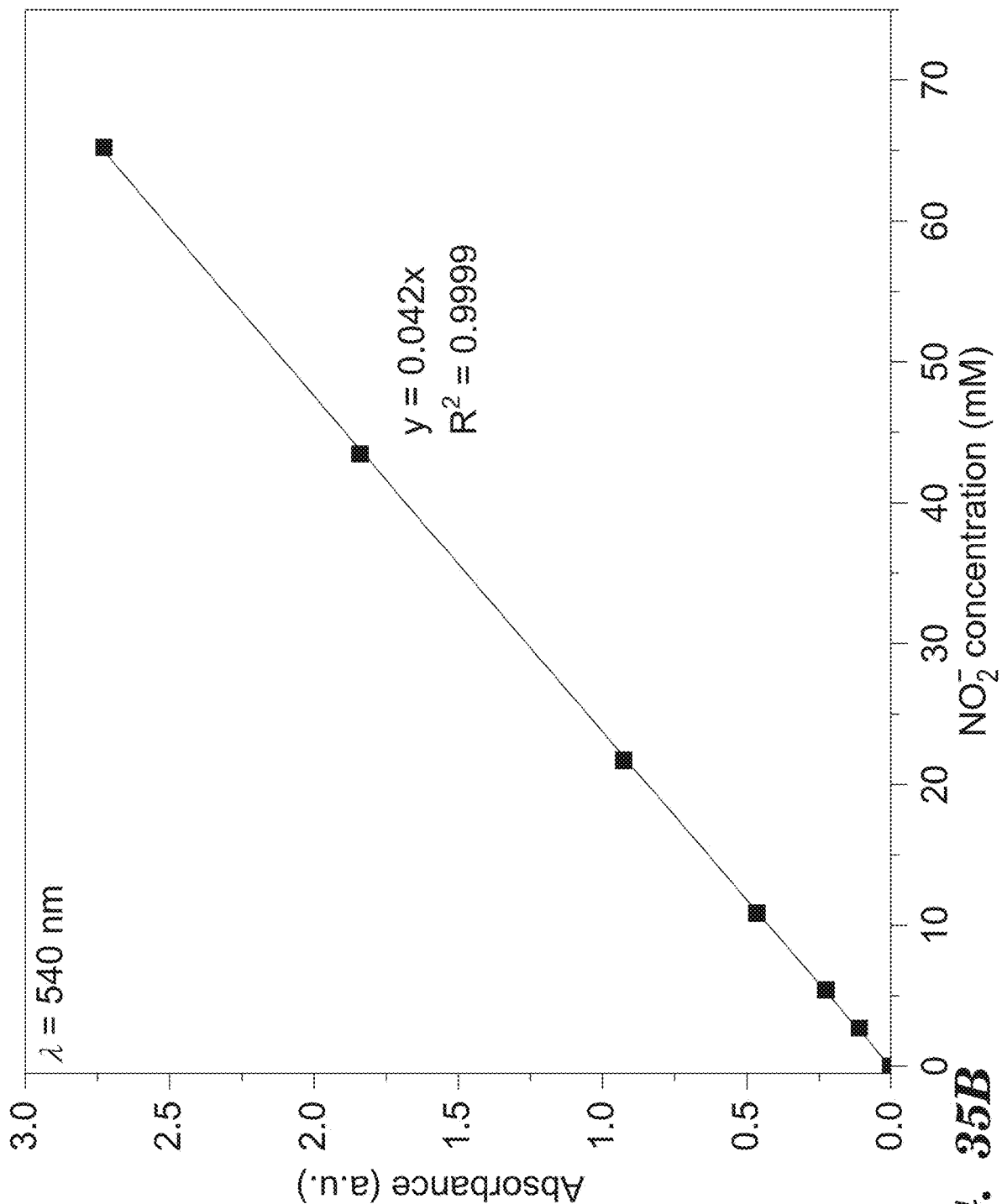
Figure 35C:
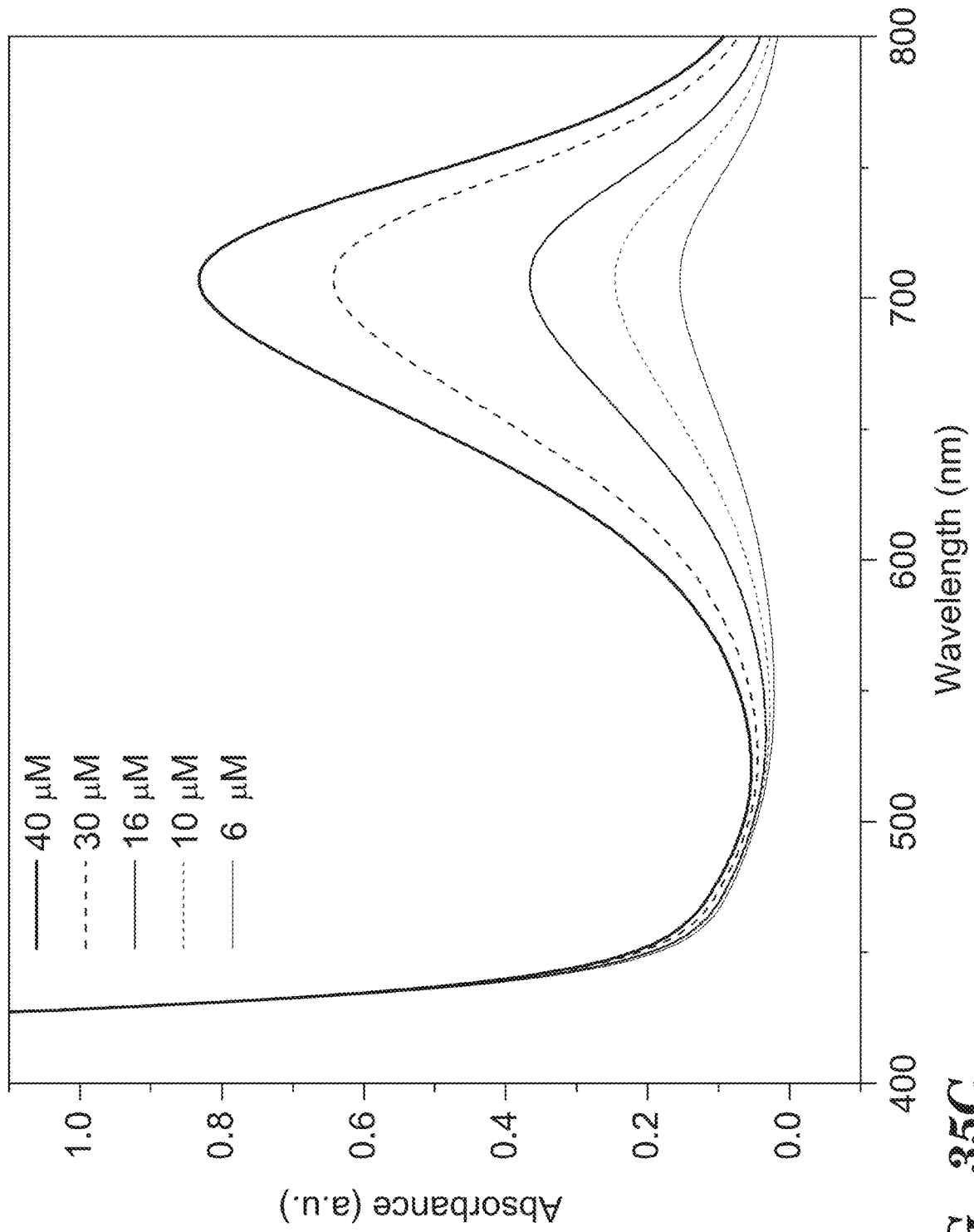
Figure 35D:
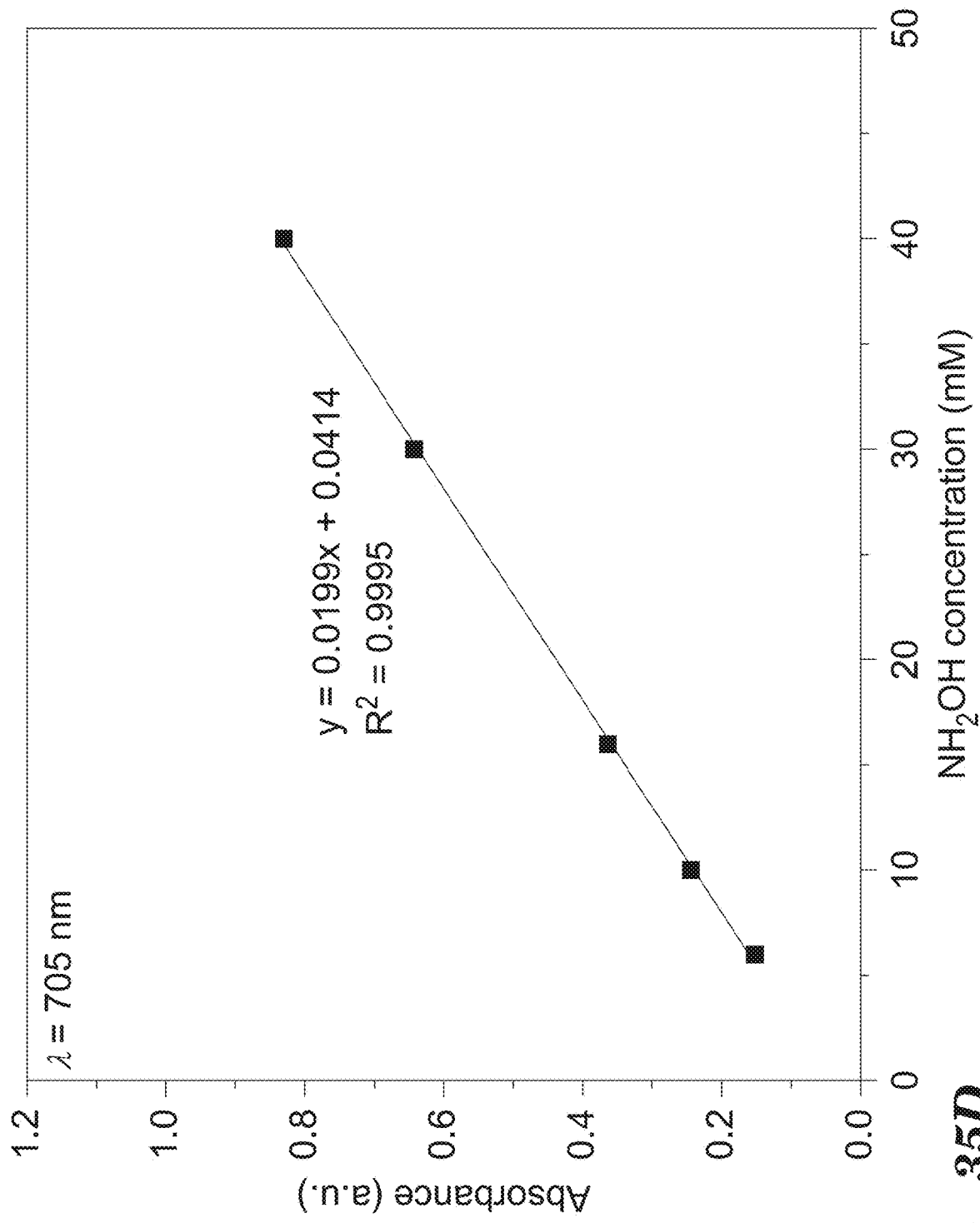
Figure 35E:
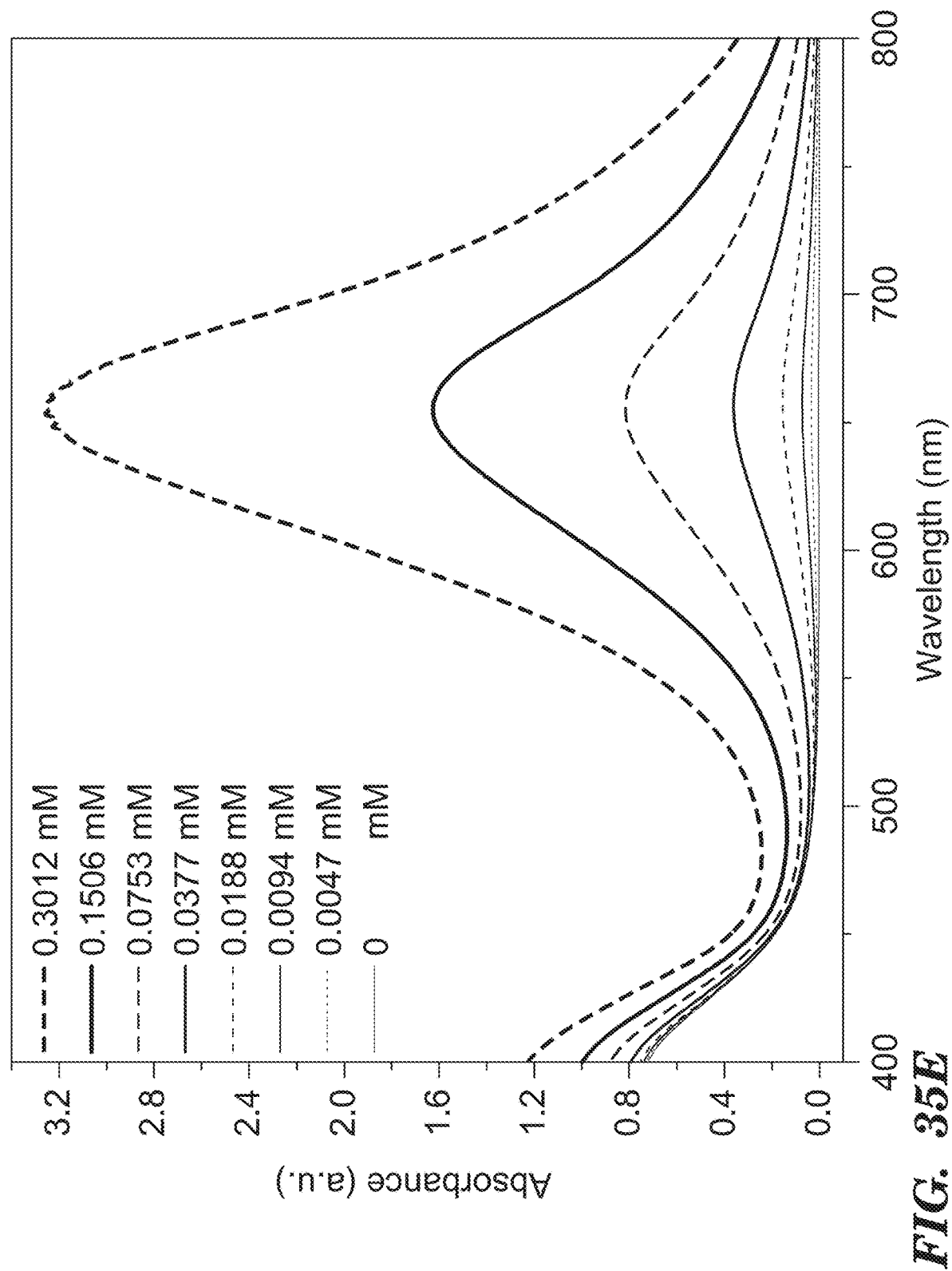
Figure 35F:
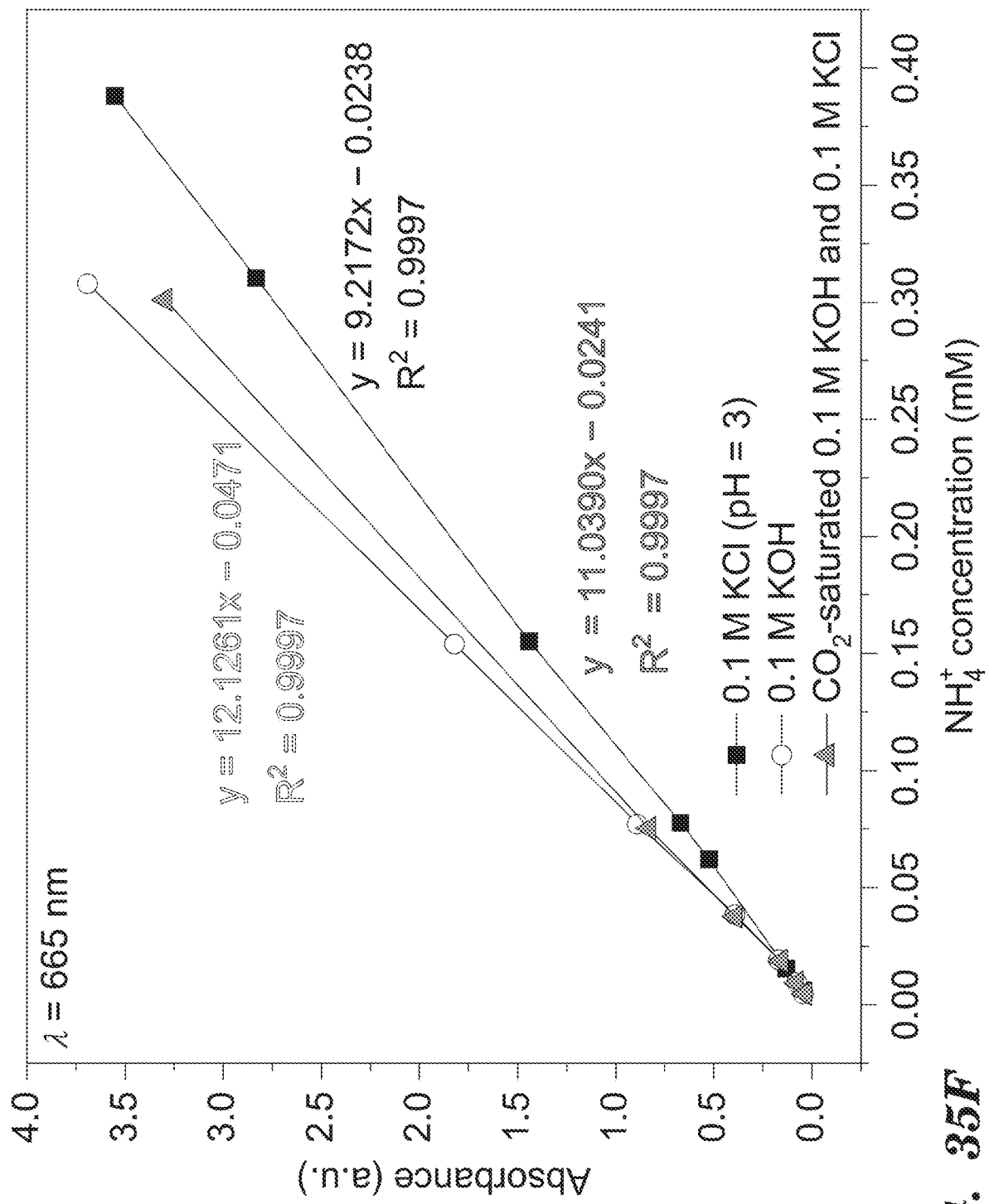

FIGS. 35A-F show the UV-Vis calibrations of $NO_2^-$, $NH_2OH$, and $NH_4^+$. FIGS. 35A-B are UV-Vis spectra and the calibration curve of standard $NO_2^-$ solutions. FIGS. 35C-D are the UV-Vis spectra and the calibration curve of the standard $NH_2OH$ solutions. FIG. 35E shows the UV-Vis spectra of the standard $NH_4^+$ solutions in $CO_2$-saturated 0.1 M KOH and 0.1 M KCl. The pH of the sample solutions was adjusted to 13 by adding KOH before the colorimetric test. FIG. 35F is the calibration curve plots for the standard $NH_4^+$ solutions in different media.

Figure 36A:
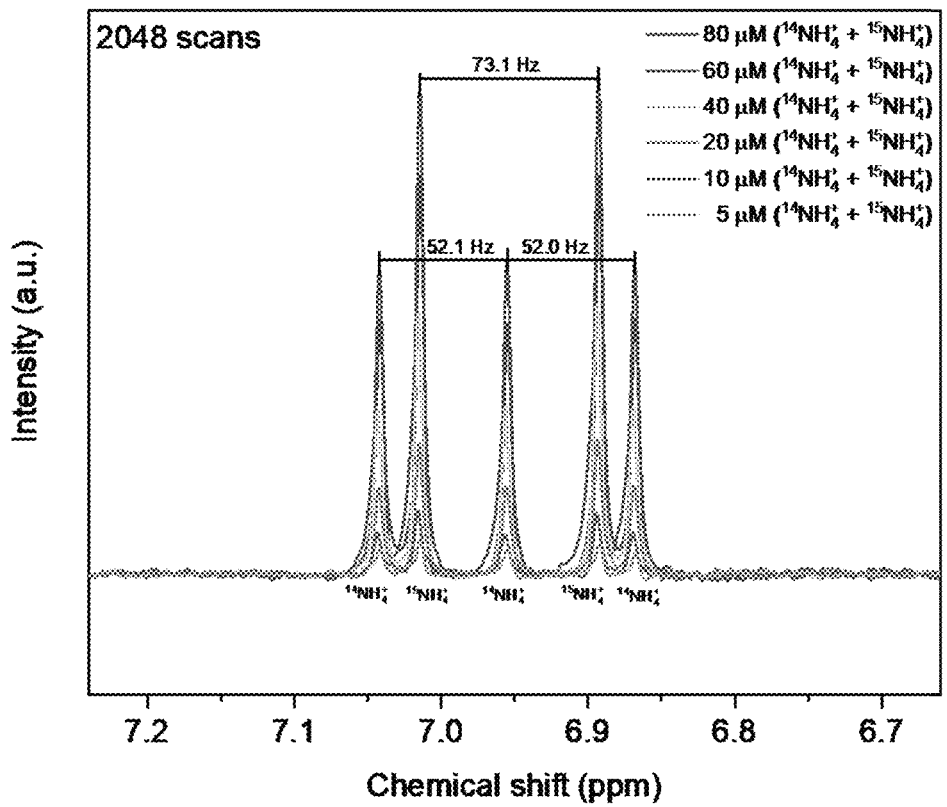
Figure 36B:
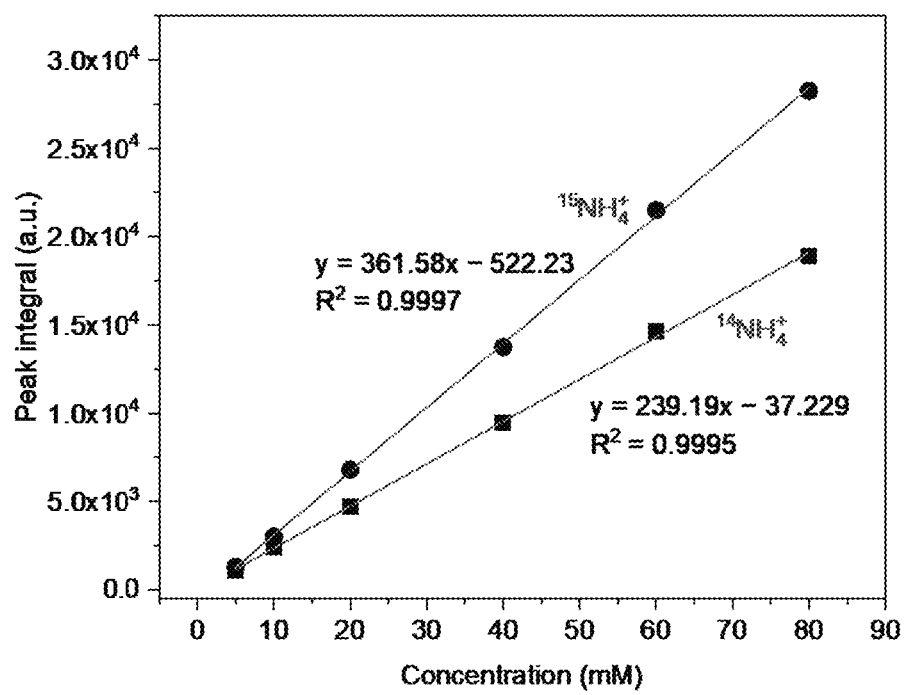

FIGS. 36A-B show the $^1H$ NMR calibration with solutions containing $^{14}NH_4^+$ and $^{15}NH_4^+$ (in 0.1 M KCl with 0.1 M $H_2SO_4$). FIG. 36A is the $^1H$ NMR spectra collected with 2,048 scans. FIG. 36B is the calibration curve plots of $^{14}NH_4^+$ and $^{15}NH_4^+$.

Figures 37A, 37B, 37C:
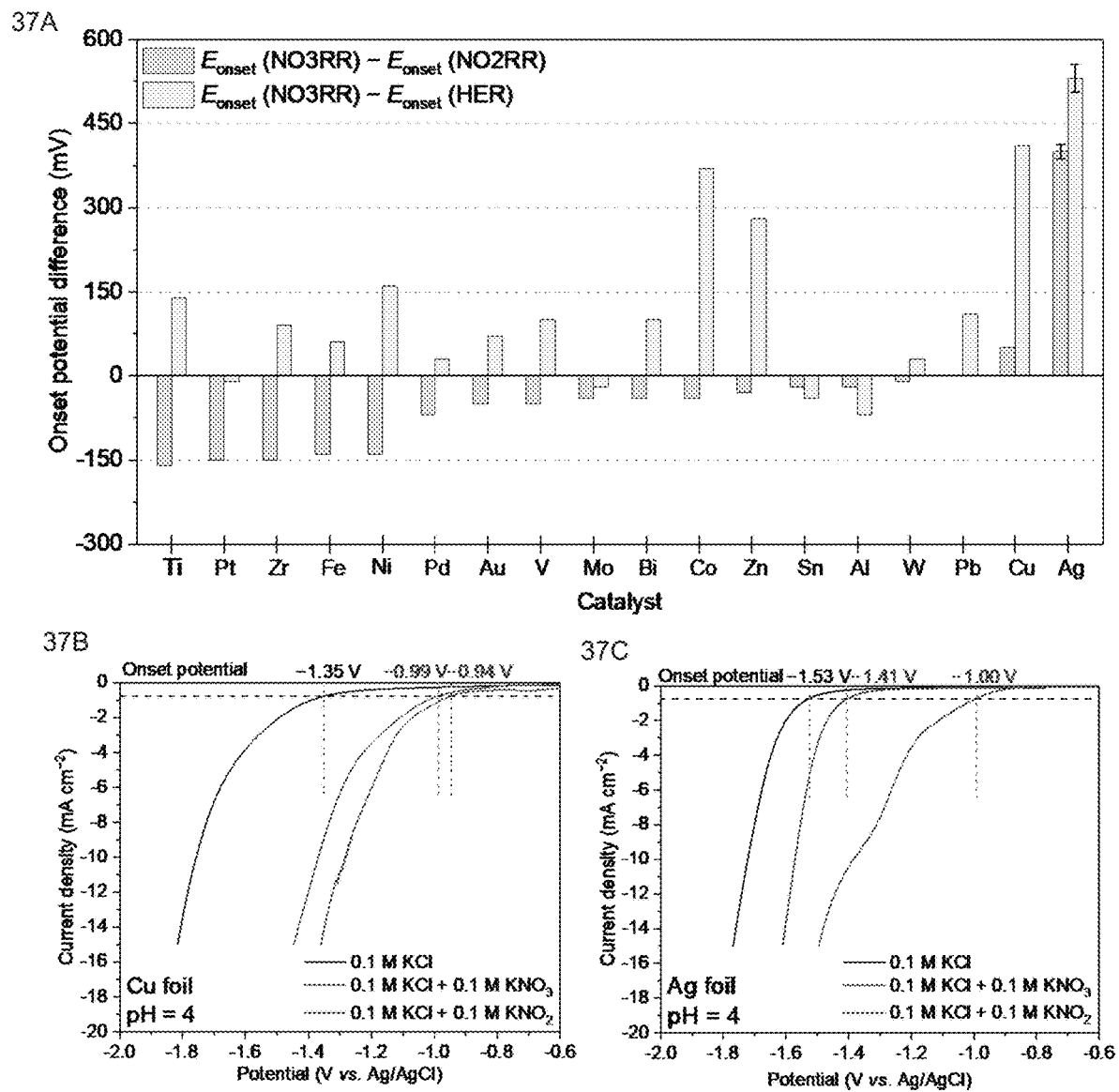
Figure 38A:
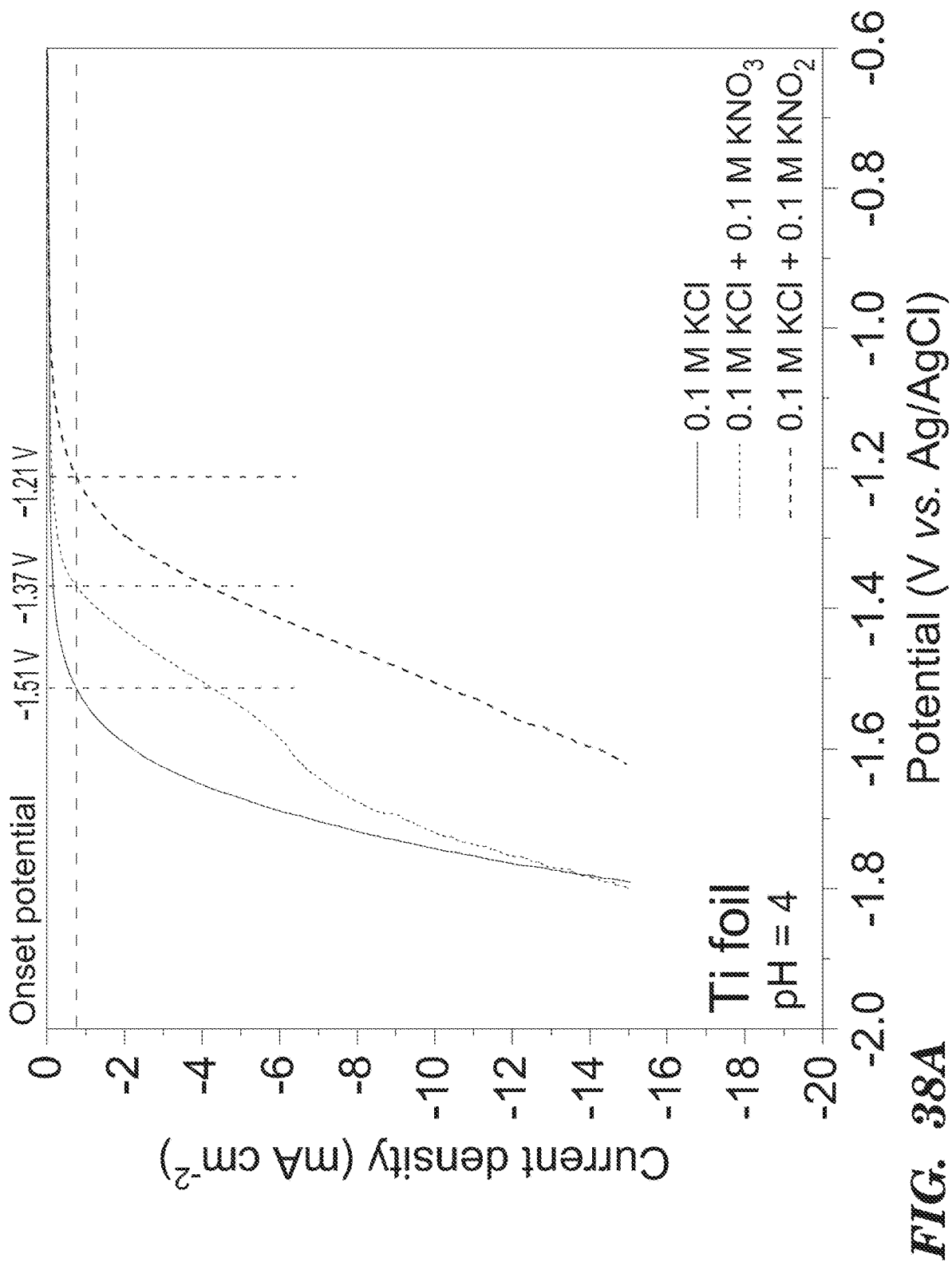
Figure 38B:
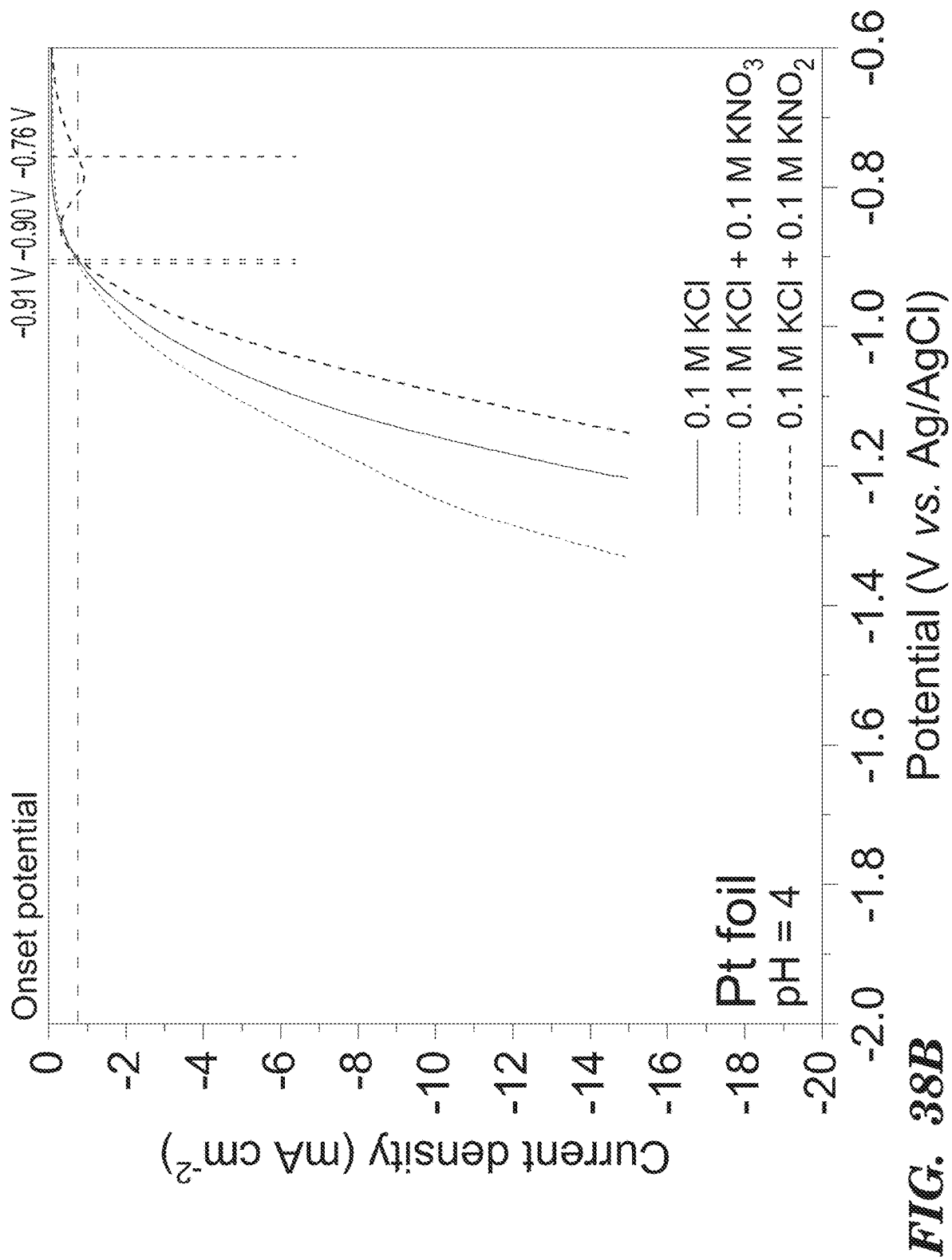
Figure 38C:
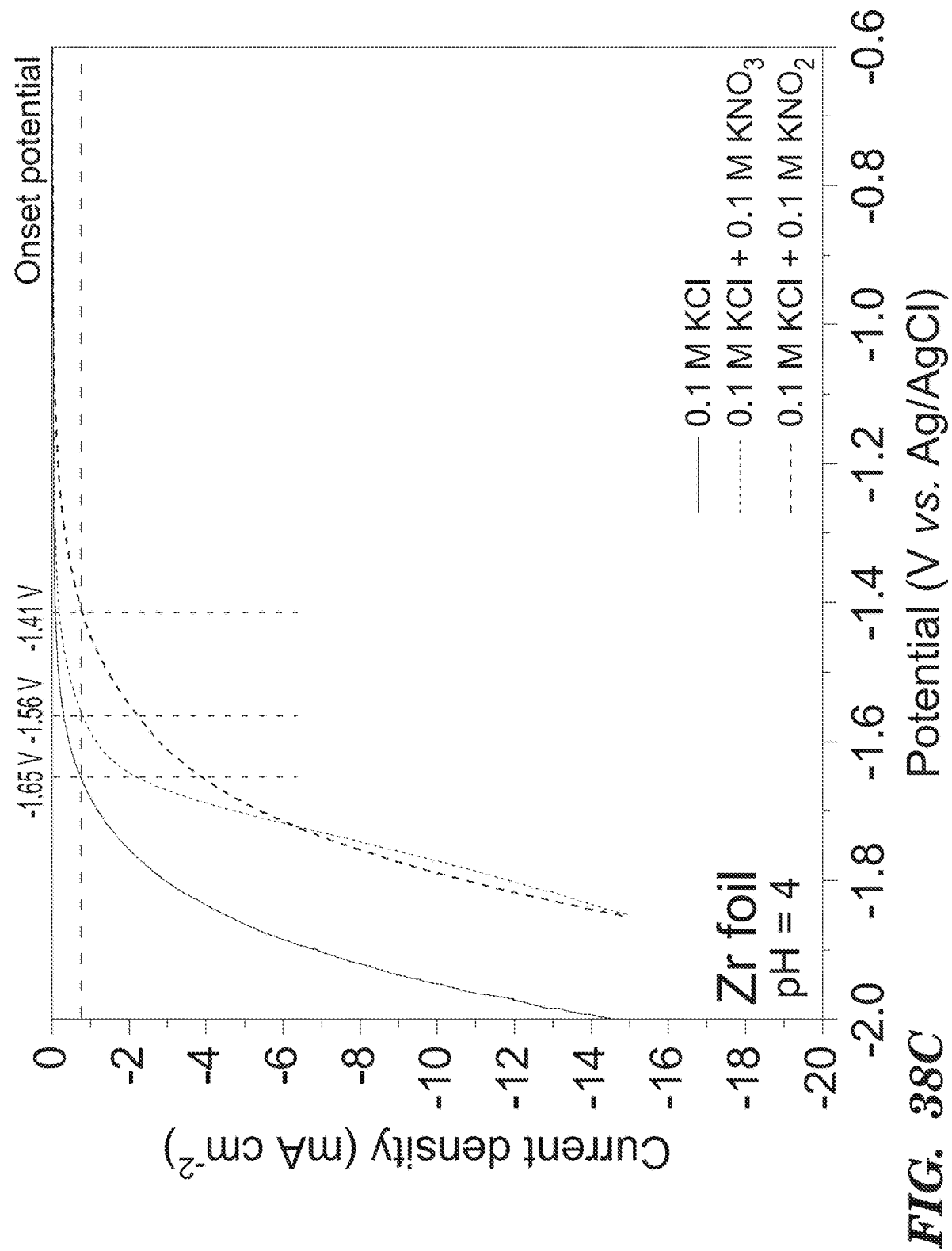
Figure 38D:
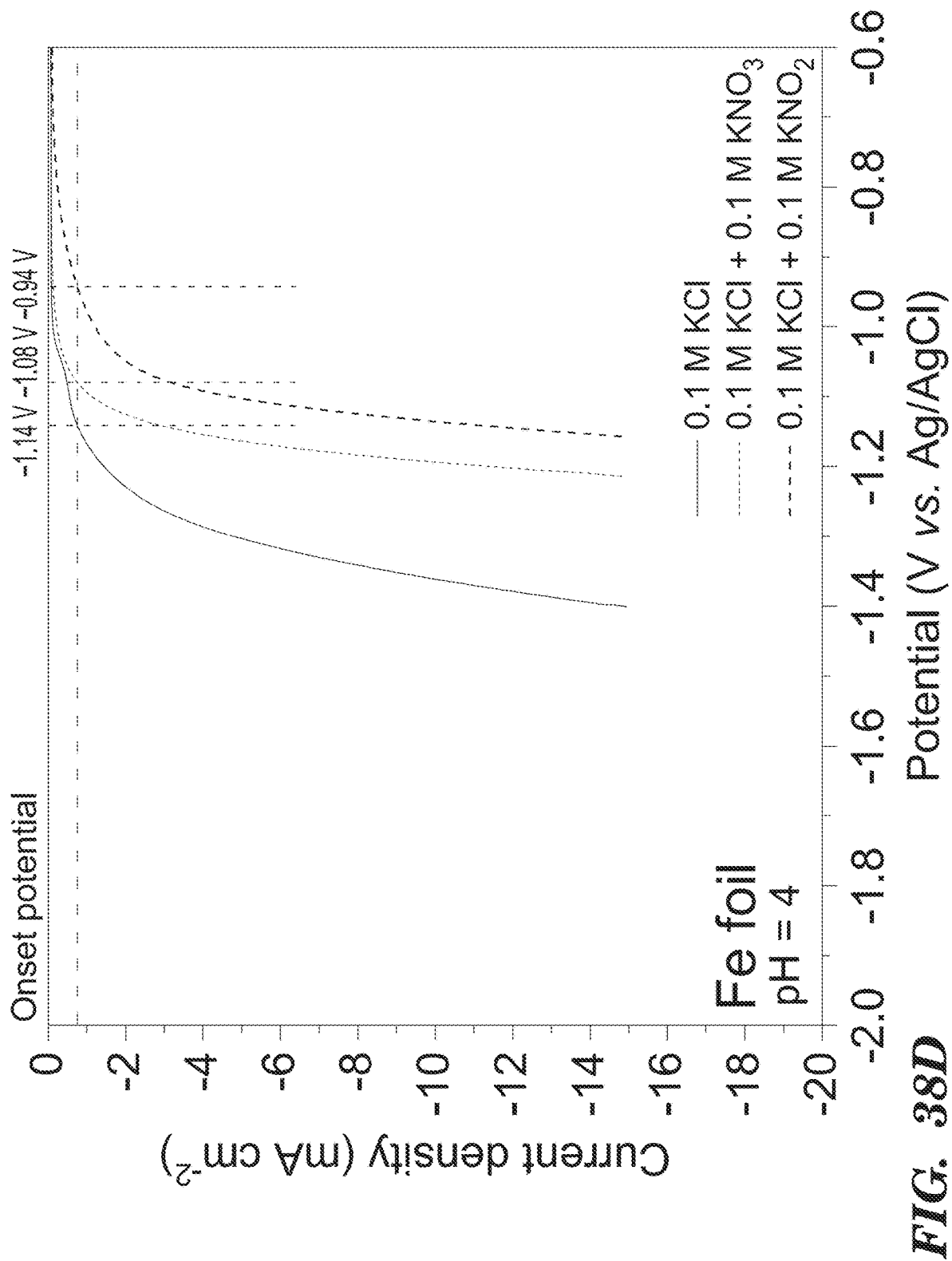
Figure 38E:
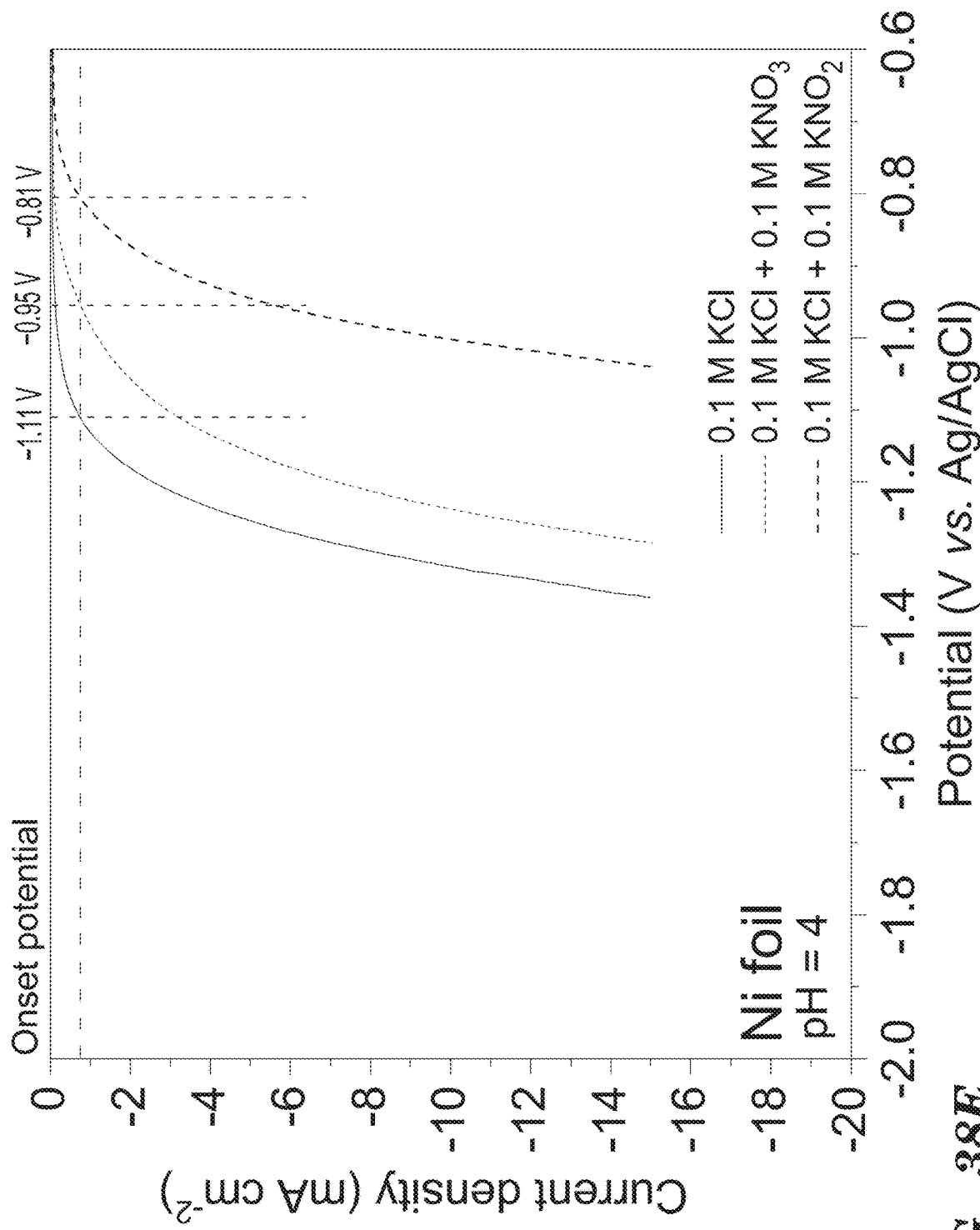
Figure 38F:
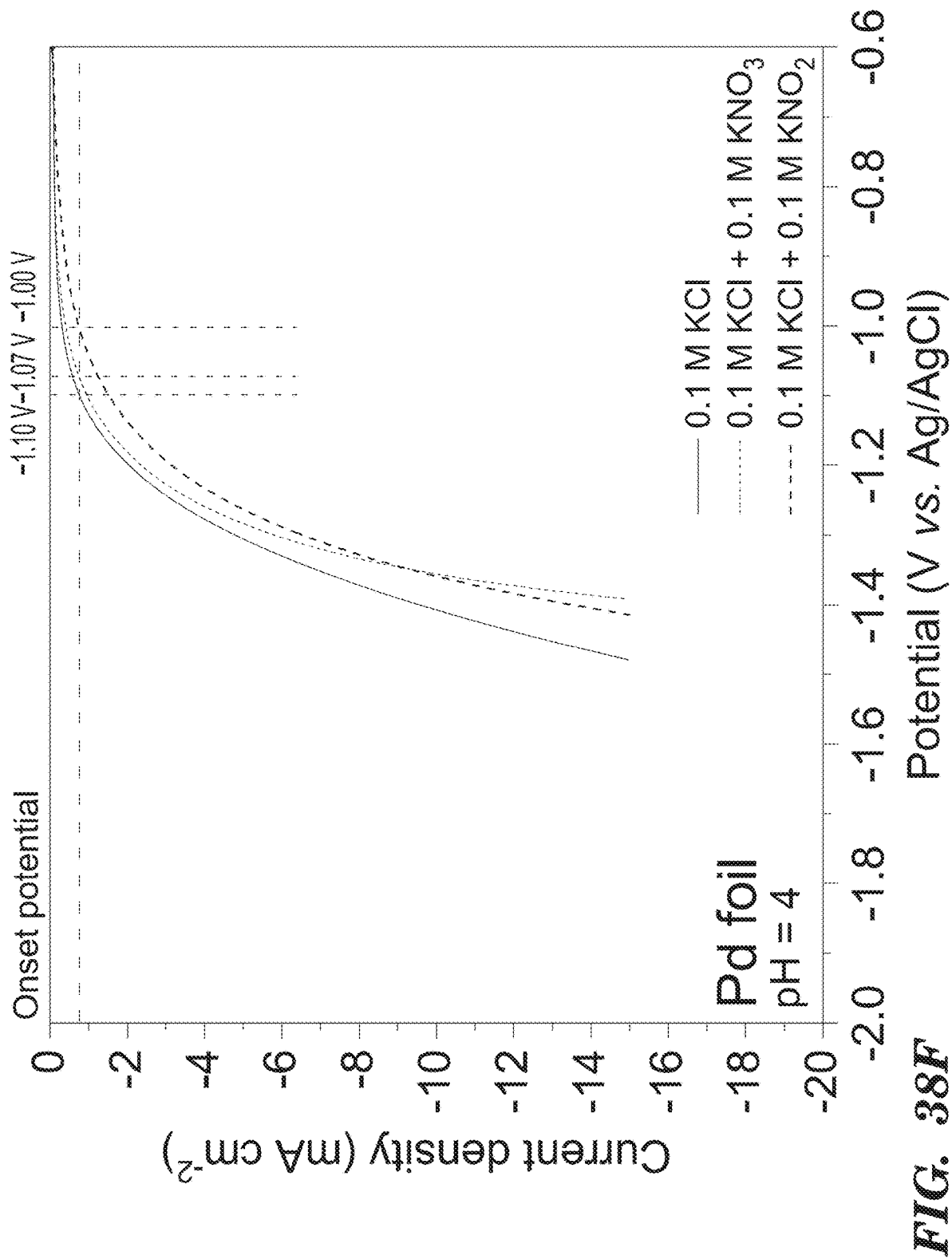
Figure 38G:
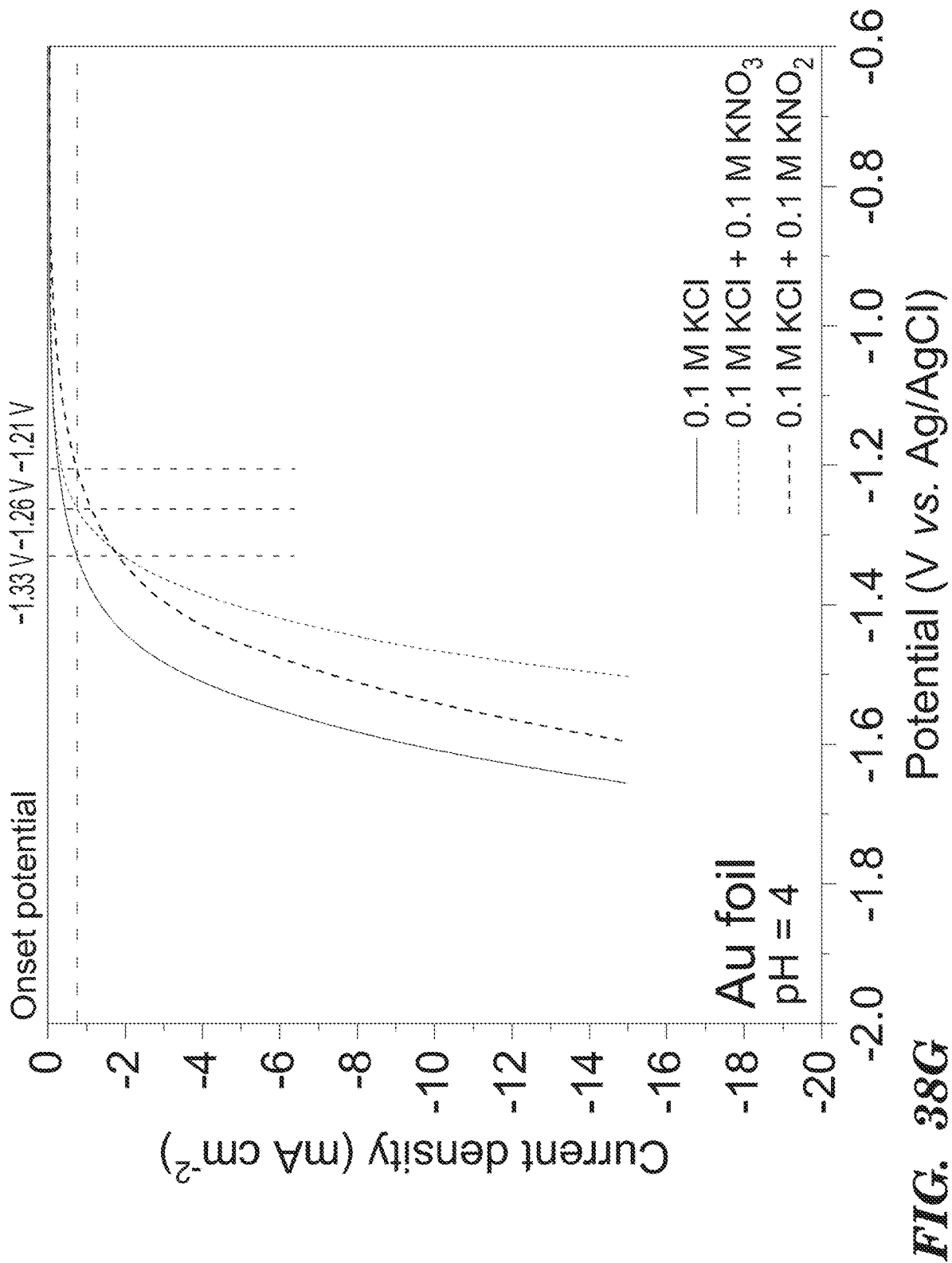
Figure 38H:
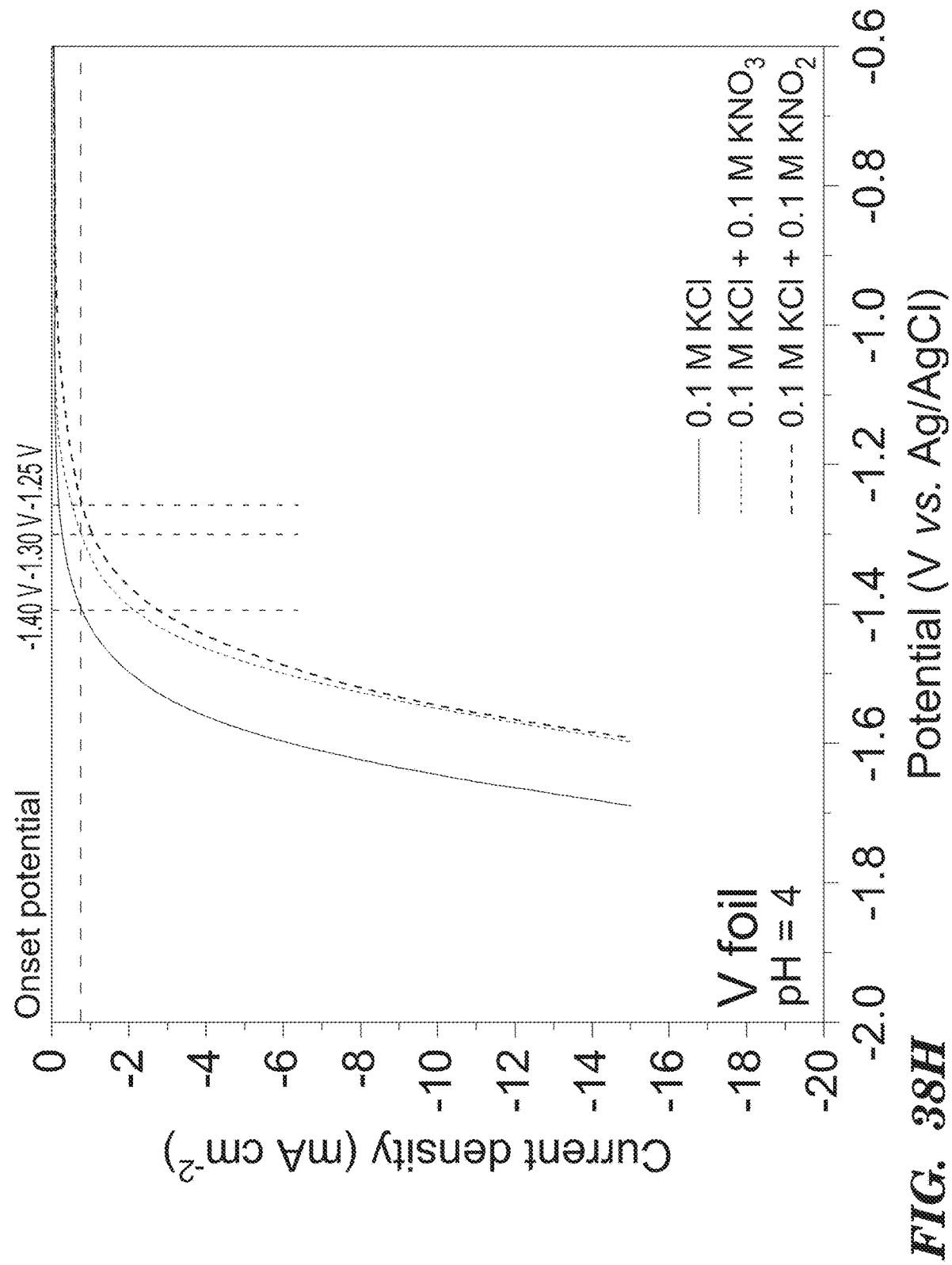
Figure 38I:
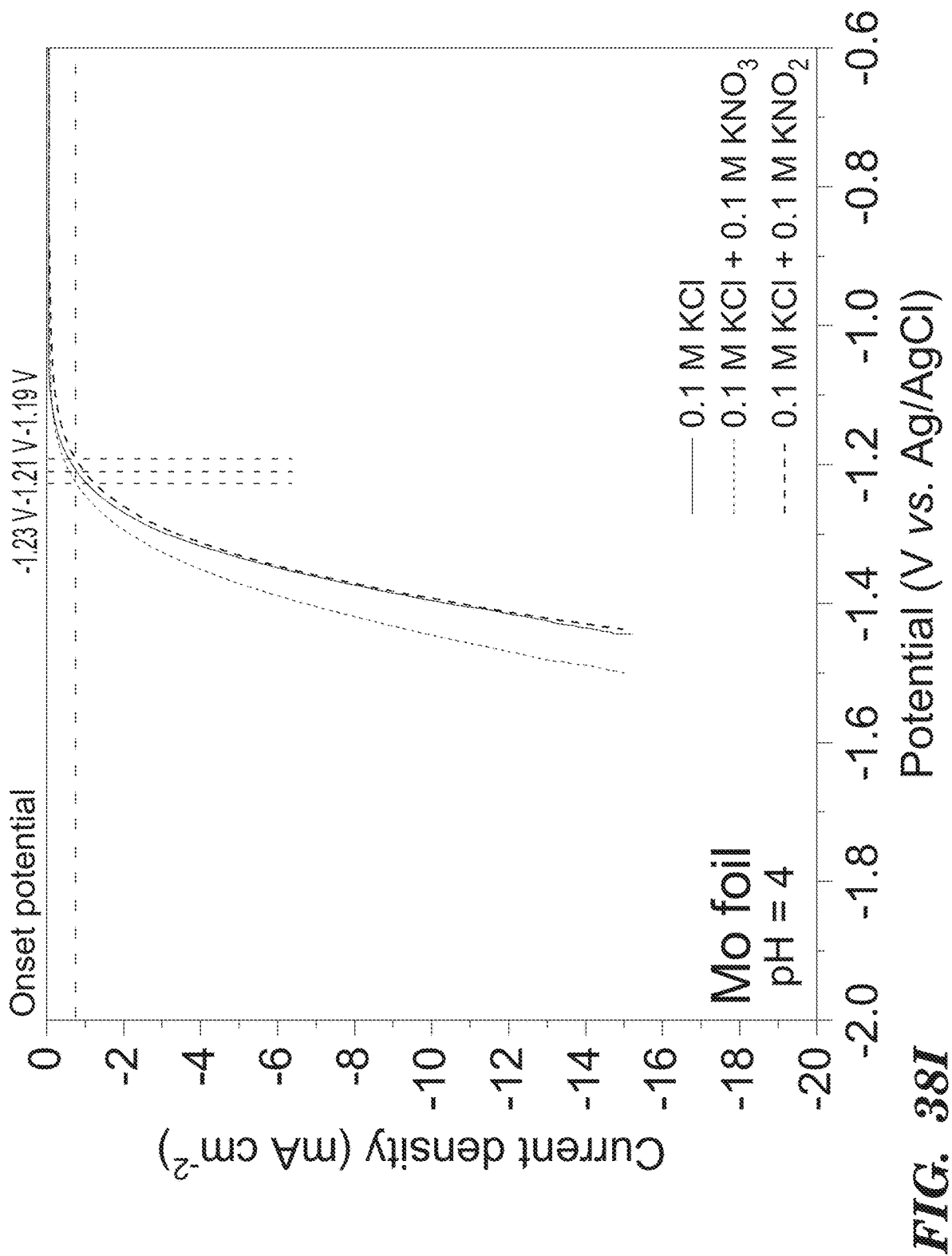
Figure 38J:
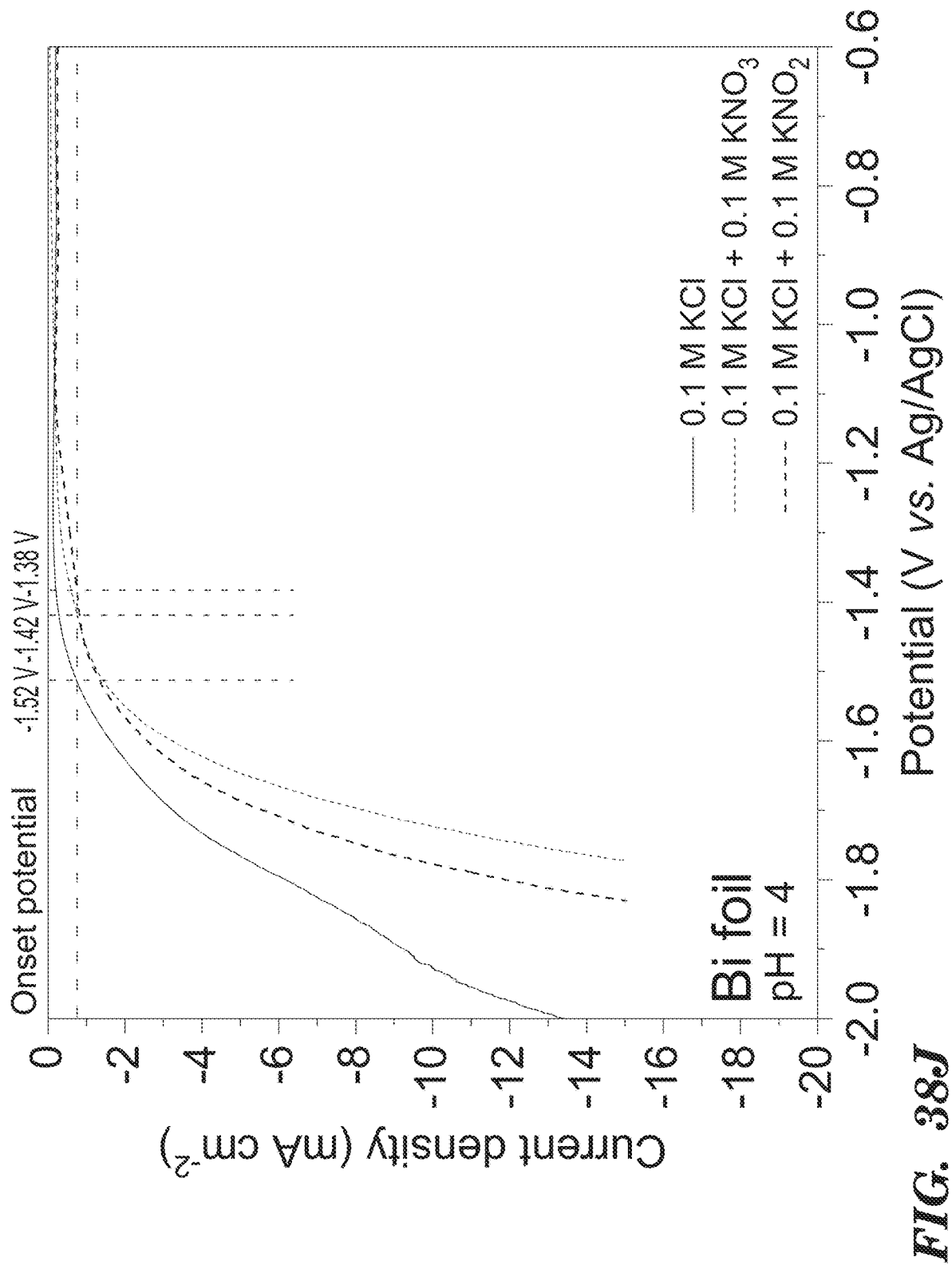
Figure 38K:
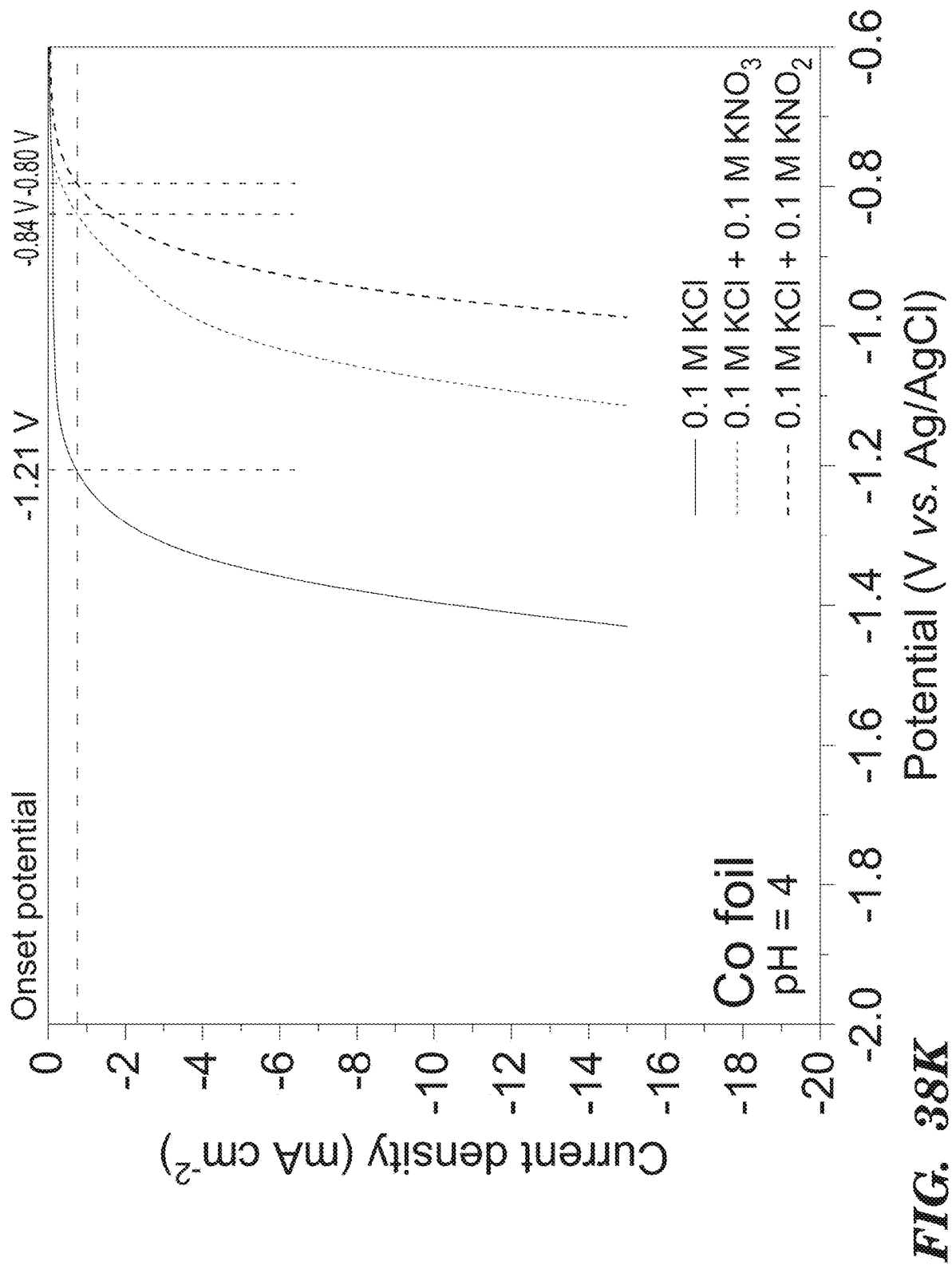
Figure 38L:
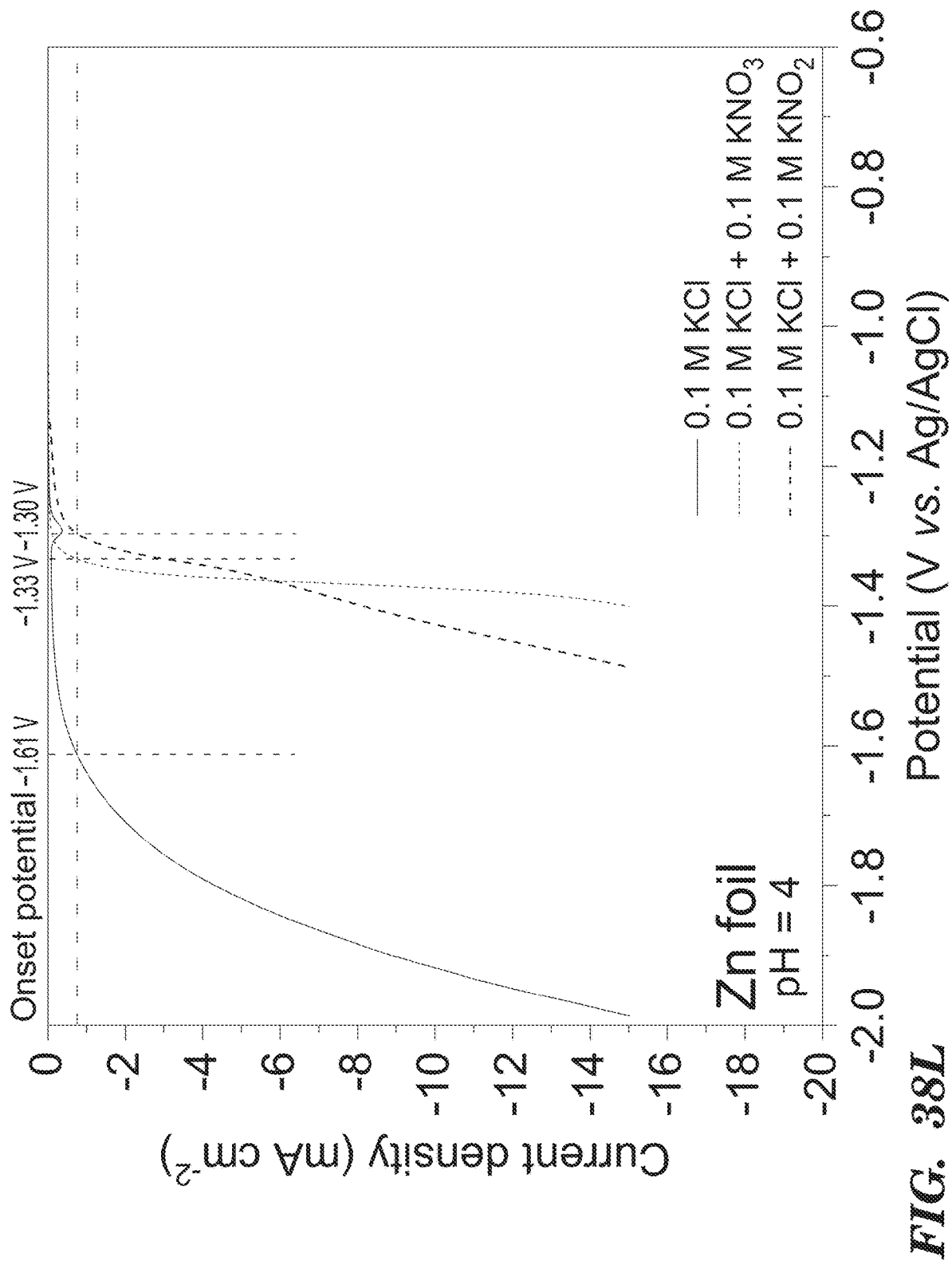
Figure 38M:
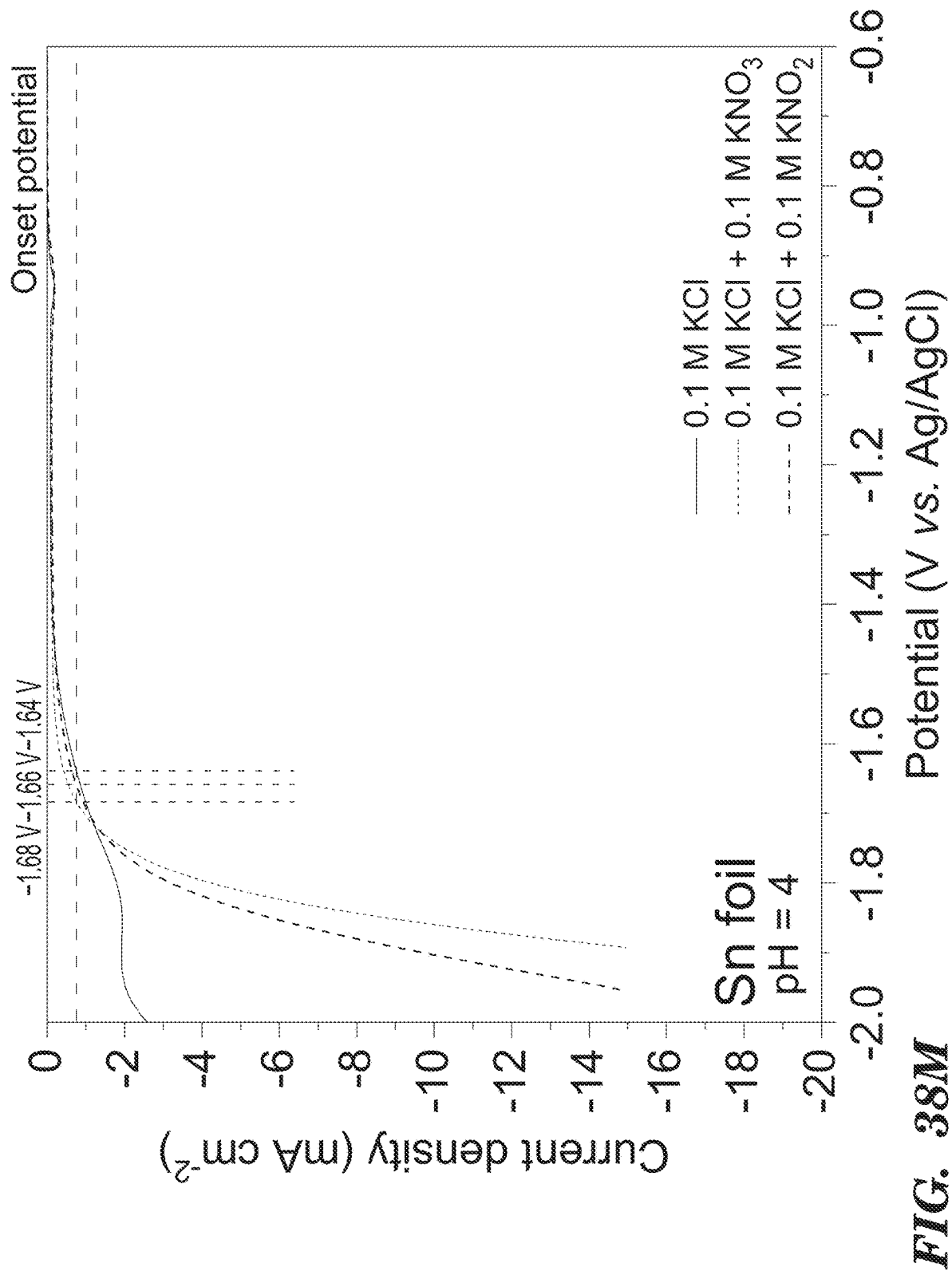
Figure 38N:
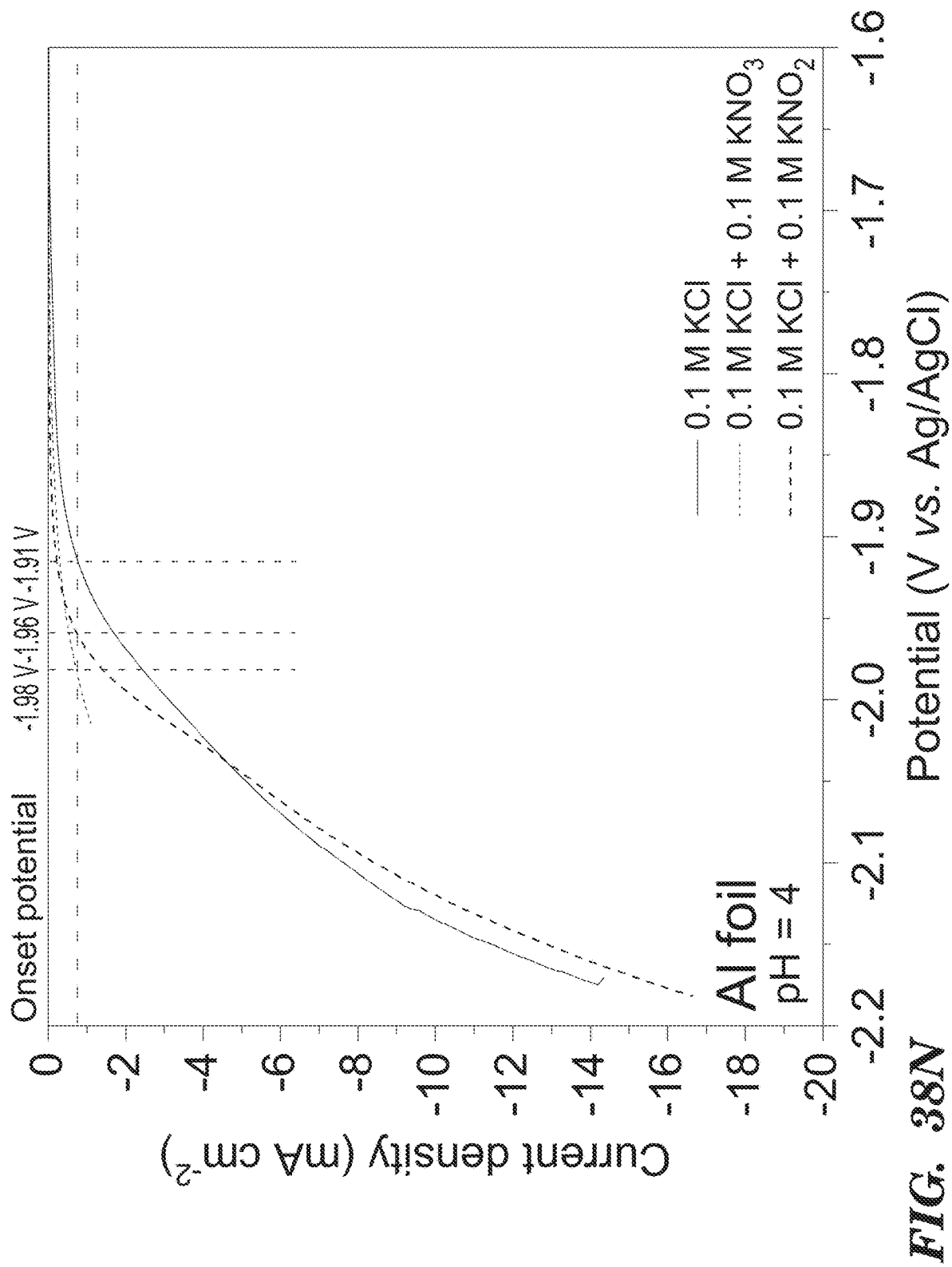
Figure 38O:
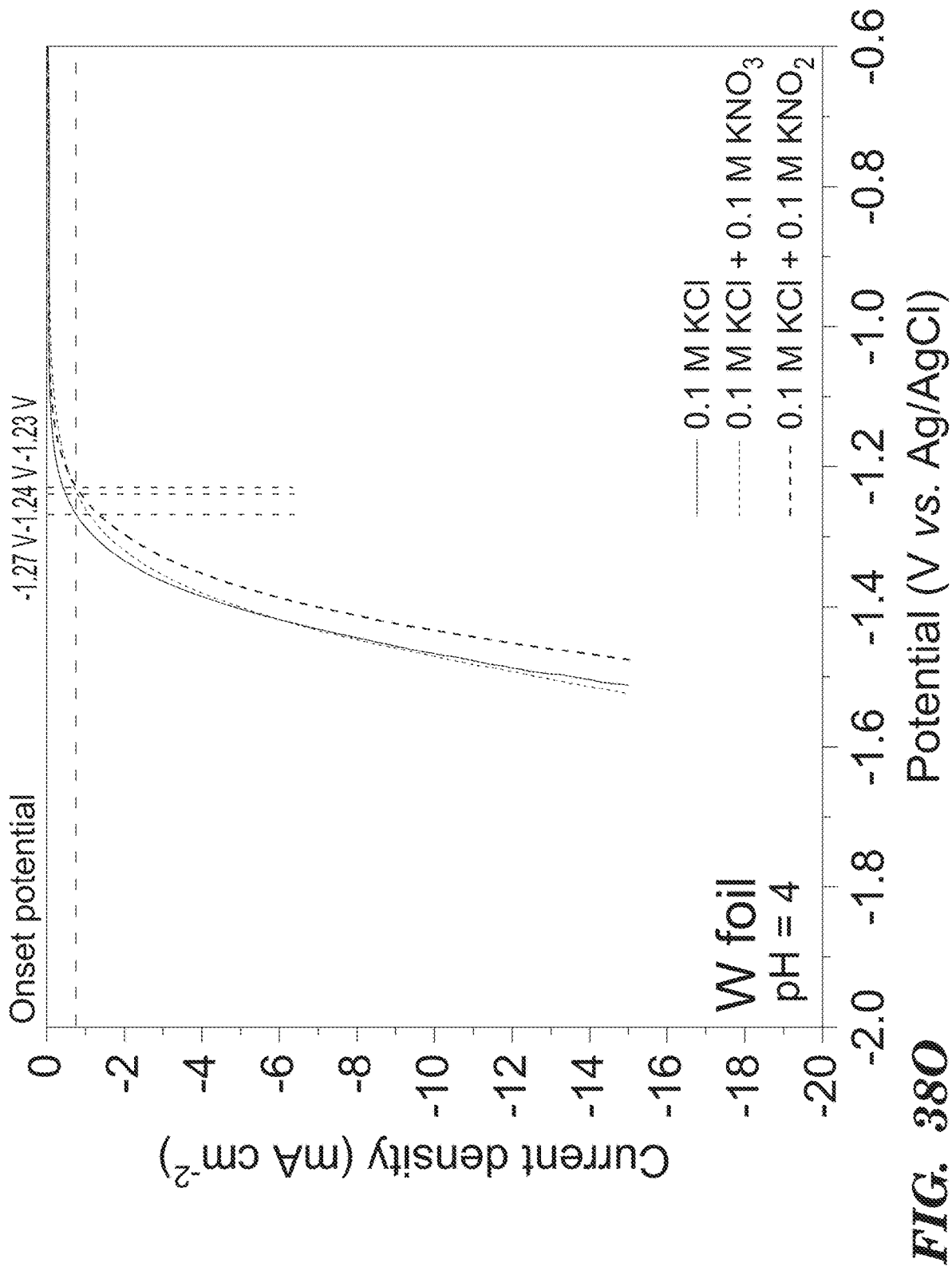
Figure 38P:
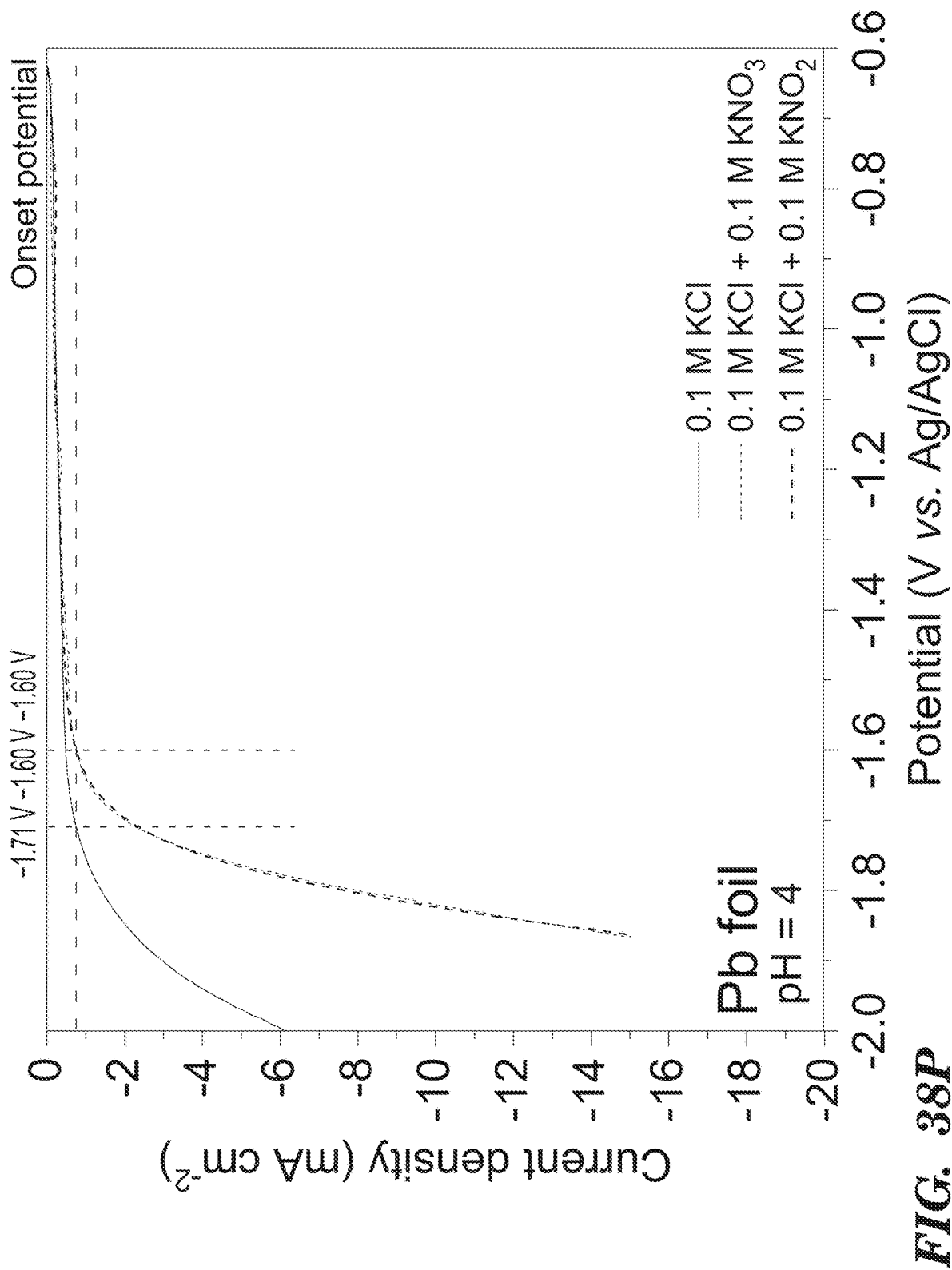

FIGS. 37A-C show metal surfaces with distinctive electrocatalytic preference between $NO_3^-$ reduction and $NO_2$ reduction. FIG. 37A is a graph of the onset-potential difference between $NO_3^-$ reduction and $NO_2^-$ reduction: "$E_{onset}(NO3RR)-E_{onset}(NO2RR)$", and the onset-potential difference between $NO_3^-$ reduction and HER: "$E_{onset}(NO3RR)-E_{onset}(HER)$". The detailed LSV curves to obtain onset potentials are shown in FIGS. 38A-38P. The error bars represent the standard deviation from at least three independent measurements. FIGS. 37B-C are LSV curves on Cu foil and Ag foil in three different solutions: 0.1 M KCl (leftmost curve), 0.1 M KCl with 0.1 M $NO_3^-$ (rightmost curve), and 0.1 M KCl with 0.1 M $NO_2^-$ (center curve). A scan rate of 5 mV $s^{-1}$ was the same for LSV on all metal surfaces, and all electrolytes were adjusted to pH 4. The geometric area of all metal foils was 4 $cm^2$.

FIGS. 38A-P are linear sweep voltammograms of metal foil electrodes. FIGS. 38A-P correspond to the voltammograms Ti, Pt, Zr, Fe, Ni, Pd, Au, V, Mo, Bi, Co, Zn, Sn, Al, W, and Pb, respectively, in three different solutions: 0.1 M KCl (black curves), 0.1 M KCl with 0.1 M $NO_3^-$ (red curves), and 0.1 M KCl with 0.1 M $NO_2^-$ (blue curves). The onset potentials (defined as the potential at −0.75 mA $cm^{-2}$) of $NO_3^-$ reduction, $NO_2$ reduction, and HER are labeled on the top of each graph. The geometric area of the electrodes was 4 $cm^2$. The range of x-axis in FIG. 38N (Al foil) is from −1.6 to −2.2 $V_{Ag/AgCl}$.

Figure 39A:
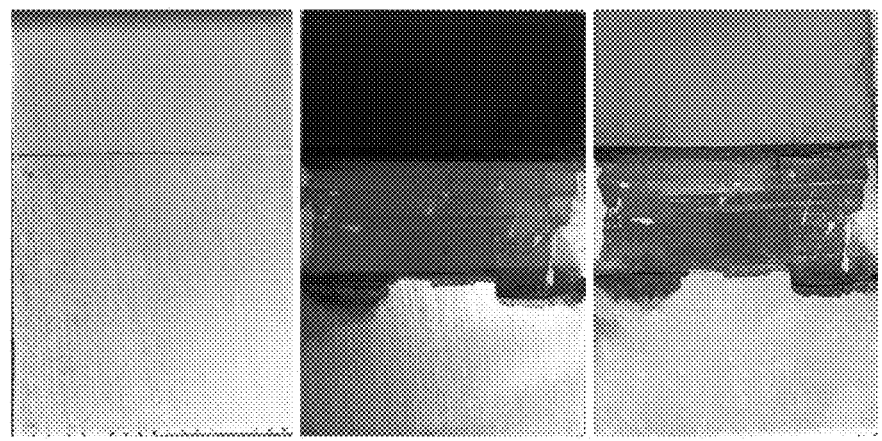
Figure 39B:
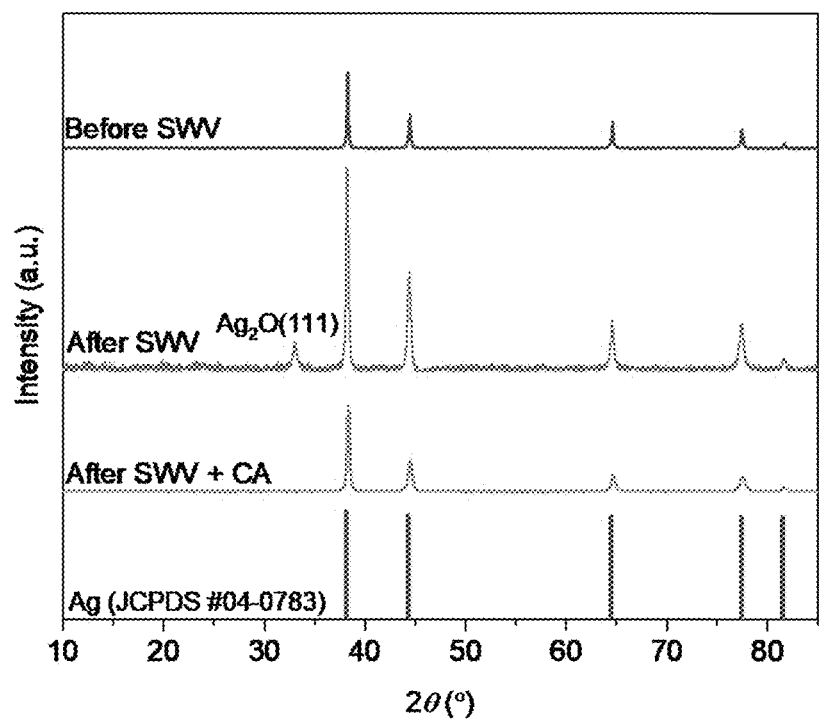
Figure 39C:
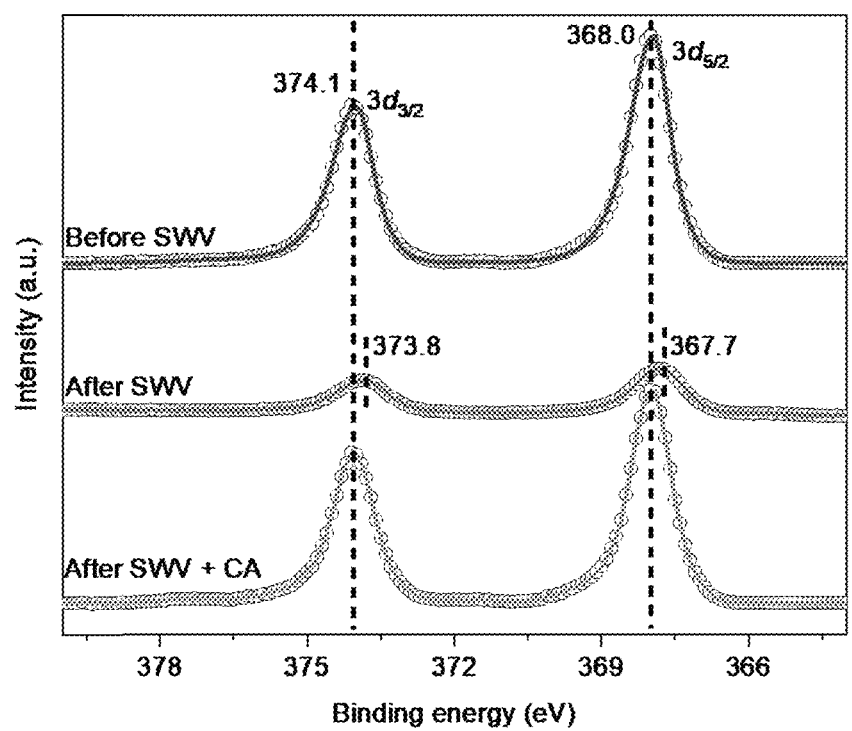

FIGS. 39A-C show the characterization of Ag foil during the preparation of OD-Ag. FIG. 39A shows photographs before and after. FIG. 39B shows the x-ray diffraction patterns. FIG. 39C shows the XPS Ag 3d spectra. The surface color of Ag foil was observed to periodically change between white and black during the SWV operation, while a yellow surface was finally obtained after the CA operation. These black and yellow layers were OD-$AgO_x$ and OD-Ag, respectively. XRD confirms the mono-constituent $Ag^0$ in the prepared OD-Ag (same as Ag foil), in comparison to OD-$AgO_x$, possessing the characteristic diffraction plane of $Ag_2O(111)$ at 32.8°. XPS exhibited a negative shift of 0.3 eV in the binding energy of both Ag 3d peaks ($3d_{3/2}$ and $3d_{5/2}$) for OD-$AgO_x$, as compared to Ag foil and OD-Ag. In addition, OD-$AgO_x$, has much lower Ag 3d peak intensity than Ag foil and OD-Ag, because of the higher coverage of oxygen atoms on surface.

Figure 40B:
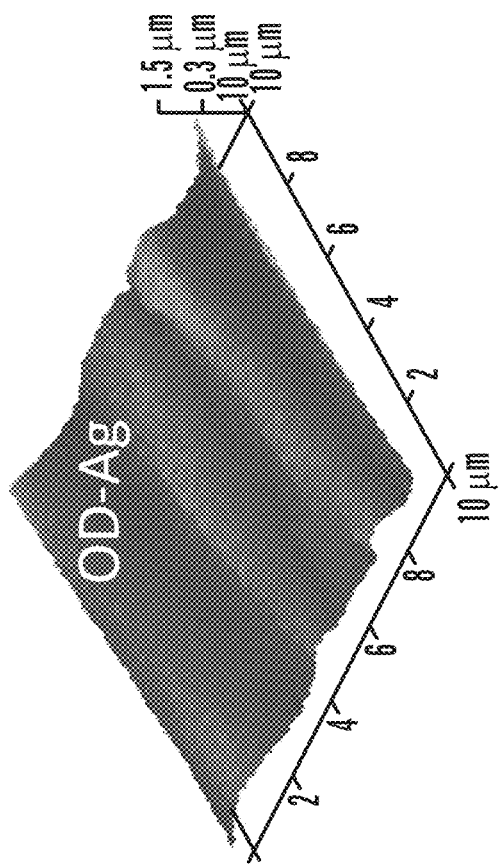
Figure 40A:
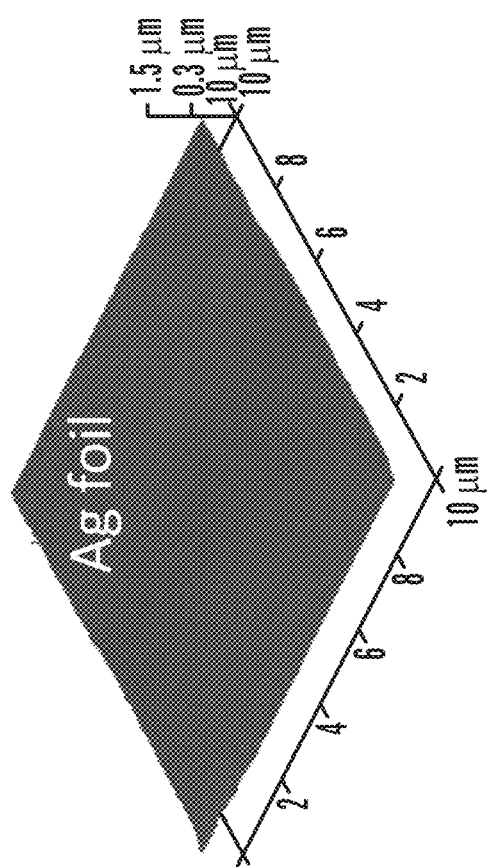
Figure 40D:
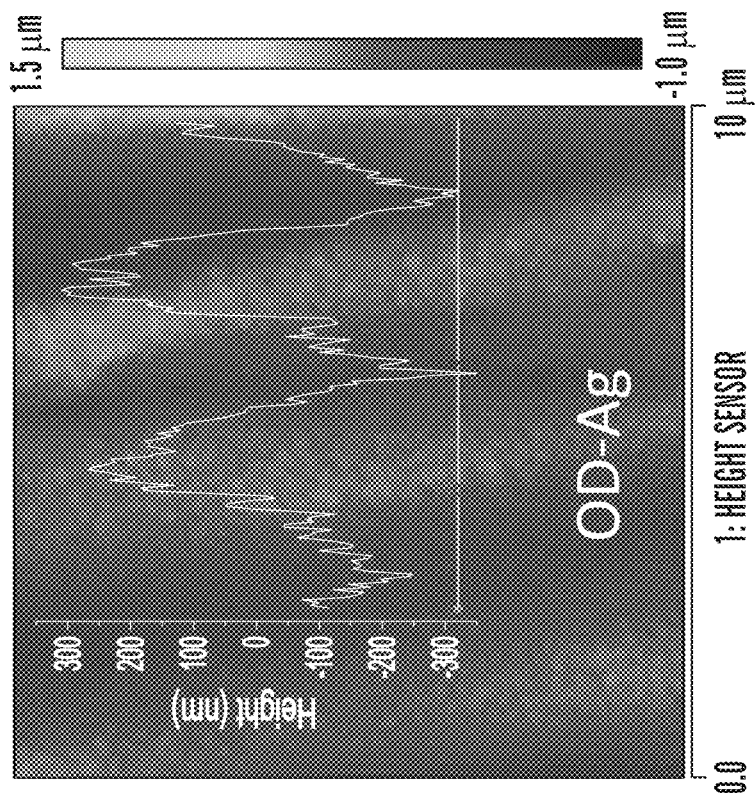
Figure 40C:
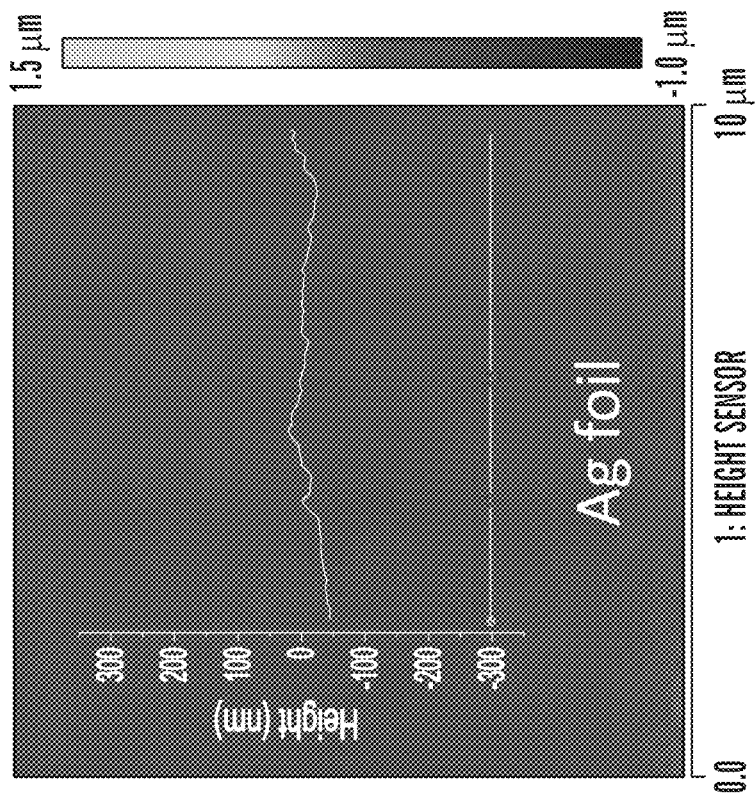
Figure 40F:
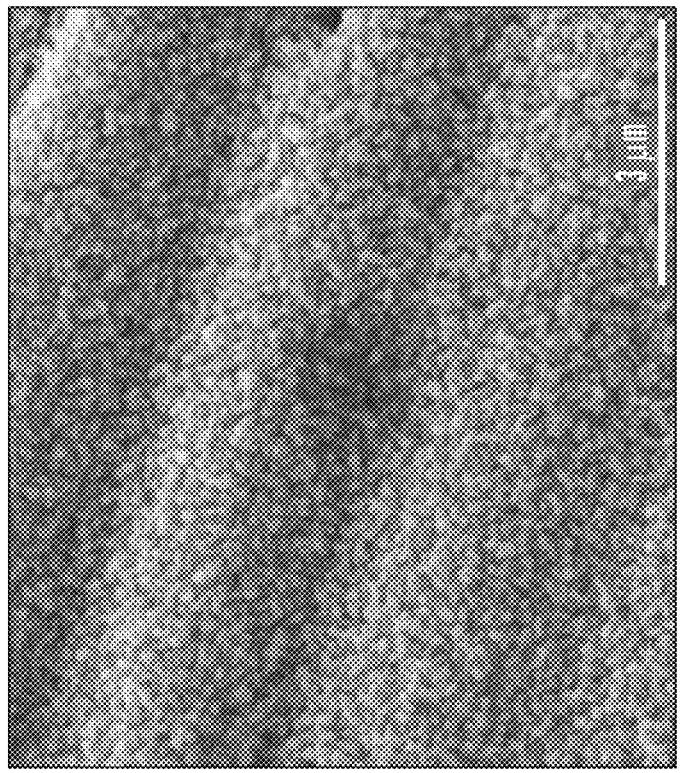
Figure 40E:
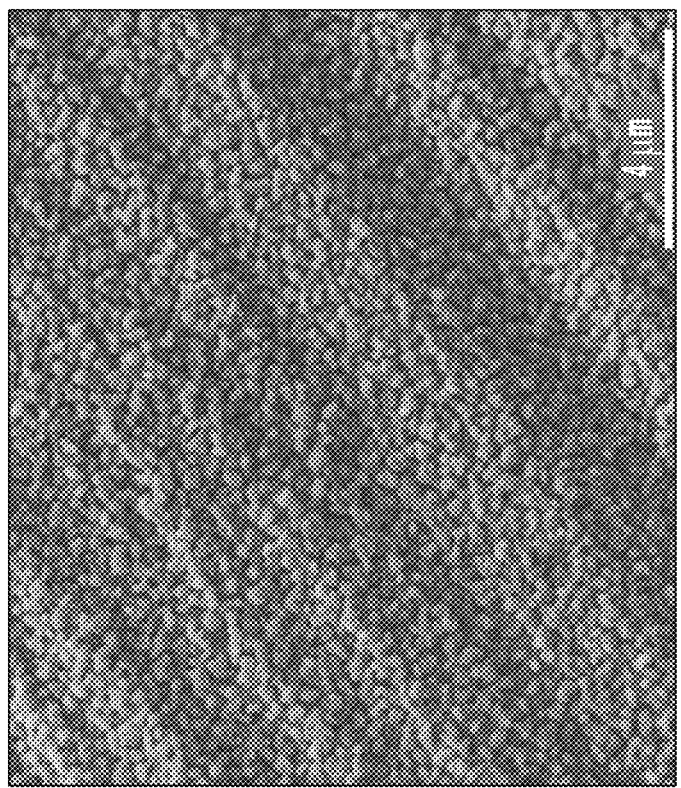

FIGS. 40A-F show the characterization of the surface morphology of OD-Ag. FIGS. 40A-B are atomic force microscopy (AFM) 3D images of Ag foil and OD-Ag, respectively. FIGS. 40C-D are AFM 2D images of Ag foil and OD-Ag, respectively, with a 7-μm section height profile graph inserted. FIGS. 40E-F are low-magnification SEM images of OD-Ag.

FIGS. 41A-B show the measurement of ECSA for the Ag electrodes. FIG. 41A is the cyclic voltammograms of Ag foil, OD-Ag, and Ag NPs/Ag in the electrolyte consisting of 5 mM $Pb(NO_3)_2$, 10 mM $HNO_3$, and 10 mM KCl. The scan rate was 10 mV $s^{-1}$. The peak for monolayer UPD of Pb was used for ECSA calculation, which corresponds to a charge of $1.67×10^{-3}$ $cm^2$ $μC^{-1}$ (Kim et al., "Achieving Selective and Efficient Electrocatalytic Activity for $CO_2$ Reduction Using Immobilized Silver Nanoparticles," J. Am. Chem. Soc. 137: 13844-13850 (2015), which is hereby incorporated by reference in its entirety). FIG. 41B is the summary of ECSA of the Ag electrodes.

Figure 42B:
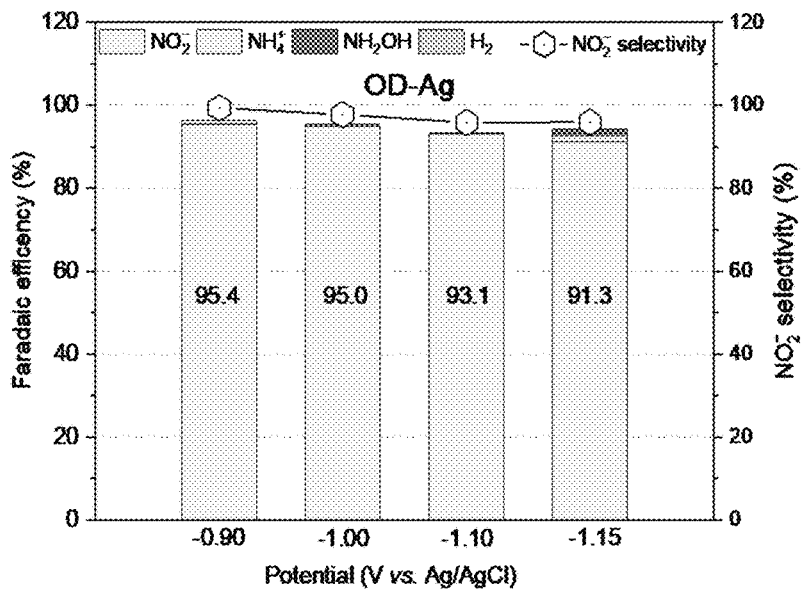

FIGS. 42A-B show the NO3RR in 0.1 M KCl (pH=4) with 0.1 M $NO_3^-$ for 1 h. The geometric area of all electrodes was 4 cm². FIG. 42A is a plot of the conversion of $NO_3^-$ on Ag foil and OD-Ag. FIG. 42B is a graph of the FE and $NO_2^-$ selectivity on OD-Ag.

Figure 43A:
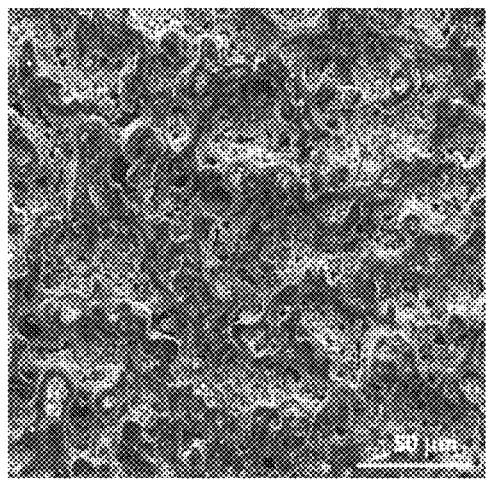
Figure 43B:
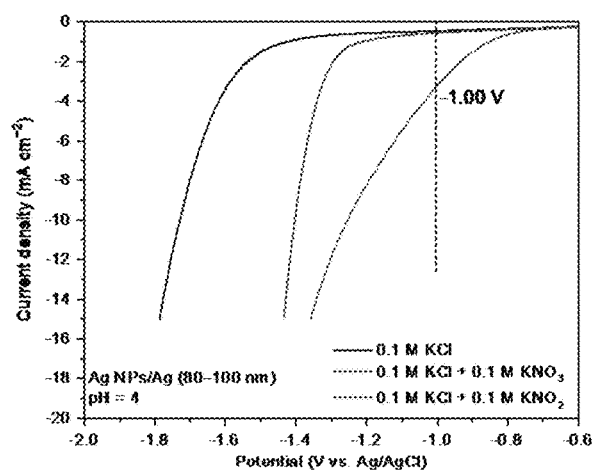

FIGS. 43A-E show the comparison of OD-Ag with a commercial nano-Ag catalyst (OD-Ag and Ag NPs/Ag (80-100 nm), loading of 1.5 $mg_{Ag}$ cm$^{-2}$). FIG. 43A is an SEM image of Ag NPs/Ag (with Nafion as the binder). FIGS. 43B-B show the linear sweep voltammograms in 0.1 M KCl, 0.1 M KCl with 0.1 M $NO_3^-$ and 0.1 M KCl with 0.1 M $NO_2^-$, respectively. FIG. 43D is a graph of $NO_3^-$ conversion in 0.1 M KCl (pH=4) with 0.1 M $NO_3^-$ at $-1.00$ $V_{Ag/AgCl}$ for 1 h. FIG. 43E is a table summarizing the area-specific NO3RR activities. Both OD-Ag and Ag NPs have a similar average size of Ag particles (~100 nm vs. 80-100 nm), very close ESCA (27.1 cm² vs. 25.9 cm², FIG. 41B), and with the same sized Ag foil (2 cm²) as electrode substrate.

FIG. 44 is a graph of the faradaic efficiency of NO3RR on OD-Ag with 0.05 M and 0.01 M $NO_3^-$. Left columns: 0.05 M $NO_3^-$. Right columns: 0.01 M $NO_3^-$. The electrolyte was 0.1 M KCl (pH=4). The applied charge was 29 C which is the theoretical charge required for NO3RR to $NO_2^-$ in the system. The geometric area of the electrode was 6 cm² for $-1.00$ and $-1.10$ $V_{Ag/AgCl}$ with 0.01 M $NO_3^-$, and 2 cm² for all other conditions. The error bars represent the standard deviation for at least three independent measurements.

Figure 45:
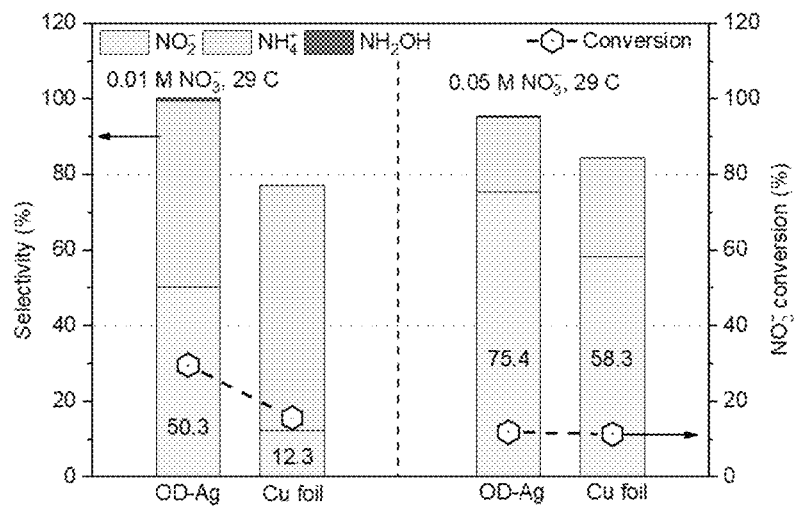

FIG. 45 is a graph of product selectivity and $NO_3^-$ conversion of NO3RR on OD-Ag and Cu foil at $-1.50$ $V_{Ag/AgCl}$. The electrolyte was 0.1 M KCl (pH=4) and the geometric area of the electrodes was 2 cm². The applied charge was 29 C.

Figure 46A:
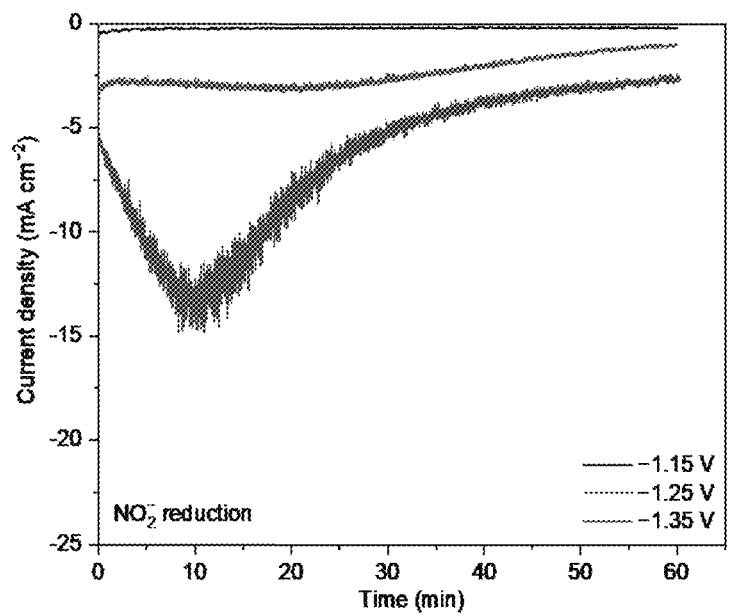

FIGS. 46A-B show the electrochemical reduction of 0.01 M $NO_2$ on OD-Ag. The electrolyte was 0.1 M KCl (pH=4) and the geometric area of OD-Ag was 2 cm². FIG. 46A is a plot of chronoamperometry (CA) profiles. FIG. 46B is a graph of product selectivity and $NO_2^-$ conversion for 1-hour electrolysis.

FIGS. 47A-D show the characterization of OD-Ag after NO3RR. Electrolysis was performed in 0.1 M KCl (pH=4) with 0.1 M $NO_3^-$ at $-1.00$ $V_{Ag/AgCl}$ for 1 h. FIG. 47A shows the XRD patterns. FIG. 47B shows the XPS Ag 3d spectra. FIG. 47C is an SEM image of OD-Ag. FIG. 47D is a table of the $Ag^+$ content in the electrolyte by ICP-OES after electrolysis.

Figure 48:
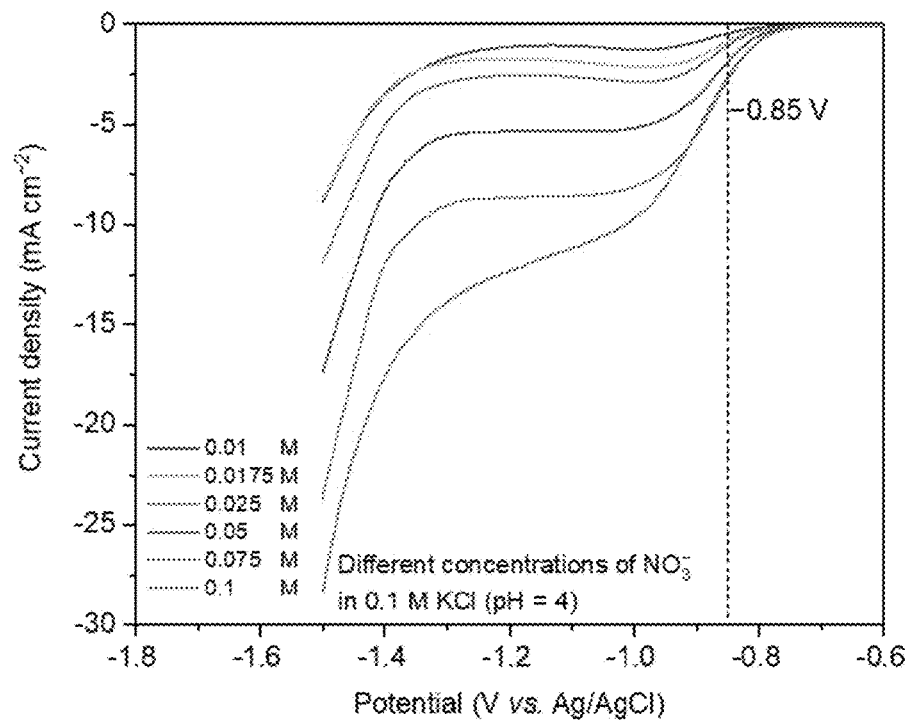

FIG. 48 shows the linear sweep voltammograms of OD-Ag in 0.1 M KCl (pH=4) with different concentrations of $NO_3^-$. The geometric area of the electrodes was 4 cm².

Figure 49A:
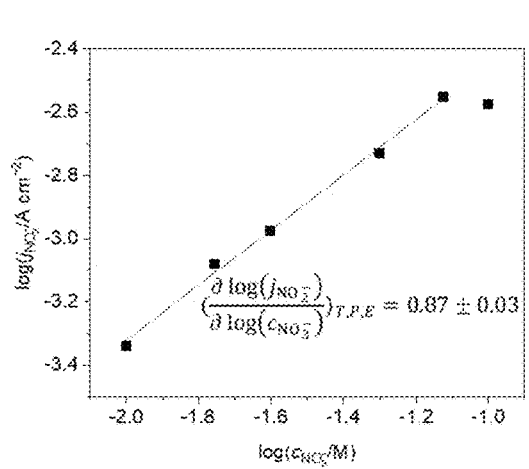
Figure 49B:
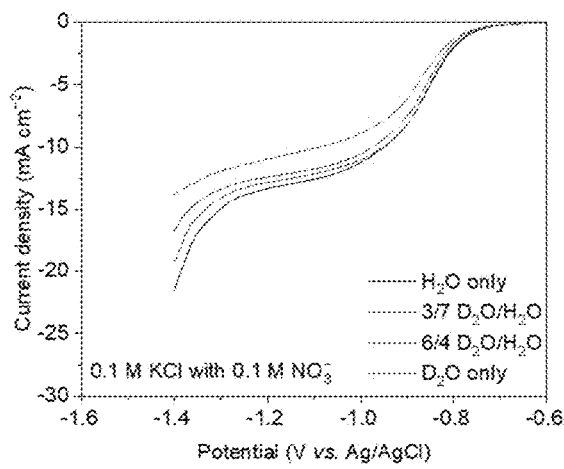
Figure 49C:
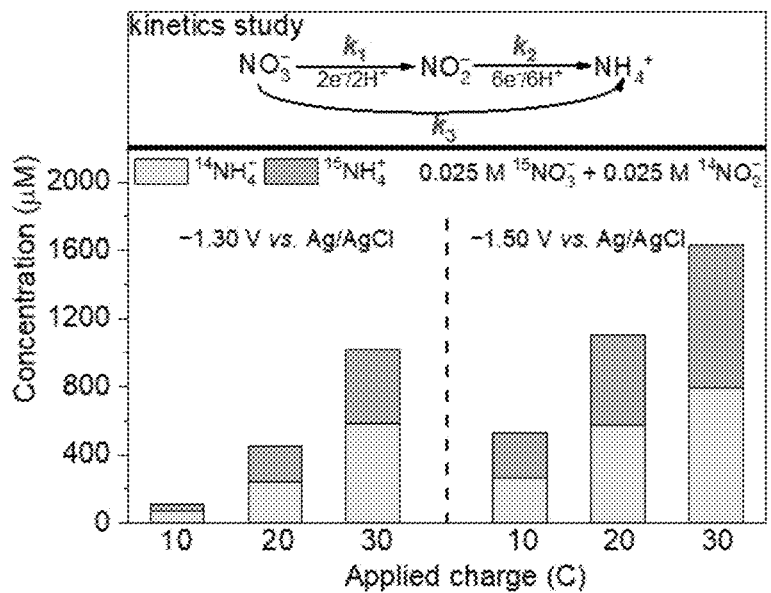

FIGS. 49A-C show the data from the kinetics and mechanism study of NO3RR on OD-Ag. FIG. 49A is a plot showing $NO_3^-$ order dependence fitting in 0.1 M KCl with different concentrations of $NO_3^-$ (pH=4) at $-0.85$ $V_{Ag/AgCl}$ with data obtained from LSV curves in FIG. 48. FIG. 49B shows the LSV of OD-Ag in 0.1 M KCl with 0.1 M $NO_3^-$ at different ratios of $D_2O/H_2O$ as the solvent. FIG. 49C is a graph of the concentration of produced $^{14}NH_4^+$ and $^{15}NH_4^+$ in 0.1 M KCl containing 0.025 M $^{15}NO_3^-$ and 0.025 M $^{14}NO_2^-$ at the potential of $-1.30$ and $-1.50$ $V_{Ag/AgCl}$, respectively, with different applied charges. The methods of isotopic products detection are detailed Example 3 (infra), and their calibrations are shown in FIGS. 36A-B.

Figure 50:
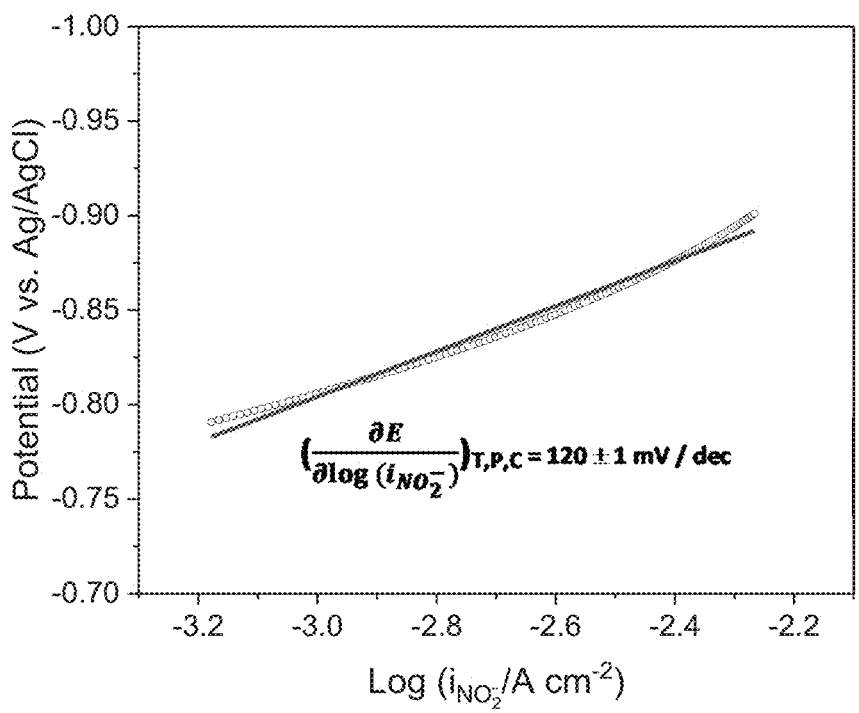

FIG. 50 is a $NO_2^-$ partial current density Tafel plot. The data was obtained from the Linear sweep voltammograms (LSV) with a potential range from $-0.79$ V (onset potential of NO3RR) to $-0.90$ $V_{Ag/AgCl}$. LSV was performed on OD-Ag in 0.1 M KCl (pH=4) with 0.1 M of $NO_3^-$ (FIG. 41C). The geometric area of the electrodes was 4 cm².

Figure 51A:
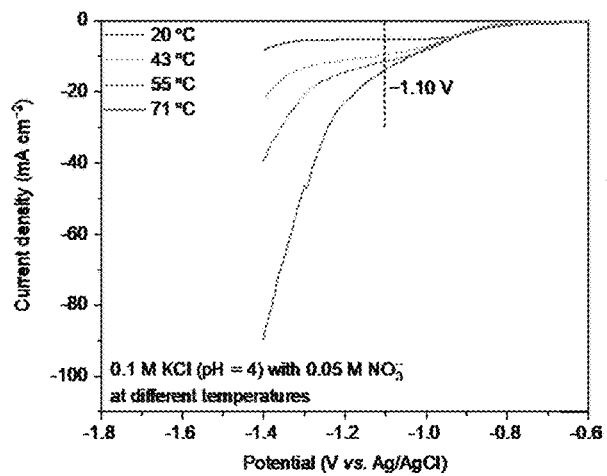
Figure 51B:
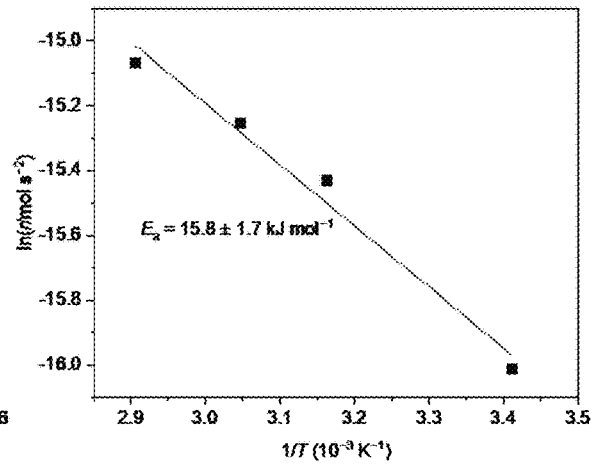

FIGS. 51A-B show the activation energy for NO3RR on OD-Ag at $-1.10$ $V_{Ag/AgCl}$. FIG. 51A shows the linear sweep voltammograms of OD-Ag in 0.1 M KCl (pH=4) with 0.05 M $NO_3^-$ at different temperatures. The geometric area of OD-Ag was 4 cm². FIG. 51B is an arrhenius plot for NO3RR on OD-Ag at $-1.10$ $V_{Ag/AgCl}$.

Figure 52A:
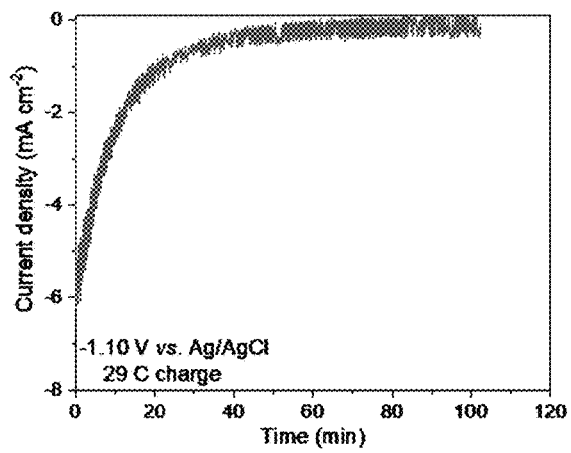
Figure 52B:
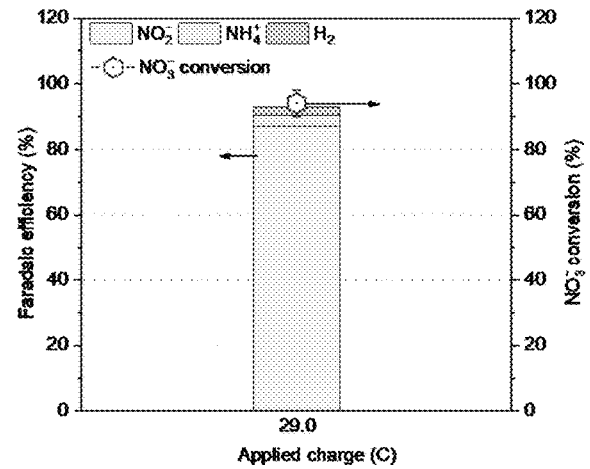

FIGS. 52A-B are graphs of NO3RR on OD-Ag with 29 C applied charge at $-1.10$ $V_{Ag/AgCl}$. The electrolyte was in 0.1 M KCl (pH=4) with 0.01 M $NO_3^-$ and the geometric area of OD-Ag was 6 cm². FIG. 52A is a plot of the current density-time profile with applying a theoretical charge of 29 C for complete convert 0.01 M $NO_3^-$ to $NO_2^-$. FIG. 52B is a graph of faradaic efficiency and $NO_3^-$ conversion. The error bars represent the standard deviations of at least three independent measurements.

Figure 53A:
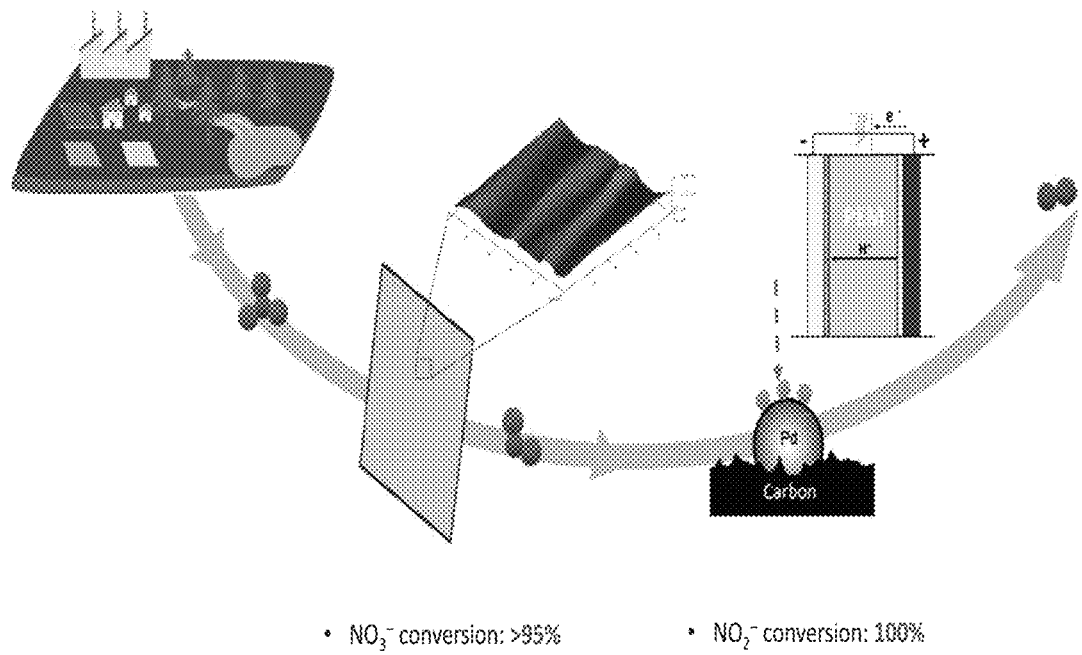
Figure 53B:
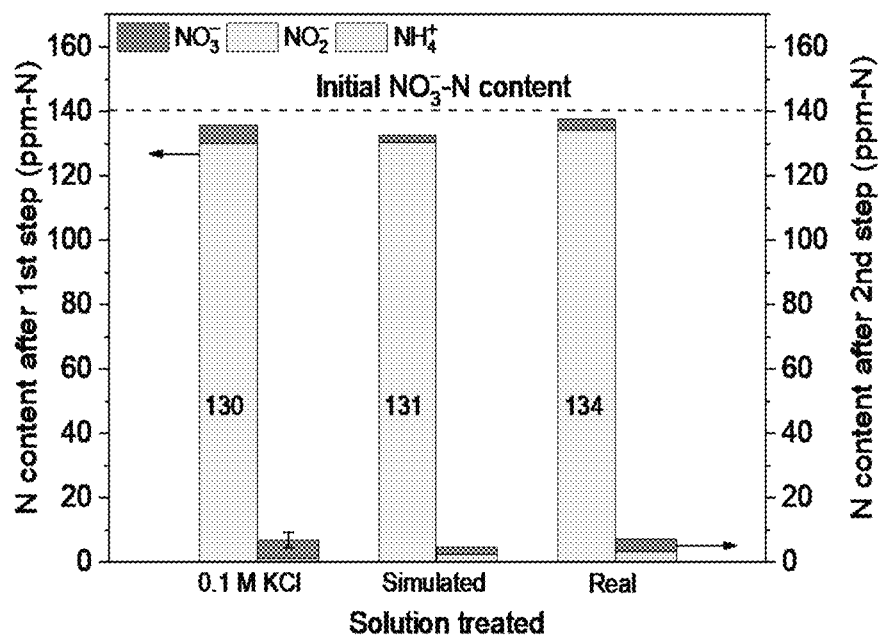

FIGS. 53A-B show nitrate removal by the combined electrocatalytic-catalytic process. FIG. 53A is a schematic illustration of the process. The corresponding reaction equations and conversions were inserted in the graph. FIG. 53B is a graph of the compositions of N-containing compounds in the wastewater after the first (electrocatalytic) step and second (catalytic) step of the treatment. Three solution media were tested: 0.1 M KCl, simulated waste stream from ion-exchange columns, and real-world agricultural wastewater (collected from Des Moines Water Works, Iowa), all of which were enriched to contain 0.01 M $NO_3^-$ (i.e., 140 ppm-N). The detailed experimental results and other test conditions are summarized in Table 16.

Figure 54:
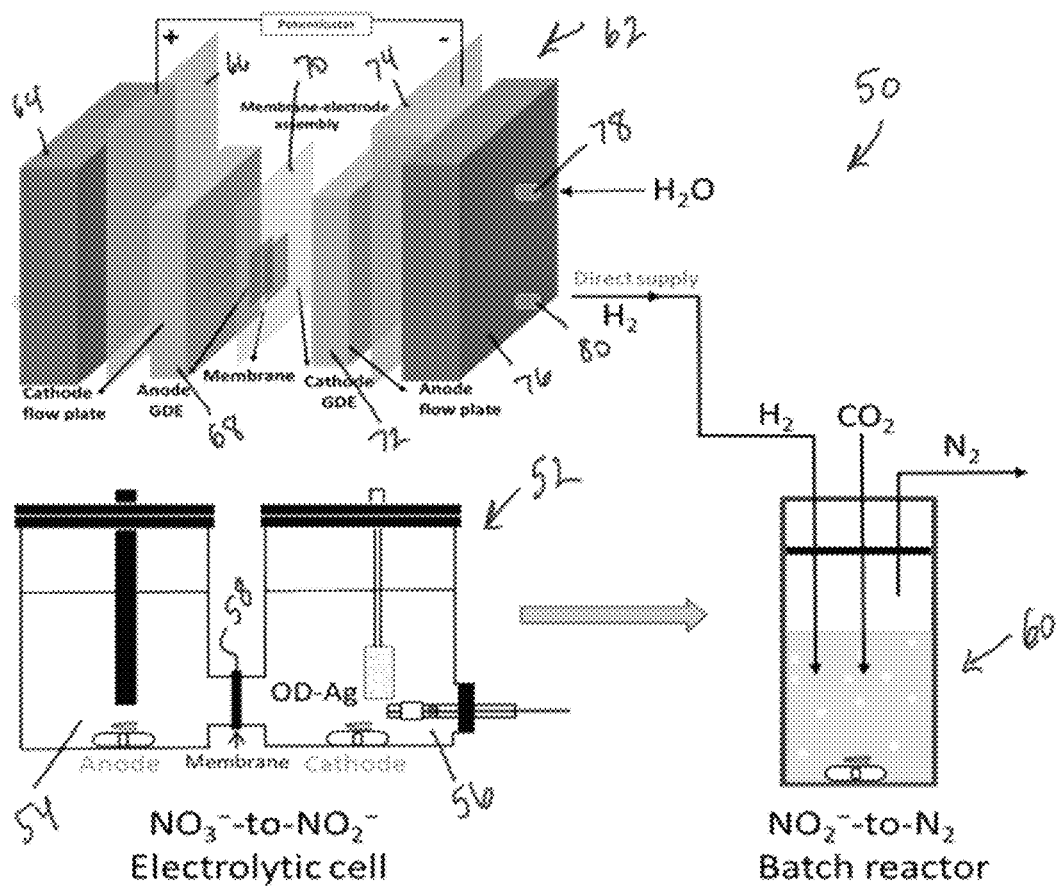

FIG. 54 is a diagram of one embodiment of a set-up of an electrocatalytic-catalytic combined process. The $H_2$ feed was generated from a PEM water electrolyzer.

Figure 55A:
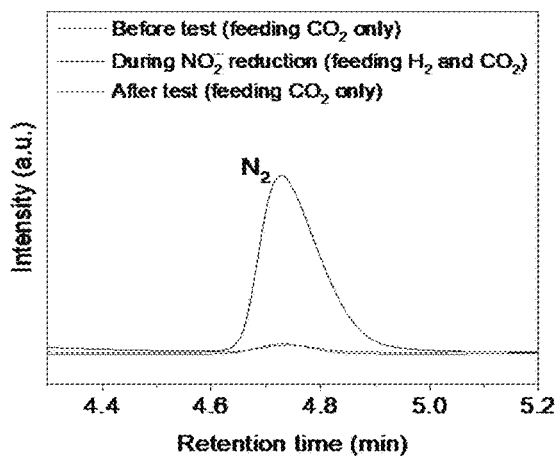
Figure 55B:
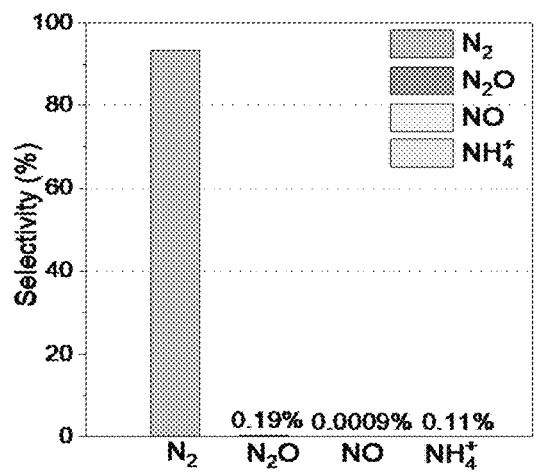

FIGS. 55A-B show the quantification of products from $NO_2^-$ reduction. FIG. 55A is the on-line GC chromatogram used to detect products from the catalytic reduction of 0.5 M $NO_2^-$ during different experimental periods. The retention time of $N_2$ was roughly 4.7 min. FIG. 55B is a graph of product selectivity of catalytic reduction of 0.5 M $NO_2^-$ for 2 h. The detailed quantification method was shown in the quantification of $H_2$ and $N_2$, quantification of $NO_2$ and NO, and quantification of $N_2O$ sections. The reaction conditions were shown in the catalytic reduction of $NO_2$ section, except for the outlet was connected to the On-line GC.

Figure 56A:
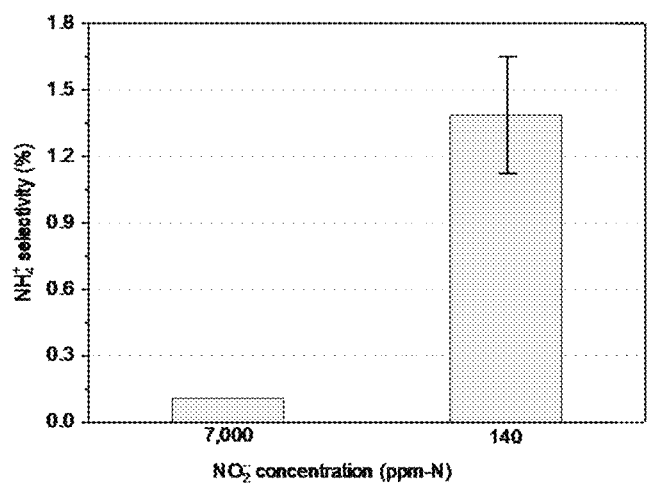
Figure 56B:
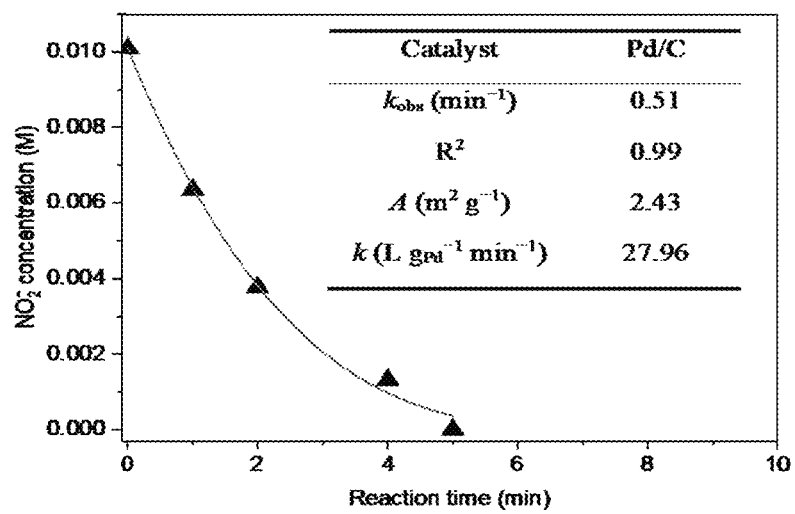
Figure 56C:
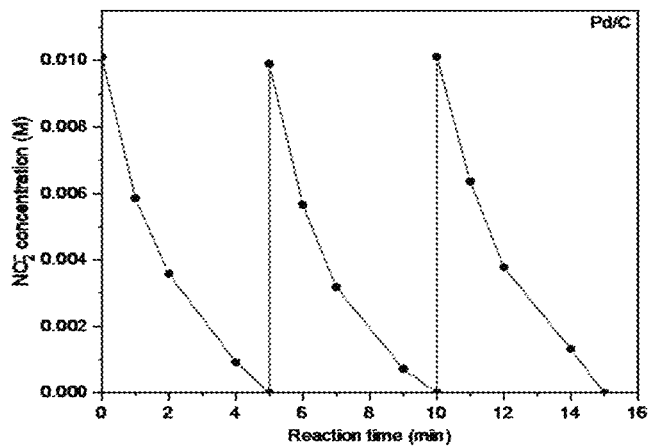

FIGS. 56A-C are graphs showing the results of catalytic reduction of $NO_2^-$ on Pd/C. The reaction medium was 0.1 M KCl with 0.1 M KOH saturated by $CO_2$. The catalyst loading was 50 mg. FIG. 56A is a graph showing the selectivity of $NH_4^+$ after full conversion of 7,000 and 140 ppm of $NO_2^-$—N. The error bar represents the standard deviation of three independent measurements. FIG. 56B is a plot of the $NO_2^-$ concentration profile during its catalytic reduction. The fitted curve assumes pseudo-first-order dependence on $NO_2^-$ concentration. The observed rate constant ($k_{obs}$), the active surface area of Pd (A), and surface Pd-normalized rate constant (k) are shown in the inset table. FIG. 56C is a plot of the $NO_2^-$ concentration profile for three consecutive measurements.

Figure 57A:
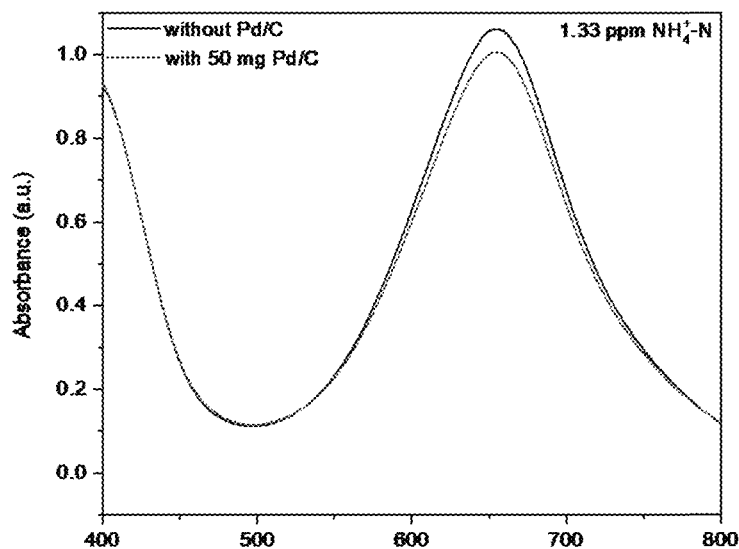
Figure 57B:
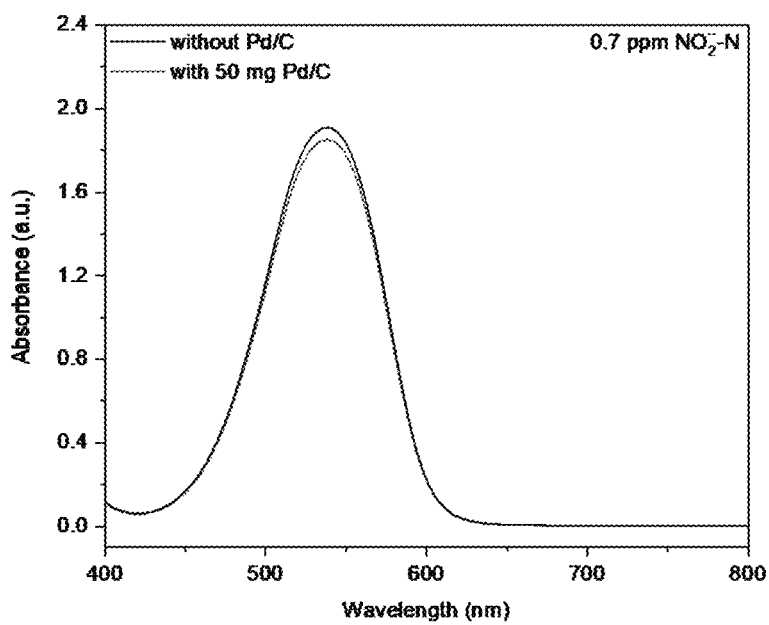

FIGS. 57A-B are absorbance plots of the control experiments for catalytic reduction of $NO_2^-$. The conditions for control experiments were the same as catalytic reduction tests, except that no $H_2$ was fed. FIG. 57A is the UV-Vis spectra for 1.33 ppm of $NH_4^+$—N in $CO_2$-saturated electrolyte stained with indophenol blue indicator, with or without adding 50 mg of Pd/C. FIG. 57B is the UV-Vis spectra for 0.7 ppm of $NO_2^-$—N in $CO_2$-saturated electrolyte stained with Griess reagent, with or without adding 50 mg of Pd/C. The adsorption of $NH_4^+$ and $NO_2^-$ contributed to a decrease of 5.2% and 3.0% in the measured concentrations, respectively.

Figure 58:
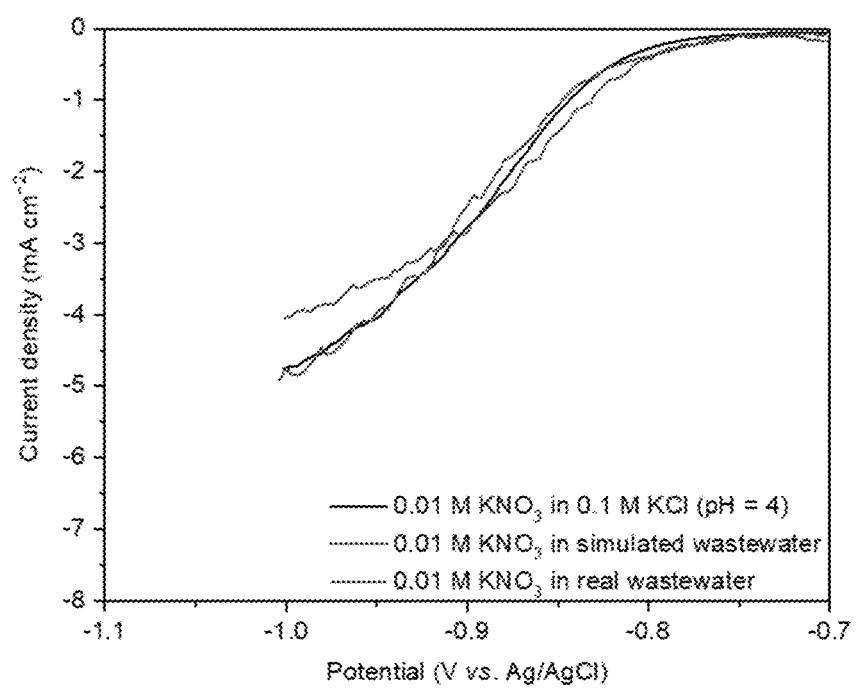

FIG. 58 shows the linear sweep voltammograms of NO3RR in different reaction media. The electrolytes contain 0.01 M $NO_3^-$ (140 ppm-N), and the geometric area of OD-Ag was 6 cm$^2$.

DETAILED DESCRIPTION

The present application relates to a system and method for removing nitrate from water.

One aspect of the present application relates to a system for removal of nitrate from water. The system includes a first reactor comprising a porous oxide-derived silver electrode (OD-Ag) for electrocatalytic reduction of nitrate ($NO_3^-$) to nitrite ($NO_2^-$) and a second reactor comprising a Pd-based catalyst for catalytic reduction of nitrite ($NO_2^-$).

According to some embodiments, the first reactor comprises an H-type cell reactor structure.

According to some embodiments, the first reactor comprises a catholyte portion and an anolyte portion, where the catholyte portion and the anolyte portion are connected by a membrane.

One embodiment of a system of the present application is illustrated in FIG. 11. According to this embodiment, system 10 is set up for the electrocatalytic reduction of $NO_3^-$, and contains H-type cell 12 (comprising cathode or catholyte portion 14, anode or anolyte portion 16, where cathode portion 14 and anode portion 16 are separated by membrane 18). System 10 also includes $NH_3$ trapping solution 20, on-line GC 22 for $H_2$ and $N_2$ quantification, and off-line quantification of $NO_3^-$, $NO_2^-$ (via device 24) and $NH_4^+$, $NH_2OH$, $NO_2$, NO, and $N_2O$ (via device 26). FIG. 12A is a photo image corresponding to the schematic setup shown in FIG. 11. FIG. 12B is a photo image of a setup of catalytic reduction of $NO_2^-$ on Pd-based catalysts in a batch reactor, in which $CO_2$ and $H_2$ were fed into the reactor.

FIG. 53A is a schematic illustration of one embodiment of an electrocatalytic-catalytic combined process for $NO_3^-$-containing wastewater treatment by using a PEM water electrolyzer to generate $H_2$. As illustrated in FIG. 54, system 50 performs electrocatalytic $NO_3^-$-to-$NO_2^-$ conversion in H-type cell 52 (containing anode portion 54 and cathode portion 56, where anode portion 54 is separated from cathode portion 56 by membrane 58). Catalytic $NO_2^-$-to-$N_2$ conversion is conducted in batch reactor 60, and $H_2$ is fed to batch reactor 60 from PEM-based water electrolyzer 62. Electrolyzer 62 contains cathode flow plate 64 (e.g., Pt/C), anode flow plate 76 (e.g., $IrO_2$), and membrane 70 (e.g., a Nafion (H+) membrane). Electrolyzer 62 also includes positive potentiostat 66 positioned between cathode flow plate 64 and anode gas diffusion electrodes ("GDE") 68. Electrolyer 62 also includes negative potentiostat 74 positioned between anode flow plate 76 and cathode GDE 72. Water enters electrolyzer 62 through port 78, and $H_2$ exits electrolyzer 62 through port 80.

The membrane separating the anode and the cathode should be constructed from a material that is chemically resistant to the reactants and products in the NO3RR reactions. The membrane may be, for example, an ion exchange membrane, such as a Proton Exchange Membrane, a solid electrolyte or an electrolyte gel. Proton exchange membranes are well known in the art. Exemplary proton exchange membranes that may be useful in the present application are disclosed in U.S. Pat. No. 7,183,017 to Taft et al.; U.S. Pat. No. 6,030,718 to Fuglevand et al.; U.S. Pat. No. 8,552,075 to Tsai et al.; U.S. Pat. No. 9,728,800 to Raiford et al.; and U.S. Pat. No. 7,993,791 to Zhamu et al., which are hereby incorporated by reference in their entirety.

According to some embodiments, the pH in the first reactor is at least 4. According to other embodiments, the pH in the first reactor is between about 4 and 13.

According to some embodiments, the system further comprises a sealed trap acid solution to absorb $NH_3$. Accumulated $NH_3$ in an alkaline reaction system will volatilize as a vapor $NH_3$, so a KCl trap solution with a pH of about 3 may be used to trap the evolved $NH_3$. $NH_3$ has a high solubility in acid conditions and existed in the form of $NH_4^+$. Other examples of possible trap solutions include, but are not limited to, other aqueous acid solutions including phosphoric acid, hydrochloric acid, and sulfuric acid.

According to some embodiments, the system further comprises an online gas chromatography for $H_2$ quantification. The side product $H_2$ produced from hydrogen evolution reaction in the electrocatalytic reduction of $NO_3^-$ system can be quantified by online gas chromatography (e.g., using SRI Instruments, 8610C, Multiple Gas #3), which may be equipped with HayeSep D and MolSieve 5 Å columns. Ultra-high-purity argon may be fed into the electrochemical reactor to carry the produced $H_2$ to online gas chromatography for its detection and quantification. A thermal conductivity detector may be used to detect $H_2$. Calibration curves for $H_2$ (e.g., 10-10,000 ppm, Cal Gas Direct) may be established by analyzing the calibration gases. As will be apparent to a person of skill in the art, any suitable gas chromatograph instrument and inert gas may be used.

According to some embodiments, the system of the present application is a water treatment device. For example, the water treatment device can be a flow through device where contaminated water enters the device via an inlet and is treated so that clean or purified water exits the device via an outlet. Purified water can then be collected in a suitable receptacle or reservoir.

According to some embodiments, the system of the present application could directly use the side product of $H_2$ from the $NO_3^-$ reduction system (at a large current density) for the reduction of nitrite in a heterogeneous catalytic rector/or for hydrogenation of biomass-derived compounds (e.g., and without limitation, furfural). Such a system could be treated as an on-site $H_2$ production from renewable electricity for wastewater treatment or chemical production.

Another aspect of the present application relates to a method of removing nitrate from water. This method involves providing a system comprising a first reactor comprising a porous oxide-derived silver electrode (OD-Ag) for electrocatalytic reduction of nitrate ($NO_3^-$) to nitrite ($NO_2^-$) and a second reactor comprising a Pd-based catalyst for catalytic reduction of nitrite ($NO_2^-$). Water containing nitrate ($NO_3^-$) is introduced into the first reactor to cause catalytic reduction of the nitrate into nitrite ($NO_2^-$) by the porous oxide-derived silver electrode (OD-Ag) and water from the first reactor is introduced into the second reactor to cause reduction of nitrite ($NO_2^-$) by the Pd-based catalyst, thereby removing nitrate from the drinking water.

Suitable water sources for removing nitrate include, for example and without limitation, one or more of drinking water, agricultural river water, or water downstream from an anion exchange column in a water treatment plant.

According to some embodiments, $H_2$ generated from a cathode in the first reactor is used to reduce nitrite in the second reactor. This is possible because clean $H_2$ is generated from the first reactor and is therefore useful in the reaction occurring in the second reactor.

According to some embodiments, the method achieves a nitrate ($NO_3^-$) concentration of about 1.6-2.5 ppm (as Nitrogen).

According to some embodiments, the method achieves an $NH_3$ concentration of about 1.1-2.5 ppm $NH_3$ (as Nitrogen).

According to some embodiments, the method achieves an undetectable nitrite ($NO_2^-$) concentration.

According to some embodiments, after a combined process for treatment of $NO_3^-$—N containing wastewater, at least about 95+% of $NO_3^-$ is converted with <about 3.0, 3.1, 3.2, 3.3, 3.4, 3.5, 3.6, 3.7, 3.8, 3.9, or 4.0 ppm of $NH_4^+$—N and <about 5.0, 5.1, 5.2, 5.3, 5.4, 5.5, 5.6, 5.7, 5.8, 5.9, 6.0, 6.1, 6.2, 6.3, 6.3, 6.5, 6.6, 6.7, or 6.8 ppm of $NO_3^-$—N remaining, and no or essentially no $NO_2^-$—N detection in any of the treated water.

According to some embodiments, molecular nitrogen gas ($N_2$) is a product from nitrite reduction in the second reactor. According to these embodiments, the molecular nitrogen gas ($N_2$) may be greater than 93%, 94%, 95%, 96%, 97%, 98%, 99%, or 100% of the product from nitrite reduction in the second reactor.

The following examples are provided to illustrate embodiments of the present application but are by no means intended to limit its scope.

EXAMPLES

Example 1—Combining Electrocatalysis and Catalysis: Application to Nitrate Reduction for Water Treatment Experimental Materials Ag foil (0.5 mm thick, 99.9985%), Pt foil (0.025 mm thick, 99%), and hydroxylamine hydrochloride (99%), were purchased from Alfa Aesar. Potassium nitrate (99.7%), potassium chloride (100%), potassium dibasic phosphate (≥98%), potassium monobasic phosphate (≥99%), sodium carbonate (100%), nitric acid, hydrochloride acid, phosphoric acid, and methanol (HPLC grade) were bought from Fisher Scientific. Sodium salicylate (≥99.5%), sodium hydroxide (≥97%), sodium nitroferricyanide dihydrate (≥99), sodium hypochlorite solution (NaOCl, available chlorine 4.00-4.99%), N-1-napthylethylenediamine dihydrochloride (NED, ≥97%), Sulfanilamide (≥99), 5% palladium on alumina, and 5% palladium on carbon were all purchased from Sigma-Aldrich. 5% palladium on silica powder were ordered from STREM Chemical, Inc. Potassium nitrite (97%) and n-Octylamine (≥99%) were bought from Acros Organic. 8-quinolinol was purchased from TCI American. Ammonia standard solution ($NH_3$—N, 100 mg L−1) was purchased from Hach. Plain carbon cloth, Vulcan XC-72R, and Nafion 115 membrane were purchased from Fuel Cell Store. 20% Ag on Vulcan was ordered from Premetek Co. Different concentration $H_2$ calibration gases were purchased from Cal Gas Direct Incorporation. Deionized water (18.2 MΩ·cm) obtained from a Barnstead E-Pure™ purification system was used for all processes.

Fabrication of OD-Ag

The OD-Ag fabrication method was based on the literature (Ma et al., "Selective and Efficient Reduction of Carbon Dioxide to Carbon Monoxide on Oxide-Derived Nanostructured Silver Electrocatalysts," *Angew Chem. Int. Ed. Engl.* 55:9748-9752 (2016), which is hereby incorporated by reference in its entirety). A piece of polycrystalline Ag foil with a total area of 4 $cm^2$ was immersed in 0.2 M NaOH solution in a one-compartment cell. Ag/AgCl served as the reference electrode and Pt foil as the counter electrode. A typical cyclic voltammetry (CV) was scanned from 0 to 1.2V (vs Ag/AgCl) with a rate of 20 mV/s on Ag foil. An asymmetric 500 HZ square-wave pulse potential ranging from 0 to 1V (vs Ag/AgCl) was applied on the Ag foil for 3 hours with both positive and negative scans. After 3 hours pulse potential treatment, a constant voltage (−1.3V vs Ag/AgCl) was applied for 10 mins to reduce the oxidized porous Ag to OD-Ag (referred to oxide-derived silver foil). The negative potential treatment for oxidized porous Ag can avoid the reduction of porous Ag oxide consumption charges interferences nitrate electroreduction.

Fabrication of Ag/C Nanoparticles

The Ag/C catalyst ink was prepared by dispersing Ag/C (20 wt. %) powder and Nafion solution in an isopropanol solution 10 mg-catalyst/mL and 20 wt % Nafion, and ultrasonicating it to make a uniform ink. The catalyst ink was then sprayed onto $HNO_3$ pretreated carbon clothes by a spray gun and the loading was controlled at 0.5 mg-Ag/$cm^2$.

ECSA Test for Ag-Based Catalyst

The electrochemical active surface area (ECSA) of Ag-based catalysts (OD-Ag, Ag foil, and Ag/C) was measured using the method of underpotential deposition (UPD) of Pb (Kim et al., "Achieving Selective and Efficient Electrocatalytic Activity for CO2 Reduction Using Immobilized Silver Nanoparticles," *J. Am. Chem. Soc.* 137:13844-13850 (2015), which is hereby incorporated by reference in its entirety). CV was conducted in a one-compartment cell containing 5 mM Pb($NO_3$)$_2$, 10 mM $HNO_3$, and 10 mM KCl, with the potential range between −0.1V to −0.48V vs (Ag/AgCl) and a scan rate of 10 my/s. Then, the desorption peak of UPD was integrated to calculate the peak area. The ECSA of Ag foil was chosen as the baseline, and its roughness factor is 1. The ECSA roughness factor of OD-Ag and Ag/C can be calculated by Eq. 1.

$$\text{ECSA roughness factor} = \text{OD-Ag UPD area/Ag foil UPD area} \qquad (\text{Eq. 1})$$

Characterizations

X-ray diffraction (XRD) patterns were obtained by a Siemens D500 diffractometer operated with a Cu Kα source (λ=1.5418 Å) at 45 kV and 30 mA, and equipped with a diffracted beam monochromator (carbon).

XPS was performed on a Kratos Amicus/ESCA 3400 X-ray Photoelectron Spectrometer with Mg Kα X-ray (1253.7 eV photon energy). All spectra were calibrated with the C 1s peak a 284.8 eV.

Scanning electron microscopy (SEM) was performed on a FEI Quanta 250 field-emission scanning electron microscope.

The Inductively coupled plasma-optical emission spectroscopy (ICP-OES, Perkin Elmer Optima 8000 instrument) was utilized to determine the $Ag^+$ concentration. 1000 ppm $Ag^+$ in 5% (v/v) nitric acid standard was prepared and diluted by 5% nitric acid to get the calibration curve with different $Ag^+$ concentration between 0.6-100 ppb. Samples were also diluted and prepared to get a 5% nitric acid solution for tests.

$H_2$ Chemisorption

The Pd active surface areas were measured by a dynamic chemisorption technique with $H_2$ as the probe molecule with a Micromeritics ASAP 2920 analyzer. The catalyst was first reduced by 50 ml/min 10% $H_2$—Ar at 200° C. for 1 h. Then 20 ml/min Ar was introduced to purge the sample at 200° C. for 1 h before the catalyst was cooled to room temperature. The catalyst was heated at a rate of 10° C./min to 35° C. After the baseline was stable on the thermal conductivity detector, a series of pulse streams of 10% $H_2$—Ar was injected onto the catalyst until the injected gas volume emerged from the sample tube unchanged and the detected peaks were constant in area. The stoichiometry factor for $H_2$ adsorption was assumed to be 2.

Ammonia Temperature Programmed Desorption (TPD)

The number and strength of the acid sites were determined by $NH_3$-TPD with a Micromeritics ASAP 2920 analyzer. The catalysts were first reduced by 50 ml/min 10% $H_2$—Ar at 200° C. for 1 h. Then, 20 ml/min Ar was introduced to purge the sample while reducing the sample temperature to 50° C. After the baseline was stable on the thermal conductivity detector, 10% $NH_3$—Ar was introduced to the sample for adsorption. After 1 hour, 10% $NH_3$—Ar was switched to UHP Ar to sweep out the physisorbed ammonia from the catalyst surfaces. Under 20 ml/min Ar flow, the catalysts were heated to 750° C. with a temperature ramp of 10° C./min and were held at 750° C. for 30 minutes. The quantity of desorbed ammonia was quantified by integrating the area under each peak. However, the TCD signal of ammonia was not characterized, so the values from each catalyst were relative but not absolute.

Electrocatalytic Reduction Measurements

All electrochemical tests were conducted in the three-electrode configuration by a BioLogic SP-300 electrochemical workstation. The reference electrode used was an Ag/AgCl (Pine Research Instrumentation). Resistance between the working electrode and reference electrode was determined by potentiostatic electrochemical impedance spectroscopy and compensated 85% by the workstation. All current density was normalized based on geometric surface area. Potentials (E) were reported versus the reversible hydrogen electrode (RHE), as calculated by Eq. 2.

$$E(\text{vs. RHE}) = E(\text{vs. Ag/AgCl}) + 0.197 \text{ V} + 0.059 \text{ V} \times pH \quad \text{(Eq. 2)}$$

Cyclic voltammetry (CV), chronoamperometry (CA), and chronopotentiometry (CP) tests were all conducted in the H-type cell along with Ultra-high-purity Argon purged to the cathode chamber during test to remove oxygen. The electrolyte volume in both chambers were 15 ml and the chambers were separated by a $K^+$-type Nafion 115 membrane. The reference electrode was Ag/AgCl, and the counter electrode was a graphite rod. CV tests were conducted at 20 mV/s scan rate without stirring. CA tests were performed at various voltages and reaction time. CP tests were performed at constant current (−25 mA) for 1-hour reaction. The cathode electrolyte was stirred by a PTFE-coated magnetic bar (size: 1×5/16") at 350 rpm. The H-type cell was first connected to a sealed 25 ml pH=3 KCl trap solution to adsorb exceeded $NH_3$, and then connected to an on-line GC to quantify $H_2$. The reactor configuration is shown in FIG. 11.

Nitrate conversion (C) and products selectivity ($S_i$) can be calculated by Eq. 3 and Eq. 4.

$$C = (n_0 - n/n_0) \times 100\% \quad C = \frac{n_0 - n}{n_0} \times 100\% \quad \text{(Eq. 3)}$$

$$S_i = n_i/n_0 - n \times 100\% \quad \text{(Eq. 4)}$$

where "$_0$ is initial moles of nitrate;" is the remaining moles of nitrate, "$_i$ is the moles of products ($_i$=$NH_3$, $NO_2^-$, or $NH_2OH$).

The Faraday efficiency can be calculated by Eq. 5.

$$FE_i = n_i z_i F/Q \times 100\% \quad FE_i = \frac{n_i z_i F}{Q} \times 100\% \quad \text{(Eq. 5)}$$

where $z_i$ is the number of electrons needed for one molecule product ($z$=2 for $NO_2^-$, $z$=6 for $NH_2OH$, and $z$=8 for $NH_3$); F is the Faradic constant (96,485 C $mol^{-1}$), Q is the total charge passed during the long time CA or CP test.

Catalytic Reduction Measurements

Catalytic reduction was conducted in the same H-type cell reactor used for electrocatalytic reduction measurements. The digital images of the reactor for electrocatalytic and catalytic reduction shown in FIGS. 12A-B. 15 ml sample solution was purged with $CO_2$ (purge rate 50 ml/min) for 15 mins to obtain buffer condition. Then, $H_2$ and $CO_2$ were purged with two gas dispersion tubes (ACE GLASS, 7 mm (OD)×210 mm (length)), and the outlet gas fed into a pH=3 trap solution. Some contents of Pd-based catalysts were dispersed in the solution with a stirring rate of 800 rpm. Sample solutions can be extracted from the small hole in the side wall of the H-cell reactor at different reaction time, and then diluted for analysis of the product concentration.

The observed reaction rate constant $k_{meas}$ (unit: L $g_{pd}^{-1}$ $min^{-1}$) was calculated assuming first-order dependence on nitrate concentration ($H_2$ was in excess) by Eq. 6.

$$d(NO_2^-)/dt = k\,C(NO_2^-) \frac{d(NO_2^-) =}{dt} = -k\,C(NO_2^-) \quad \text{(Eq. 6)}$$

where $C(NO^-_2)$ is the concentration of nitrate (unit: mg $L^{-1}$) and t is the reaction time (unit: min).

Products Quantifications (1) High Performance Liquid Chromatography (HPLC) for nitrate and nitrite quantification: The samples containing nitrate and nitrite were collected and diluted with deionized water, and then filtered through a 0.4 micron filter before analysis by HPLC (Agilent Technologies 1260) which was equipped with a variable wavelength detector (VWD, G1314B). The quantification method was based on the literature (Chou et al., "A High Performance Liquid Chromatography Method for Determining Nitrate and Nitrite Levels in Vegetables," *Journal of Food and Drug Analysis* 11:233-238 (2003), which is hereby incorporated by reference in its entirety). The wavelength used for both nitrate and nitrite detection was 213 nm. The column (Phenomenex Inc., Gemini C18, 3 μm 110 Å) for analysis was operated at 25° C. with a binary gradient pumping method to pump mobile phase at 0.4 mL $min^{-1}$ flow rate. Mobile phase was 30% MeOH, 70% water, and 0.01 M Octylamine mixed solution, and its pH was adjusted to 7.0 with 85% Phosphoric Acid. The pH adjustments for all of the experiments were performed by pH probe (Hach company). Each run time was 30 minutes, nitrite and nitrate retention time were around 17 and 19 minutes, respectively. The calibration curve for nitrate and nitrite quantification were showed in FIGS. 13A-B.

(2) On-Line Gas Chromatography (GC) for $H_2$ quantification: $H_2$ evolved from the cathode side was quantified by an On-line GC (SRI Instrument 8610C MG #3), which was equipped with HaySep D and MolSieve 5 Å columns. A scheme used for gas flow path from ultra-high-purity Argon (Airgas, 99.999%) as carrier gas through the H-type cell reactor and connected to On-line GC was shown in FIG. 11.

A thermal conductivity detector (TCD) was used to detect Hz. $H_2$ quantification details and its calibration curve is shown in FIG. 14.

(3) UV-Vis for other products quantification: The nitrite concentration after the catalytic reduction was quantified by UV-Vis spectrophotometer (Shimadzu UV 2700), which showed results quickly. Spectrophotometry measurement of $NO_2$ concentration was by Griess reagent (FIG. 15). $NH_3$ (Kim et al., "Lithium-Mediated Ammonia Synthesis from Water and Nitrogen: A Membrane-Free Approach Enabled by an Immiscible Aqueous/Organic Hybrid Electrolyte System," Green Chemistry 21:3839-3845 (2019), which is hereby incorporated by reference in its entirety) (FIG. 16) and $NH_2OH$ (Burrell, "Spectrophotometric Method for Determining Hydroxylamine Reductase Activity in Higher Plants," Analytical Chemistry 27:1664-1665 (1955), which is hereby incorporated by reference in its entirety) (FIG. 17) were also quantified by UV-Vis spectrometer.

Results and Discussion

Synthesis and Characterizations of Oxide-Derived Ag (OD-Ag) Catalysts

OD-Ag was synthesized using square-wave pulsed potential for continuous oxidization and reduction of polycrystalline Ag foil. FIG. 18 showed the cyclic voltammetry (CV) result of Ag foil in 0.2 M NaOH. The oxidation peaks during positive-going scan are assigned to $Ag_2O$, $Ag_2O_2$, $Ag_2O_3$, and water oxidation, and the reduction peaks correspond to the reduction of these Ag oxides (Uhlig's Corrosion Handbook, Second Edition, Edited by R. Winston Review, which is hereby incorporated by reference in its entirety). FIGS. 19A-C showed the digital images of polycrystalline Ag foil, Ag oxide, and OD-Ag. Color changes at different stages were observed during the OD-Ag fabrication process. SEM images (FIGS. 1A-B) of the OD-Ag showed that nanoporous structure (particle size is 150-200 nm) was formed on the Ag foil surface. After electrocatalytic reduction of nitrate (for 2 hours), slight structure changes were observed in both morphology and particle size (250-300 nm), as shown in FIGS. 20A-B.

The diffraction peaks of Ag/C Ag foil and OD-Ag in XRD patterns before and after the electrocatalytic reduction (FIG. 2), showed that OD-Ag was in its metal $Ag^0$ state, and nitrate reduction process did not change the crystalline structure of OD-Ag. Based on Scherrer equation, the calculated Ag/C crystalline size was 41 nm.

Figure 3A:
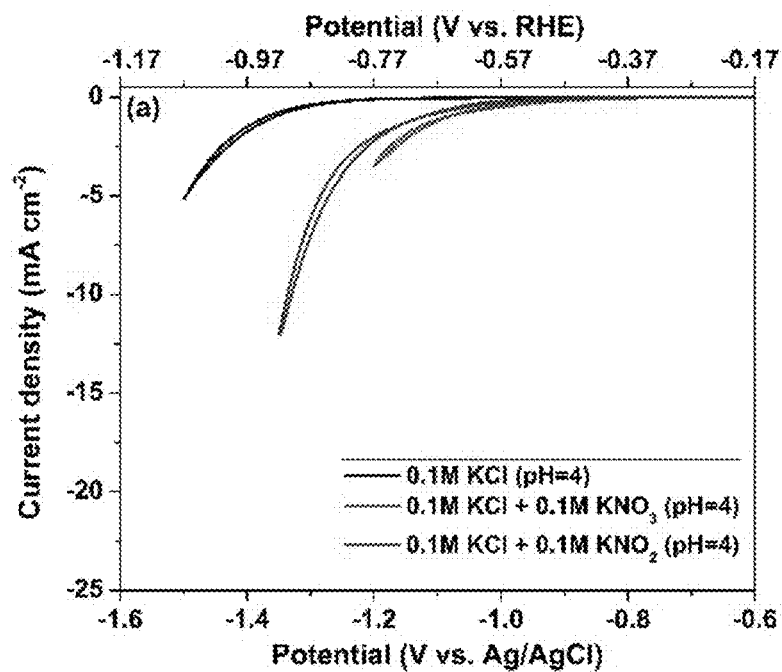
FIGS. 3A-D are graphs showing cyclic voltammograms of polycrystalline Cu (FIG. 3A), polycrystalline Ag (FIG. 3B), 0.5 mg/cm$^2$ Ag/C (FIG. 3C), and OD-Ag (FIG. 3D) in 0.1M KCl (pH=4), 0.1M KCl+0.1M $KNO_3$ (pH=4), and 0.1M KCl+0.1M $KNO_2$ (pH=4), respectively. Conditions: Scan rate 20 mV/s, geometric electrode area immersed in electrolyte were all 4 cm$^2$, without stirring.

To further analyze the compositions of OD-Ag before and after electrocatalytic reduction of nitrate, X-ray photoelectron spectroscopy (XPS) characterizations were conducted. As shown in FIG. 3A, the $Ag_{3d5/2}$ peak at 368.2 eV was observed for polycrystalline Ag foil. For OD-Ag before and after nitrate electrocatalytic reduction, the $Ag_{3d3/2}$ and $Ag_{3d5/2}$ peaks were at the same position as the Ag foil. The XPS results are consistent with the XRD patterns, indicating that both as-synthesized OD-Ag and the one after electroreduction are in the $Ag^0$ metal state. Inductively coupled plasma optical emission spectrometry (ICP-OES) (Table 1) results showed Ag foil, Ag/C, and OD-Ag were stable and durable in the course of electrocatalytic reduction of nitrate, with negligible Ag leaching issue (detected [Ag+]: <5 ppb).

TABLE 1

ICP-OES Results After Nitrate Electrocatalytic Reduction

| Sample Name | $Ag^+$ Leaching Concentration (ppb) |
|---|---|
| Ag/C | 3.14 |
| Ag foil | 4.90 |
| OD-Ag | 4.86 |

The electrochemical surface areas ("ECSA") of Ag foil, Ag/C, and OD-Ag were measured by underpotential deposition (UPD) of the Pb-stripping method (FIG. 21), and the ECSA roughness factor was estimated based on polycrystalline Ag foil (its ECSA factor was normalized as 1). The OD-Ag fabrication method has been optimized, and their corresponding ECSA factors under different synthesis conditions were shown in Table 2. A square-wave potential scan using 500 Hz pulse frequency for 3 hours was found to give the highest ECSA factor of 12.6, which is a 12.6 times higher electrochemically active surface area of OD-Ag than that of the Ag foil. Ag/C (0.5 mg/cm$^2$) also showed 7.2 times higher surface area than Ag foil, thus serving as a good control sample for comparison with OD-Ag.

TABLE 2

Relative ECSA Factor of Ag Foil and OD-Ag with Different Synthesis Parameters

| Materials | Relative Roughness Factor* |
|---|---|
| Ag foil | 1 |
| Ag/C nanoparticles | 7.25 |
| OD-Ag 250 Hz forward + reverse scan | 5.66 |
| OD-Ag 500 Hz only forward scan | 7.04 |
| OD-Ag 500 Hz forward and reverse scan | 12.64 |

*Relative roughness factor = $\dfrac{OD - Ag\ UPD\ area}{Ag\ foil\ UPD\ area}$ OD – Ag UPD area / Ag foil UPD area Electrocatalytic Reduction of Nitrate ($NO_3^-$)

Figure 3B:
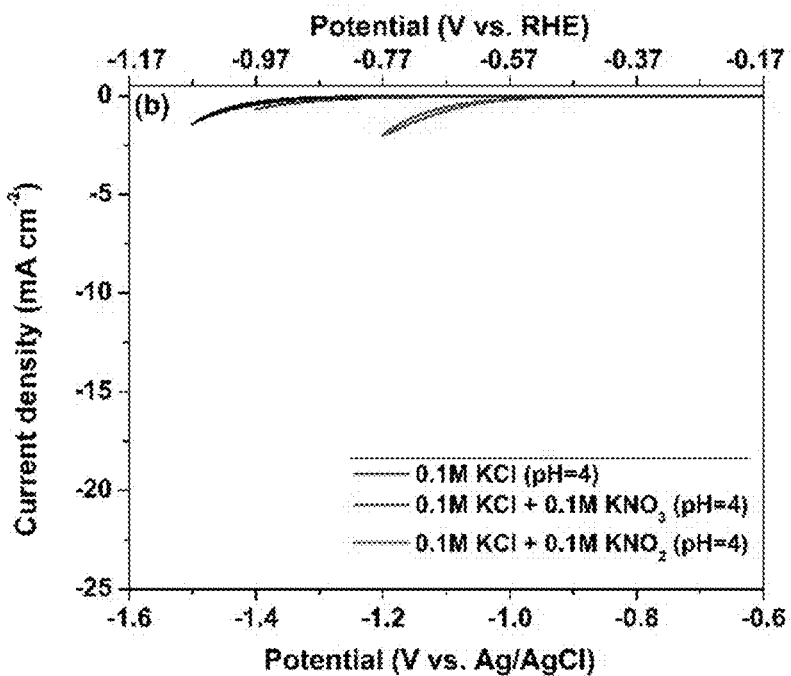

Cyclic Voltammetry (CV) Tests: Cu has been widely studied for electrocatalytic reduction of $NO_3^-$, which has been known to promote nitrate reduction (Reyter et al., "Study of the Electroreduction of Nitrate on Copper in Alkaline Solution," Electrochimica Acta 53:5977-5984 (2008); Yoshioka et al., "Electrocatalytic Reduction of Nitrate to Nitrous Oxide by a Copper-Modified Covalent Triazine Framework," J. Phys. Chem. C 120:15729-15734 (2016), which are hereby incorporated by reference in their entirety). However, Ag has rarely been investigated. In this work, the activity of nitrate reduction on the Ag foil electrode was evaluated by CV in a self-designed H-type cell, and was compared with that on Cu foil. FIGS. 3A-B exhibited that the onset potential for nitrate reduction (red curve) on both catalysts was almost identical (~−0.9V vs Ag/AgCl). However, on the Ag foil, the onset potential difference between $NO_3^-$ reduction and for $NO_2^-$ reduction (blue curve) was 260 mV, which is much larger than the onset potential difference of 86 mV on polycrystalline Cu foil. In addition, the Ag foil also showed larger onset potential difference between $NO_3^-$ reduction and HER, as compared to the Cu foil (360 mV vs 320 mV). This suggests that $NO_2^-$ is unreactive in a broader potential window on Ag foil.

Figure 3C:
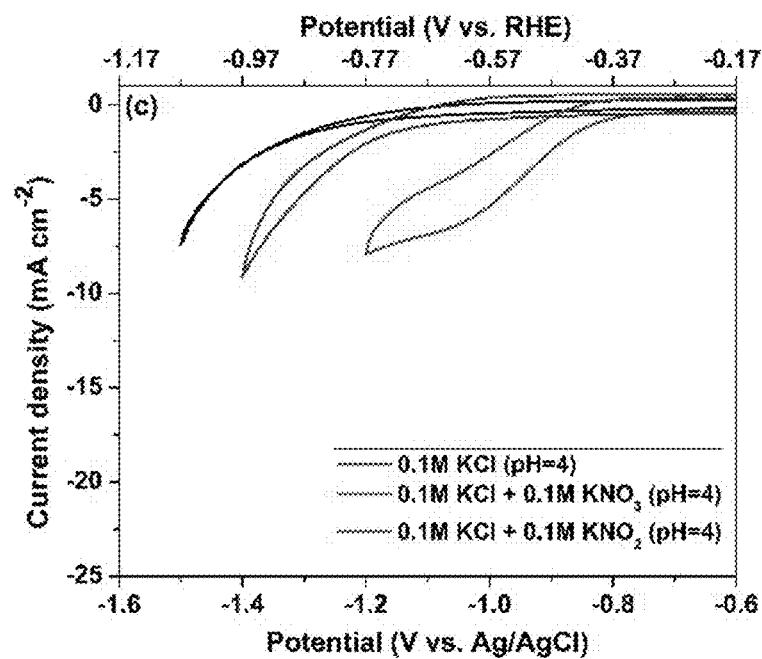
Figure 3D:
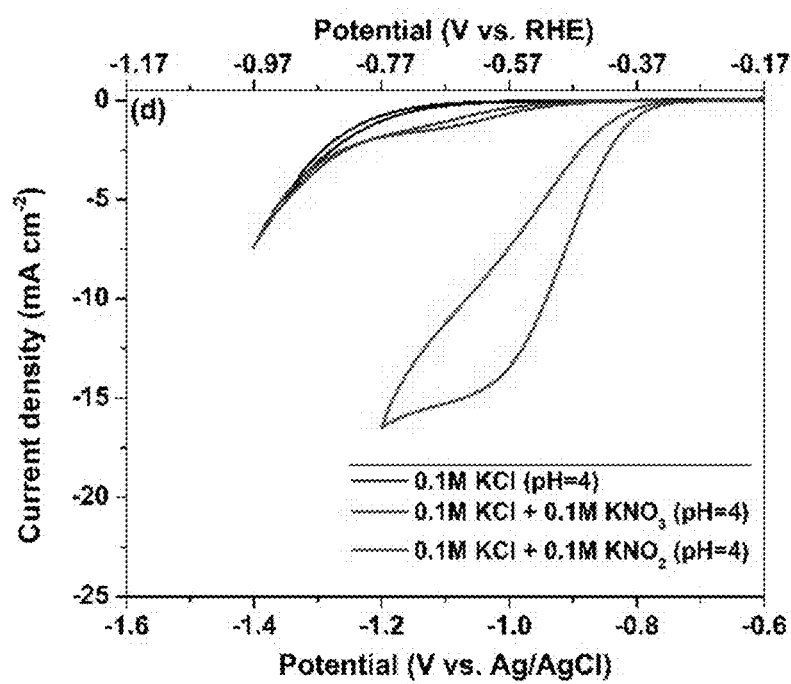

CV tests were then conducted on three Ag catalysts: Ag foil, Ag/C, and OD-Ag, as shown in FIGS. 3B-D. On Ag/C and OD-Ag, the onset potentials for $NO_3^-$ reduction, $NO_2^-$ reduction, and HER were −0.80V, −1.05V, −1.10V; and −0.76V, −0.96V, −1.13V, respectively. They were positively shifted about 100-200 mV, as compared with the Ag foil (−1.00V, −1.29V, and −1.35V). This was attributed to the particle size effect, the nano-sized Ag catalysts (Ag/C and OD-Ag) facilitate adsorption of $NO_3^-$, $NO_2^-$, and H on the electrode surface. Thus, all the onset potentials for these reactions positively shifted, which indicates nano-sized OD-Ag and Ag/C can save energy input for nitrate reduction. Furthermore, by comparing the current density of these three Ag-based catalysts, the sequence of nitrate reduction activity followed: OD-Ag>Ag/C>Ag foil. For example, at −1.1 V, the current density for OD-Ag, Ag/C, and Ag foil was −13.45 $mA/cm^2$, −5.37 $mA/cm^2$, and −0.18 $mA/cm^2$, respectively. Therefore, using OD-Ag can achieve $NO_3^-$ reduction with the highest $NO_3^-$ reduction activity and highest selectivity to $NO_2^-$, with minimal side.

Figure 4A:
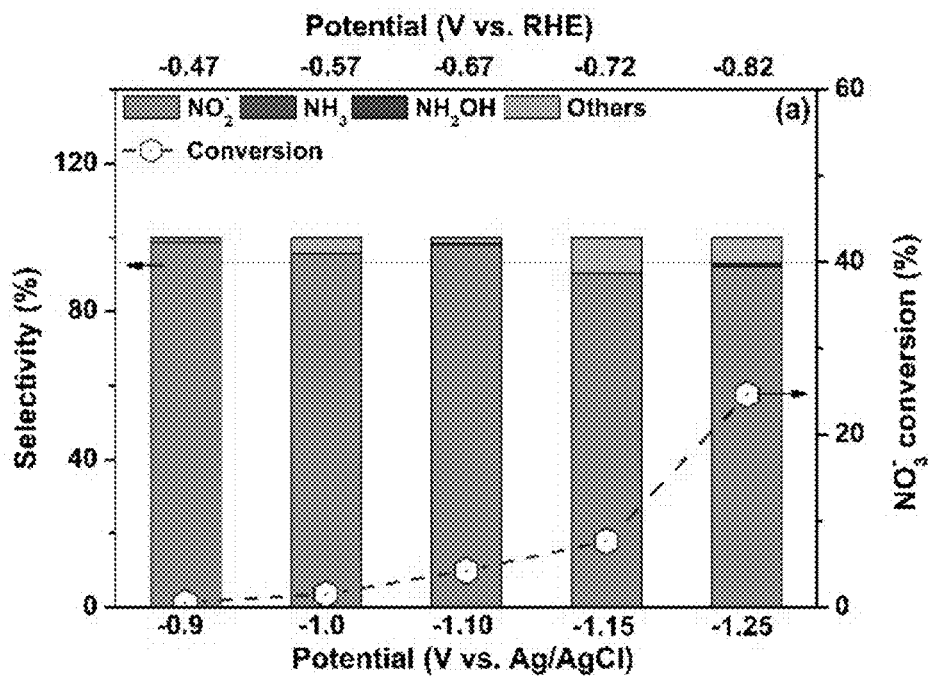
FIGS. 4A-D are graphs showing $NO_3^-$ conversion and product selectivity on Ag foil (FIG. 4A) and Cu foil (FIG. 4B) in different voltages. Their corresponding faradic efficiency to different products and total charge passed is shown in FIGS. 4C-D. Conditions: 1 h duration, cathode electrolyte 0.1M KCl+0.1M $KNO_3$ (pH=4), anode electrolyte 0.1M KCl (pH=4), stir rate 350 rpm, geometric electrode area immersed in electrolyte were all 4 cm$^2$.
Figure 4B:
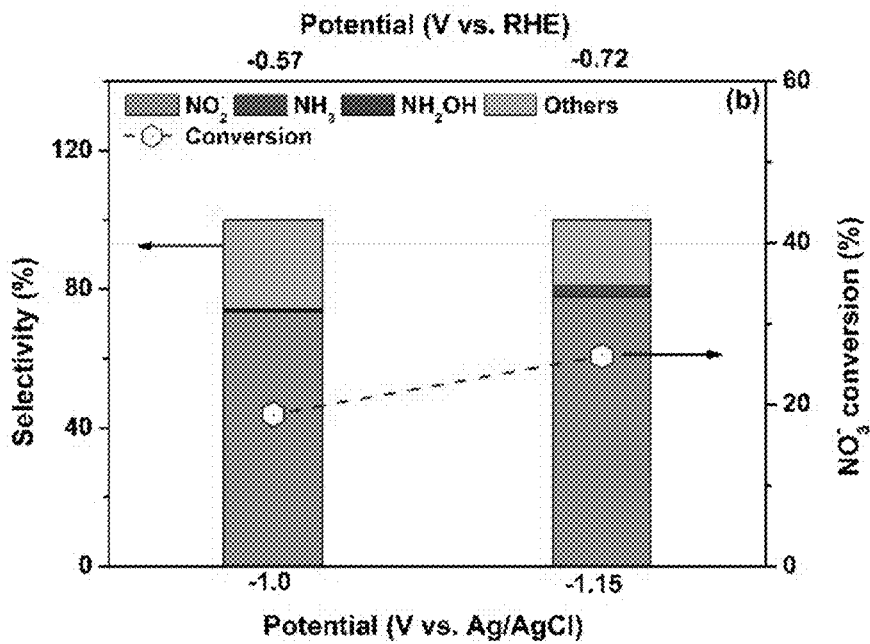
Figure 4C:
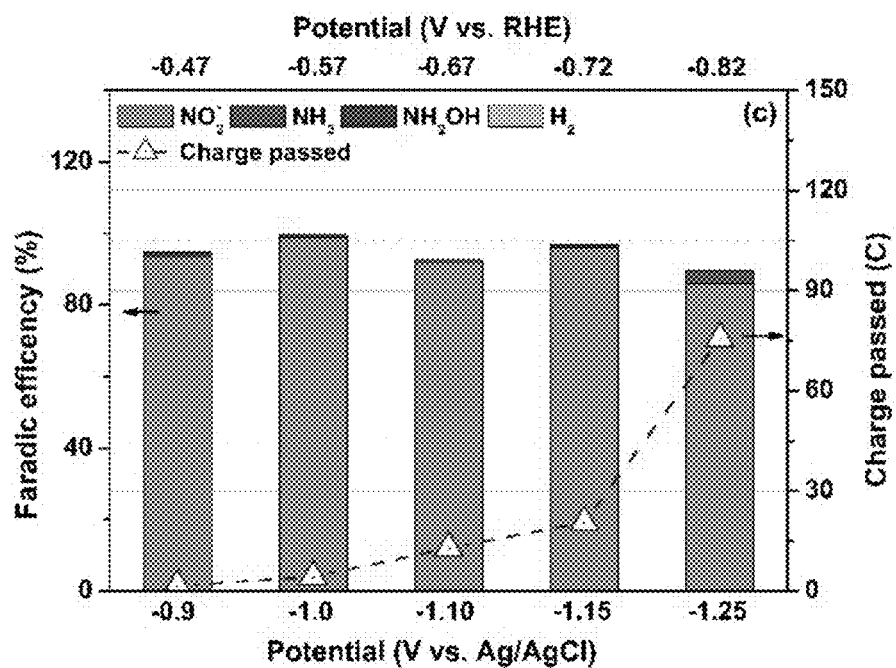
Figure 4D:
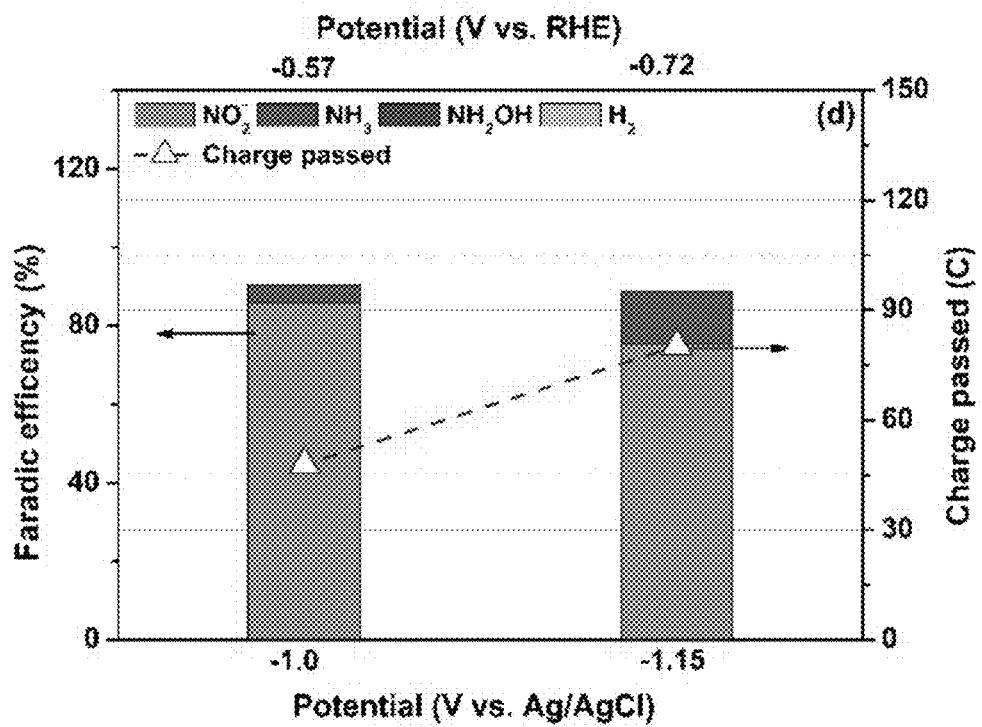

Chronoamperometry (CA): The state-state electroreduction of nitrate was conducted by applying constant (chronoamperomety) on Ag and Cu foils. As shown in FIG. 4A, when the potential was negatively shifted from −0.9 V to −1.15 V, $NO_3^-$ was converted to $NO_2$ with a high selectivity (>90%) and high faradic efficiency (>90%), with nearly no $NH_3$ produced (<0.5% selectivity). As potential further decreased to −1.25 V, the $NH_3$ selectivity was increased to around 1%, and the faradic efficiency of $NH_3$ over 3%. The increased selectivity and faradic efficiency to $NH_3$ indicate a more negative potential would promote deep reduction of $NO_2$ to $NH_3$. Further, as shown in FIG. 4C, there was nearly no HER as the side reaction in the applied potential range (−0.9V∼−1.25 V), which suggested $NO_3^-$ reduction can, to some extent, suppress HER on Ag foil. Even higher $NO_3^-$ conversion was achieved on Cu foil (18% at −1.0V and 26% at −1.15V, see FIG. 4B), the $NO_2$ selectivity struggled at 73% to 78%. The $NH_3$ selectivity of >3% and $NH_3$ faradic efficiency of >13% at −1.15V, are much higher than that on Ag foil.

Figure 5A:
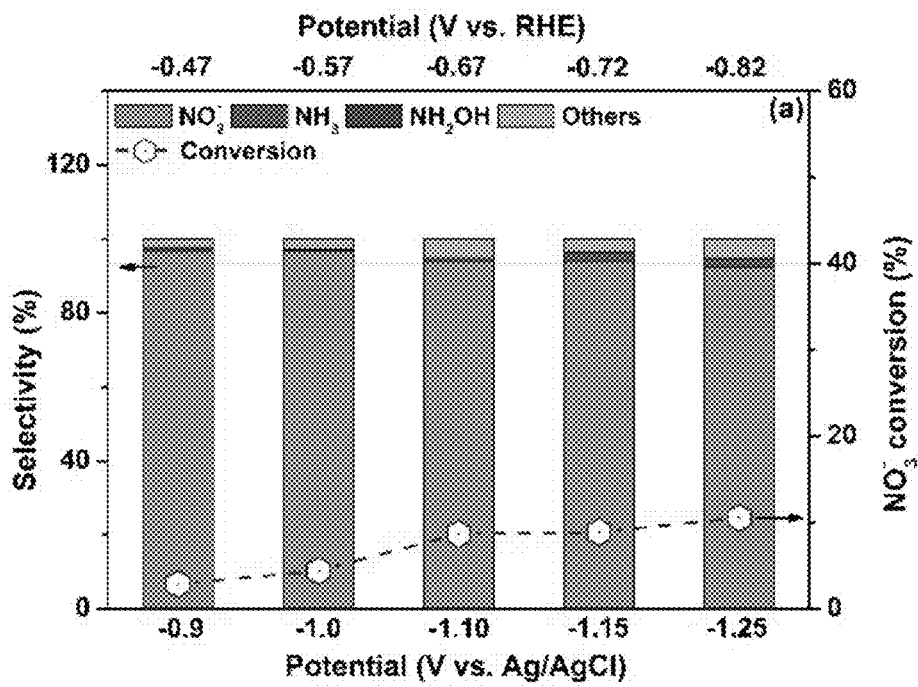
FIGS. 5A-D are graphs showing $NO_3^-$ conversion and product selectivity on 0.5 mg/cm$^2$ Ag/C (FIG. 5A) and OD-Ag (FIG. 5B) in different voltages. Their corresponding faradic efficiency to different products and total charge passed are shown in FIGS. 5C-D. Conditions: 1 h duration, cathode electrolyte 0.1M KCl+0.1M $KNO_3$ (pH=4), anode electrolyte 0.1M KCl (pH=4), stir rate 350 rpm, geometric electrode area immersed in electrolyte were all 4 cm$^2$.

$NO_3^-$ reduction on nano-sized OD-Ag and Ag/C catalysts were then studied. On Ag/C (FIG. 5A), it showed a $NO_2^-$ selectivity of >90% at the potential range of −0.9 V to −1.25 V. However, $NH_3$ selectivity was increased to >2%. When more negative potential was applied, the faradic efficiency of $NO_2^-$ on Ag/C was decreased from 97% at −0.9V to only 77% at −1.25V, and faradic efficiency of $NH_3$ was increased from <2% to over 8% (FIG. 5C). A control experiment on a plain carbon cloth was performed to test whether the carbon support led to the increased $NH_3$ production. In FIG. 25 and Table 3, the CV showed almost no potential difference between $NO_3^-$ and $NO_2^-$ reduction, which suggests that the generated $NO_2^-$, can be readily reduced to $NH_3$, rather than stay as $NO_2^-$. The 1 h-CA test at −1.25 V showed only 1.7% $NO_3^-$ is converted, with >10% $NH_3$ faradic efficiency. Moreover, on Ag/C, the side reaction HER occurred (FIG. 5C), and selectivity to $H_2$ was increased to ∼5% and 8% at −1.15V and −1.25V, respectively. The increased $H_2$ production might be attributed to the interactions between carbon and Ag nanoparticles, which facilitate hydrogen evolution reaction.

TABLE 3

| CA Test Result on Carbon Cloth | | | | |
|---|---|---|---|---|
| Reaction Condition | $NO_3^-$ Conversion (%) | Charge Passed (C) | $NO_2^-$ faradic efficiency (%) | $NH_3$ faradic efficiency (%) |
| −1.25 V vs Ag/AgCl | 1.7 | 5.0 | 70.5 | 10.3 |

Figure 5B:
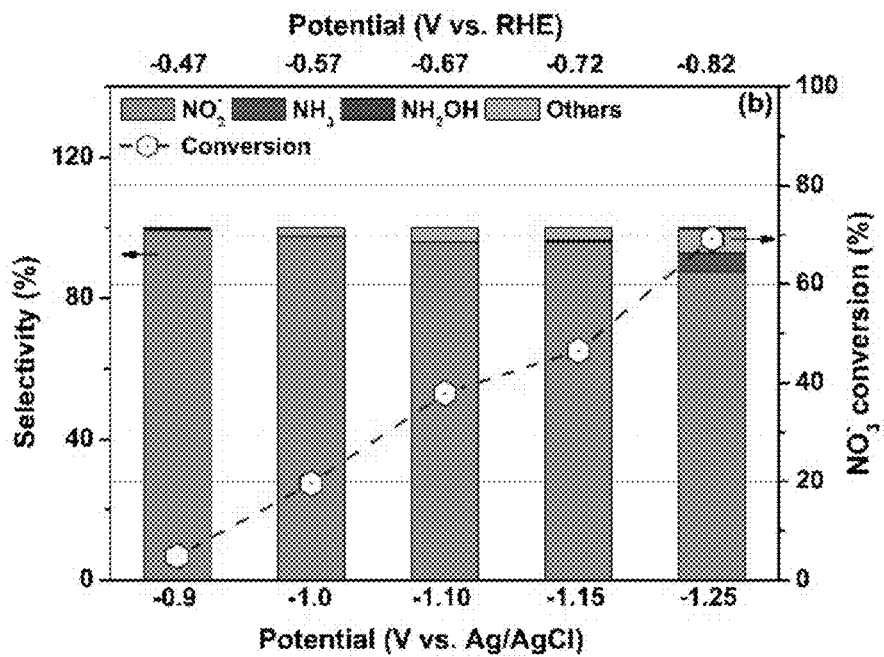
Figure 5C:
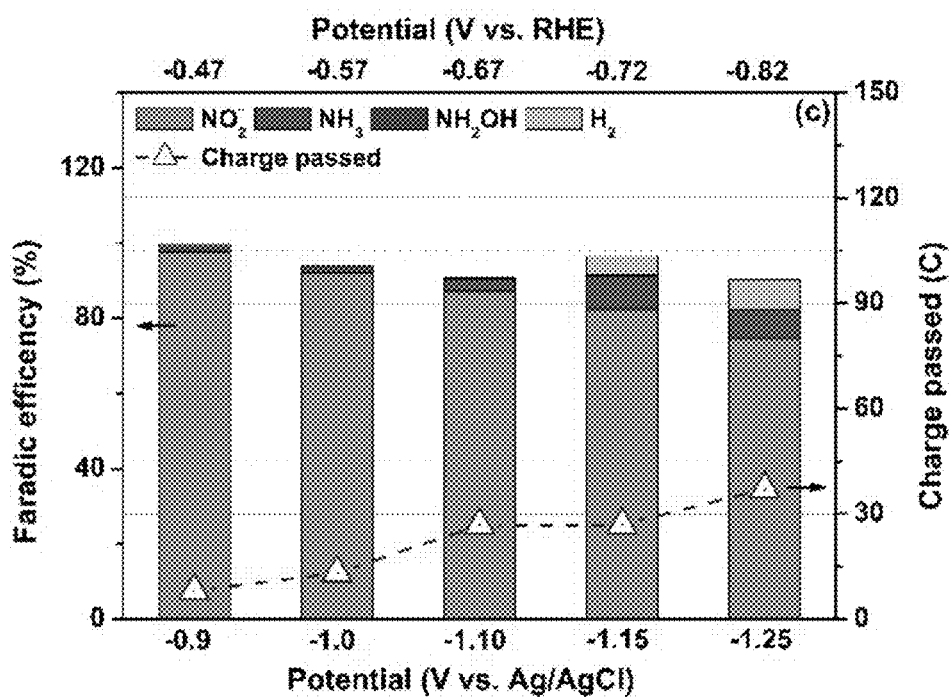
Figure 5D:
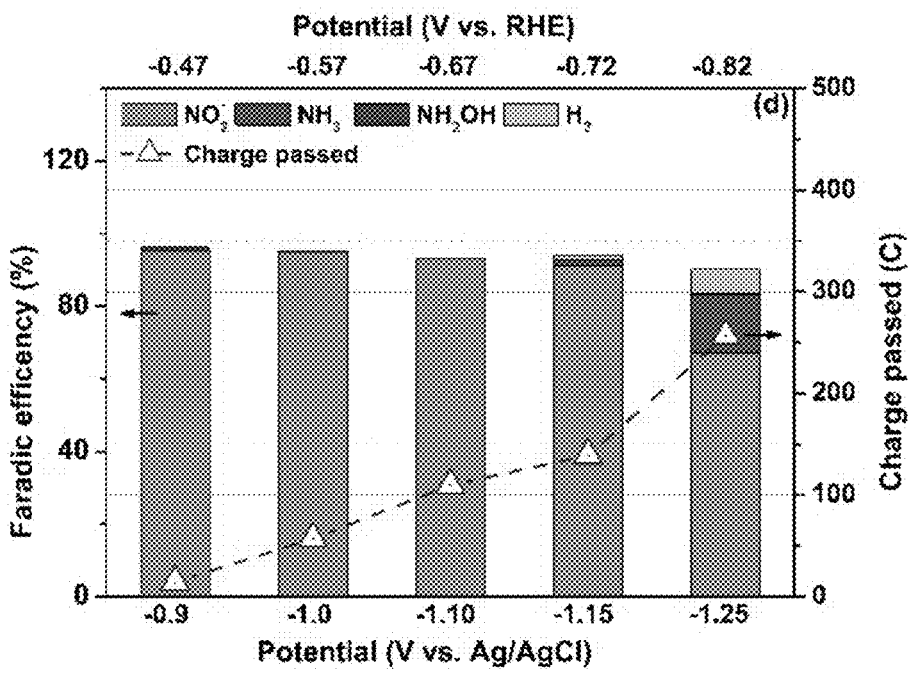

In comparison, OD-Ag showed very high activity for $NO_3^-$ reduction, with a conversion of 5-6 times higher than Ag/C, and 8-10 times higher than Ag foil (FIG. 5B). Even at such a high conversion, most $NO_2^-$ selectivity was kept very high >95% (except for −1.25V), while $NH_3$ selectivity (<0.4%) and faradic efficiency (1.3%) were maintained extremely low, which were much lower than that on Ag/C (FIGS. 5A-D). It is reasonable to conclude that the nitrate reduction activity and product selectivity were dependent not only on the size of Ag catalysts, as nanosized catalysts (OD-Ag and Ag/C) performed better than bulk Ag foil, but also on the structure of Ag catalysts. OD-Ag showed better $NO_3^-$ reduction performances than Ag/C. The selectivity to nitrite was potential controlled, thus, deep reduction reactions can be minimized by choosing the appropriate potential range. Furthermore, a small amount of $NH_2OH$ was detected on all Ag-based catalysts (close to 0.5% faradic efficiency) at relatively negative potentials (−1.15 V and −1.25 V).

2.2 pH Effect on Electrocatalytic Reduction of Nitrate

Figure 6A:
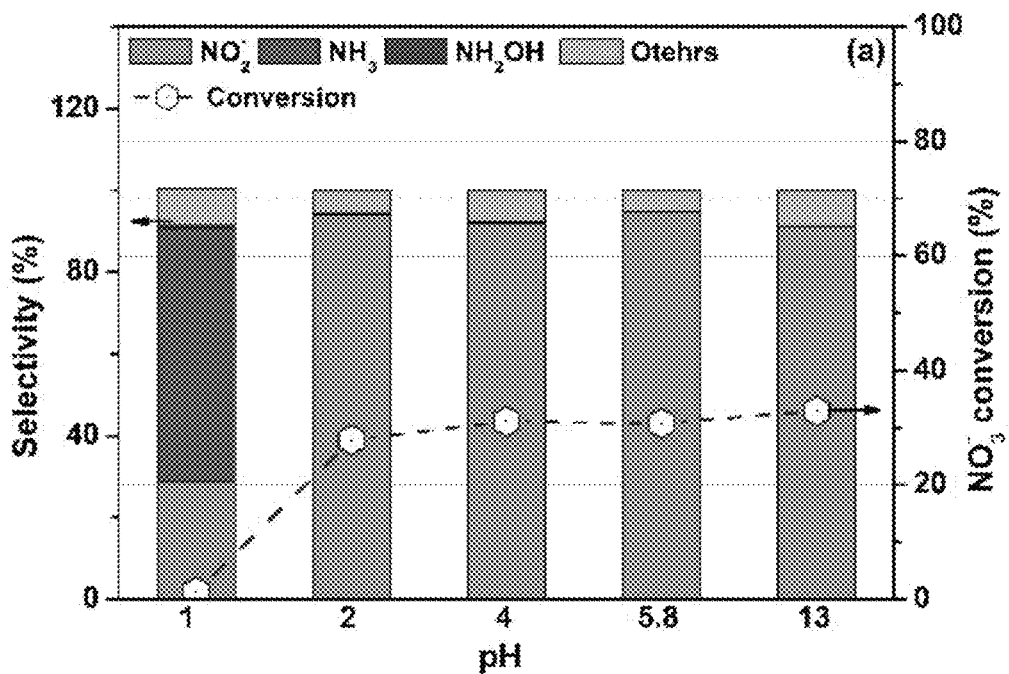
FIGS. 6A-B are graphs showing $NO_3^-$ conversion and product selectivity (FIG. 6A) and faradic efficiency (FIG. 6B) on OD-Ag with different pH. Conditions: Constant current 1 h (total charge equal 90° C.), cathode electrolyte 0.1M KCl+0.1M $KNO_3$ (different pH), anode electrolyte 0.1M KCl (different pH), stir rate 350 rpm, geometric electrode area immersed in electrolyte were all 4 cm$^2$. pH=5.8 means 0.1M KCl+0.1M $KNO_3$ without adjusting pH, otherwise, pH was adjusted by concentrated HCl or KOH.
Figure 6B:
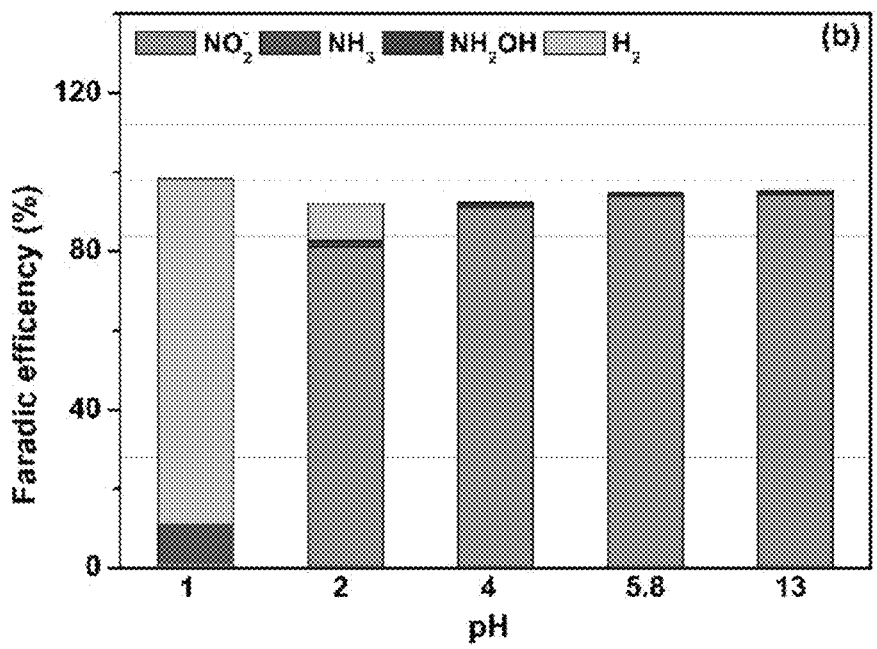

Constant current tests were applied to study the pH effect on nitrate reduction (FIGS. 6A-B). Under strong acidic conditions (pH=1), the activity of nitrate reduction was very low. Nitrate conversion was only 1.3% with a relatively low selectivity of 29% to $NO_2^-$, and fairly high selectivity of 61% to $NH_3$. HER was the main reaction, with a $H_2$ faradaic efficiency of ∼87%. $NH_2OH$ was detected with ∼1% selectivity at pH=1. As pH was increased to 2, the $NO_2^-$ selectivity increased and $NH_3$ decreased, however still nearly 7% charges went to $H_2$. In sharp comparison, in the pH range of 4 to 13, the $NO_3^-$ conversion, $NO_2$ (all showed >90%) and $NH_3$ (all showed <0.4%) selectivity, and their corresponding faradic efficiency (in range of 91%-94%) remained unchanged. Therefore, nitrate reduction is pH independent from a weak acidic to a strong basic system (under experimental conditions, pH: 4-13).

Figure 7A:
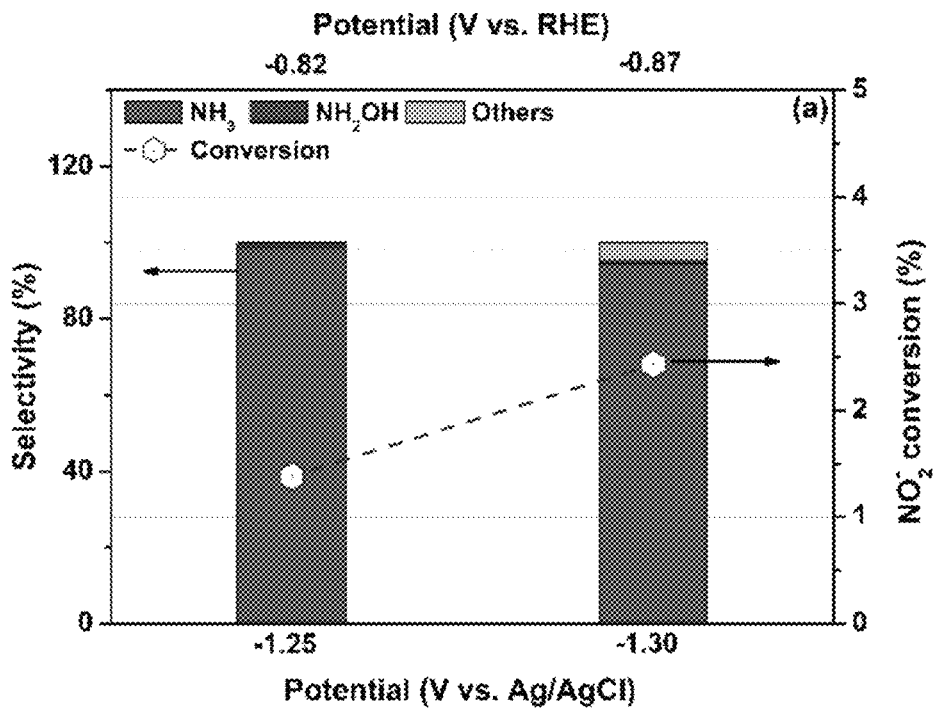
FIGS. 7A-B are graphs showing $NO_2^-$ conversion and product selectivity (FIG. 7A) and faradic efficiency and total charge passed on OD-Ag (FIG. 7B).
Figure 7B:
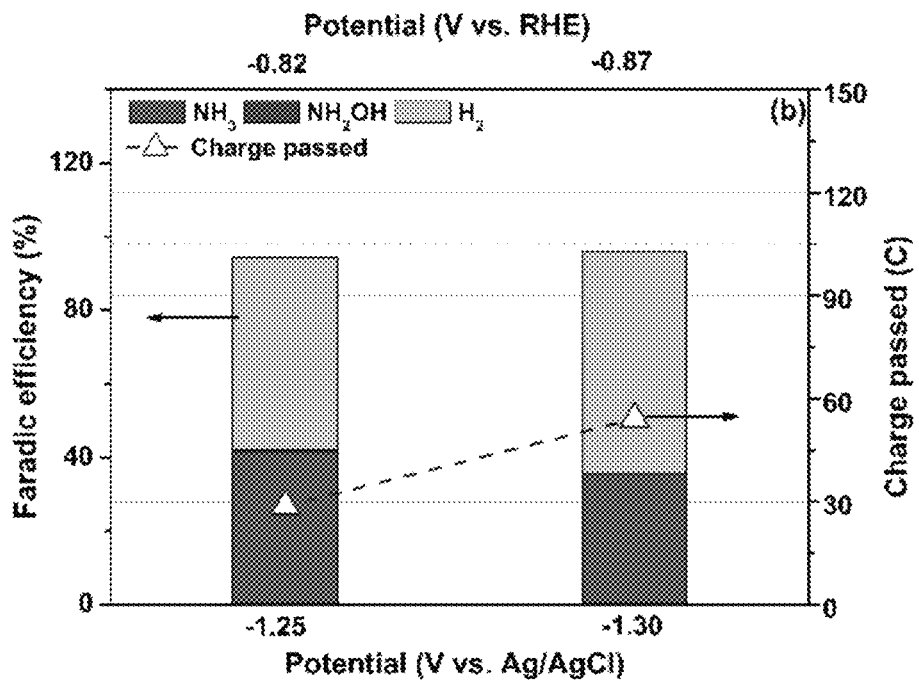

Electrocatalytic Reduction of Nitrite ($NO_2$): Electrocatalytic reduction of nitrite on OD-Ag at both −1.25V and −1.30V showed high selectivity to $NH_3$ (>90%, in FIG. 7A) and moderate $NH_3$ faradic efficiency (>40%, FIG. 7B). However, $NO_2$ conversion was not high (<3%) at these two potentials, because HER was much more facile than $NO_2^-$ reduction. $NH_2OH$ was further tested at these two voltages, which was consistent with the results of $NO_2^-$ electrocatalytic reduction. Therefore, currently it remains a big challenge to employ electrocatalysis to reduce $NO_2^-$ to a final product of $N_2$.

$H_2$ Influence on Electrocatalytic Reduction of $NO_3^-$ to $NH_3$: It was found that $NH_3$ selectivity was quite high in acidic electrolyte, even though the nitrate conversion was low. Two mechanisms were hypothesized: (1) HER was dominant in acidic conditions, because the strong H adsorption would form a high H-coverage on Ag electrodes, and occupy most of the active sites, thus facilitating formation of N—H bond to form $NH_3$. (2) Strong HER would generate a lot of $H_2$ in the system, which can facilitate subsequent reduction of some intermediates to $NH_3$ through non-faradaic processes. To clarify which mechanism is dominant, electrocatalytic reduction of $NO_3^-$ at −1.0 (no $H_2$ generated at this voltage) was compared with hydrogen ($H_2$) purge and argon (Ar) purge. The results (Table 4) showed $NO_3^-$ conversion and charges passed were almost the same, but the detected $NH_3$ in $H_2$ purged system was about 1.5 times higher than that in Ar-purged system. Therefore, these results supported the hypothesis that $NH_3$ generation depended not only on the applied voltage, but also on the on-site generated $H_2$, which may favor non-faradic reduction of nitrate reduction intermediates (e.g., $NO_x$ intermediates) to $NH_3$.

TABLE 4

Nitrate Reduction at OD-Ag Compared with $H_2$ Purge and Ar Purge

| Reaction Condition | $NO_3^-$ Conversion (%) | Charge Passed (C) | $NH_3$ Concentration ($10^{-4}$ mol/L) |
|---|---|---|---|
| −1.0 V with 100 ml/min $H_2$ | 22.85 | 67.09 | 3.58 |
| −1.0 V with 100 ml/min Ar | 22.10 | 67.17 | 2.55 |

$NH_2OH$ Generation: $NH_2OH$ was qualitatively detected at the level of 0.3-0.4 ppm at very negative potential (−1.15V to −1.25V vs Ag/AgCl) and very strong acid conditions (pH=1). The two conditions are common in that they both have relatively strong HER and relatively high $NH_3$ production. It was hypothesized that the mechanism of $NH_2OH$ generation is similar to $NH_3$ formation, which can be facilitated by: (1) more H (produced from faradic process) adsorbed on the active sites of catalysts promote formation of N—H bond for $NH_2OH$ generation; and (2) $H_2$ produced in the system could further reduce $NO_3^-$-reduction intermediates (pure non-faradaic process) to generate $NH_2OH$. The second hypothesis seemed to be implausible, based on the results of a few control experiments. (1) Catalytic reduction of $NO_3^-$ and $NO_2^-$ by $H_2$ over OD-Ag did not produce any $NH_2OH$ (FIG. 23E); (2) Electrocatalytic reduction of $NO_3^-$ at −1.0 V with $H_2$ purging did not produce $NH_2OH$. Therefore, $NH_2OH$ was likely produced from faradaic-related processes (electrochemical processes). Further, $NH_2OH$ was verified as the intermediate to $NH_3$, because no matter if electrocatalysis or catalysis (by $H_2$) was applied to reduce $NH_2OH$, $NH_3$ was the only product with nearly 100% selectivity (FIGS. 23A, 23B, and 23D) and high faradic efficiency (other charges went to HER) (FIG. 23C).

Full Conversion $NO_3^-$ to $NO_2^-$ Via Electrocatalytic Reduction on OD-Ag

Previously, OD-Ag was used to achieve high $NO_2^-$ selectivity and faradic efficiency, and almost no $NH_3$ and $H_2$ were produced. However, it is difficult to achieve $NO_3^-$ conversion of 100%. Therefore, a $NO_3^-$ solution with a lower concentration of 0.01 M (mimicking nitrate concentration of the downstream leavening the water treatment plant) was tested, and nearly 100% $NO_3^-$ was electrocatalytically converted to $NO_2^-$ at −1.1V. When a constant voltage was used with a charge of 29° C. (theoretical 28.9° C.), 93% $NO_3^-$ conversion, 94% $NO_2^-$ selectivity, and 0.8% $NH_3$ selectivity were achieved (FIG. 8). By sacrificing $NO_2^-$ faradic efficiency through increasing the total charge to 32.2° C., $NO_3^-$ conversion can be increased to 99.8%.

Full Elimination of $NO_2^-$ Via Catalytic Reduction on Pd-Based Catalysts

High $NO_3^-$ conversion and high $NO_2^-$ selectivity can be achieved through an electrocatalytic process using the OD-Ag electrode. However, electrocatalytic reduction of $NO_2^-$ can only produce $NH_3$. Therefore, a catalytic process was used for $NO_2^-$ reduction on three commercial Pd catalysts. 0.01M $NO_2^-$ as a feedstock can be eliminated completely on Pd-based catalysts. $NO_2^-$ solution samples were taken at a regular time interval, diluted, and analyzed immediately by a spectrometry method. The $H_2$ flow rate was first to be optimized to eliminate the limitation of $H_2$ transport on reaction kinetics (FIG. 24). When $H_2$ flow rate is >25 ml/min, the $NO_2^-$ reduction rate did not change. Therefore, the $H_2$ flow rate of 25 ml/min was used for all $NO_2^-$ reduction experiments. A series of rigorous control experiments (FIG. 25) showed Pd-based catalysts worked efficiently for catalytic reduction of $NO_2^-$ with only a trace amount of $NH_3$ produced, but very low activity for $NO_3^-$ reduction. $CO_2$ buffer was important in the reduction system, as has been reported previously. OD-Ag showed no activity towards catalytic reduction of $NO_3^-$ and $NO_2^-$, and Ag nanoparticles exhibited very low activity for $NO_2$ reduction. Therefore, choosing Pd-based catalysts for $NO_2$ reduction was necessary. The selectivity of the side product $NH_3$ depends on the catalyst content for nitrite reduction on Pd/C catalyst (FIG. 26). The $NH_3$ production can be effectively minimized by increasing catalyst loading in the system, and the lowest $NH_3$ selectivity was achieved using 25 mg 5% Pd/C. This is probably because $H_2$ is readily adsorbed and occupied on most Pd surfaces when the Pd loading is low, thus facilitating formation of $NH_3$ by supplying sufficient N—H bonding.

The rate constants for 0.01M $NO_2$ reduction on the three Pd-based catalysts were calculated and shown in FIGS. 9A-B. 5% Pd/C had the highest $NO_2^-$ reduction rate of 3.54 L $g_{pd}^{-1}$ $min^{-1}$, which is much higher than 5% Pd/$Al_2O_3$ (0.80 L $g_{pd}^{-1}$ $min^{-1}$) and 5% Pd/$SiO_2$ (0.37 L $g_{pd}^{-1}$ $min^{-1}$). This indicates that 0.01M $NO_2^-$ (produced from electrocatalytic reduction of $NO_3^-$) can be completely removed in the same H-type cell reactor within 5 mins. To directly compare the activity of Pd, the apparent turn over frequency ("TOF") of each catalyst was calculated based on the active surface area of Pd determined by $H_2$ chemisorption, as shown in Table 5. It turned out that the Pd dispersion varied from support to support, hence the intrinsic reaction rate on Pd/$Al_2O_3$ is lower than that on Pd/$SiO_2$, although the reaction rate was higher on Pd/$Al_2O_3$. The difference of TOF on various support might result from the different intrinsic kinetic on Pd, due to the so-called metal-support interaction. However, the possibility that the supports participate in the reaction cannot be completely ruled out. The $NH_3$ selectivity (all <1.5%) after full conversion (complete removal) of $NO_2$ was: 0.7% on 5% Pd/$SiO_2$, 0.9% on 5% Pd/$Al_2O_3$, and 1.4% on 5% Pd/C, respectively. The corresponding $NH_3$ concentration was: 0.8 ppm as N, 1.1 ppm as N, and 1.7 ppm as N, for 5% Pd/$SiO_2$, 5% Pd/$Al_2O_3$, and 5% Pd/C, respectively. Therefore, 5% Pd/$SiO_2$ showed the lowest $NH_3$ residual concentration in the final solution. Stability tests of these three Pd-based catalysts showed no apparent activity drop for three continuous reactions (FIGS. 10A-C). The calculated rate constant was 0.37±0.02, 0.80±0.02, and 3.54±0.47 for 5% Pd/$SiO_2$, 5% Pd/$Al_2O_3$, and 5% Pd/C, respectively.

TABLE 5

TOF Test Results for Nitrite Catalytic Reduction

| Catalyst | 5% Pd/SiO$_2$ | 5% Pd/Al$_2$O$_3$ | 5% Pd/C |
|---|---|---|---|
| Pd Dispersion | 4% (25 nm) | 16% (6 nm) | 11% (9 nm) |
| Pd Active surface area (m$^2$/g catalyst) | 0.9658 | 3.57805 | 2.4334 5% Pd loading, so 48 m$^2$/g$_{Pd}$, about 10.4 nm. |
| TOF(s$^{-1}$) | 0.035 | 0.026 | 0.195 |

However, since SiO$_2$ and Al$_2$O$_3$ are well known for their acidic properties, NH$_3$ might be adsorbed on the catalysts, the measured concentration of NH$_3$ in the solution would not able to account for the entire amount of NH$_3$ produced in the reaction. Therefore, the adsorption of NH$_3$ on catalysts was observed. In the presence of a solution, the NH$_3$ adsorption effect was due to different iso-electric point (IEP) of the oxide supports (Toebes et al., "Synthesis of Supported Palladium Catalysts," *Journal of Molecular Catalysis A: Chemical* 173:75-98 (2001), which is hereby incorporated by reference in its entirety). When pH value is >IEP, the Pd surface becomes negatively charged and prefers to adsorb cations, such as Pd(NH$_3$)$_4$$^{2+}$. Silica is an acidic oxide and aluminum is an amphoteric oxide, which can adsorb cations at relatively high pH. This suggests the possibility that NH$_3$ can be adsorbed on the catalysts; the measured NH$_3$ concentration by colorimetric method is lower than that of all produced NH$_3$. Some control experiments were conducted to test this hypothesis. NH$_3$ concentrations were compared among blank (no catalyst) solutions and the ones with addition of 50 mg 5% Pd/C, 50 mg 5% Al$_2$O$_3$, or 50 mg 5% Pd/SiO$_2$, respectively. NH$_3$ adsorption quantity depended on both pH and reaction time. To obtain the adsorption rate and saturated (equilibrium) adsorption quantity on each catalyst, the NH$_3$ concentration in the solution was measured at different times after they were added in catalyst suspensions. The results of NH$_3$ quantification after the immediate addition of NH$_3$ (at t=0) in different systems are shown in FIGS. 27A-D). (1) In weak acid solution (pH=3 and CO$_2$ buffer solution), NH$_3$ adsorption on all three Pd-based catalysts was negligible. (2) At neutral pH (dilute by DI-water), adsorption of NH$_3$ on Pd/C was small (close to 0), while almost 20% and 49% NH$_3$ adsorption on Pd/Al$_2$O$_3$ and Pd/SiO$_2$, respectively. (3) In basic solution, only Pd/C showed NH$_3$ adsorption of 17%. (4) The reason for NH$_3$ adsorption was not due to carbon, because no NH$_3$ was adsorbed on carbon. The quantified NH$_3$ concentrations after 20 hours of addition of NH$_3$ are shown FIGS. 28A-C. (1) In weak acid solution, nearly no NH$_3$ adsorption on all three Pd catalysts. (2) At neutral pH, the NH$_3$ adsorption issue became more severe with longer holding time (7%, 38%, and 65% for Pd/C, Pd/Al$_2$O$_3$, and Pd/SiO$_2$, respectively). (3) In basic solution, all the three catalysts showed different NH$_3$ adsorptions (69%, 19%, and 36% for Pd/C, Pd/Al$_2$O$_3$, and Pd/SiO$_2$, respectively). This suggests that the NH$_3$ adsorption rate is low at high pH, and the adsorption is more obvious at a longer holding time (i.e., 20 h). Carbon itself showed almost no NH$_3$ adsorption even for 20 h holding time. The NH$_3$ adsorption on Pd/Al$_2$O$_3$ and Pd/SiO$_2$ at neutral and basic pH solutions are in agreement with the acidic and amphoteric surface properties of SiO$_2$ and Al$_2$O$_3$ supports.

Furthermore, NH$_3$-TPD experiments were conducted and confirmed the adsorption of ammonia on the catalysts, with key data summarized in Table 6. The normalized areas were defined as peak area per gram of catalyst. Although the peak area from TCD signal was not calibrated to quantify the amount of NH$_3$, the values indicates the relative amount of desorbed NH$_3$, which reduces in the order of 5 wt % Pd/SiO$_2$, Pd/Al$_2$O$_3$, and Pd/C. The order of NH$_3$ adsorption amount determined from NH$_3$-TPD was well consistent with the results of the control experiments in solution. Therefore, conducting these control experiments of NH$_3$ adsorption are essential for reporting NH$_3$ concentration, because they can be lower than the real produced value. In the experiments, weak acid condition was used, under which nearly no NH$_3$ adsorption was observed. In addition, NH$_3$ concentration was quantified immediately after catalytic NO$_2$$^-$ reduction reactions.

TABLE 6

NH$_3$-TPD Test Results

| | 5 wt % Pd/SiO$_2$ | | 5 wt % Pd/Al$_2$O$_3$ | | 5 wt % Pd/C | |
|---|---|---|---|---|---|---|
| Total | Temperature at Maximum (° C.) | Normalized area | Temperature at Maximum (° C.) | Normalized area | Temperature at Maximum (° C.) | Normalized area |
| | 109 | 4.56 | 140 | 2.53 | 106 | 1.47 |
| | 346 | 10.15 | 297 | 7.18 | 338 | 1.18 |
| | | | | | 740 | 6.69 |
| | | 14.71 | | 9.71 | | 9.34 |

The possibility of NO$_2$$^-$ adsorption on Pd-based catalysts was also examined. The NO$_2$$^-$ concentration in 15 mL standard NO$_2$$^-$ solution (blank, 52 μM) and 15 mL standard NO$_2$$^-$ solution 50 mg various Pd catalysts were measured and quantified. As can be seen from FIG. 29 (key data summarized in Table 7, Pd/C showed strong NO$_2$$^-$ "adsorption", Pd/Al$_2$O$_3$ showed low NO$_2$$^-$ "adsorption", and Pd/SiO$_2$ showed nearly no NO$_2$$^-$ "adsorption". Table 8 further indicates that NO$_2$$^-$ adsorption on Pd/C catalysts was dependent on NO$_2$$^-$ concentration, a higher NO$_2$$^-$ concentration can lead to higher "adsorption" of NO$_2$$^-$. Interestingly, carbon showed nearly no NO$_2$$^-$ "adsorption", suggesting it plays a trivial role on NO$_2$$^-$ "adsorption". The interaction between Pd and carbon may change the chemical state of Pd, which can adsorb or react with NO$_2$$^-$. The chemical state of Pd in 5% Pd/C catalyst was Pd$^{2+}$, indicating Pd exists in PdO form. (5% Pd/Al$_2$O$_3$, 5% Pd/SiO$_2$, and 5% Pd/C before and after.) The NO$_2$$^-$ reduction test results were not influenced by NO$_2$$^-$ adsorption, because a concentrated 0.01 M NO$_2$$^-$ was used as feedstock, and the adsorption on Pd/C was only 2% (FIG. 30 and Table 10).

TABLE 7

$NO_2^-$ Adsorption Control Test Results

| Reaction Condition | Tested Concentration (uM) | Adsorption percentage (%) |
|---|---|---|
| Blank (standard, 15 ml) | 52 | 67.09 |
| 15 ml blank + 50 mg Pd/C | 2 | 96 |
| 15 ml blank + 50 mg Pd/Al$_2$O$_3$ | 49 | 6 |
| 15 ml blank + 50 mg Pd/SiO$_2$ | 52 | 0 |

TABLE 8

$NO_2^-$ Adsorption Control Test Results

| $NO_2^-$ Concentration (μM) | Catalyst | Tested Concentration (μM) | Absorption Concentration (μM) | Absorption Percentage (%) |
|---|---|---|---|---|
| 200 | 15 ml standard + 50 mg Pd/C | 70 | 130 | 65.0 |
| 100 | 15 ml standard + 50 mg Pd/C | 12 | 88 | 88.0 |
| 75 | 15 ml standard + 50 mg Pd/C | 4 | 71 | 94.7 |
| 50 | 15 ml standard + 50 mg Pd/C | 0.8 | 49.2 | 98.4 |
| 25 | 15 ml standard + 50 mg Pd/C | 0 | 25 | 100.0 |
| 50 | 15 ml standard + 50 mg Carbon | 48.3 | 1.7 | 3.4 |

TABLE 9

$NO_2^-$ Adsorption Control Test Results

| Reaction Condition | Tested Concentration (M) | Adsorption percentage (%) |
|---|---|---|
| Blank (standard, 15 ml) | 0.01 | base |
| 15 ml blank + 50 mg Pd/C | 0.098 | 2 |

Combining Electrocatalytic Reduction and Catalytic Reduction for Nitrate Removal Finally, electrocatalytic $NO_3^-$ reduction was combined using OD-Ag and catalytic $NO_2^-$ reduction on Pd catalysts in one same H-type cell reactor to eliminate nitrate ions. 0.01 M $NO_2^-$ (140 ppm N) was chosen as feedstock because it is in the typical $NO_3^-$ concentration range of concentrated wastewater stream. The results (Table 10) showed that the final $NO_3^-$ conversion can achieve >98% on OD-Ag electrode with 31.5 C charge passed at −1.1V vs Ag/AgCl, and the second catalytic process can efficiently eliminate $NO_2^-$ with minimal $NH_3$ generation. After the two steps, $NO_3^-$ concentration was reduced to 1.6-2.5 ppm (as N), no $NO_2^-$, and 1.6-2.5 ppm (as N) $NH_3$ in the final treated solution. The $NH_3$ concentration showed the highest (2.5 ppm) by using Pd/C catalyst, and the lowest by using Pd/SiO$_2$ (1.6 ppm). By sacrificing the reaction rate of the first step, a decreased potential of −1.0V vs Ag/AgCl was used to fully convert $NO_3^-$ to $NO_2^-$, and Pd/C and Pd/SiO$_2$ were compared as the catalyst used in the second step. Finally, the lowest 1.1 ppm (as N) $NH_3$ and 5.88 ppm (as N) $NO_3^-$ was achieved in the end by using Pd/SiO$_2$. These results are better than previously published work (Table 11), in electrocatalytic or catalytic reduction of $NO_3^-$ (Martinez et al., "State-of-the-Art and Perspectives of the Catalytic and Electrocatalytic Reduction of Aqueous Nitrates," *Applied Catalysis B: Environmental* 207:42-59 (2017); Garcie-Segura et al., "Electrocatalytic Reduction of Nitrate: Fundamentals to Full-Scale Water Treatment Applications," *Applied Catalysis B: Environmental* 236:546-568 (2018), which are hereby incorporated by reference in their entirety), although $NH_3$ concentration (1.1 ppm as N) still needs to be further reduced to meet the limit of 0.66 ppm (as N) $NH_3$ (Table 12).

TABLE 10

Performances of Combined Electrocatalysis and Catalysis Process for Nitrate Reduction

| Start $NO_3^-$ concentration (ppm)[a] | voltage (V)[b] | Catalysts[c] | Final concentration (ppm)[a] | | |
|---|---|---|---|---|---|
| | | | NH3 | $NO_2^-$ | $NO_3^-$ |
| 140 | −1.1 | Pd/Al$_2$O$_3$ | 2.45 | 0 | 2.56 |
| | | Pd/C | 2.43 | 0 | 1.66 |
| | | Pd/SiO$_2$ | 1.62 | 0 | 1.64 |
| | −1.0 | Pd/SiO$_2$ | 1.09 | 0 | 5.88 |

[a]Concentration ppm as N.
[b]Electrocatalytic reduction on OD-Ag and potential vs Ag/AgCl.
[c] Catalytic step catalysts. OD-Ag geometric area 6 cm$^2$, 31.5° C. charge passed, electrolyte volume 15 ml, stir rate 350 rpm. Catalytic process condition: different Pd-based catalysts 50 mg, same reaction cell continuously used after first step, CO$_2$ flow rate: 50 ml/min, room temperature and ambient pressure, stir rate 800 rpm.

TABLE 11

Summary of Electrocatalytic and Catalytic Reduction of Nitrate

| $NO_3^-$ Concentration (ppm) | Electrocatalytic/ Catalytic | Catalysts | X (%) | $S_{NH3}$ (%) | SN2 (%) | Ref. |
|---|---|---|---|---|---|---|
| 700 | Electrocatalytic | Cu | 90 | 77.3 | 1 | [a] |
| 112 | Electrocatalytic | Pd$_{0.2}$ Sn$_{0.8}$/SS | 100 | 24 | 34 | [b] |
| 112 | Electrocatalytic | Blended Sn$_{0.8}$Pd$_{0.2}$/SS | 100 | 14 | 81 | [c] |
| 700 | Electrocatalytic | Sn | 99 | 8 | 92 | [d] |
| 700 | Electrocatalytic | Bi | N/A | 3.8-19 | 58-65 | [e] |
| 50 | Catalytic | PdIn | 100 | 5 | 95 | [f] |
| 00 | Catalytic | PdIn | 82.2 | 25.6 | 74.4 | [g] |
| 360 | Catalytic | PdCu | >90 | 3.4 | 93.5 | [h] |
| 30 | Catalytic | PdSn | 100 | 9 | 91 | [i] |
| 140 | Combined | OD-Ag + Pd-based | 98 | 1.2 | 98.8 | This work |

Ref. List: Each reference is hereby incorporated by reference in its entirety.
[a] Polatides & Kyriacou, "Electrochemical Reduction of Nitrate Ion on Various Cathode Reaction Kinetics on Bronze Cathode," Journal of Applied Electrochemistry 35:421-427 (2005).
[b] Su et al., "Mode of Electrochemical Deposition on the Structure and Morphology of Bimetallic Electrodes and its Effect on Nitrate Reduction Toward Nitrogen Selectivity," Applied Catalysis B: Environmental 257 (2019).
[c] Katsounaros et al., "Efficient Electrochemical Reduction of Nitrate to Nitrogen on Tin Cathode at Very High Cathodic Potentials," Electrochimica Acta 52:1329-1338 (2006).
[d] Dortsiou & Kyriacou, "Electrochemical Reduction of Nitrate on Bismuth Cathodes," Journal of Electroanalytical Chemistry 630:69-74 (2009).
[e] Guo et al., "Insights into Nitrate Reduction over Indium-Decorated Palladium Nanoparticle Catalysts," ACS Catalysis 8:503-515 (2017).
[f] Marchesini et al., "Study of the Interactions of Pd,In with SiO$_2$ and Al$_2$O$_3$ Mixed Supports as Catalysts for the Hydrogenation of Nitrates in Water," Catalysis Communications 21:9-13 (2012).
[g] Constantinou et al., "Catalytic Removal of Nitrates from Waters," Catalysis Today 151:190-194 (2010).
[h] Hamid et al., "Highly Reactive and Selective Sn-Pd Bimetallic Catalyst Supported by Nanocrystalline ZSM-5 for Aqueous Nitrate Reduction," Applied Catalysis B: Environmental 187:37-46 (2016).

TABLE 12

Summary of Combined Electrocatalytic and Catalytic Nitrate Reduction Results

| Feed $NO_3^-$ (ppm) | Step 1 electrode | Voltage | Charge | $F_{NO2-}$ | $F_{H2}$ | Step 2 catalyst | $XNO3-$ | $SNH3$ | $SN2$ | $C_{NH3}$ (ppm) |
|---|---|---|---|---|---|---|---|---|---|---|
| 140 | OD-Ag | −1.1 | 31.5 | 83.2 | 4.9 | $Pd/Al_2O_3$ | 98.2 | 1.8 | 98.2 | 2.45 |
| 140 | (6 cm²) | −1.1 | 31.5 | 82.0 | 4.9 | Pd/C | 98.8 | 1.8 | 98.2 | 2.43 |
| 140 | | −1.1 | 31.5 | 85.6 | 4.2 | Pd/SiO2 | 98.8 | 1.2 | 98.8 | 1.62 |
| 140 | | −1.0 | 31.5 | 82 | 2.1 | Pd/SiO2 | 95.9 | 0.8 | 99.2 | 1.09 |
| 140 | | −1.0 | 29.5 | 84.6 | 2.3 | Pd/C | 90.9 | 1.5 | 98.5 | 1.8 |
| 70 | | −1.0 | 14.5 | 84 | 1.6 | Pd/C | 92.9 | 1.3 | 98.7 | 0.8 |

Conclusions

In conclusion, an OD-Ag electrode with over 12 times higher electrochemical surface area compared to commercial Ag foil was successfully prepared. Nitrate electrocatalytic reduction on OD-Ag was found to be controlled by electrode potential. Under the potential range of −0.9 V~−1.15 V (vs Ag/AgCl), electrocatalytic reduction of nitrate on OD-Ag can achieve high $NO_2^-$ selectivity of >95% and low $NH_3$ selectivity of <0.4%. In one same cell, the OD-Ag has demonstrated superior nitrate reduction performance with 98% conversion and 95% selectivity to nitrite, and subsequent catalytic reduction of nitrite has achieved 100% conversion and over 99% selectivity to $N_2$. The detected nitrate and ammonium in the final solution after combining the two steps were only 5 ppm and 1.1 ppm, respectively, no nitrite was detected. These results were lower than previously reported work in catalytic and electrocatalytic reduction of nitrate.

Example 2—Nitrite Reduction by $H_2$ Directly Generated from Water Electrolyzers Chemical and Materials 40 wt % Pt/C and $IrO_2$ were purchased from Premetek Co. Untreated carbon cloth and Teflon Gasket were ordered from Fuel Cell Store.

Electrode and Membrane Electrode Assembly (MEA) Fabrications

The MEA was assembled with a cathode electrode (Pt/C catalyst), a proton exchange membrane (PEM, Nafion 115), and an anode electrode ($IrO_2$ catalyst).

The cathode ink containing 80 wt % commercial 40 wt % Pt/C catalyst and 20% Nafion was sprayed on an untreated carbon cloth to obtain a catalyst loading of 1.15 $mg_{Pt}$ $cm^{-2}$. The anode catalyst used the same method to achieve 3.75 mg $cm^{-2}$ $IrO_2$ loading. The sprayed catalysts were dried in air overnight. Then, anode, cathode, and Nafion 115 membrane were hot pressed at 130° C. and 1000 psi for 3 mins.

Proton Exchange Membrane (PEM) Water Electrolyzer Test

The MEA with an active catalyst area of 5 $cm^2$ was assembly to a sandwich structure. Cathode and anode were fed into 100% relative humidity (RH) vapor water (60 ml min−1 high purity Argon) or liquid water (5.5 ml min−1). Single cell temperature and humidified Argon temperature were 80° C.

Water Splitting Combined with Nitrite Reduction

The water electrolysis was controlled by a SP 300 potentiostat. Linear sweep voltammetry (LSV) and 10 cycles cyclic voltammetry (CV) were tested to obtain steady-state operation. Then, constant current (−1.4 A, −280 mA/$cm^2$) was applied for PEM water splitting, and $H_2$ generated from the cathode was purged to a sealed nitrite reduction cell for nitrite removal. $CO_2$ was also fed (2.5 ml $min^{-1}$) to the nitrate reduction cell during the nitrite reduction process.

Example 3—Nitrite Selectivity on Oxide-Derived Silver in Electrocatalytic Nitrate Reduction Chemical and Materials All chemicals were used as received without purification. Silver foil (0.5 mm thick, 99.9985%), copper foil (0.5 mm thick, 99.9985%), platinum foil (0.025 mm thick, 99%), tin foil (0.025 mm thick, 99.9%), titanium foil (0.89 mm thick, 99.7%), zinc foil (0.1 mm thick, 99.994%), iron foil (0.5 mm thick, 99.99%), nickel foil (0.1 mm thick, 99.5%), palladium foil (0.025 mm thick, 99.9%), gold foil (0.05 mm thick, 99.95%), lead foil (0.76 mm thick, 99.8%), molybdenum foil (0.1 mm thick, 99.95%), tungsten foil (0.25 mm thick, 99.95%), aluminum foil (0.1 mm thick, 99.99%), cobalt foil (0.1 mm thick, 99.95%), zirconium foil (0.2 mm thick, 99.8%), vanadium foil (1.0 mm thick, 99.5%), and hydroxylamine hydrochloride ($NH_2OH·HCl$, 99%) were purchased from Alfa Aesar. Bismuth plate (>99.99%) was purchased from Amazon. Potassium nitrate ($KNO_3$, 99.7%), potassium chloride (KCl, 100%), potassium phosphate dibasic ($K_2HPO_4$, ≥98%), potassium phosphate monobasic ($KH_2PO_4$, ≥99%), sodium carbonate ($Na_2CO_3$, 100%), sodium chloride (NaCl, ≥99%), sodium sulfate ($Na_2SO_4$, ≥99%), sodium bicarbonate ($NaHCO_3$, 100%), hydrogen peroxide ($H_2O_2$, 30%), nitric acid ($HNO_3$, 70%), hydrochloric acid (HCl, 37%), phosphoric acid ($H_3PO_4$, ≥85%), and methanol (HPLC grade) were purchased from Fisher Chemical. Sodium salicylate (≥99.5%), sodium hydroxide (NaOH, ≥97%), potassium hydroxide (KOH, ≥85%), sodium nitroferricyanide dihydrate ($Na_2[Fe(CN)_5NO]·2H_2O$, ≥99%), sodium hypochlorite solution (NaOCl, available chlorine 4.00-4.99%), N-(1-Naphthyl)ethylenediamine dihydrochloride (NED, ≥97%), sulfanilamide (≥99%), and palladium on active carbon (Pd/C, 5 wt. % Pd loading) were purchased from Sigma-Aldrich. Silver nanopowder (80-100 nm, 99.99%) was purchased from US Research Nanomaterials, Inc. Potassium nitrite ($KNO_2$, 97%), lead(II) nitrate ($Pb(NO_3)_2$, ≥99%), and n-Octylamine (>99%) were purchased from Acros Organic. 8-quinolinol was purchased from TCI. Ammonia standard solution (100 mg $L^{-1}$ as $NH_3$—N) was purchased from Hach. Silver standard solution (1,000 μg $mL^{-1}$ of $Ag^+$ in 5% v/v nitric acid) was purchased from Inorganic Ventures. Plain carbon cloth, Vulcan XC-72R, PTFE gaskets, and Nafion 115 membrane were purchased from Fuel Cell Store. 40% Pt on Vulcan XC-72 (Pt/C) and $IrO_2$ powder were purchased from Premetek. Argon (Ar, Ultra High Purity, 99.999%), hydrogen ($H_2$, Ultra High Purity, 99.999%), and carbon dioxide ($CO_2$, industrial grade) were purchased from Airgas. $H_2$ calibration gases (10 ppm, 100 ppm, 1,000 ppm, 5,000 ppm, 10,000 ppm, balance helium) and $N_2O$ calibration gases (95 ppm, 1,000 ppm, balance nitrogen) were purchased from Cal Gas Direct. Nitrogen ($N_2$) calibration gases (100 ppm, 1,000 ppm, 10,000 ppm, 100,000 ppm, balance helium) were purchased from Shop Cross. Nitrogen oxides detector tube (No. 175U, 1-60 ppm) was purchased from Kitagawa America. Deionized (DI) water (18.2 MΩ cm, Barnstead™ E-Pure™) was used for app parts of this example.

Preparation of Working Electrodes

Oxide-derived silver (OD-Ag) was prepared in a standard three-electrode system by a modified square wave voltammetric (SWV) method according to Ma et al., "Selective and Efficient Reduction of Carbon Dioxide to Carbon Monoxide on Oxide-Derived Nanostructured Silver Electrocatalysts," Angew. Chem. Int. Ed. 55:9748-9752 (2016), which is hereby incorporated by reference in its entirety). A polycrystalline silver foil, a silver/silver chloride (Ag/AgCl) electrode (saturated KCl, $E^0$=0.197 V vs. SHE, Pine Research), and a platinum foil were used as the working electrode, reference electrode, and counter electrode, respectively. 0.2 M NaOH was used as the electrolyte. To synthesize OD-$AgO_x$, symmetric square-wave pulse potential from 0 to 1 $V_{Ag/AgCl}$ was applied by a Biologic SP-300 potentiostat/galvanostat on the Ag foil at a frequency of 500 Hz for 3 h (video S1, with a 16× play rare). Then, a constant potential (−1.30 $V_{Ag/AgCl}$) was applied for 10 min to reduce OD-$AgO_x$, to OD-Ag.

The electrode with Ag nanoparticles on Ag foil (Ag NPs/Ag) was prepared by airbrushing a 2-propanol dispersion of Ag NPs (10 mg $mL^{-1}$) and Nafion on both sides of the Ag foil. The mass ratio of Ag NPs and Nafion was 4:1. The catalyst loading was controlled at 1.5 $mg_{Ag}$ $cm^{-2}$.

Materials Characterization

Physical Characterization

X-ray diffraction (XRD) crystallography was carried out on a Siemens D500 X-ray diffractometer with a Cu Kα source (λ=1.5418 Å) at a tube voltage of 45 kV and a tube current of 30 mA. The scan was performed at a rate of 10° $min^{-1}$ and a step size of 0.01°. X-ray photoelectron spectroscopy (XPS) was carried out on a Kratos Amicus/ESCA 3400 X-ray photoelectron spectrometer with Mg Kα X-ray (1,253.7 eV). All spectra were calibrated with the C is peak at 284.8 eV. Scanning electron microscopy (SEM) was performed on a FEI Quanta-250 field-emission scanning electron microscope. Inductively coupled plasma-optical emission spectroscopy (ICP-OES) was performed on a PerkinElmer® Optima™ 8000 ICP-OES instrument. The calibration in the range of 0.6-100 ppb was established by diluting the standard $Ag^+$ solution (1,000 μg $mL^{-1}$) with 5% v/v nitric acid.

Determination of the Electrochemical Active Surface Area (ECSA)

The ECSA of the Ag electrodes (OD-Ag, Ag foil, and Ag NPs/Ag) was measured by underpotential deposition (UPD) of Pb (Kim et al., "Achieving Selective and Efficient Electrocatalytic Activity for CO2 Reduction Using Immobilized Silver Nanoparticles," J. Am. Chem. Soc. 137:13844-13850 (2015), which is hereby incorporated by reference in its entirety). Cyclic voltammetry (CV) was conducted in a three-electrode system with an electrolyte consisting of 5 mM Pb($NO_3$)$_2$, 10 mM $HNO_3$, and 10 mM KCl between −0.10 and −0.48 $V_{Ag/AgCl}$ with a scan rate of 10 mV $s^{-1}$. The peak for monolayer UPD of Pb was used for ECSA calculation, which corresponds to a charge of 1.67×$10^{-3}$ $cm^2$ $μC^{-1}$.

Determination of the Active Surface Area of Pd

The active surface area of Pd for Pd/C was measured by $H_2$ pulse chemisorption on an AutoChem II 2920 chemisorption analyzer. The catalyst was first reduced at 200° C. (10° C. $min^{-1}$ ramp rate) under a flow of 10% $H_2$/Ar (50 mL $min^{-1}$) for 1 h. Then, a 1-hour purging step was carried out with Ar (20 mL $min^{-1}$) at 200° C. before the catalyst was cooled to 35° C. After the baseline signal from the thermal conductivity detector was stable, a series of pulse streams of 10% $H_2$—Ar was injected until the injected gas volume emerged from the sample tube was unchanged and the detected peak integral was constant. The stoichiometric factor for $H_2$ adsorption was assumed to be 2 (one $H_2$ molecule for two Pd atoms) (Prelazzi et al., "Comparison of $H_2$Adsorption, $O_2$Adsorption, $H_2$Titration, and $O_2$Titration on Supported Palladium Catalysts," J. Catal. 181:73-79 (1999), which is hereby incorporated by reference in its entirety).

Electrocatalytic and Catalytic Activity Measurements

Electrochemical Measurements

Linear sweep voltammetry (LSV) measurements were carried out in a single-compartment cell with a three-electrode configuration without stirring. The electrolyte consisted of 0.1 M KCl, and its pH was adjusted to 4 by adding hydrochloric acid. The scan rate was 5 mV $s^{-1}$.

The electrochemical reduction of $NO_3^-$ (NO3RR) was performed by chronoamperometry (CA) at room temperature in a dual-chamber H-type cell with a three-electrode configuration, and the cathode chamber was airtight. Each chamber contained 15 mL of the electrolyte (0.1 M KCl, pH=4) and the two chambers were separated by a Nafion 115 membrane ($K^+$ form). $KNO_3$ was added to the catholyte, which was magnetically stirred at 350 r.p.m. by a PTFE-coated stir bar (20×6 mm). The geometric area of the working electrode was chosen depending on the experimental conditions, typically 2, 4, or 6 $cm^2$. Specifically, at low overpotentials and $NO_3^-$ concentration such as −1.00 and −1.10 $V_{Ag/AgCl}$ with 0.01 M $NO_3^-$, a 6 $cm^2$-electrode was used to ensure the reaction was complete in a few hours. At high overpotentials or $NO_3^-$ concentration, smaller electrodes were used to avoid overload of the potentiostat. A graphite rod was used as the counter electrode. All electrode potentials were measured against the Ag/AgCl reference electrode (saturated KCl) with 85% IR-compensation. Ar was fed into the catholyte at a flow rate of 12.5 mL $min^{-1}$. The outlet gas from the cathode chamber was bubbled into an external trapping solution containing 25 mL of 0.1 M KCl (pH=3) to absorb any $NH_3$ that evolved from the system. The gas flow was then introduced to the on-line gas chromatography (GC) to quantify $H_2$. The duration of CA was chosen depending on the total applied charge, as detailed in the Brief Description of the Drawings. The current density was calculated based on the geometric area (for both sides) of the electrode. The entire experimental setup is shown in FIG. 11.

The conversion of $NO_3^-$ (X, previously referred to as "C") and selectivity to product i ($S_i$, i=$NH_4^+$, $NO_2^-$, or $NH_2OH$) were calculated by Eq. 3 and Eq. 4:

$$X = \frac{n_0 - n}{n_0} \times 100\% \quad \text{(Eq. 3)}$$

$$S = \frac{n_i}{n_0 - n} \times 100\% \quad \text{(Eq. 4)}$$

where $n_0$ is the initial amount of $NO_3^-$ (mol); n is the amount of $NO_3^-$ after electrolysis (mol); $n_i$ is the amount of product i (mol).

The faradaic efficiency of product i ($FE_i$) was calculated by Eq. 5:

$$FE_i = \frac{n_i z_i F}{Q} \times 100\% \quad \text{(Eq. 5)}$$

where $z_i$ is the number of electrons transferred to product i; F is the Faraday constant (96,485 C mol$^{-1}$); Q is the total charge passed through the electrolytic cell (C).

Isotopic Experiment and Kinetics Modeling

The isotopic experiment was conducted in 0.1 M KCl (pH=4) with 0.025 M K$^{15}$NO$_3$ and 0.025 M K$^{14}$NO$_2$. CA was carried out with different applied charges. The N-species in the resulting solution were quantified by HPLC (for $^{15}$NO$_3^-$), colorimetry (for total $^{14}$NO$_2^-$ and $^{15}$NO$_2^-$), and NMR ($^{14}$NH$_4^+$ and $^{15}$NH$_4^+$), as detailed in 6.1 and 6.7.

The following reactions in the electrolytic cell were considered:

$^{15}$NO$_3^- \rightarrow {}^{15}$NO$_2^-$     $k_1$ $^{14}$NO$_2^- \rightarrow {}^{14}$NH$_2^-$     $k_2$ $^{15}$NO$_3^- \rightarrow {}^{15}$NH$_4^-$     $k_3$ $^{15}$NO$_2^- \rightarrow {}^{15}$NH$_4^-$     $k_4$ All reactions were assumed to be first-order (Katsounaros et al., "Efficient Electrochemical Reduction of Nitrate to Nitrogen on Tin Cathode at Very High Cathodic Potentials," *Electrochim. Acta* 52:1329-1338 (2006); Katsounaros et al., "Reaction Pathways in the Electrochemical Reduction of Nitrate on Tin," *Electrochim. Acta* 71:270-276 (2012), which are hereby incorporated by reference in their entirety) without isotopic effect ($k_2=k_4$). In addition, 100% $^{15}$N and $^{14}$N balances were assumed, in light of the ~100% nitrogen balance for the electro-reduction of NO$_3^-$ and NO$_2^-$, and the low selectivity towards NO$_2$, NO, N$_2$O, and NH$_2$OH (FIG. 31D and Table 13).

TABLE 13

Content of Gaseous Products (NO$_2$, NO, and N$_2$O) for the Electro-Reduction of NO$_3^-$ or NO$_2^-$ on OD-Ag. The Electrolyte was 0.1M KCl and the Applied Potential was $-1.50$ V$_{Ag/AgCl}$

| Entry | Reactants | Ar flow rate (mL min$^{-1}$) | Reaction time (min) | Product detected | Content (ppm) | Charge (C) |
|---|---|---|---|---|---|---|
| 1 | 0.05M NO$_3^-$ | 12.5 | 4 | Total NO + N$_2$O | 3.0 | 25.4 |
| 2 | 0.025M NO$_3^-$ + 0.025M NO$_2^-$ | 20 | 35 | | 32.6 | 190.7 |
| 3 | 0.025M NO$_3^-$ + 0.025M NO$_2^-$ | 12.5 | 4 | Total NO + NO$_2$ | 2.4 | 21.2 |

Note:
Estimation of FE of N$_2$O based on Entry 2.

$n_{N_2O}$=20 mL min$^{-1}$×35 min×32.6×10$^{-6}$×0.0416 mol L$^{-1}$/1000=9.49×10$^{-7}$ (mol)

Assuming all N$_2$O was reduced from NO$_3^-$ (NO$_2^-$), the upper (lower) limit of FE is $$FE_{N_2O,max} = \frac{9.49 \times 10^{-7} \text{ mol} \times 4 \times 96485 \, C \, \text{mol}^{-1}}{190.7 \, C} \times 100\% = 0.19\%$$

$$FE_{N_2O,min} = \frac{9.49 \times 10^{-7} \text{ mol} \times 4 \times 96485 \, C \, \text{mol}^{-1}}{190.7 \, C} \times 100\% = 0.096\%$$

Similarly, results in the above table show a negligible contribution of NO$_2$ and NO (≤0.007%) to the total FE in the system.

Let A=$^{15}$NO$_3^-$, B=$^{15}$NO$_2^-$, C=$^{15}$NH$_4^+$, b=$^{14}$NO$_2^-$, and c=$^{14}$NH$_4^+$. The following 5 equations can be obtained by rate law:

$$\frac{d[A]}{dt} = -k_1[A] - k_3[A] \quad \text{(Eq. 7)}$$

$$\frac{d[B]}{dt} = k_1[A] - k_2[B] \quad \text{(Eq. 8)}$$

$$\frac{d[C]}{dt} = k_3[A] + k_2[B] \quad \text{(Eq. 9)}$$

$$\frac{d[b]}{dt} = -k_2[b] \quad \text{(Eq. 10)}$$

$$\frac{d[c]}{dt} = k_2[b] \quad \text{(Eq. 11)}$$

By using the boundary conditions ([X]=[X]$_0$ for all species at t=0) and N balance ([A]+[B]+[C]=[A]$_0$+[B]$_0$+[C]$_0$), the solutions for [A], [b], and [B] are:

$$[A] = [A]_0 e^{-(k_1+k_3)t} \quad \text{(Eq. 12)}$$

$$[b] = [b]_0 e^{-k_2 t} \quad \text{(Eq. 13)}$$

$$[B] = \frac{k_1 [A]_0}{k_2 - k_1 - k_3} \left[ e^{-(k_1+k_3)t} - e^{-k_2 t} \right] = f(t) k_1 \quad \text{(Eq. 14)}$$

Therefore, $k_2$ and ($k_1+k_3$) were calculated by linear regression of $\ln([b]/[b]_0)$ and $\ln([A]/[A]_0)$ on t; $k_1$ was calculated by linear regression of [B] on $$f(t) = \frac{[A]_0}{k_2 - k_1 - k_3} \left[ e^{-(k_1+k_3)t} - e^{-k_2 t} \right].$$

The fitted curves and calculated rate constants are summarized in FIGS. 32A-32G.

Catalytic Reduction of NO$_2^-$

Catalytic reduction of NO$_2^-$ was carried out at room temperature in a gastight reactor. Specifically, 50 mg of Pd/C was suspended in 15 mL of the NO$_2^-$-containing solution which was magnetically stirred at 800 r.p.m. The solution was sparged with CO$_2$ at 25 mL min$^{-1}$ by a gas dispersion tube (Ace Glass, 7 mm O.D., 25-50 micron porosity) during the test to maintain the CO$_2$-buffered condition (Martinez et al., "State-of-the-Art and Perspectives of the Catalytic and Electrocatalytic Reduction of Aqueous Nitrates," *Appl. Catal. B* 207:42-59 (2017), which is hereby incorporated by reference in its entirety). After the solution was saturated with CO$_2$ (pH~7), H$_2$ was fed at 25 mL min$^{-1}$ via another gas dispersion tube. During the measurement, the solution was sampled periodically from the reactor, followed by dilution and filtration for product analysis.

The observed reaction rate constant $k_{obs}$ (min$^{-1}$) was calculated assuming pseudo-first-order dependence on NO$_2^-$ concentration (H$_2$ is in excess) by (Eq. 15)

$$\frac{dc}{dt} = -k_{obs}c \qquad \text{(Eq. 15)}$$

where c is the concentration of $NO_2^-$ (mg $L^{-1}$) and t is the reaction time (min) (Clark et al., "Mechanistic Insights into pH-Controlled Nitrite Reduction to Ammonia and Hydrazine over Rhodium," *ACS Catal.* 10:494-509 (2019), which is hereby incorporated by reference in its entirety). The rate constant was normalized to the concentration of surface Pd in the solution by (Eq. 16)

$$E = \frac{k_{obs}}{\frac{AmM}{aN_AV}} \qquad \text{(Eq. 16)}$$

where A is the active surface area of Pd ($m^2\ g^{-1}$), m is the mass of Pd in the reactor (0.050 g), M is the molar mass of Pd (106.42 $g_{Pd}\ mol^{-1}$), a is the cross-sectional area of one Pd atom ($7.87\times10^{-20}\ m^2$), $N_A$ is the Avogadro constant ($6.02\times10^{23}\ mol^{-1}$), V is the volume of the $NO_2^-$-containing solution (0.015 L). The unit of the normalized k calculated from the above equation is L $g_{Pd}^{-1}\ min^{-1}$.

Combined Process for Agricultural Wastewater Denitrification

The combined denitrification process was carried out in three media: (1) 0.1 M KCl; (2) simulated waste stream from ion-exchange columns (containing 400 mg $L^{-1}$ of NaCl, 400 mg $L^{-1}$ of $Na_2SO_4$, and 8,000 mg $L^{-1}$ of $NaHCO_3$ in DI water) (Paidar et al., "Electrochemical Removal of Nitrate Ions in Waste Solutions After Regeneration of Ion Exchange Columns," *J. Appl. Electrochem.* 29:611-617 (1999), which is hereby incorporated by reference in its entirety); and (3) real agricultural wastewater obtained from Des Moines Water Works, Iowa (filtered to remove the insoluble matters). Additional $KNO_3$ was added to set the concentration of $NO_3^-$ at 0.01 M (corresponding to 140 ppm-N) to simulate the $NO_3^-$ content enriched in waste streams. The two-step denitrification treatment was performed as described in 4.1 (for $NO_3^-$ to $NO_2^-$) and 4.3 (for $NO_2^-$ to $N_2$).

A proton-exchange membrane (PEM)-based water electrolyzer was utilized to generate on-site $H_2$ for the second step (catalytic reduction of $NO_2^-$) (FIGS. 33A-33B). The membrane electrode assembly (MEA) included a Pt/C cathode, $IrO_2$ anode, and a Nafion 115 membrane ($H^+$ form). The electrodes were prepared by spraying the dispersion containing the catalyst and Nafion ionomer (4:1 in mass) onto plain carbon cloths. The catalyst loading was 1.15 mg $cm^{-2}$ (in Pt) for the cathode and 3.75 mg $cm^{-2}$ (in $IrO_2$) for the anode. The MEA was hot-pressed at 130° C. and 1,000 psi for 3 min before assembled into the cell hardware containing two PTFE gaskets and two graphite end plates with serpentine flow channels. The active area of the electrodes was 5 $cm^2$. The cell was operated at 80° C. with DI water supplied in both cathode and anode chambers at a flow rate of 5.5 mL $min^{-1}$ by a peristaltic pump. Repeated CV scans were carried out between 0 and 1.6 V until a stable CV curve was obtained. Constant-current electrolysis was then performed at 1.4 Å, and the generated $H_2$ from the cathode compartment was directly sparged in the $NO_2^-$-containing solution.

Computational Methods

The Vienna ab initio Simulation Package (VASP) was used for density functional theory (DFT) calculations (Kresse & Furthmuller, "Efficient Iterative Schemes for Ab Initio Total-Energy Calculations Using a Plane-Wave Basis Set," *Phys. Rev. B* 54:11169-11186 (1996); Kresse & Furthmuller, "Efficiency of Ab-Initio Total Energy Calculations for Metals and Semiconductors Using a Plane-Wave Basis Set," *Comput. Mater. Sci.* 6:15-50 (1996), which are hereby incorporated by reference in their entirety). Projector augmented-wave (PAW) potentials were implemented to describe electron-ion interactions (P. E. Blöchl, "Projector Augmented-Wave Method," *Phys. Rev. B* 50:17953-17979 (1994); Kresse & Joubert, "From Ultrasoft Pseudopotentials to the Projector Augmented-Wave Method," *Phys. Rev. B* 59:1758-1775 (1999), which are hereby incorporated by reference in their entirety), and the Perdew-Wang functional was used within the generalized gradient approximation (GGA-PW91) to determine exchange-correlation energies (Perdew & Wang, "Accurate and Simple Analytic Representation of the Electron-Gas Correlation Energy," *Phys. Rev. B* 45:13244-13249 (1992), which is hereby incorporated by reference in its entirety). Electronic energies were calculated to a precision of $10^{-4}$ eV, using a kinetic energy cutoff of 400 eV. Geometry optimizations were performed until the forces on all atoms were less than 0.02 eV $Å^{-1}$. Optimized lattice constants were calculated as follows (experimental values in parentheses, all values in Å): Ag 4.16 (4.09), Cu 3.64 (3.61), and Pd 3.96 (3.89) (Haynes et al., *CRC Handbook of Chemistry and Physics*, Ed.: W. M. Haynes, CRC (2016), which is hereby incorporated by reference in its entirety).

The values reported in reference to the Ag/AgCl electrode were calculated by shifting the potential vs. RHE (the typical reference for the computational hydrogen electrode) according to the difference in standard reduction potentials. Potentials (E) versus Ag/AgCl in saturated KCl relative to those calculated vs. RHE were therefore calculated using Eq. 17:

$$E_{Ag/AgCl} = E_{RHE} - 0.197\ V - 0.059\ V \times pH \qquad \text{(Eq. 17)}$$

Quantification Methods

Quantification of $NO_3^-$ and $NO_2^-$ $NO_3^-$ and $NO_2^-$ were analyzed by High-Performance Liquid Chromatography (HPLC) (Chou et al., "A High Performance Liquid Chromatography Method for Determining Nitrate and Nitrite Levels in Vegetables," *J. Food Drug Anal.* 11:233-238 (2003); Chou et al., "A High Performance Liquid Chromatography Method for Determining Nitrate and Nitrite Levels in Vegetables," *Journal of Food and Drug Analysis* 11:233-238 (2003), which is hereby incorporated by reference in its entirety) (Agilent Technologies, 1260 Infinity II LC System) equipped with a variable wavelength detector (Agilent 1260 Infinity Variable Wavelength Detector VL). The wavelength of 213 nm was used for detection. A C18 HPLC column (Gemini® 3 μm, 110 Å, 100×3 mm) was used for analysis at 25° C. with a binary gradient pumping method to drive mobile phase at 0.4 mL $min^{-1}$. The mobile phase consisted of 0.01 M n-Octylamine in a mixed solution containing 30 vol % of methanol and 70 vol % of DI water, and the pH of the mobile phase was adjusted to 7.0 with $H_3PO_4$. The running time was 30 min for each sample, and the retention time for $NO_3^-$ and $NO_2$ was around 18 and 16 min, respectively. The calibration solutions for $NO_3^-$ or $NO_2$ were prepared with $KNO_3$ and $KNO_2$ in the concentration range of 0.0625-2 mM (FIGS. 34A-34B).

$NO_2^-$ at lower concentrations was determined by colorimetry based on the Griess reaction. Two reagents were prepared and stored at 4° C., including (a) solution A, containing 10 mg $mL^{-1}$ of sulfanilamide and 1.2 M HCl; and (b) solution B, containing 1.0 mg $mL^{-1}$ of N-(1-Naphthyl) ethylenediamine dihydrochloride (NED). Specifically, the coloring reagent was prepared by mixing equal volumes of solution A and B. 0.6 mL of the coloring reagent was then mixed with 4 mL of the neutralized sample solution at room temperature. The absorbance measurement was performed on a UV-Vis spectrophotometer (Shimadzu UV-2700) at a wavelength of 540 nm after 15 min of color development. The calibration curve (FIGS. 35A-35F) was established by testing a series of standard $NO_2^-$ solutions in the concentration range of 2.7-65.2 µM.

Quantification of $H_2$ and $N_2$

The produced $H_2$ and $N_2$ from the reactor were analyzed by an on-line GC (SRI Instruments, 8610C, Multiple Gas #3) equipped with HayeSep D and MolSieve 5 Å columns. A thermal conductivity detector was used to detect $H_2$ and $N_2$. The calibration curves for $H_2$ (10-10,000 ppm) and $N_2$ (100-100,000 ppm) were established by analyzing the calibration gases.

To quantify the generated $H_2$ during the NO3RR measurements, the GC program was started at 2 min after NO3RR was initiated. A 12.5-min programmed cycle was repeated, including 8 min of the GC running period and 4.5 min of the cooling period. For each cycle, the rate of $H_2$ generation (r, mol s$^{-1}$) was calculated using Eq. 18

$$r = c \times 10^{-6} \times \frac{p\dot{V} \times 10^{-6} \div 60}{RT} \quad \text{(Eq. 18)}$$

where c is the $H_2$ content (ppm); V is the volumetric flow rate of the inlet gas (12.5 mL min$^{-1}$); p is the atmospheric pressure (p=1.013×10$^5$ Pa); R is the gas constant (R=8.314 J mol$^{-1}$ K$^{-1}$); T is the room temperature (293.15 K). The total amount of $H_2$ production (mol) was calculated by integrating the plot of $H_2$ production rate (mol s$^{-1}$) vs. reaction time (s) with polynomial curve fitting.

The composition of the gaseous product of catalytic $NO_2^-$ reduction using on-line GC was also examined. The experiment was carried out as described in the catalytic reduction of $NO_2^-$ discussion supra with a lower feeding rate of $H_2$ (14.5 mL min$^{-1}$) and $CO_2$ (2.5 ml min$^{-1}$), and a higher $NO_2^-$ concentration (0.5 M) to ensure the signal of $N_2$ was detectable by GC. The total reaction time was 2 h. To quantify the generated $N_2$, the GC program was started at 5 min after the catalytic reduction was initiated. An 8-min programmed cycle was repeated, including 6 min of the GC running period and 2 min of the cooling period. 15 GC runs were performed in total during the reaction. The consumption of feeding gases ($H_2$ and $CO_2$) and generation of $N_2$ during the reduction of $NO_2^-$ was considered ($2NO_2^- + 3H_2 + 2CO_2 \rightarrow N_2 + 2HCO_3^- + 2H_2O$), which results in a non-negligible decrease in the flow rate of the gas mixture. The net consumption rate of gas (mL min') was calculated by Eq. 19:

$$\text{Net consumption rate} = \frac{3+2-1}{2} \times (n_0 - n) \times \frac{RT}{P} \times 10^6 \div \frac{t}{60} \quad \text{(Eq. 19)}$$

where no is the initial amount of $NO_2^-$ (mol); n is the amount of $NO_2^-$ after the reaction (mol); t is the reaction time (s). The calibrated flow rate of the GC inlet gas ($\dot{V}'$) was then obtained by subtracting the net consumption rate from the total feeding rate of $H_2$ and $CO_2$ into the reactor. Other steps for calculating the $N_2$ production were the same as for $H_2$.

Quantification of $NO_2$ and NO

The total concentration of $NO_2$ and NO in the outlet gas of the reactor was tested by nitrogen oxide detector tubes (Kitagawa America, No. 175U) with a measuring range of 1-60 ppm. Gas was sampled by an aspirating pump (Kitagawa America, AP-20), and the content of total $NO_2$ and NO was obtained by reading the scale of the maximum point of the purple stained layer, where the colorimetric reaction occurs in the presence of $NO_2$ or NO:

$$NO + CrO_3 + H_2SO_4 \rightarrow NO_2$$

$NO_2$ + 3,3'-Dimethylnaphithidine → Nitroso-compound (pale purple)

Quantification of $N_2O$

The concentration of $N_2O$ in the outlet gas of the reactor was analyzed by an off-line GC equipped with an electron capture detector. The calibration curve of $N_{2O}$ was established by testing the standard gases in the range of 0.1-300 ppm. The outlet gas from the reactor was collected in sample bags (FlexFoil PLUS, SKC, Inc) and injected into GC for analysis.

Quantification of $NH_4^+$ $NH_4^+$ was quantified by indophenol blue colorimetry (Chen et al., "Revealing Nitrogen-Containing Species in Commercial Catalysts Used for Ammonia Electrosynthesis." *Nature Catalysis* 3:1055-1061 (2020); Kim et al., "Lithium-Mediated Ammonia Synthesis from Water and Nitrogen: A Membrane-Free Approach Enabled by an Immiscible Aqueous/Organic Hybrid Electrolyte System," *Green Chem.* 21:3839-3845 (2019), which are hereby incorporated by reference in their entirety). Three reagents were prepared, including (a) coloring solution, containing 0.4 M sodium salicylate and 0.32 M NaOH; (b) oxidizing solution, containing 0.75 M NaOH in NaClO solution (available chlorine: 4.00-4.99%); and (c) catalyst solution, containing 10 mg mL$^{-1}$ of $Na_2[Fe(CN)_5NO]\cdot 2H_2O$. Specifically, 50 µL of the oxidizing solution, 500 µL of the coloring solution, and 50 µL of the catalyst solution were added sequentially into 4 mL of the testing sample, followed by ultrasonication for 10 s to mix the reagents. The absorbance measurement was performed on a UV-Vis spectrophotometer (Shimadzu UV-2700) at a wavelength of 665 nm after 2 h of color development. The calibration curves (FIGS. 35A-35F) were established by examining a series of standard $NH_4^+$ solutions in the concentration range of 5-300 µM. It should be noted that $NH_4^+$ quantification by colorimetry is pH-sensitive. Therefore, multiple calibration curves were prepared according to the specific composition of the sample solutions. For the $CO_2$-saturated solutions, the pH was adjusted to 13 by adding KOH before the colorimetric test.

Quantification of $NH_2OH$ $NH_2OH$ was determined by a colorimetric method (Frear & Burrell, "Spectrophotometric Method for Determining Hydroxylamine Reductase Activity in Higher Plants," *Anal. Chem.* 27:1664-1665 (1955), which is hereby incorporated by reference in its entirety). 1 mL of the sample solution, 1 mL of 0.05 M phosphate buffer solution (pH=6.8), 0.8 mL of DI water, 0.2 mL of trichloroacetic acid, 1 mL of 8-quinolinol, and 1 mL of 1 M $Na_2CO_3$ solution were mixed and placed in a boiling water bath for 1 min for color development. The solution was then removed from the water bath and cooled at room temperature for 15 min. The absorbance was measured at 705 nm on a UV-Vis spectrophotometer. The calibration curve (FIGS. 35A-35F) was established by testing a series of $NH_2OH$ solutions in the concentration range of 6-40 µM.

Quantification of $^{14}NH_4^+$ and $^{15}NH_4^+$ $^{14}NH_4+$ and $^{15}NH_4^+$ were quantified by $^1H$ nuclear magnetic resonance (NMR) spectroscopy obtained on a Bruker Avance III 600 Spectrometer. Samples were prepared by properly diluting the electrolyte with a solution containing 0.1 M $H_2SO_4$ and 0.1 M KCl, and then mixing 0.8 mL of the diluted solution with 0.2 mL of DMSO-$d_6$. Calibration curves were established by testing a series of solutions containing $^{14}NH_4^+$ and $^{15}NH_4^+$ in 0.1 M $H_2SO_4$ and 0.1 M KCl with concentrations ranging from 5 to 80 μM (FIGS. 36A-36B). The scan number was 2,048. Water suppression was performed for all NMR measurements.

Results and Discussion

Strong Electrocatalytic Preference on Ag for $NO_3^-$-to-$NO_2^-$ Reaction

Owing to the higher reactivity of $NO_2^-$ than the stable $NO_3^-$, it is generally easier to electrochemically reduce $NO_2^-$ on most metal surfaces. Indeed, as observed in linear sweep voltammetry (LSV), 15 of 18 commonly used metal foils possessed a more negative onset potential for the $NO_3^-$ reduction reaction (NO3RR) than for the $NO_2^-$ reduction reaction (NO2RR), rendering the onset-potential difference (i.e., "$E_{onset}$(NO3RR)–$E_{onset}$(NO2RR)") negative: gradually from −160 to −10 mV on Ti, Pt, Zr, Fe, Ni, Pd, Au, V, Mo, Bi, Co, Zn, Sn, Al, and W, respectively (FIG. 37A and Table 14). Note that the onset potential was consistently defined as the potential under which −0.75 mA cm$^{-2}$ was reached in LSV for NO3RR, NO2RR, and HER (hydrogen evolution reaction) in this work. Clearly, those metal surfaces prefer the NO2RR to the NO3RR under the same test conditions. No preference between NO3RR and NO2RR was observed on Pb foil: the onset potential of the NO3RR was precisely the same as that of the NO2RR (−1.60 $V_{Ag/AgCl}$, $V_{Ag/AgCl}$: V vs. Ag/AgCl, hereinafter).

TABLE 14

Summary of Onset Potentials ($V_{Ag/AgCl}$, Defined as the Potential in which the Current Density Attained −0.75 mA cm$^{-2}$) and Onset Potential Difference on Different Electrodes. The Linear Sweep Voltammograms are Shown in FIGs. 38A-38P and FIGs. 37B-37C

| Electrode | $E_{NO3RR}$ ($V_{Ag/AgCl}$) | $E_{NO2RR}$ ($V_{Ag/AgCl}$) | $E_{HER}$ ($V_{Ag/AgCl}$) | $E_{NO3RR}$ − $E_{NO2RR}$ (mV) | $E_{NO3RR}$ − $E_{HER}$ (mV) |
|---|---|---|---|---|---|
| Ti | −1.37 | −1.21 | −1.51 | −160 | 140 |
| Pt | −0.91 | −0.76 | −0.90 | −150 | −10 |
| Zr | −1.56 | −1.41 | −1.65 | −150 | 90 |
| Fe | −1.08 | −0.94 | −1.14 | −140 | 60 |
| Ni | −0.95 | −0.81 | −1.11 | −140 | 160 |
| Pd | −1.07 | −1.00 | −1.10 | −70 | 30 |
| Au | −1.26 | −1.21 | −1.33 | −50 | 70 |
| V | −1.30 | −1.25 | −1.40 | −50 | 100 |
| Mo | −1.23 | −1.19 | −1.21 | −40 | −20 |
| Bi | −1.42 | −1.38 | −1.52 | −40 | 100 |
| Co | −0.84 | −0.80 | −1.21 | −40 | 370 |
| Zn | −1.33 | −1.30 | −1.61 | −30 | 280 |
| Sn | −1.68 | −1.66 | −1.64 | −20 | −40 |
| Al | −1.98 | −1.96 | −1.91 | −20 | −70 |
| W | −1.24 | −1.23 | −1.27 | −10 | 30 |
| Pb | −1.60 | −1.60 | −1.71 | 0 | 110 |
| Cu | −0.94 | −0.99 | −1.35 | 50 | 410 |
| Ag | −1.00 | −1.41 | −1.53 | 410 | 530 |

Cu and Ag are the only two metal surfaces that showed the distinctive preference for NO3RR over NO2RR: the "$E_{onset}$(NO3RR)–$E_{onset}$(NO2RR)" is positive. Specifically, the onset potentials of the NO3RR in LSV are very close to each other: −1.00 $V_{Ag/AgCl}$ and −0.94 $V_{Ag/AgCl}$ on Ag and Cu, respectively (FIGS. 37B-37C). Importantly, the onset potential of the NO2RR is far more negative on Ag than on Cu (−1.41 $V_{Ag/AgCl}$ vs. −0.99 $V_{Ag/AgCl}$), substantiating the higher energy barrier of $NO_2$ reduction on the Ag surface. As a result, the potential window between NO3RR and NO2RR onsets is significantly wider on Ag than on Cu (410 mV vs. 50 mV). In addition, Ag holds 180 mV more negative onset potential for HER than Cu (−1.53 $V_{Ag/AgCl}$ vs. −1.35 $V_{Ag/AgCl}$), and the "$E_{onset}$(NO3RR)–$E_{onset}$(HER)" is 530 mV (Ag) vs. 410 mV (Cu). The strong preference for the NO3RR over the NO2RR and HER could be particularly beneficial for selectively converting $NO_3^-$ to $NO_2^-$, as the produced $NO_2^-$ (from $NO_3^-$ reduction) may be preserved as the final product on the electrode.

Highly Selective $NO_3^-$-to-$NO_2^-$ Pathway on OD-Ag with Enhanced Activity

In order to significantly enhance NO3RR activity, oxide-derived Ag (OD-Ag) electrocatalysts were directly prepared from Ag foil by performing square wave voltammetry (SWV) and then conducting CA under a constant negative potential (Ma et al., "Selective and Efficient Reduction of Carbon Dioxide to Carbon Monoxide on Oxide-Derived Nanostructured Silver Electrocatalysts," Angew. Chem. Int. Ed. 55:9748-9752 (2016), which is hereby incorporated by reference in its entirety). The color change of Ag foil during the preparation was shown in FIG. 38A. The chemical state change between $AgO_x$ and $Ag^0$ during synthesis and the successful formation of OD-Ag was confirmed by X-ray diffraction (XRD) spectroscopy (FIG. 39B) and X-ray photoelectron spectroscopy (XPS) (FIG. 39C) (Murray et al., "Shape- and Size-Selective Electrochemical Synthesis of Dispersed Silver(I) Oxide Colloids," Nano Lett. 5:2319-2324 (2005), which is hereby incorporated by reference in its entirety). Scanning electron microscope (SEM) imaging (FIG. 31A) shows that OD-Ag has a rough surface with small particles (around 100 nm), in contrast to the smoother surface of Ag foil (FIGS. 40A-40F). Interestingly, optimized synthesis created a stepped and wave-like morphology with ±250 nm of surface depth, which was confirmed by atomic force microscopy (AFM) analysis (FIG. 31B and FIGS. 40A-40D) and lower-magnification SEM images (FIGS. 40E-40F). Underpotential deposition (UPD) of Pb (Kim et al., "Achieving Selective and Efficient Electrocatalytic Activity for CO2 Reduction Using Immobilized Silver Nanoparticles," J. Am. Chem. Soc. 137:13844-13850 (2015), which is hereby incorporated by reference in its entirety) (FIGS. 41A-41B) showed OD-Ag has 27.1 cm$^2$ of electrochemical surface area (ECSA), or 13 times as much as the same geometric size of Ag foil (2.1 cm$^2$).

As shown in FIG. 31C, compared with Ag foil, the onset potentials (NO3RR, NO2RR, and HER) on OD-Ag are positively shifted by approximately 200 mV with the wide onset potential window still maintained. Besides, by comparing FIG. 31C with FIG. 37A, OD-Ag showed the widest potential difference between NO3RR and NO2RR (440 mV), as well as between NO3RR and HER (540 mV), among the total 18 metals screened.

Throughout the potential range of −0.90 to −1.15 $V_{Ag/AgCl}$, OD-Ag delivered 5-10 times higher $NO_3^-$ conversion than Ag foil in the same electro-reduction experiment with the electrolyte containing 0.1 M $NO_3^-$ for one hour (FIG. 42A). More importantly, ultra-high faradaic efficiency (FE) towards $NO_2^-$ ranging from 95.4% to 91.3% and selectivity between 98.8% to 95.9% were obtained under the electrode potential from −0.90 V to −1.15 $V_{Ag/AgCl}$, accordingly (FIG. 42B).

The intrinsic activity of NO3RR was largely enhanced on the in-situ electrochemically fabricated OD-Ag, as confirmed by comparing OD-Ag with a commercial nano-Ag catalyst (i.e., Ag NPs/Ag: Ag nanoparticle-coated Ag foil). As shown in FIGS. 43A-43E, under similar conditions (particle size, substrate, etc.), OD-Ag exhibited tripled area-specific activity (0.72 vs. 0.26 mA cm$^{-2}_{Ag}$) and over doubled $NO_3^-$ conversion (19.6% vs. 8.5%). The substantially increased area-specific activity could originate from the wave-like morphology and increased abundance of under-coordinated Ag sites on the surface (discussed in detail in the DFT section) (Pander III et al., "Understanding the Heterogenous Electrocatalytic Reduction of Carbon Dioxide on Oxide-Derived Catalysts," *ChemElectroChem* 5:219-237 (2018); Back et al., "Active Sites of Au and Ag Nanoparticle Catalysts for $CO_2$ Electroreduction to CO," *ACS Catal.* 5:5089-5096 (2015), which are hereby incorporated by reference in their entirety).

The high $NO_3^-$-to-$NO_2^-$ selectivity on OD-Ag can be maintained in a wide potential window even at low $NO_3^-$ concentrations, indicating the basis of a robust and well-manageable pathway. At lower $NO_3^-$ concentrations (0.05 and 0.01 M), as shown in FIG. 31D, $NO_2$ production still dominated on OD-Ag with the $NO_3^-$-to-$NO_2^-$ selectivity all higher than 87.3% in the potential range of −1.00 to −1.30 $V_{Ag/AgCl}$, by applying the exact amount of theoretical charge required to completely reduce 0.01 M $NO_3^-$ to $NO_2^-$ (i.e., 29 C, FIG. 31D). More negative potentials resulted in a gradual increase in $NH_4^+$ generation, while the charge consumption by HER remained insignificant for all tested conditions (FE: <10%, FIG. 44).

OD-Ag was also compared with the widely used Cu foil at −1.30 $V_{Ag/AgCl}$ under same experimental conditions. With 0.01 M $NO_3^-$, it was found that OD-Ag outperformed Cu in both $NO_3^-$ conversion (65.3% vs. 39.0%) and $NO_3^-$-to-$NO_2^-$ selectivity (87.3% vs. 48.5%, FIG. 31E). Their performance difference was further validated by tests under different $NO_3^-$ concentrations and strongly negative potential of −1.50 $V_{Ag/AgCl}$ (FIG. 45). The exceptionally high NO3RR selectivity to $NO_2^-$ on OD-Ag also outperforms many other reported Cu-based catalysts (Yoshioka et al., "Electrocatalytic Reduction of Nitrate to Nitrous Oxide by a Copper-Modified Covalent Triazine Framework," *J. Phys. Chem.* 120:15729-15734 (2016); Wang et al., "Enhanced Nitrate-to-Ammonia Activity on Copper-Nickel Alloys via Tuning of Intermediate Adsorption," *J. Am. Chem. Soc.* 142:5702-5708 (2020); Reyter et al., "Study of the Electroreduction of Nitrate on Copper in Alkaline Solution," *Electrochim. Acta* 53:5977-5984 (2008); Perez-Gallent et al., "Electrocatalytic Reduction of Nitrate on Copper Single Crystals in Acidic and Alkaline Solutions," *Electrochim. Acta* 227:77-84 (2017), which are hereby incorporated by reference in their entirety).

As expected, the observed potential of losing dominance (≥90% selectivity) for $NO_3^-$-to-$NO_2^-$ (−1.30 $V_{Ag/AgCl}$) is fairly consistent with the potential that triggers the $NO_2^-$-to-$NH_4^+$ reaction in $NO_2^-$ solution (−1.25 $V_{Ag/AgCl}$) at the same concentration of 0.01 M (FIG. 46A-46B). Interestingly, a detectable level of $NH_2OH$ showed up under relatively more negative potentials in NO3RR (FIG. 31C). In addition, more $NH_2OH$ was generated from direct NO2RR (selectivity up to 5.6%, FIGS. 47A-47D). Such results are in concert with the recognition that $NH_2OH$ is a reaction intermediate to $NH_4^+$ for the reduction of $NO_3^-$ and $NO_2^-$ (Shen et al., "Electrocatalytic Nitrate Reduction by a Cobalt Protoporphyrin Immobilized on a Pyrolytic Graphite Electrode," *Langmuir* 31:8495-8501 (2015); Wang et al., "Unveiling the Activity Origin of a Copper-Based Electrocatalyst for Selective Nitrate Reduction to Ammonia," *Angew. Chem. Int. Ed.* 59:5350-5354 (2020), which are hereby incorporated by reference in their entirety).

In addition to the high $NO_3^-$-to-$NO_2^-$ activity, OD-Ag appeared highly durable and robust under testing conditions. As evidenced by XPS and XRD spectra (FIGS. 47A-47B), the chemical state of Ag in OD-Ag was unchanged after the electrochemical measurements. Moreover, neither structural change nor Ag leaching was detected (FIGS. 47C-47D).

Mechanism and Kinetics of NO3RR on OD-Ag

To obtain more mechanistic insights into the electrokinetics for $NO_3^-$-to-$NO_2^-$, the reaction order with respect to the $NO_3^-$ concentration was analyzed by fitting the partial current density for $NO_3^-$-to-$NO_2$ against the $NO_3^-$ concentration in log-log scale. Under −0.85 $V_{Ag/AgCl}$ (i.e., 60 mV more negative than the onset potential), ~100% FE of $NO_3^-$ to $NO_2^-$ has been verified on OD-Ag in all tested $NO_3^-$ concentrations (0.010-0.100 M, adjusted to pH 4 for each case), allowing the LSV currents (FIG. 48) of $NO_3^-$ reduction to be used as the partial currents for $NO_3^-$-to-$NO_2^-$. Note that the same reference electrode (Ag/AgCl) was used in all $NO_3^-$ concentrations to ensure the accurate potential control, thanks to its pH-insensitive nature (Eliaz and Gileadi, *Physical Electrochemistry: Fundamentals, Techniques, and Applications*, John Wiley & Sons (2019), which is hereby incorporated by reference in its entirety). As shown in FIG. 49A, a slope of 0.87 was obtained in the concentration range from 0.010 M to 0.075 M, strongly suggesting the first-order dependence of the $NO_3^-$-to-$NO_2^-$ reaction on the $NO_3^-$ concentration. The concentration of 0.100 M $NO_3^-$ does not follow the fitting, mainly due to the saturated active sites in $NO_3^-$ adsorption. The Tafel curves showed a slope of 120 mV $dec^{-1}$ (FIG. 50), which corresponds to an empirical transfer coefficient ($\alpha$=2.303RT/F d log(j)/dE) of 0.48. This suggested the first-electron transfer involved in the rate-determining step (RDS) of $NO_3^-$-to-$NO_2^-$ reaction on OD-Ag (Bard & Faulkner, "Electroactive Layers and Modified Electrodes," *Electrochemical Methods: Fundamentals and Applications*, $2^{nd}$ Ed. John Wiley & Sons, NY, New York, 580-632 (2000), which is hereby incorporated by reference in its entirety). Further, in the temperature range of 20–71° C., a moderate apparent activation energy was obtained (15.8 kJ $mol^{-1}$, under −1.10 $V_{Ag/AgCl}$, FIGS. 51A-51B).

In particular, $NO_3^-$-to-$NO_2^-$ reaction kinetics (or the current density) on OD-Ag is mainly regulated by the $NO_3^-$ concentration under a facile potential. For example, by applying 100% of theoretical charge (29 C) in converting 0.01 M $NO_3^-$ at −1.10 $V_{Ag/AgCl}$, the reaction rate was gradually decreased to zero during the consumption of $NO_3^-$ (FIGS. 52A-52B). Extending reaction time or applying excess charges is hard to overcome the fundamental obstacle for the further reduction of accumulated $NO_2$ or trigger HER on OD-Ag.

Since two protons are involved in the $NO_3^-$-to-$NO_2^-$ reaction, H/D kinetic isotope effect (KIE) was studied by comparing the LSV in different solvents: pure $H_2O$, pure $D_2O$, and two ratios of mixtures on OD-Ag in 0.1 M $NO_3^-$-containing electrolyte. As shown in FIG. 49B, a prominent isotopic effect was observed with a KIE value of 1.33 under −0.85 $V_{Ag/AgCl}$ (not a mass-transport-limited potential). Such observation implies that protons also participate in the RDS of $NO_3^-$-to-$NO_2^-$ reaction, in agreement with the proton-assisted mechanism identified by DFT computations discussed in the next section.

$^{14}N/^{15}N$ isotopic experiments were designed and conducted to probe the $NO_3^-$ reduction kinetics and pathways on OD-Ag. Specifically, an equal concentration (0.025 M) of $^{15}NO_3^-$ and $^{14}NO_2^-$ was used in the solution medium, and two characteristic electrode potentials (−1.30 and −1.50 $V_{Ag/AgCl}$) were investigated, under which negligible and considerable levels of $NH_4^+$ was generated, respectively. Enabled by the simultaneous detection of both isotopically labeled $^{14}NH_4^+$ and $^{15}NH_4^+$ by NMR spectroscopy (FIG. 49C), the kinetics of the following three separate reactions can be revealed: $^{15}NO_3^-$ to $^{15}NO_2^-$ (reaction 1, $k_1$ as the apparent rate constant), $^{14}NO_2^-$ to $^{14}NH_4^+$ (reaction 2, $k_2$), and $^{15}NO_3^-$ to $^{15}NH_4^+$ (reaction 3, $k_3$). The detailed kinetic model derivation, data collection, and kinetics regressions are shown in the isotopic experiment and kinetics modeling section (supra) and FIGS. 32A-32G.

As shown in FIGS. 32A-32G, $k_2$ (0.0064 min$^{-1}$) is approximately a quarter of $k_1$ (0.0273 min$^{-1}$) under −1.30 $V_{Ag/AgCl}$, while $k_3$ (0.0007 min$^{-1}$) is negligible. Under −1.50 $V_{Ag/AgCl}$, both $k_2$ and $k_3$ grew much more prominently than $k_1$. The $k_2$ and $k_3$ increased 4 times and 8 times, respectively, from −1.30 to −1.50 $V_{Ag/AgCl}$. As such, $k_2$ and $k_3$ attained about 81% and 18% of $k_1$, respectively.

$k_3$ is non-negligible under strongly negative potentials, indicating a direct $NO_3^-$-to-$NH_4^+$ reaction pathway that "bypasses" the desorption of the reaction intermediate ($NO_2^*$, the precursor of $NO_2^-$ product (Dima et al., "Electrocatalytic Reduction of Nitrate at Low Concentration on Coinage and Transition-Metal Electrodes in Acid Solutions," *J. Electroanal. Chem.* 554:15-23 (2003); Dima et al., "Nitrate Reduction on Single-Crystal Platinum Electrodes," *Electrochim. Acta* 50:4318-4326 (2005), which are hereby incorporated by reference in their entirety)) and then directly turns into $NH_4^+$ product. This experimentally detected direct $NO_3^-$-to-$NH_4^+$ reaction pathway is consistent with the DFT calculation prediction noted by the recent work on a Cu-based catalyst (Chen et al., "Electrochemical Reduction of Nitrate to Ammonia via Direct Eight-Electron Transfer Using a Copper-Molecular Solid Catalyst," *Nat. Energy* 5:605-613 (2020), which is hereby incorporated by reference in its entirety).

In addition, very low FE towards $NO_x$ gas products were detected from both NO3RR and NO2RR ($N_2O \leq 0.19\%$, $NO/NO_2 \leq 0.007\%$, Table 13). It also justifies the omission of $NO_x$ products in the kinetics model.

A Combined Electrocatalytic-Catalytic Process for $NO_3^-$ Removal from Agricultural Waste Streams Built on the exceptionally-high $NO_3^-$-to-$NO_2^-$ selectivity on OD-Ag and the highly reactive property of $NO_2^-$, a combined electrocatalytic-catalytic water treatment application was proposed. $NO_3^-$-containing agricultural waste was treated by coupling the electrocatalytic $NO_3^-$-to-$NO_2^-$ step on OD-Ag with a subsequent catalytic $NO_2^-$-to-$N_2$ step on a commercial 5 wt. % Pd/C catalyst using the clean reducing agent $H_2$ that is generated on-site by a PEM-based water electrolyzer (FIG. 53A and FIG. 54).

It is important to confirm the final reduction product is non-toxic $N_2$ instead of $NO_x$. A concentrated $NO_2^-$ solution (0.5 M) was reduced to increase the signal intensity for more accurate quantification by on-line gas chromatography (GC). Indeed, on-line GC confirmed 93.4% selectivity towards $N_2$, with selectivity towards $NH_4^+$, NO, and $N_2O$ of only 0.11%, 0.0009%, and 0.19% (FIGS. 55A-55B and Table 15), respectively, based on colorimetry and off-line GC methods. The catalytic reaction kinetics for $NO_2^-$-to-$N_2$ was examined on Pd/C in 0.01 M $NO_2$ solution (FIGS. 56A-56C), and a pseudo-first-order behavior was observed ($R^2$=0.99, FIG. 56B) with a rate constant of 27.96 L $g_{Pd}^{-1}$ min$^{-1}$. No apparent drop was observed in catalytic performance in three consecutive operations (FIG. 56C). Additional control experiments excluded possible adsorption of $NH_4^+$ or $NO_2^-$ on the high-surface-area carbon support (FIGS. 57A-57B) (Toebes et al., "Synthesis of Supported Palladium Catalysts," *J. Mol. Catal. A Chem.* 173:75-98 (2001), which is hereby incorporated by reference in its entirety).

TABLE 15

Content of NO and $N_2O$ Products for the Catalytic Reduction of 0.5M $NO_2^-$. Reaction Conditions and Calculation of Flow Rate are Detailed in the Quantification of H2 and N2 Section (supra)

| Reaction time (min) | Converted $NO_2^-$ (mol) | Detected NO (ppm) | Detected $N_2O$ (ppm) |
|---|---|---|---|
| 10 | 0.0075 | 7.2 | 165.2 |
| 15 | (for t = | 3.6 | (for t = 0-60 min) |
| 20 | 0-120 min) | 2.4 | |
| 40 | | 1.0 | |
| 60 | | <1.0[a] | |
| 80 | | <1.0 | 236.3 |
| 100 | | <1.0 | (for t = |
| 120 | | <1.0 | 60-120 min) |

[a]"<1.0 ppm" indicates the NO content was below the detection limit (1.0 ppm) of the nitrogen oxides detector tube.

Note: Estimation of selectivity to NO and $N_2O$ for t=0-120 min $n_{N_2O}$=14 mL min$^{-1}$×60 min×(165.2+236.3)×10$^{-6}$× 0.0415 mol L$^{-1}$/1000=1.40×10$^{-5}$ (mol)

The selectivity of $N_2O$ is $$S_{N_2O} = \frac{1.40 \times 10^{-5} \text{ mol}}{0.0075 \text{ mol}} \times 100\% = 0.19\%$$

Similarly, the estimated selectivity to NO is 0.0009% for t=0-120 min.

To examine the $NO_3^-$-removal capability, the combined electrocatalytic-catalytic process was tested to treat three solution media: 0.1 M KCl, a simulated waste stream from ion-exchange columns (Paidar et al., "Electrochemical Removal of Nitrate Ions in Waste Solutions After Regeneration of Ion Exchange Columns," *J. Appl. Electrochem.* 29:611-617 (1999), which is hereby incorporated by reference in its entirety), and real-world agricultural wastewater (collected from Des Moines Water Works, Iowa), all of which were enriched to contain 0.01 M $NO_3^-$ (i.e., 140 ppm-N). LSV showed no significant difference in the three solution media (FIG. 58). After the combined process for water treatment, 95+% of $NO_3^-$ was converted with <3.5 ppm of $NH_4^+$—N and <5.9 ppm of $NO_3^-$—N remaining, and no $NO_2$—N was detected in any of the treated solutions (FIG. 53B). Detailed experimental results and other tested reaction conditions are summarized in Table 16. The combined denitrification process in this work presents one of the lowest undesirable selectivity towards $NH_4^+$ and one of the highest desirable selectivities towards $N_2$ among other reported catalytic/electrocatalytic processes, as shown in Table 17.

TABLE 16

Summary of the Experimental Results of the Combined Denitrification Process

| Reaction medium | $c_0$ ($NO_3^-$) (ppm-N) | Step 1 (Electro-reduction on OD-Ag) | | | | | Step 2 (Catalytic reduction on Pd/C) | | | |
|---|---|---|---|---|---|---|---|---|---|---|
| | | Potential (V)[a] | Charge (C) | FE ($NO_2^-$) | FE ($H_2$) | X ($NO_3^-$)[b] | S ($NH_4^+$)[c] | c ($NO_3^-$) (ppm-N) | c ($NO_2^-$) (ppm-N) | c ($NH_4^+$) (ppm-N) |
| 0.1M | 140 | −1.10 | 31.5 | 82.0% | 4.9% | 98.8% | 1.8% | 1.7 | —[d] | 2.4 |
| KCl | 140 | −1.00 | 31.5 | 82.0% | 2.1% | 95.9% | 1.3% | 5.9 | — | 1.8 |
| (pH = 4) | 140 | −1.00 | 31.5 | 85.2% | 2.7% | 93.1% | 1.6% | 9.7 | — | 2.1 |
| | 140 | −1.00 | 31.5 | 84.1% | 1.9% | 96.1% | 1.8% | 5.7 | — | 1.7 |
| | 140 | −1.00 | 29.5 | 84.6% | 2.3% | 90.9% | 1.5% | 12.6 | — | 1.8 |
| | 70 | −1.00 | 14.5 | 84.0% | 1.6% | 92.9% | 1.3% | 5.0 | — | 0.8 |
| Simulated[e] | 140 | −1.00 | 33.5 | 80.6% | 3.8% | 97.4% | 1.6% | 1.7 | — | 2.4 |
| Real[f] | 140 | −1.00 | 35.3 | 78.5% | 3.2% | 98.4% | 2.5% | 3.6 | — | 3.5 |

[a] Potential (V) vs. Ag/AgCl.
[b] Conversion of $NO_3^-$.
[c] Selectivity to $NH_4^+$.
[d] "—" indicates the level of $NO_2^-$ was below the detection limit of 1 μM of the colorimetric method.
[e] Simulated waste stream from the ion-exchange columns (Hörold et al., "Development of Catalysts for a Selective Nitrate and Nitrite Removal from Drinking Water," Catal. Today 17:21-30 (1993), which is hereby incorporated by reference in its entirety).
[f] Real agricultural wastewater from Des Moines Water Works, Iowa

TABLE 17

Summary of the Reported Electrocatalytic or Catalytic System for $NO_3^-$ Removal.

| $c_0$ ($NO_3^-$) (ppm-N) | System | Catalyst | X ($NO_3^-$)[a] | S ($N_2$)[b] | S ($NO_x$)[c] | S (gases)[d] | S ($NH_4^+$)[e] | Ref. |
|---|---|---|---|---|---|---|---|---|
| 700 | Electrocatalytic | Cu | 90% | 1% | 0.1% | N/A | 77.3 | a |
| 112 | Electrocatalytic | Blended $Sn_{0.8}Pd_{0.2}$/S | 100% | 81% | 0 | N/A | 14[f] | b |
| 700 | Electrocatalytic | Sn | 99% | 92% | 0 | N/A | 8% | c |
| 700 | Electrocatalytic | Bi | 95% | 65% | 16% | N/A | 19% | d |
| 50 | Electrocatalytic | nZVI@OMC | 65% | N/A | N/A | 74% | 26% | e |
| 140 | Electrocatalytic | BDD | 48% | 45% | 0 | N/A | 7%[g] | f |
| 100 | Electrocatalytic[h] | nZVI@D201 | 80% | N/A | N/A | 95% | N/A | g |
| 50 | Catalytic | PdIn | 100% | N/A | N/A | 95% | 5% | h |
| 100 | Catalytic | PdIn | 82% | N/A | N/A | 74% | 26% | i |
| 360 | Catalytic | PdCu | >90% | N/A | <1% | 94% | 3% | j |
| 30 | Catalytic | PdSn | 100% | N/A | N/A | 91% | 9% | k |
| 140 | Electrocatalytic-catalytic | OD-Ag and Pd/C | 98% | 93% | N/A | 99% | 1% | This work |

[a] Conversion of $NO_3^-$.
[b] Selectivity to $N_2$.
[c] Selectivity to $NO_x$.
[d] Selectivity to gaseous products [= (Reacted $NO_3^-$ − Produced $NH_4^+$ − Produced $NO_2^-$)/(Reacted $NO_3^-$)].
[e] Selectivity to $NH_4^+$.
[f] Yield of $NH_4^+$ (= Conversion of $NO_3^-$ × Selectivity of $NH_4^+$).
[g] FE of $NH_4^+$.
[h] Electro-reduction of $NO_3^-$ to $NH_4^+$ coupled with electro-oxidation of $NH_4^+$ to $N_2$.
a: Polatides & Kyriacou, "Electrochemical Reduction of Nitrate Ion on Various Cathode Reaction Kinetics on Bronze Cathode," Journal of Applied Electrochemistry 35:421-427 (2005), which is hereby incorporated by reference in its entirety
b: Su et al., "Mode of Electrochemical Deposition on the Structure and Morphology of Bimetallic Electrodes and its Effect on Nitrate Reduction Toward Nitrogen Selectivity," Applied Catalysis B: Environmental 257 (2019), which is hereby incorporated by reference in its entirety
c: Katsounaros et al., "Efficient Electrochemical Reduction of Nitrate to Nitrogen on Tin Cathode at Very High Cathodic Potentials," Electrochim. Acta 52:1329-1338 (2006), which is hereby incorporated by reference in its entirety
d: Dortsiou & Kyriacou, "Electrochemical Reduction of Nitrate on Bismuth Cathodes," Journal of Electroanalytical Chemistry 630:69-74 (2009), which is hereby incorporated by reference in its entirety
e: Teng et al., "Selective Nitrate Reduction to Dinitrogen by Electrocatalysis on Nanoscale Iron Encapsulated in Mesoporous Carbon," Environ. Sci. Technol. 52:230-236 (2018), which is hereby incorporated by reference in its entirety
f: Kuang et al., "Electrochemical Reduction of Nitrate on Boron-Doped Diamond Electrodes: Effects of Surface Termination and Boron-Doping Level," Chemosphere 251:126364 (2020)
g: Liu et al., "Electrochemically Mediated Nitrate Reduction on Nanoconfined Zerovalent Iron: Properties and Mechanism," Water Res. 173:115596 (2020), which is hereby incorporated by reference in its entirety
h: Guo et al., "Insights into Nitrate Reduction Over Indium-Decorated Palladium Nanoparticle Catalysts," ACS Catal. 8:503-515 (2017), which is hereby incorporated by reference in its entirety
i: Marchesini et al., "Study of the Interactions of Pd, In with $SiO_2$ and $Al_2O_3$ Mixed Supports as Catalysts for the Hydrogenation of Nitrates in Water," Catalysis Communications 21:9-13 (2012), which is hereby incorporated by reference in its entirety
j: Constantinou et al., "Catalytic Removal of Nitrates from Waters," Catalysis Today 151:190-194 (2010), which is hereby incorporated by reference in its entirety
k: Hamid et al., "Highly Reactive and Selective Sn-Pd Bimetallic Catalyst Supported by Nanocrystalline ZSM-5 for Aqueous Nitrate Reduction," Applied Catalysis B: Environmental 187:37-46 (2016), which is hereby incorporated by reference in its entirety In addition, this application experimentally demonstrated that $H_2$ generated on-site by a PEM-based water electrolyzer can completely replace the $H_2$ feed from the pressurized cylinder (FIGS. 33A-33B), avoiding the use of commercial $H_2$ which not only relies heavily upon the reforming of fossil fuels for production but also requires costly infrastructure for storage and transportation (van der Zwaan et al., "The Cost of Pipelining Climate Change Mitigation: An Over-view of the Economics of $CH_4$, $CO_2$ and $H_2$ Transportation," *Appl. Energy* 88:3821-3831 (2011), which is hereby incorporated by reference in its entirety).

CONCLUSION

The unique $NO_3^-$-to-$NO_2^-$ selectivity was discovered on OD-Ag among a series of metal surfaces. Its significantly enhanced activity compared to nano-Ag could originate from the wave-like stepped-surface that exposes an increased abundance of under-coordinated active sites. Up to 98% selectivity and 95% faradaic efficiency were achieved and well-maintained in a wide potential window. Electro-kinetics and DFT computations provided mechanistic insights into the ultrahigh $NO_3^-$-to-$NO_2^-$ selectivity observed on OD-Ag, which was not prominent on Cu. Built on the highly selective $NO_3^-$-to-$NO_2^-$ pathway on OD-Ag, a combined electrocatalytic-catalytic process was demonstrated for $NO_3^-$ removal from real-world agricultural wastewater to $N_2$. Powered by inexpensive renewable electricity, the directional reduction of $NO_3^-$ has the ability to unlock the potential to economically denitrify agricultural wastewater towards utterly harmless $N_2$. The produced $NO_2^-$ may also be utilized as a reactive platform species for distributed manufacturing of various nitrogen-based products in need.

Converting excess nitrate ($NO_3^-$) from waste streams, through nitrite ($NO_2^-$) as the essential intermediate, to harmless dinitrogen ($N_2$) has become an important environmental and health topic. However, realizing highly-selective $NO_3^-$ reduction towards $NO_2^-$ has proven challenging, largely because of the high reactivity of $NO_2^-$ in its deep reduction to ammonia/ammonium ($NH_3/NH_4^+$) with the lowest valence. The $NO_3^-$-to-$NO_2^-$ conversion is usually catalyzed by nitrate reductase enzymes in nature. This application reports the exceptionally high selectivity and significantly enhanced intrinsic activity of electrocatalytic $NO_3^-$-to-$NO_2^-$ conversion on oxide-derived silver (OD-Ag). Up to 98% $NO_3^-$-to-$NO_2^-$ selectivity and 95% faradaic efficiency were achieved in a wide potential window. Electro-kinetics and DFT computations provided insights into the underlying cause of the unique selectivity observed on OD-Ag compared with Cu. Benefiting from the unique $NO_3^-$-to-$NO_2^-$ selectivity on OD-Ag, a catalytic process of $NO_2^-$-to-$N_2$ was coupled to treat $NO_3^-$-containing real-world wastewater forming $N_2$.

Although preferred embodiments have been depicted and described in detail herein, it will be apparent to those skilled in the relevant art that various modifications, additions, substitutions, and the like can be made without departing from the spirit of the present application and these are therefore considered to be within the scope of the present application as defined in the claims which follow.

What is claimed:

1. A system for removal of nitrate from water, said system comprising:
    a first reactor comprising a nanostructured oxide-derived silver (OD-Ag) electrode for electrocatalytic reduction of nitrate ($NO_3^-$) to nitrite ($NO_2^-$), wherein the nanostructured OD-Ag electrode comprises a surface, wherein said surface comprises a wave-like morphology, said wave-like morphology comprising peaks and valleys deviating ±250 nm from flatness and
    a second reactor comprising a Pd-based catalyst for catalytic reduction of nitrite ($NO_2^-$).

2. The system according to claim 1, wherein the first reactor comprises an H-type cell reactor structure.

3. The system according to claim 2, wherein the first reactor comprises a catholyte portion and an anolyte portion, wherein the catholyte portion and the anolyte portion are connected by a membrane.

4. The system according to claim 3, wherein the pH in the catholyte portion and the anolyte portion is at least 4.

5. The system according to claim 4, wherein the pH in the catholyte portion and the anolyte portion is between about 4 and 13.

6. The system according to claim 1, wherein the system further comprises:
    a sealed trap acid solution to absorb $NH_3$.

7. The system according to claim 1 further comprising:
    an online gas chromatography unit.

8. A method of removing nitrate from water, said method comprising:
    providing a system comprising:
        a first reactor comprising a nanostructured oxide-derived silver (OD-Ag) electrode for electrocatalytic reduction of nitrate ($NO_3^-$) to nitrite ($NO_2^-$), wherein the nanostructured OD-Ag electrode comprises a surface, wherein said surface comprises a wave-like morphology, said wave-like morphology comprising peaks and valleys deviating ±250 nm from flatness and
        a second reactor comprising a Pd-based catalyst for catalytic reduction of nitrite ($NO_2^-$);
    introducing water containing nitrate ($NO_3^-$) into the first reactor to cause catalytic reduction of the nitrate into nitrite ($NO_2^-$) by the nanostructured OD-Ag electrode; and
    introducing water from the first reactor into the second reactor to cause reduction of nitrite ($NO_2^-$) by the Pd-based catalyst, thereby removing nitrate from the drinking water.

9. The method according to claim 8, wherein the first reactor has an H-type cell reactor structure.

10. The method according to claim 9, wherein the first reactor comprises a catholyte portion and an anolyte portion, wherein the catholyte portion and the anolyte portion are connected by a membrane.

11. The method according to claim 10, wherein the pH in the catholyte portion and the anolyte portion is at least 4.

12. The method according to claim 11, wherein the pH in the catholyte portion and the anolyte portion is between about 4 and 13.

13. The method according to claim 8, wherein the system further comprises:
    a sealed trap acid solution to absorb $NH_3$.

14. The method according to claim 8, wherein $H_2$ generated from a cathode in the first reactor is used to reduce nitrite in the second reactor.

15. The method according to claim 8, wherein said water is selected from one or more of drinking water, agricultural river water, and downstream from an anion exchange column in a water treatment plant.

16. The method according to claim 8, wherein said method achieves a nitrate ($NO_3^-$) concentration of about 1.6-2.5 ppm (as Nitrogen).

17. The method according to claim 8, wherein said method achieves an $NH_3$ concentration of about 1.1-2.5 ppm $NH_3$ (as Nitrogen).

18. The method according to claim 8, wherein said method achieves an undetectable nitrite ($NO_2^-$) concentration.

19. The method according to claim 8, wherein molecular nitrogen gas ($N_2$) is a product from nitrite reduction in the second reactor.

20. The method according to claim 19, wherein the molecular nitrogen gas ($N_2$) is greater than 93% of the product from nitrite reduction in the second reactor.

* * * * *